(12) United States Patent
Clayton

(10) Patent No.: US 11,898,619 B2
(45) Date of Patent: Feb. 13, 2024

(54) STRUCTURES, SYSTEMS, AND METHODS FOR ENERGY DISTRIBUTION

(71) Applicant: Ogre Skin Designs, LLC, Austin, TX (US)

(72) Inventor: Brent E. Clayton, Austin, TX (US)

(73) Assignee: Ogre Skin Designs, LLC, Austin, TX (US)

( * ) Notice: Subject to any disclaimer, the term of this patent is extended or adjusted under 35 U.S.C. 154(b) by 0 days.

(21) Appl. No.: 17/837,588

(22) Filed: Jun. 10, 2022

(65) Prior Publication Data

US 2022/0381312 A1 Dec. 1, 2022

Related U.S. Application Data

(62) Division of application No. 16/442,243, filed on Jun. 14, 2019, now Pat. No. 11,371,576.

(Continued)

(51) Int. Cl.
| | |
|---|---|
| *F16F 7/12* | (2006.01) |
| *F41H 1/00* | (2006.01) |
| *A42B 3/06* | (2006.01) |

(52) U.S. Cl.
CPC ........ *F16F 7/12* (2013.01); *A42B 3/06* (2013.01); *F41H 1/00* (2013.01)

(58) Field of Classification Search
CPC ................. F16F 7/12; A42B 3/06; F41H 1/00
See application file for complete search history.

(56) References Cited

U.S. PATENT DOCUMENTS

| | | | |
|---|---|---|---|
| 3,086,899 A | 4/1963 | Smith et al. | |
| 3,090,175 A | 5/1963 | Berglund | |

(Continued)

FOREIGN PATENT DOCUMENTS

| | | | |
|---|---|---|---|
| CN | 103478046 A | * | 1/2014 |
| EP | 0031378 B1 | | 3/1984 |

(Continued)

OTHER PUBLICATIONS

International Searching Authority, International Search Report and Written Opinion for PCT/US2019/037361 dated Apr. 21, 2020, eight pages.

*Primary Examiner* — Melanie Torres Williams
(74) *Attorney, Agent, or Firm* — Dickinson Wright, PLLC

(57) ABSTRACT

Energy distribution structures provide architectural flexibility in various configurations, materials, and scalability, which enables a vast number of applications. An energy distribution structure or array thereof may include a three-dimensional outer component and a three-dimensional inner component within the outer component. The outer component absorbs and redirects initial energy from an applied energy event, and the inner component absorbs and redirects residual energy from the applied energy event. Such an applied energy event may be caused by a ballistic or non-ballistic impact, an instantaneous or prolonged impact such as atmospheric pressure or decompression, explosive overpressure (shockwave), low-velocity contact, and blunt force trauma. Energy distribution structures can increase the strength, resilience or survivability of such events, and reduce the injury or damage to target objects such as people, vehicles, structures, vessels and surfaces by shielding same from such events.

20 Claims, 115 Drawing Sheets

Related U.S. Application Data

(60) Provisional application No. 62/685,850, filed on Jun. 15, 2018.

(56) References Cited

U.S. PATENT DOCUMENTS

| | | | |
|---|---|---|---|
| 3,689,345 A | 9/1972 | Figge et al. | |
| 3,782,029 A * | 1/1974 | Bardot | A63F 9/0073 446/85 |
| 3,849,237 A | 11/1974 | Zetlin | |
| 3,906,571 A | 9/1975 | Zetlin | |
| 4,348,442 A | 9/1982 | Figge | |
| 4,448,832 A | 5/1984 | Kidwell | |
| 4,495,237 A * | 1/1985 | Patterson | E04C 2/3405 156/291 |
| 4,965,138 A | 10/1990 | Gonzalez | |
| 5,266,379 A | 11/1993 | Schaeffer et al. | |
| 5,518,802 A | 5/1996 | Colvin et al. | |
| 5,804,757 A | 9/1998 | Wynne | |
| 6,112,635 A | 9/2000 | Cohen | |
| 6,174,587 B1 | 1/2001 | Figge, Sr. | |
| 6,200,664 B1 | 3/2001 | Figge et al. | |
| 6,543,755 B2 | 4/2003 | Monson et al. | |
| 6,682,128 B2 | 1/2004 | Carroll, III | |
| 6,931,812 B1 | 8/2005 | Lipscomb | |
| 7,416,775 B2 | 8/2008 | Snel | |
| 7,487,589 B2 | 2/2009 | Guo | |
| 7,574,830 B2 | 8/2009 | Baker | |
| 7,866,248 B2 | 1/2011 | Moore, III et al. | |
| D652,709 S | 1/2012 | Bucci | |
| 8,426,010 B2 | 4/2013 | Stadthagen-Gonzalez | |
| 8,430,930 B2 | 4/2013 | Hunt | |
| 8,826,602 B1 * | 9/2014 | Lipscomb | E04B 1/19 52/80.2 |
| 9,733,049 B1 | 8/2017 | Warren | |
| 9,869,100 B2 | 1/2018 | Sennik | |
| 2002/0017805 A1 | 2/2002 | Carroll et al. | |
| 2005/0183376 A1 | 8/2005 | Shoji | |
| 2009/0230729 A1 | 9/2009 | Lusk | |
| 2009/0274865 A1 | 11/2009 | Wadley et al. | |
| 2010/0300275 A1 | 12/2010 | Warren | |
| 2011/0041455 A1 | 2/2011 | Philips | |
| 2011/0107904 A1 | 5/2011 | Queheillalt et al. | |
| 2011/0283873 A1 | 11/2011 | Wadley et al. | |
| 2014/0060305 A1 | 3/2014 | Fromson | |
| 2015/0305430 A1 | 10/2015 | Rush et al. | |
| 2017/0101789 A1 | 4/2017 | Cormier et al. | |

FOREIGN PATENT DOCUMENTS

| | | | |
|---|---|---|---|
| FR | 2827670 A1 * | 1/2003 | G01B 11/16 |
| PL | 225435 B1 * | 4/2017 | |
| WO | 8803086 A1 | 5/1988 | |
| WO | 2008023939 A1 | 2/2008 | |
| WO | 2010082970 A2 | 7/2010 | |

* cited by examiner

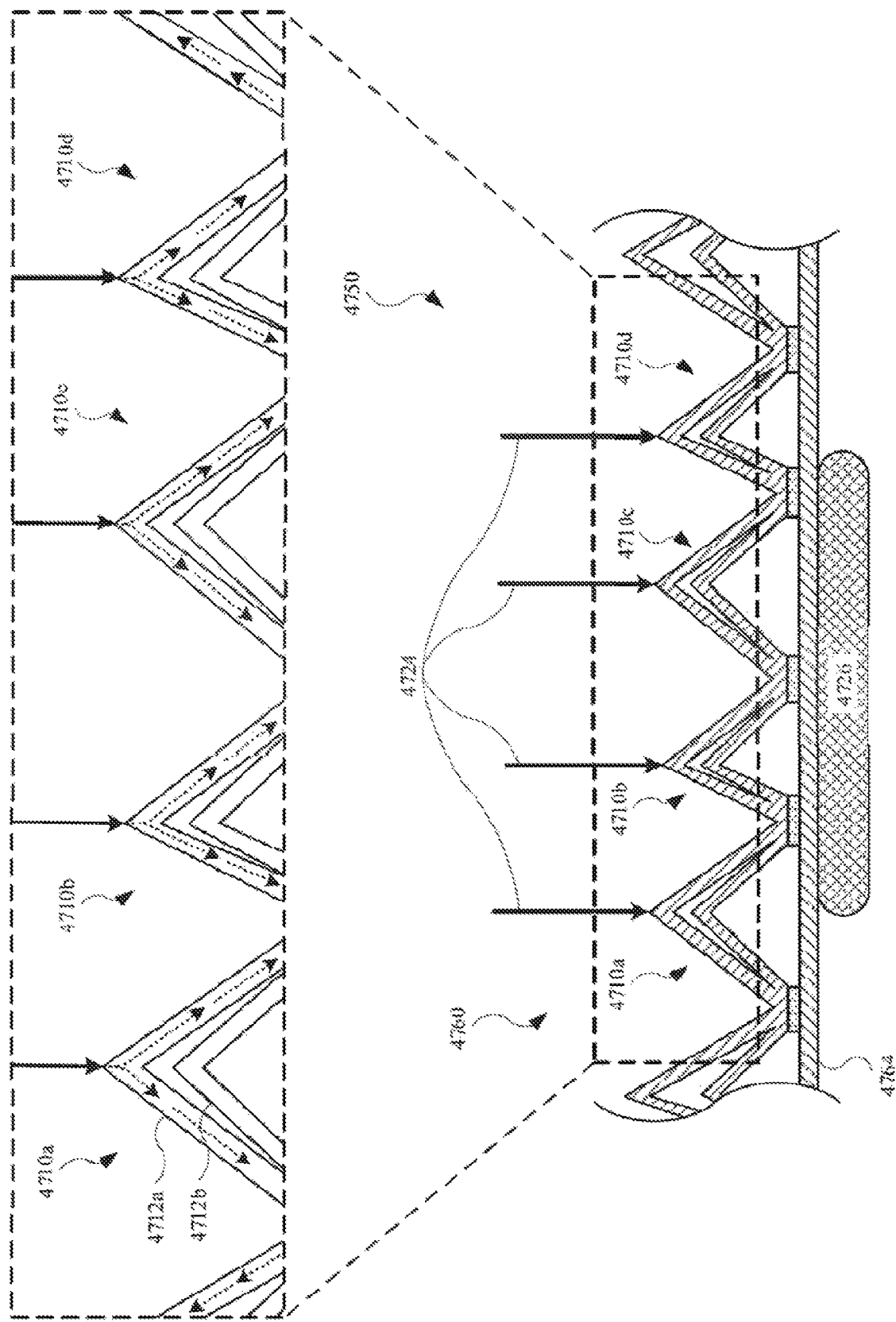

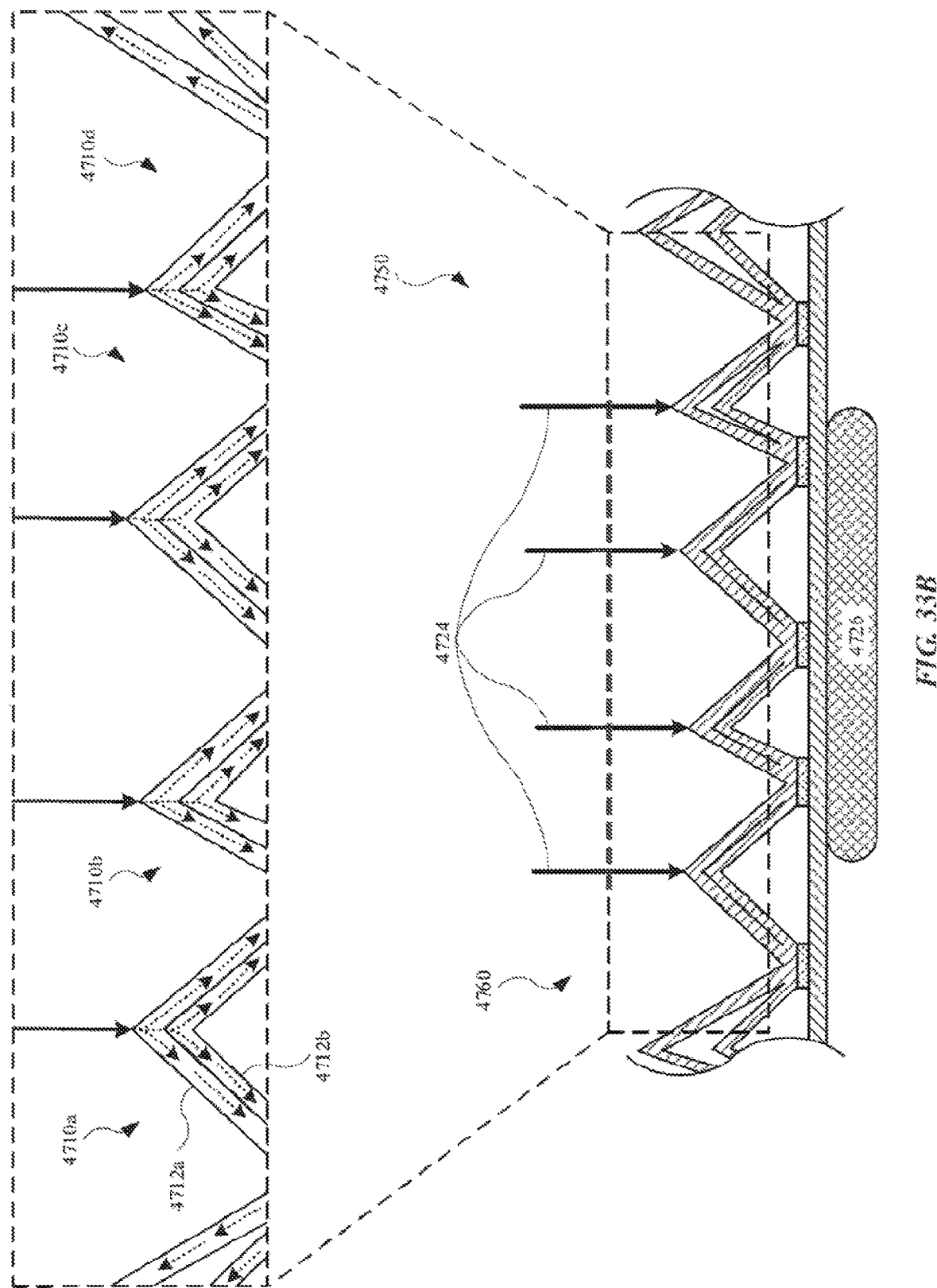

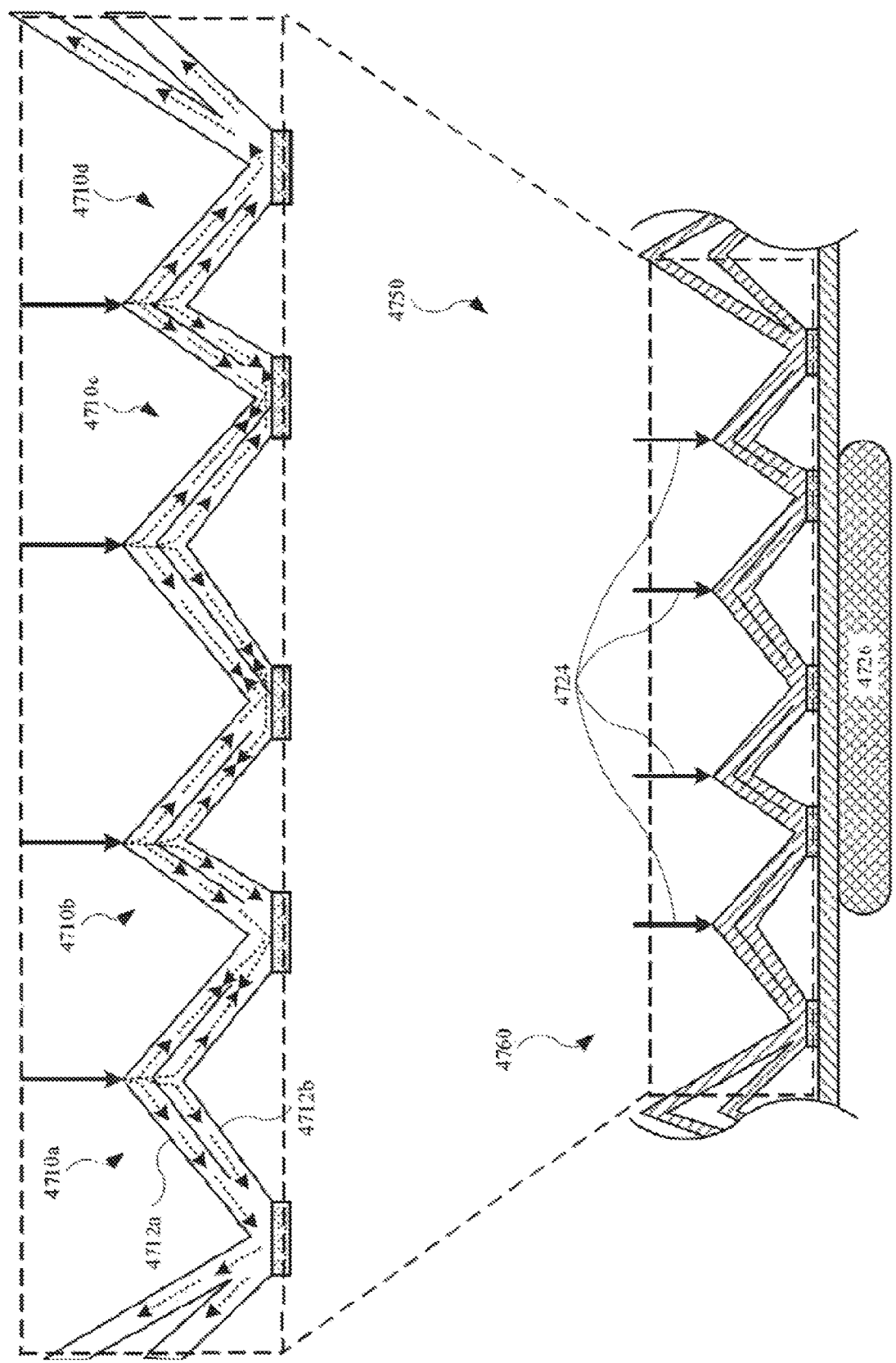

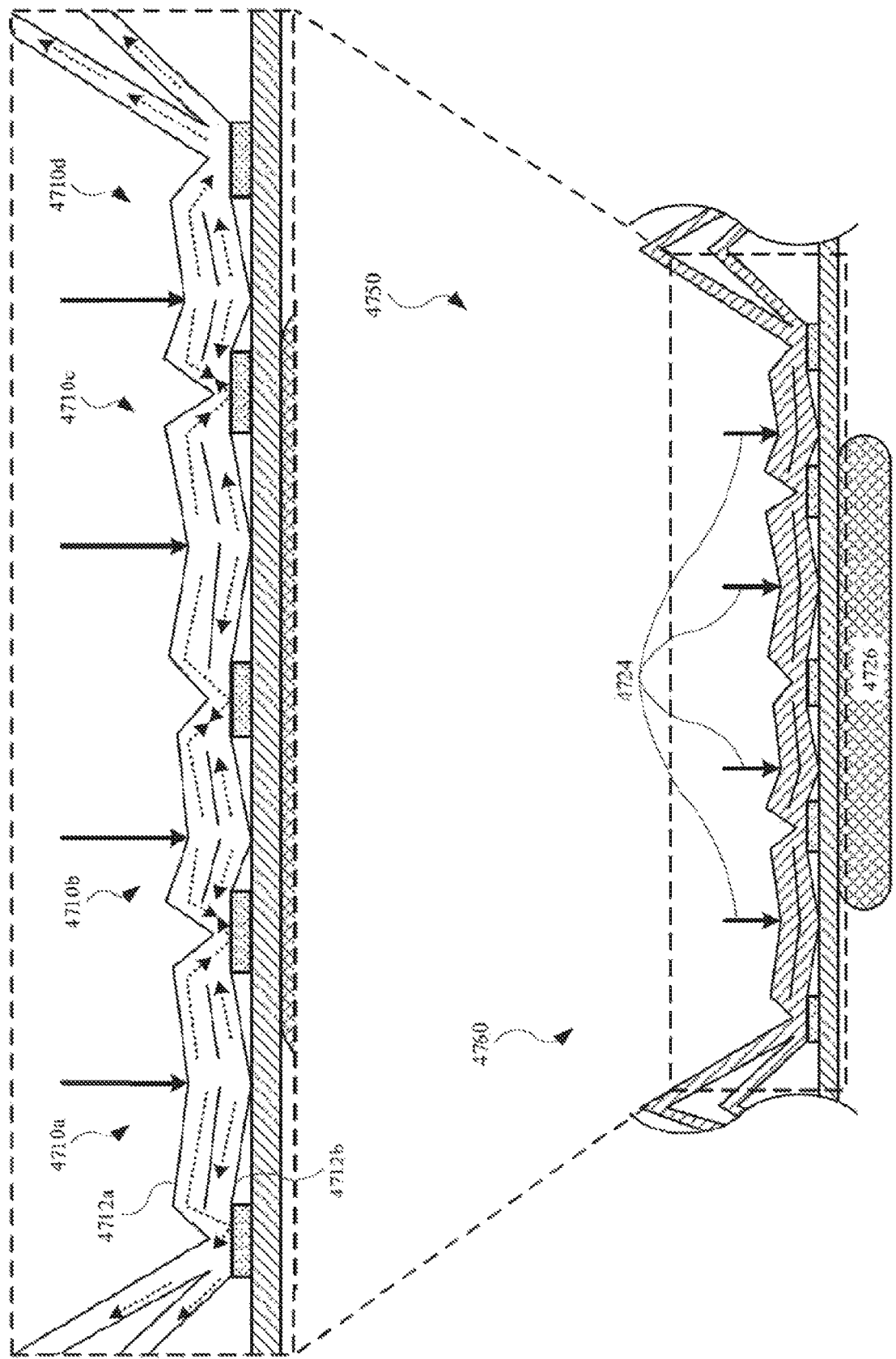

Rotation Creating Electromagnetic Field
Rotating Inside Each Unit

|  | Sphere "X" | SA |
|---|---|---|
| Sphere Surface Area | • r = 15' | • r = 5' |
| $SA = 4\pi r^2$ | $4 \times \pi \times r^2$ | $4 \times \pi r^2$ |
|  | $4 \times 3.14 \times (15)^2$ | $4 \times \pi \times 25^{SF}$ |
|  | $4 \times 3.14 \times 225^{SF}$ | $SA = 314^{SF}$ |
|  | $SA = 3{,}202.8_{SF}$ | $\dfrac{3{,}202.8 \div 314}{10.2}$ |
|  | Sphere "X" | V |
| $V = 4/3\, \pi r^3$ | • r = 15' | • r = 5' |
|  | $4/3 \times 3.14 \times (15)^3$ | $4/3 \times 3.14 \times 125^{CF}$ |
|  | $4/3 \times 3.14 \times 3{,}375$ | $V = 523.60_{CF}$ |
|  | $V = 14{,}137.17_{CF}$ | $\dfrac{14{,}137.17 \div 523.60}{= 27}$ |

FIG. 86

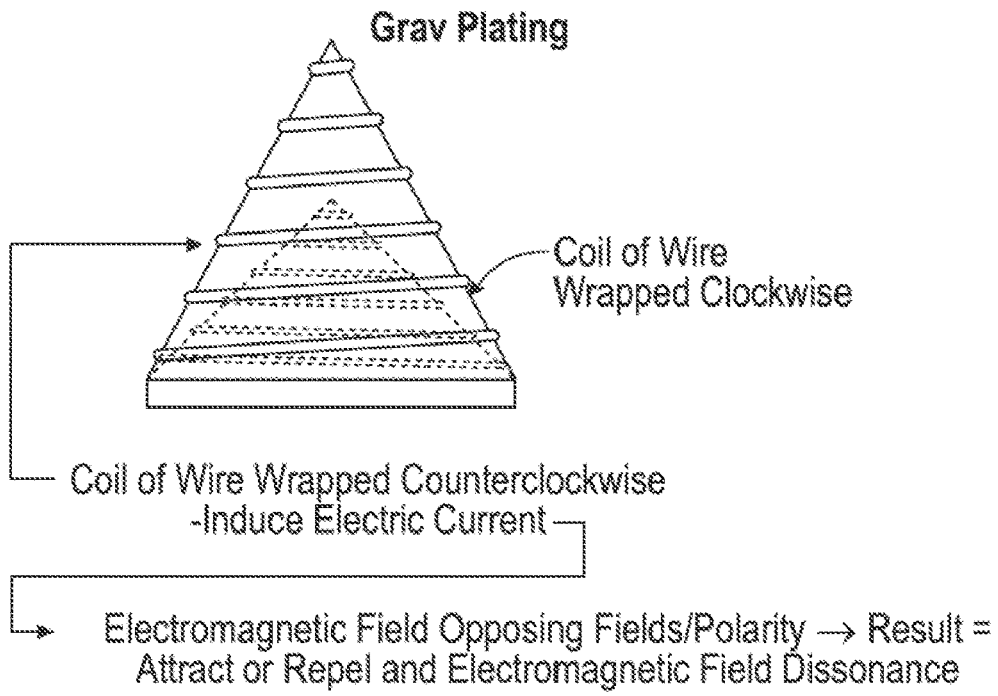
FIG. B1A
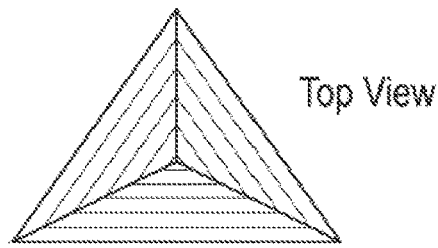
FIG. B1B
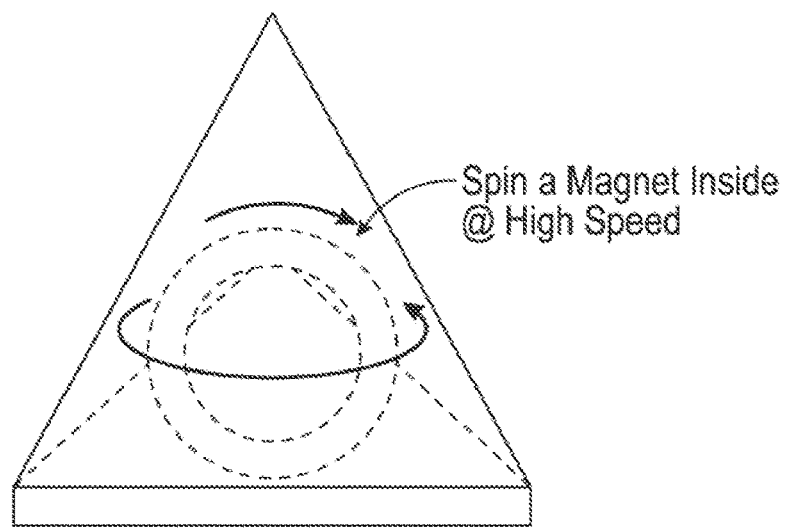
FIG. B1C

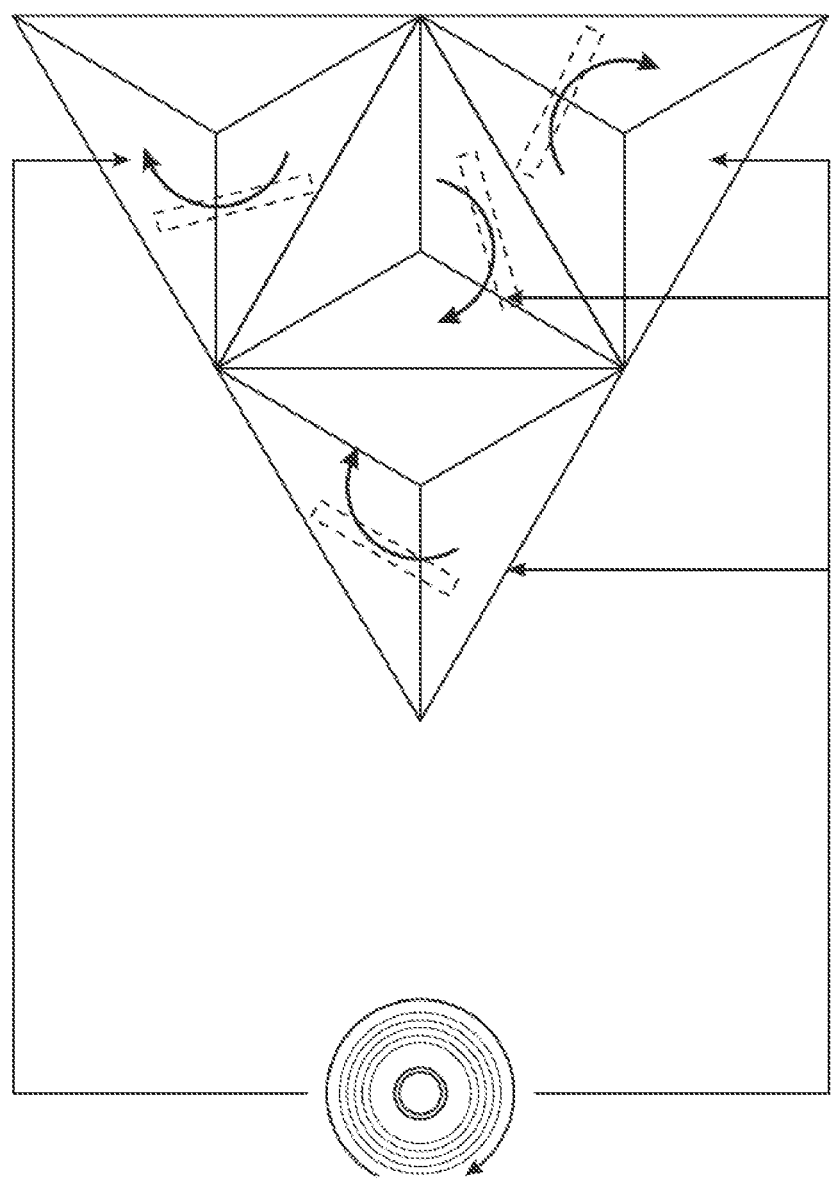
Rotation Creating Electromagnetic Field Rotating Inside Each Unit
FIG. B2

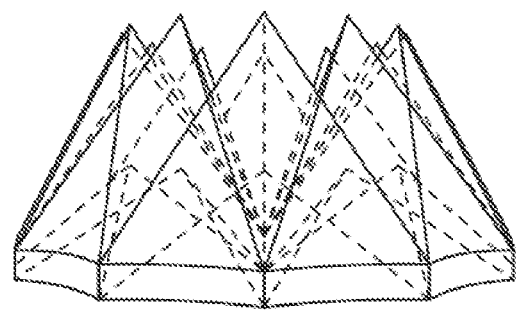
FIG. B3
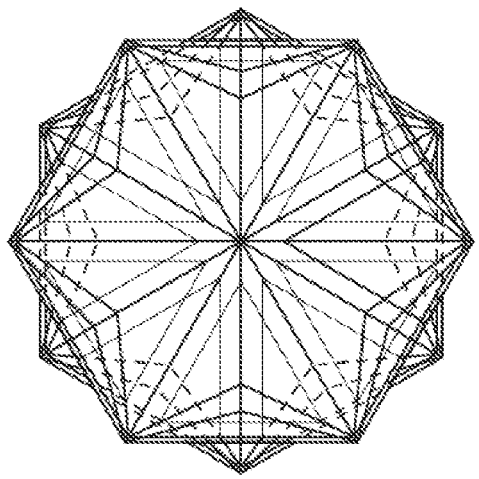
FIG. B4
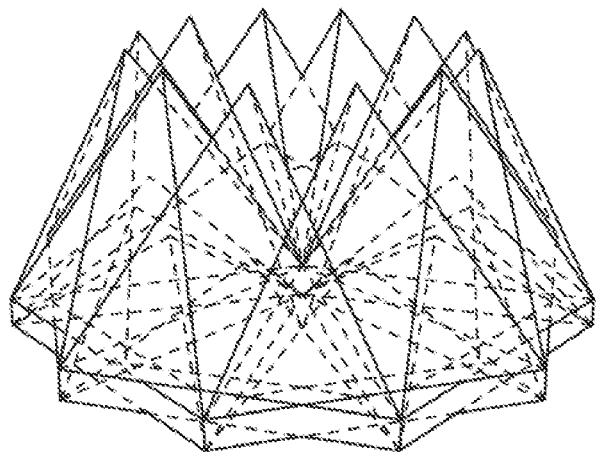
FIG. B5

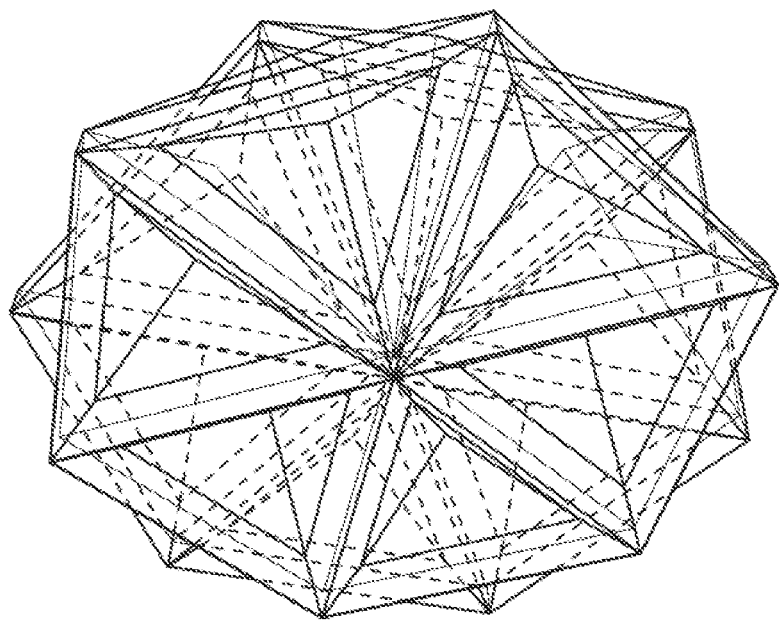
FIG. B6
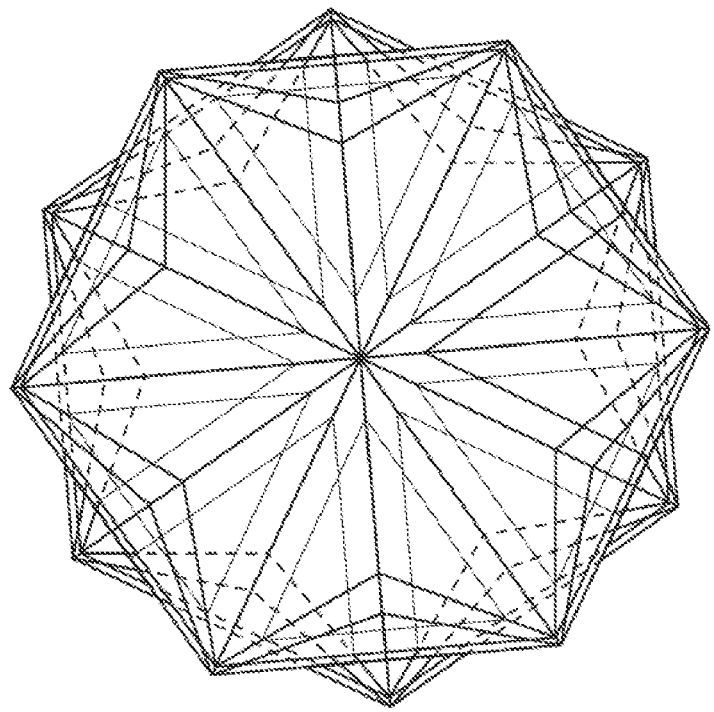
FIG. B7

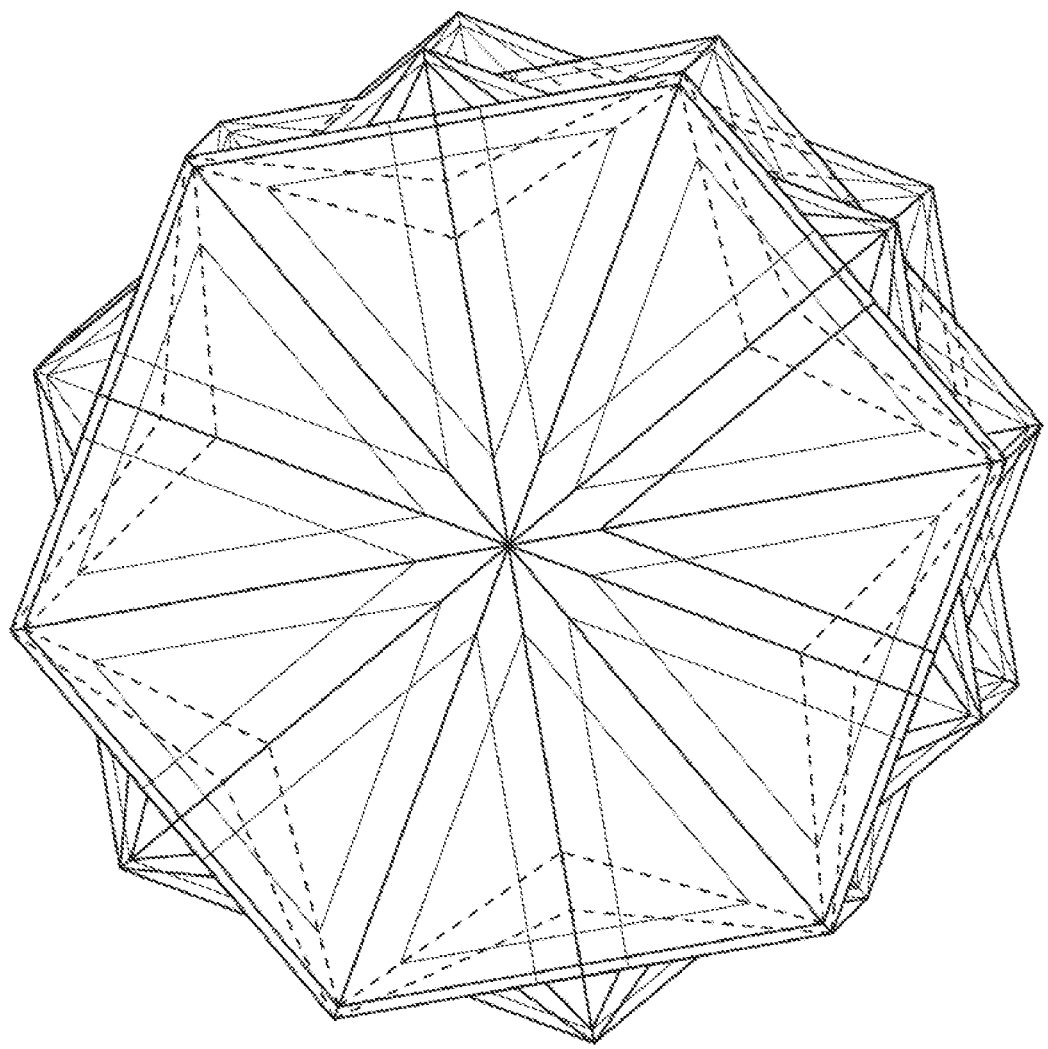
FIG. B8

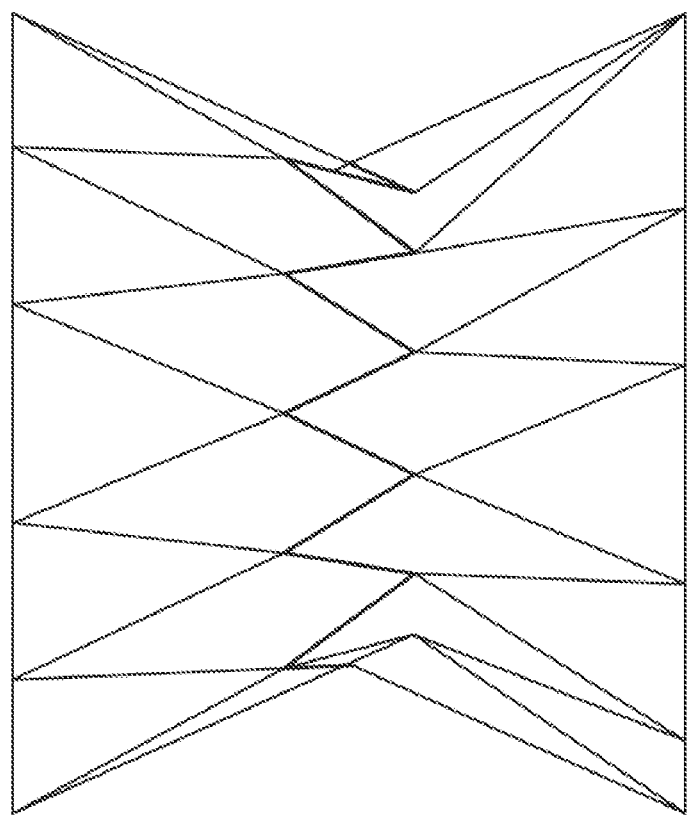
FIG. B9

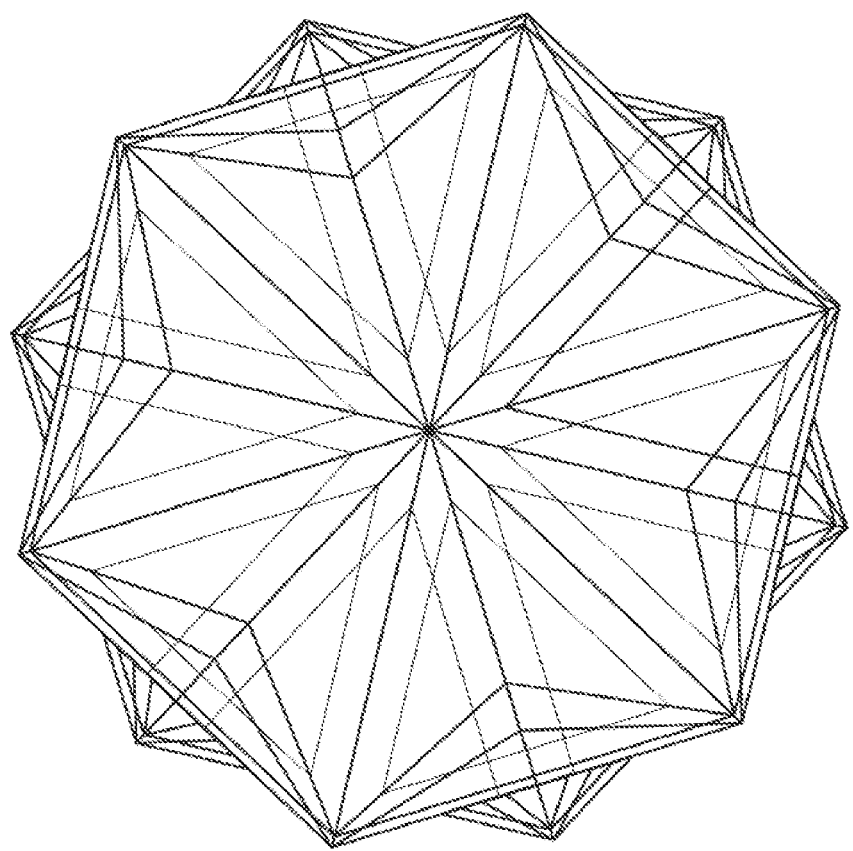
FIG. B10

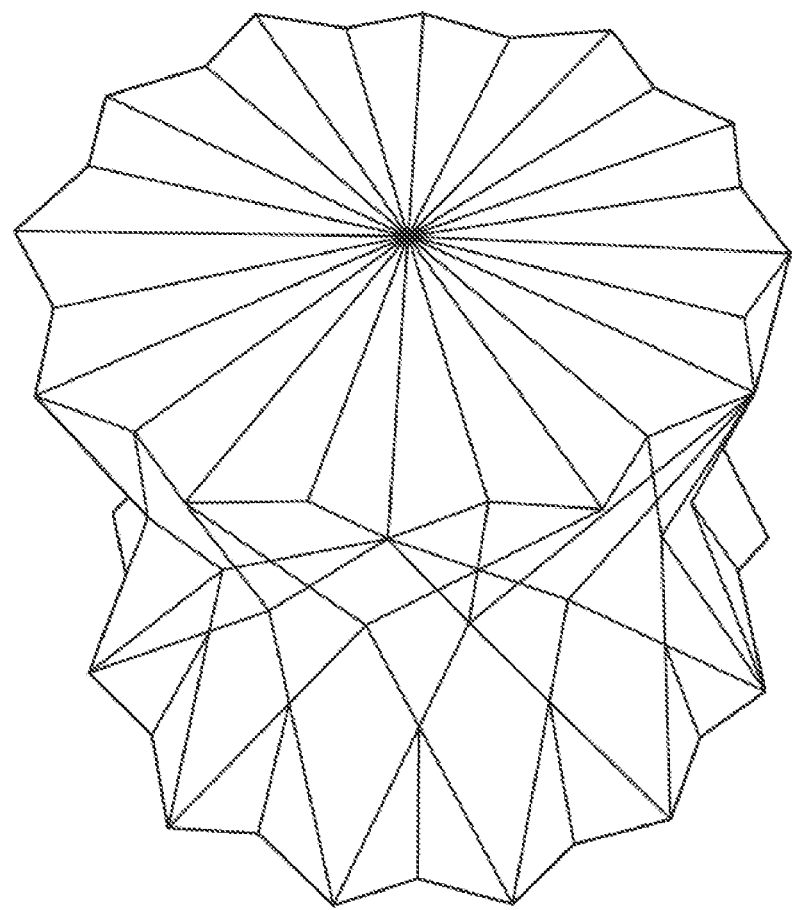
FIG. B11

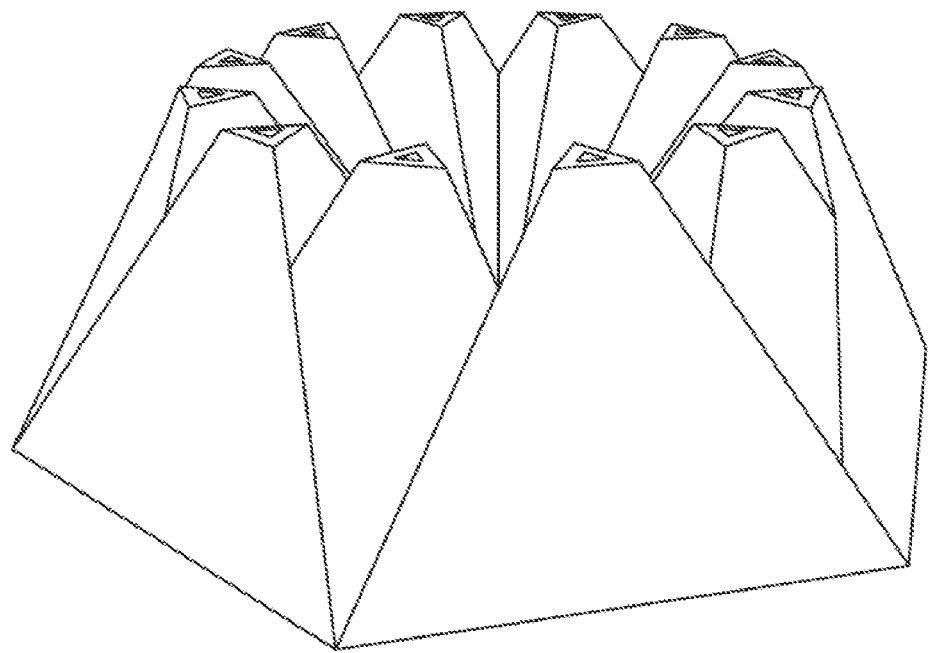
FIG. B12
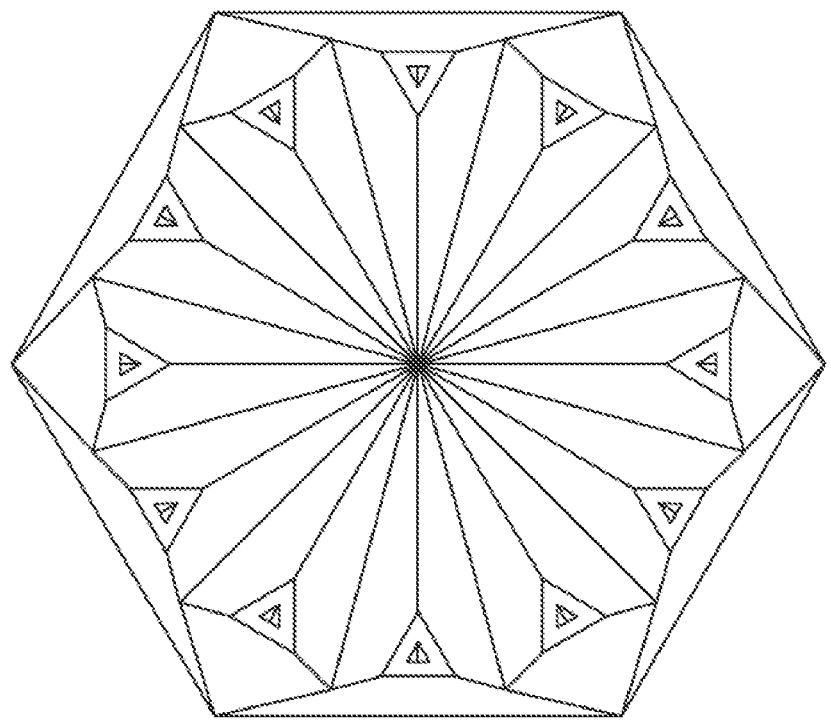
FIG. B13

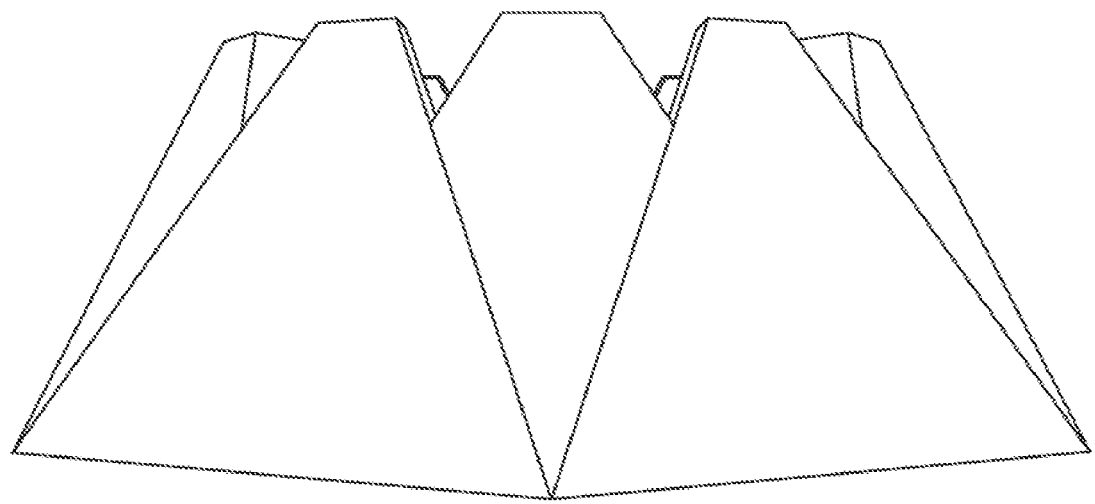
FIG. B14
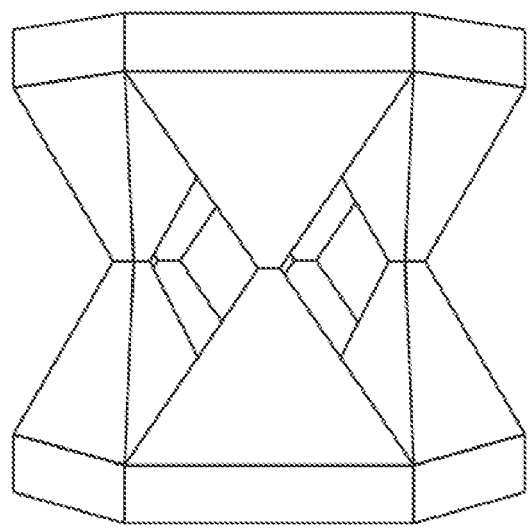
FIG. B15
 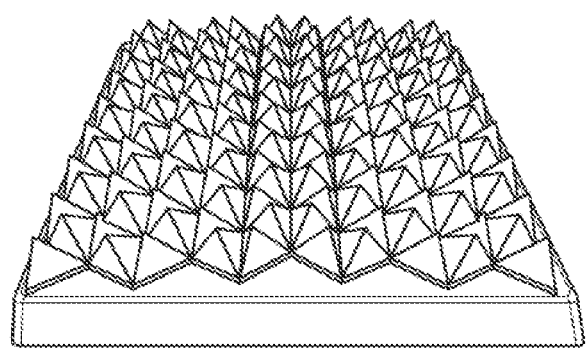
FIG. B16

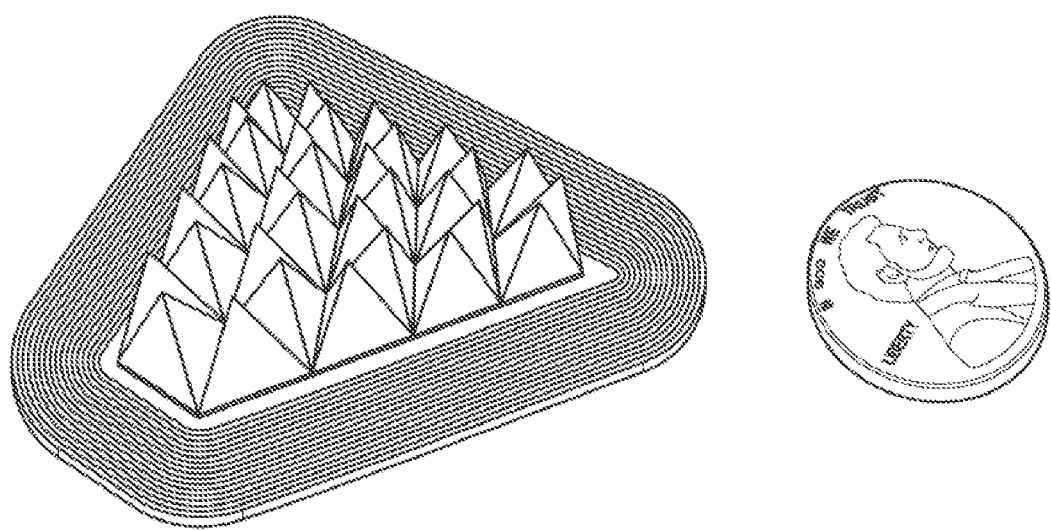
FIG. B17

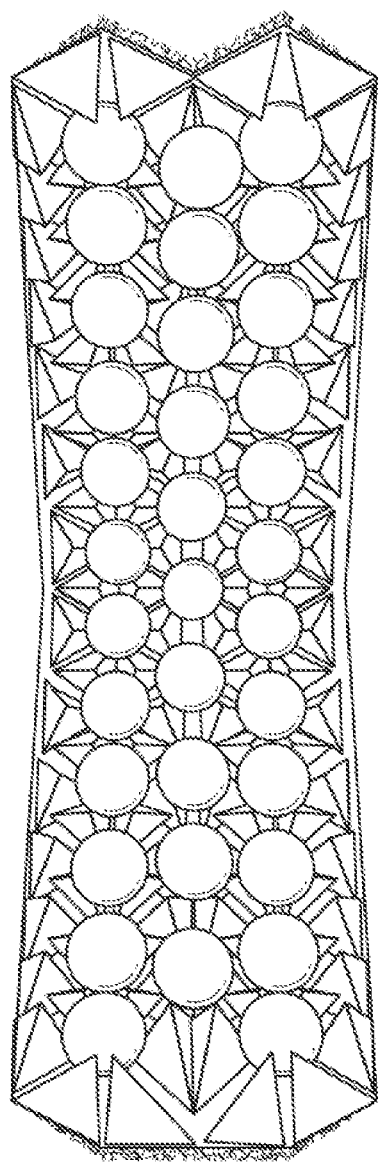
FIG. B18
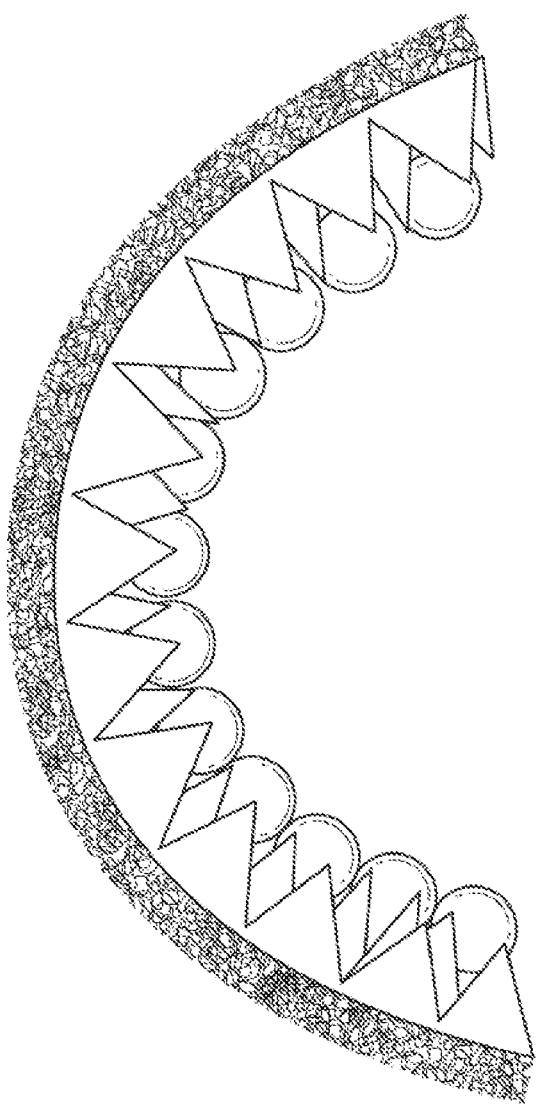
FIG. B19
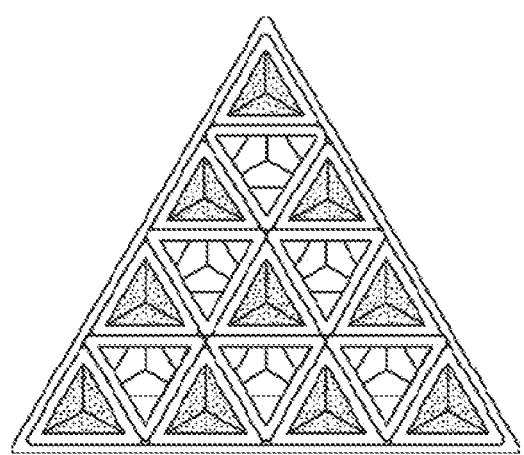
FIG. B20

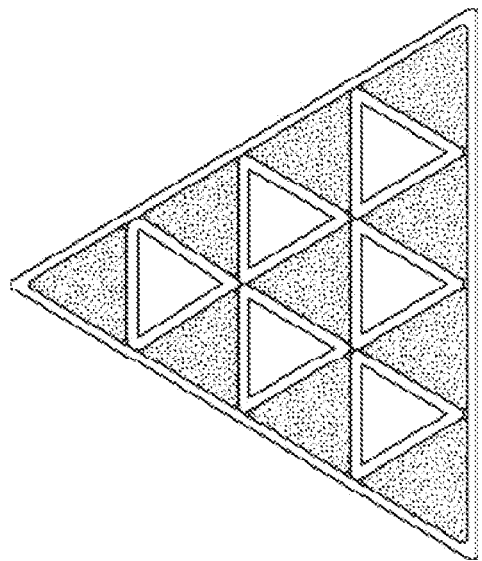
FIG. B21A
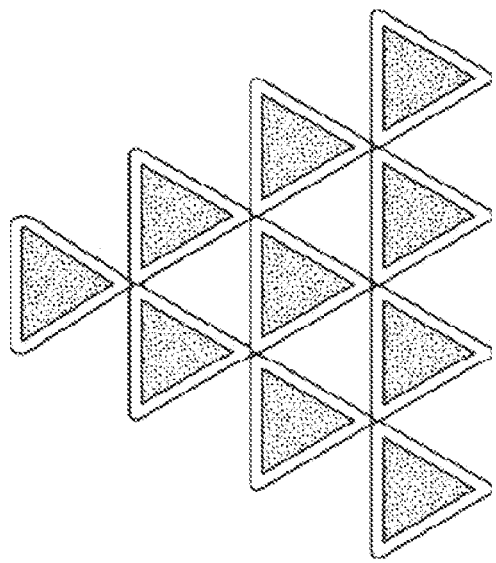
FIG. B21B
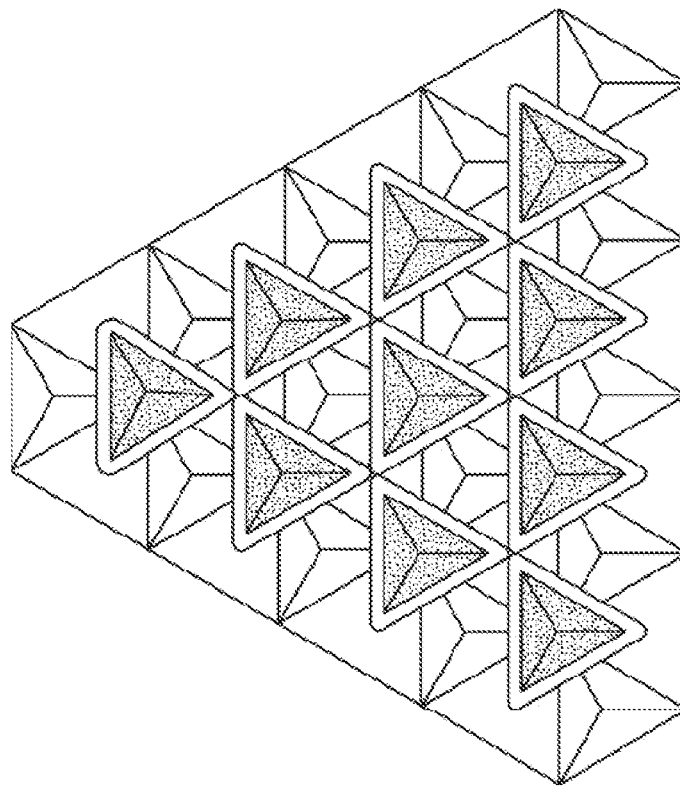
FIG. B22

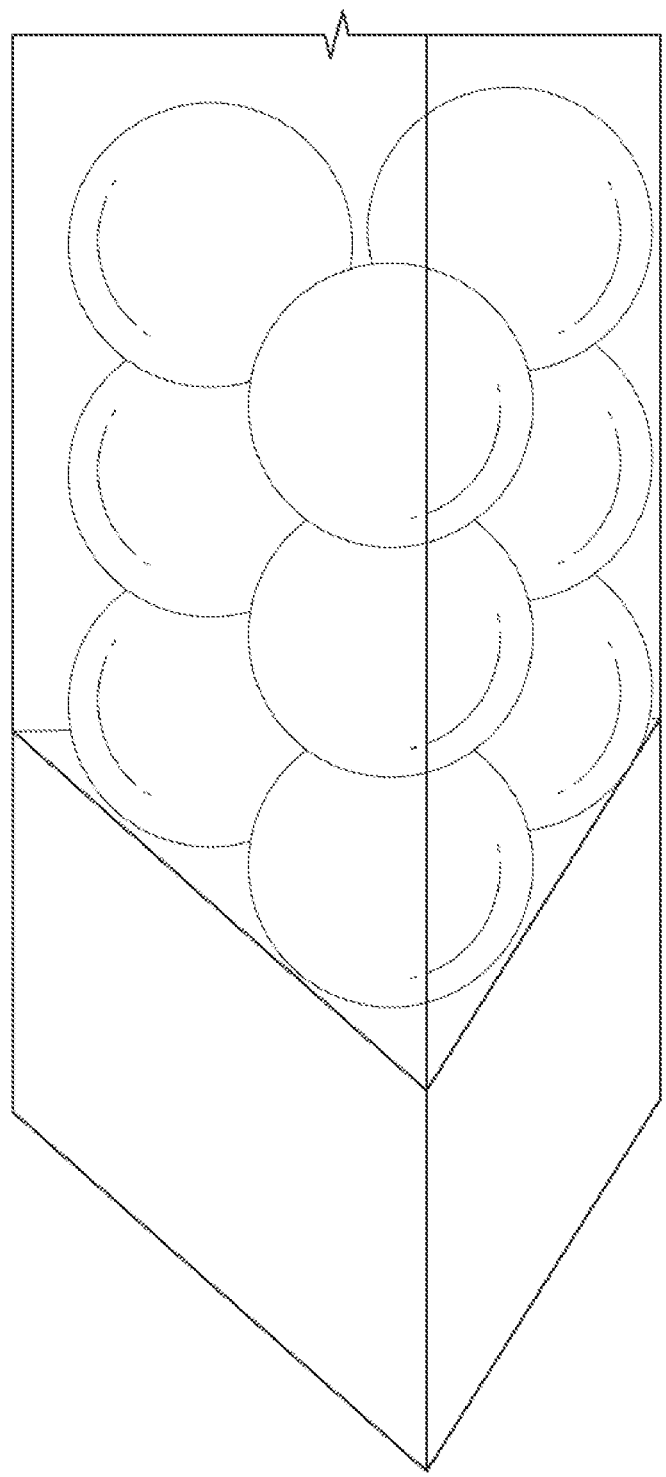
FIG. B23

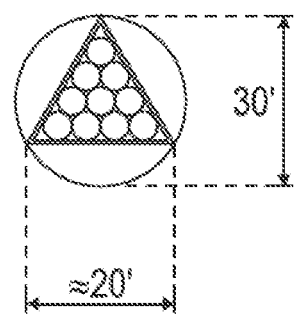
FIG. B24A
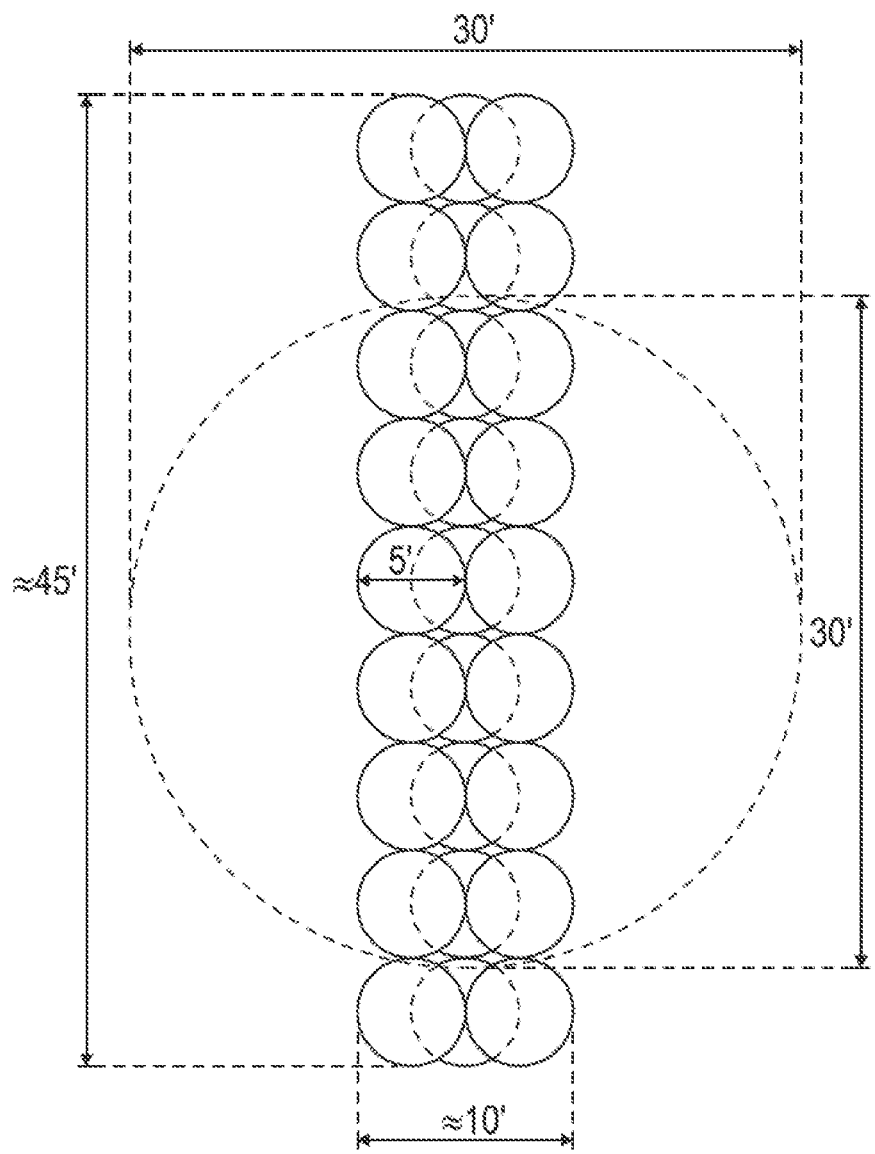
FIG. B24B

Sphere Surface Area

$SA = 4\pi r^2$

Sphere "X"
- $r = 15'$ $4 \times \pi \times r^2$
$4 \times 3.14 \times (15)^2$
$4 \times 3.14 \times 225^{SF}$
$SA = 3{,}202.8_{SF}$ SA
- $r = 5'$ $4 \times \pi r^2$
$4 \times \pi \times 25^{SF}$
$SA = 314^{SF}$ $$\begin{array}{r} 3{,}202.8 \\ \div\ 314 \\ \hline 10.2 \end{array}$$

$V = 4/3\, \pi r^3$

Sphere "X"
- $r = 15'$ $4/3 \times 3.14 \times (15)^3$
$4/3 \times 3.14 \times 3{,}375$ $V = 14{,}137.17_{CF}$ V
- $r = 5'$ $4/3 \times 3.14 \times 125^{CF}$
$V = 523.60_{CF}$ $$\begin{array}{r} 14{,}137.17 \\ \div\ 523.60 \\ \hline = 27 \end{array}$$

FIG. B25

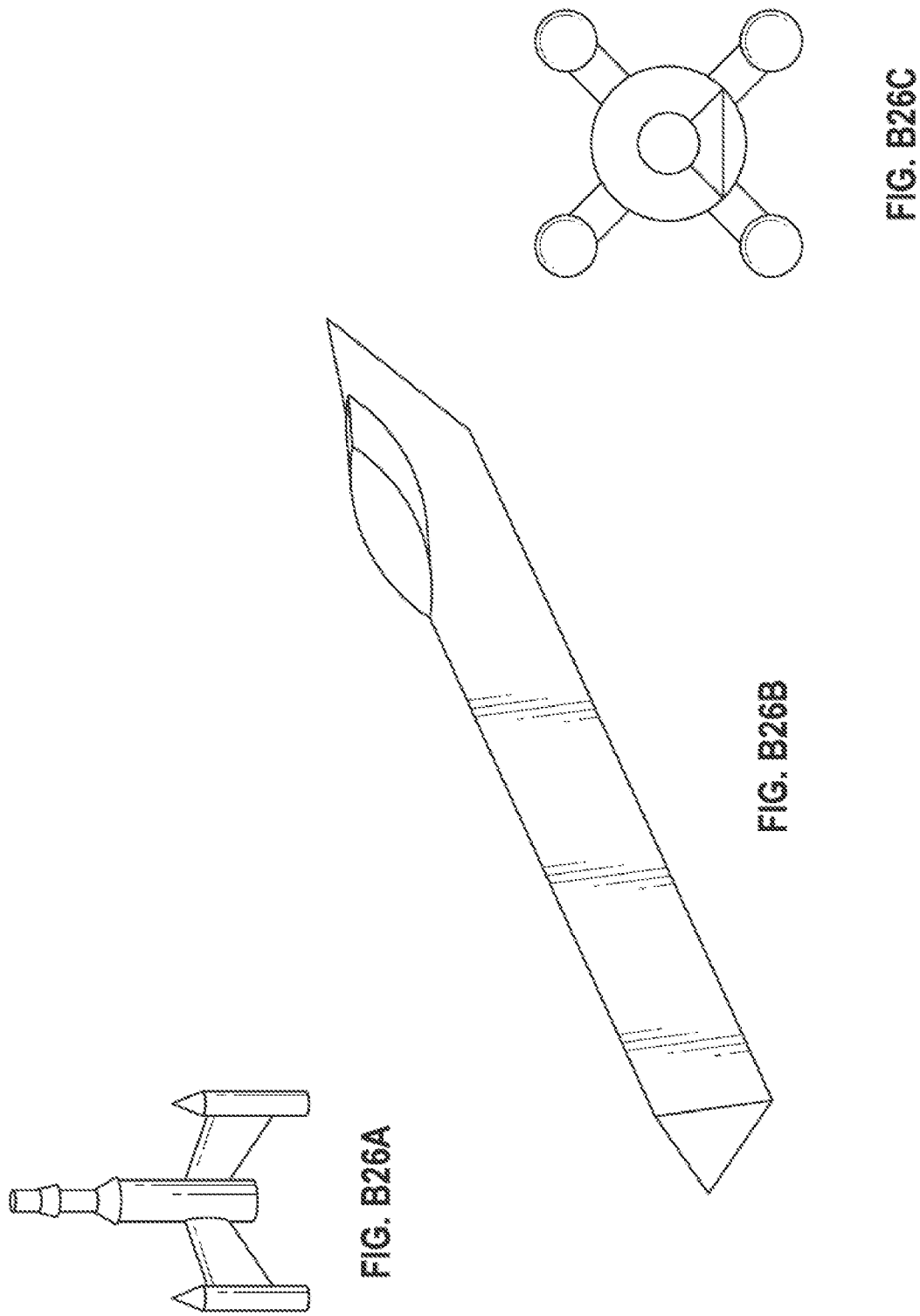

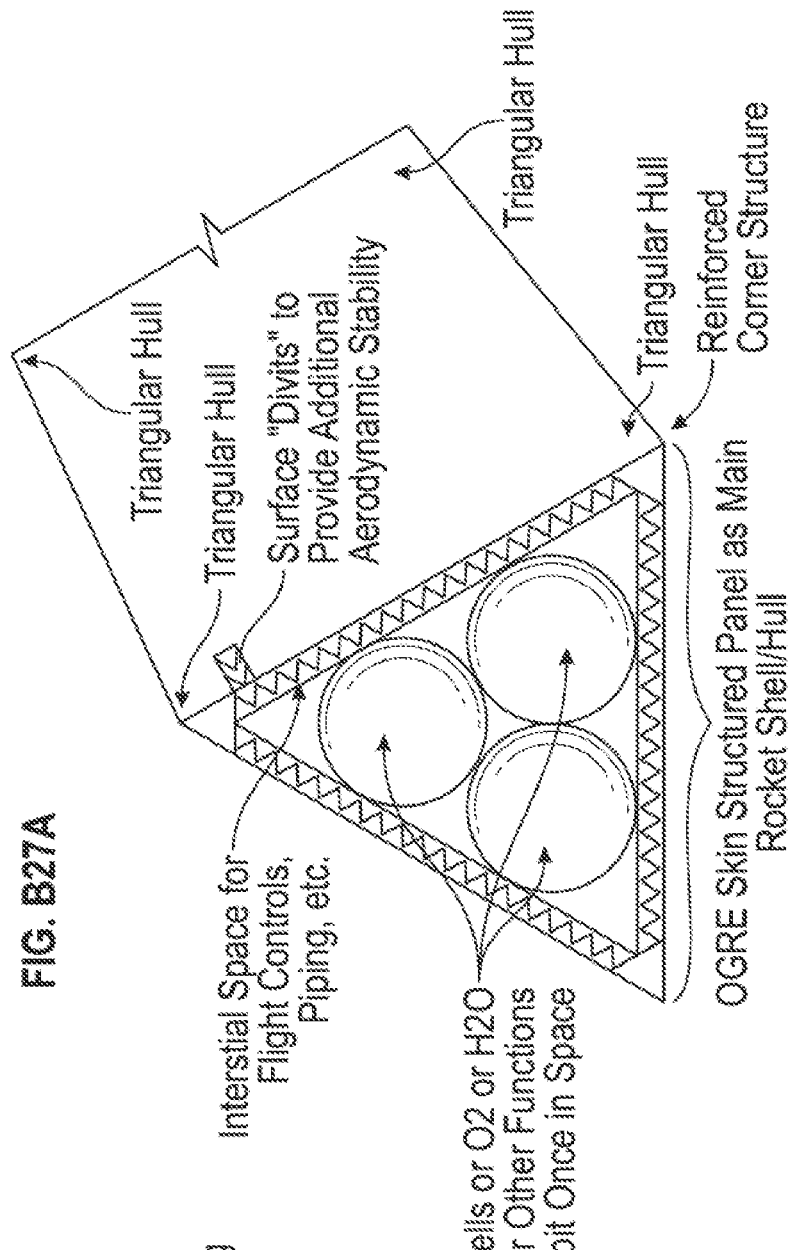
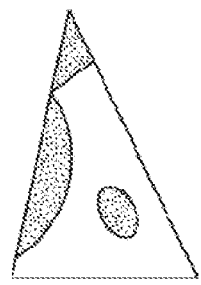
FIG. B27A
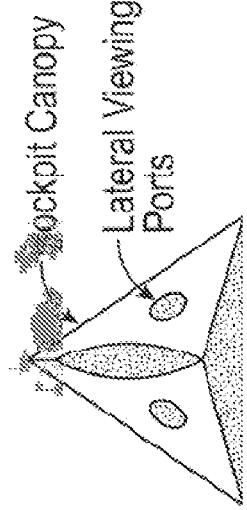
FIG. B27B
FIG. B27C

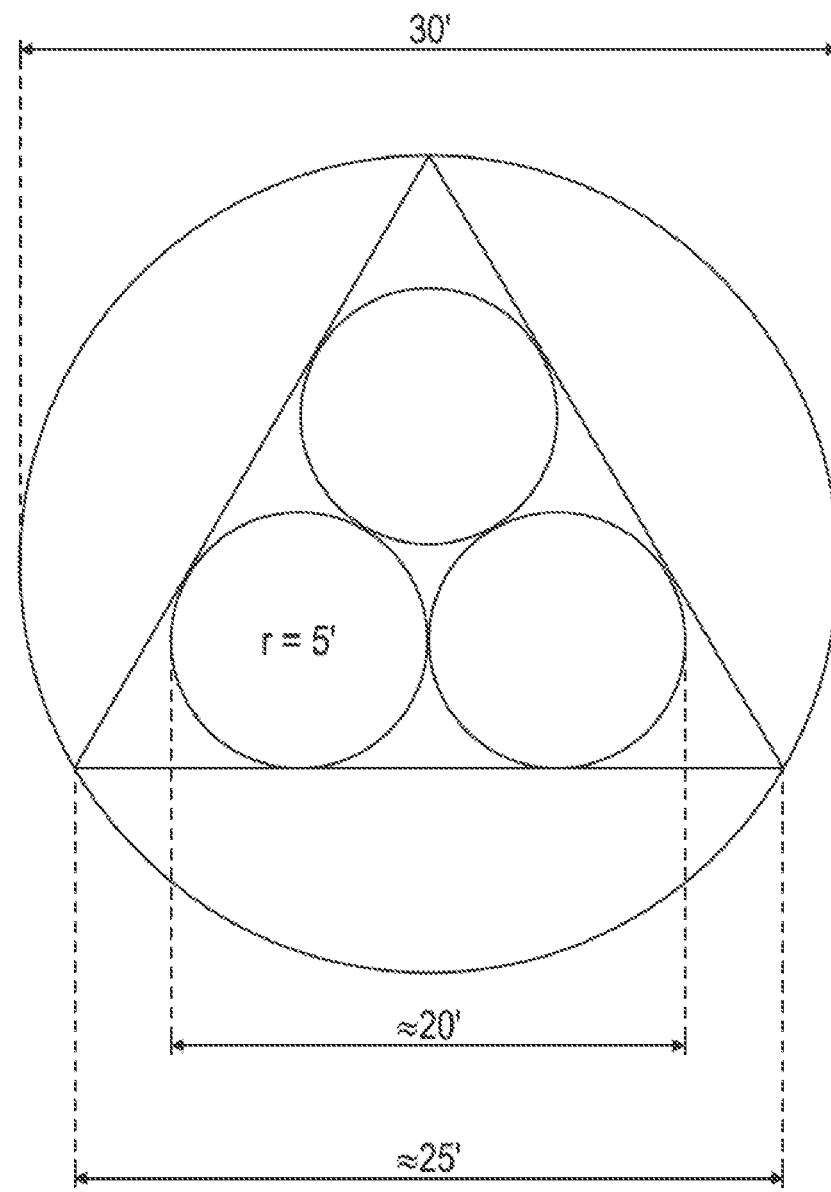
FIG. B28

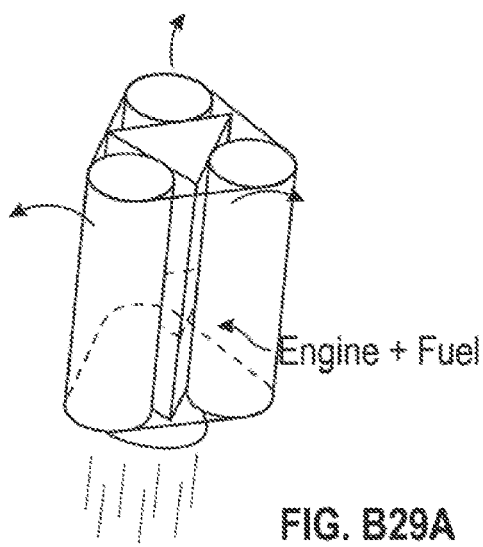
FIG. B29A
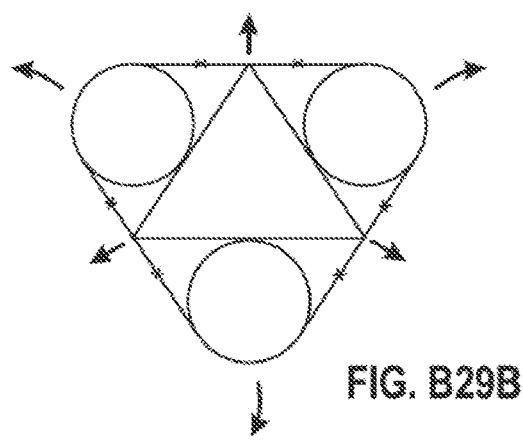
FIG. B29B
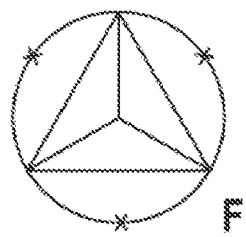
FIG. B29C
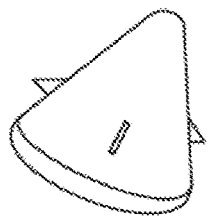
FIG. B29D
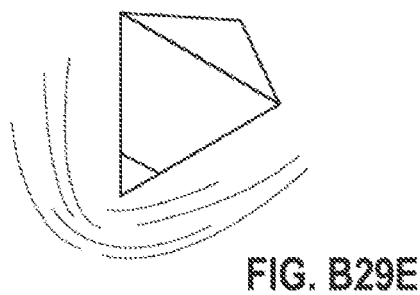
FIG. B29E
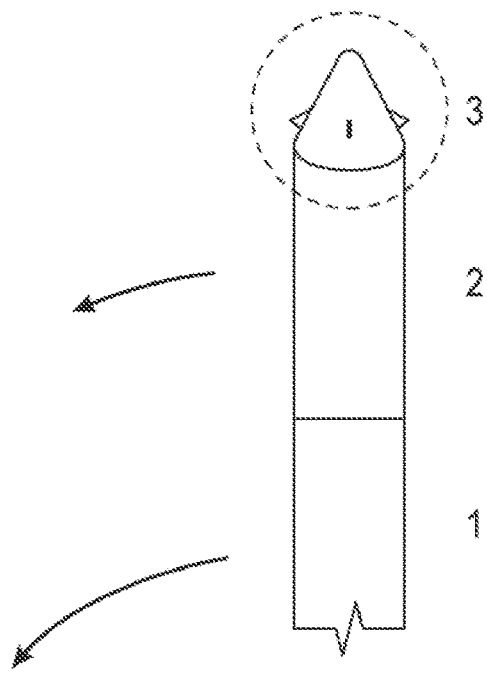
FIG. B29F

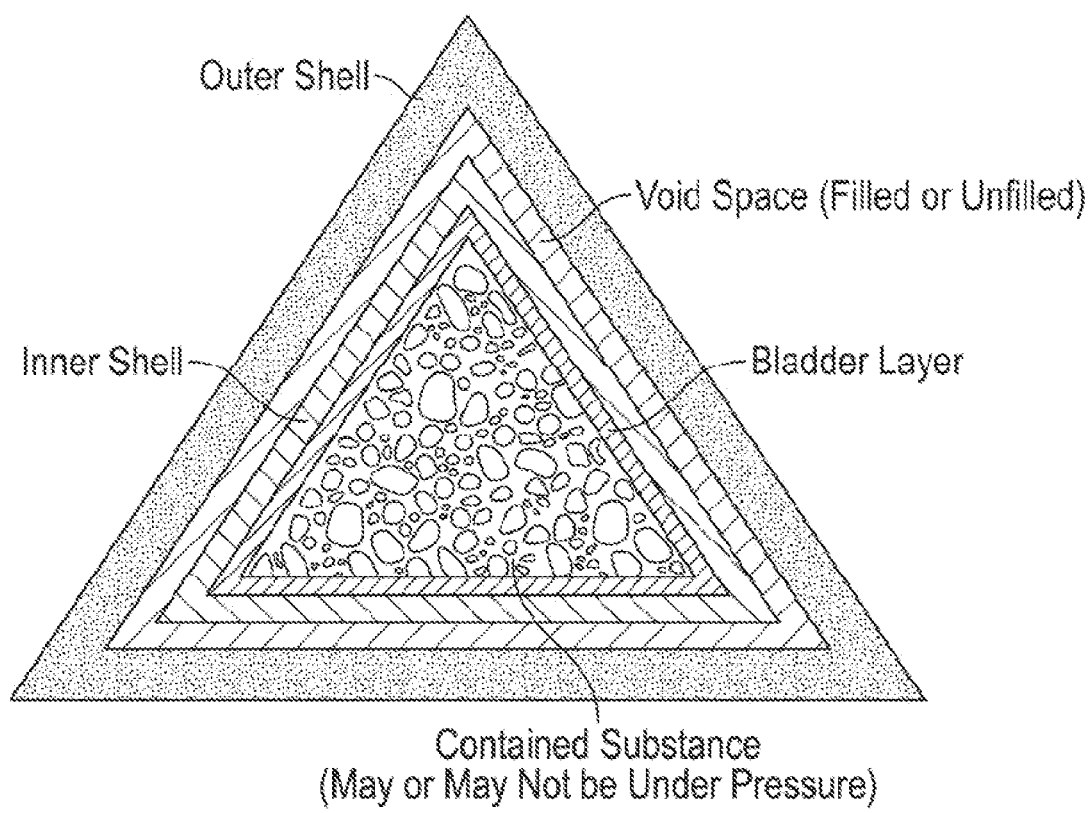
FIG. B30

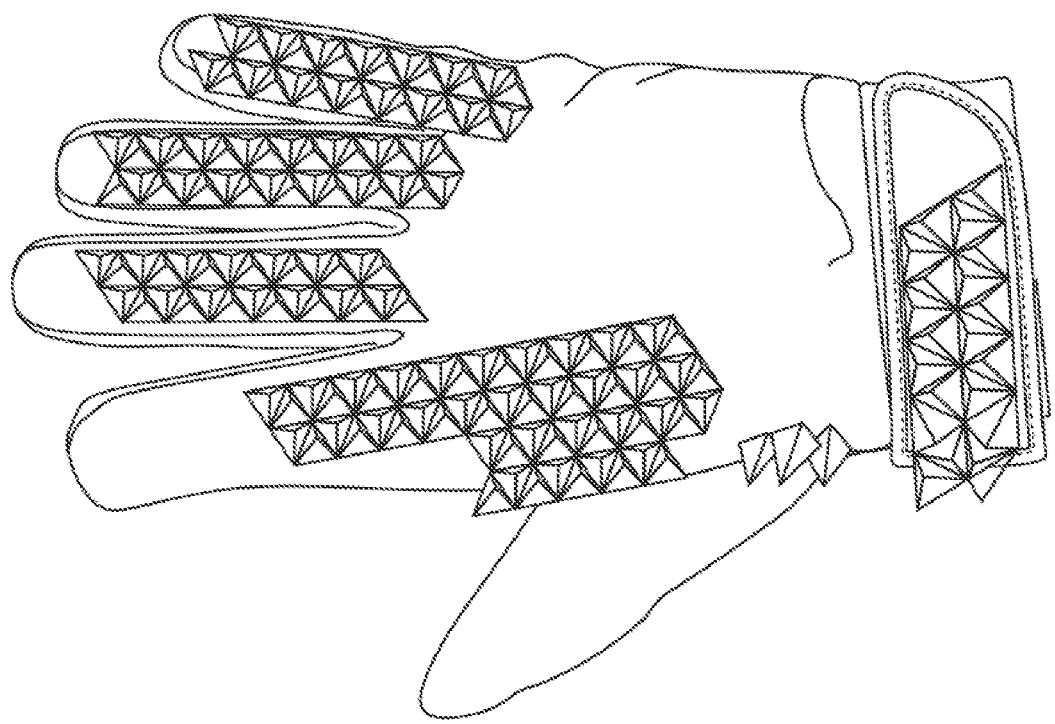
FIG. B31B
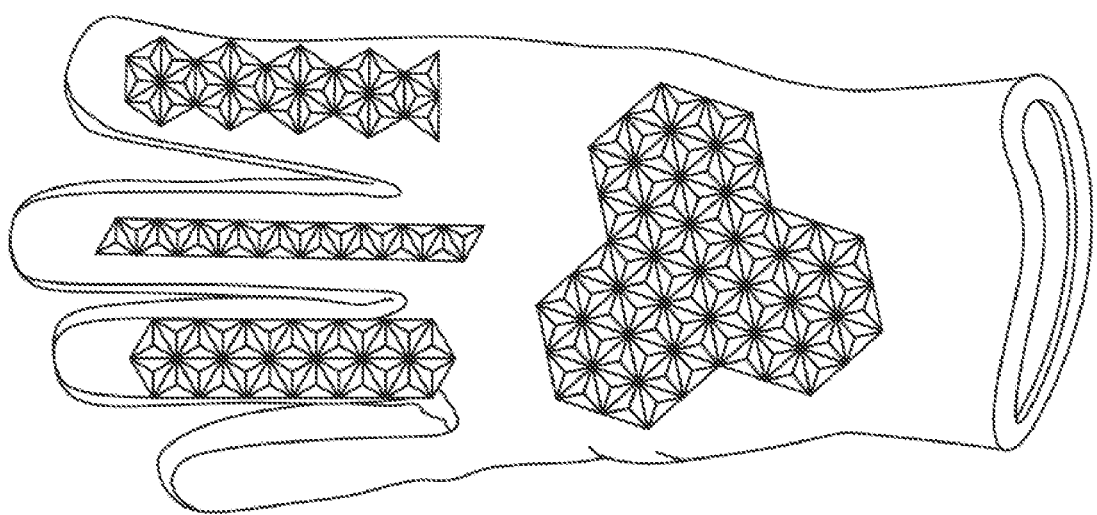
FIG. B31A

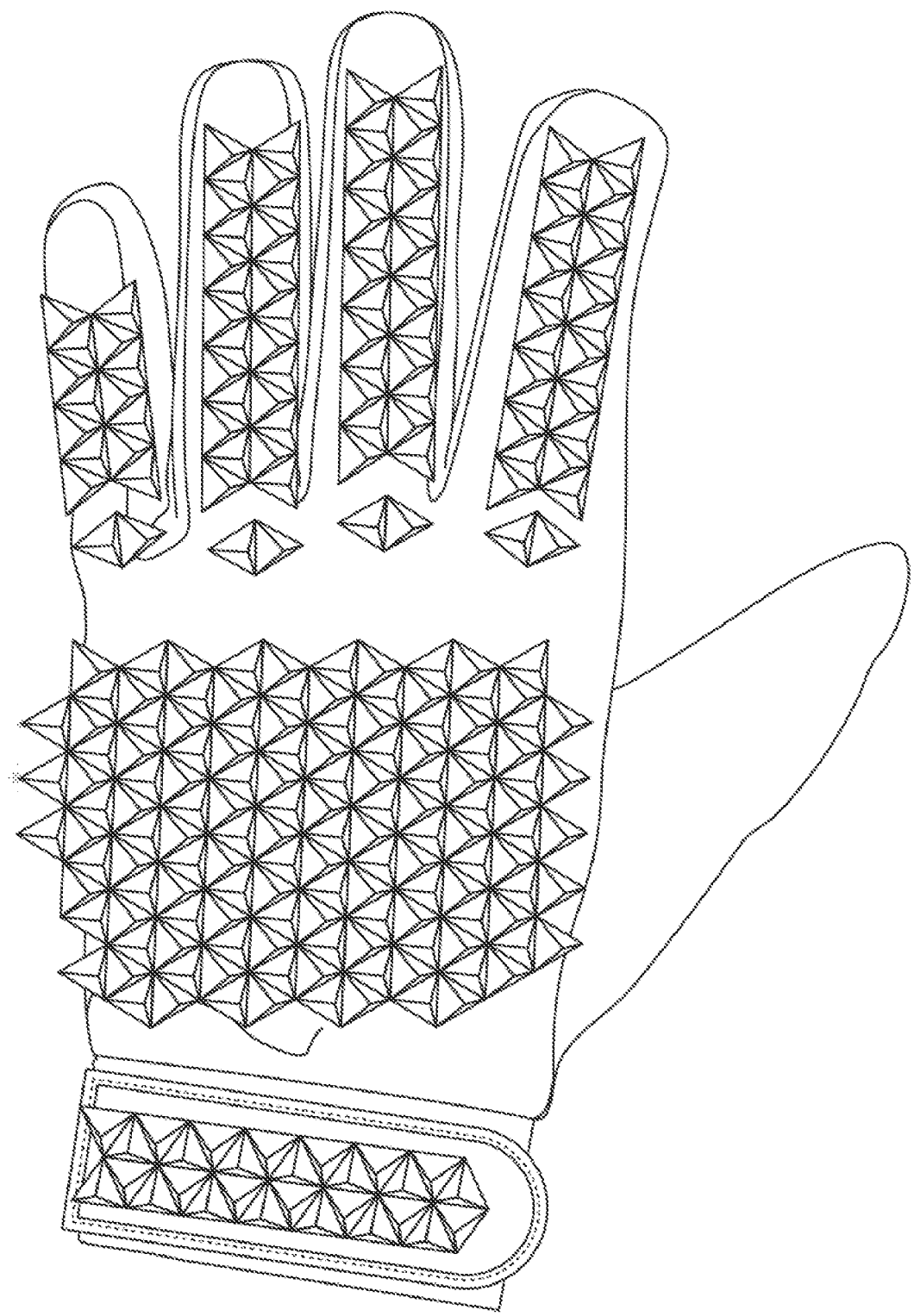
FIG. B32

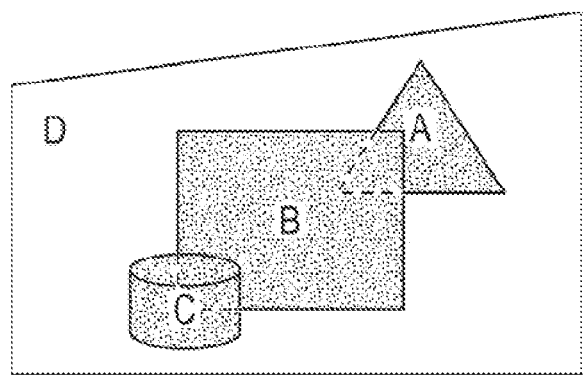
FIG. B33
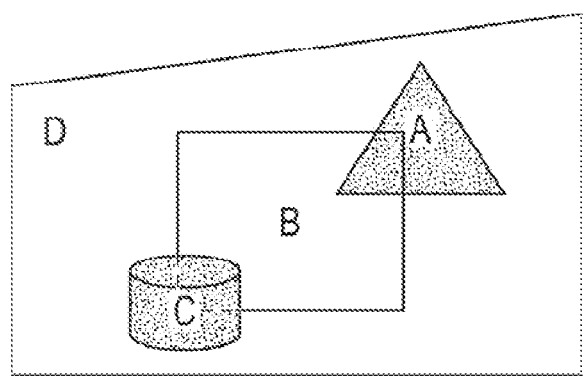
FIG. B34
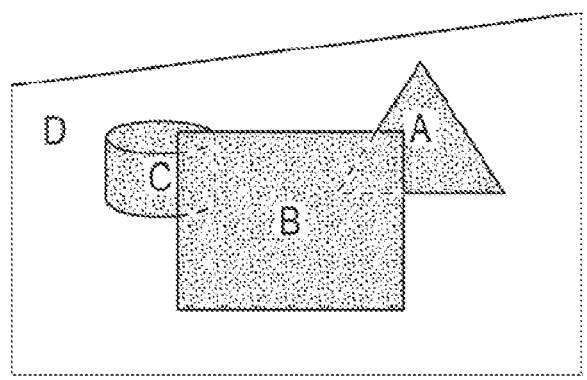
FIG. B35

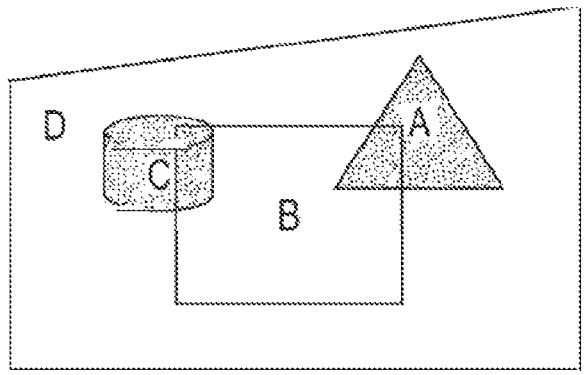
FIG. B36
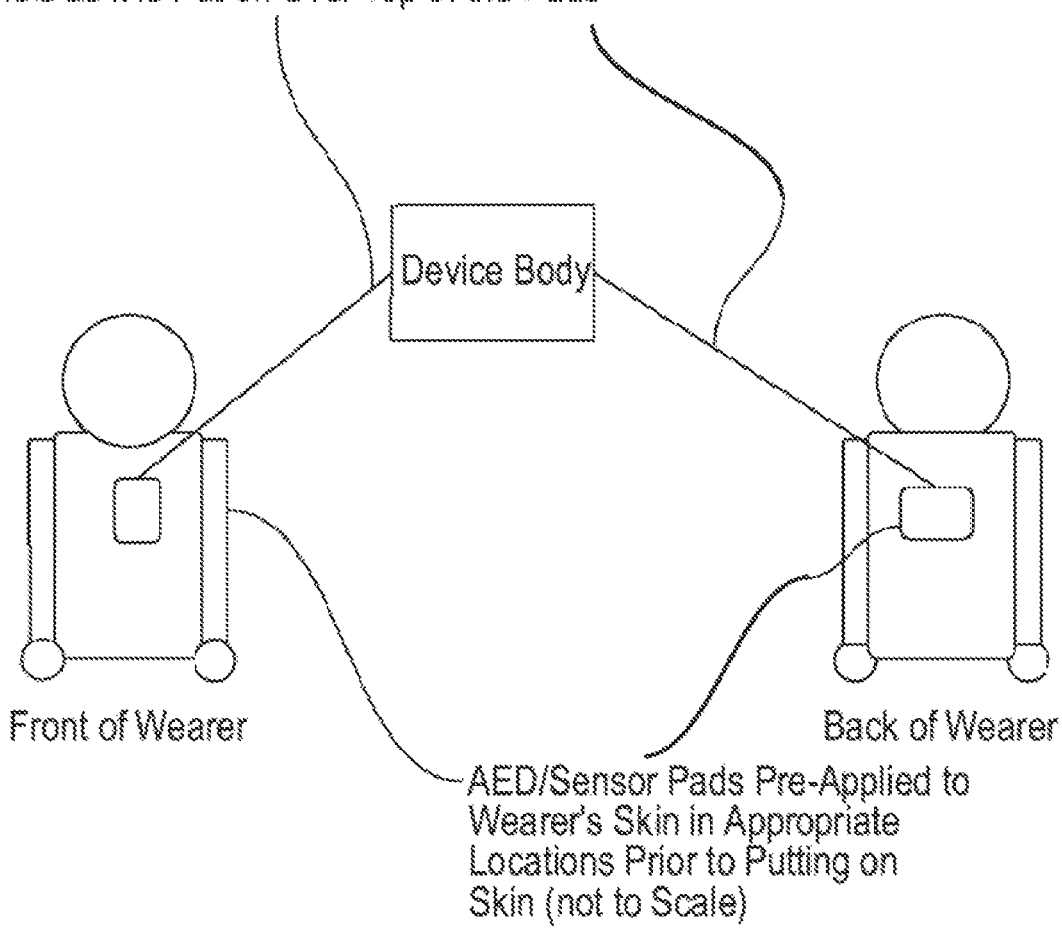
FIG. B37

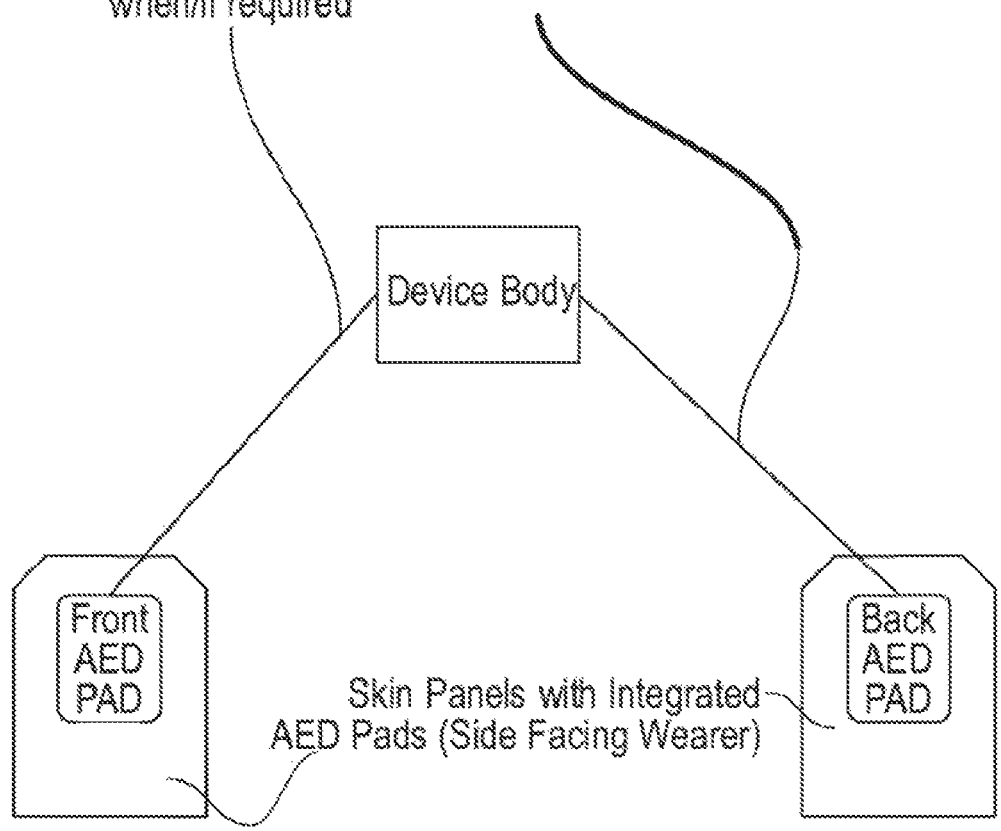
FIG. B38

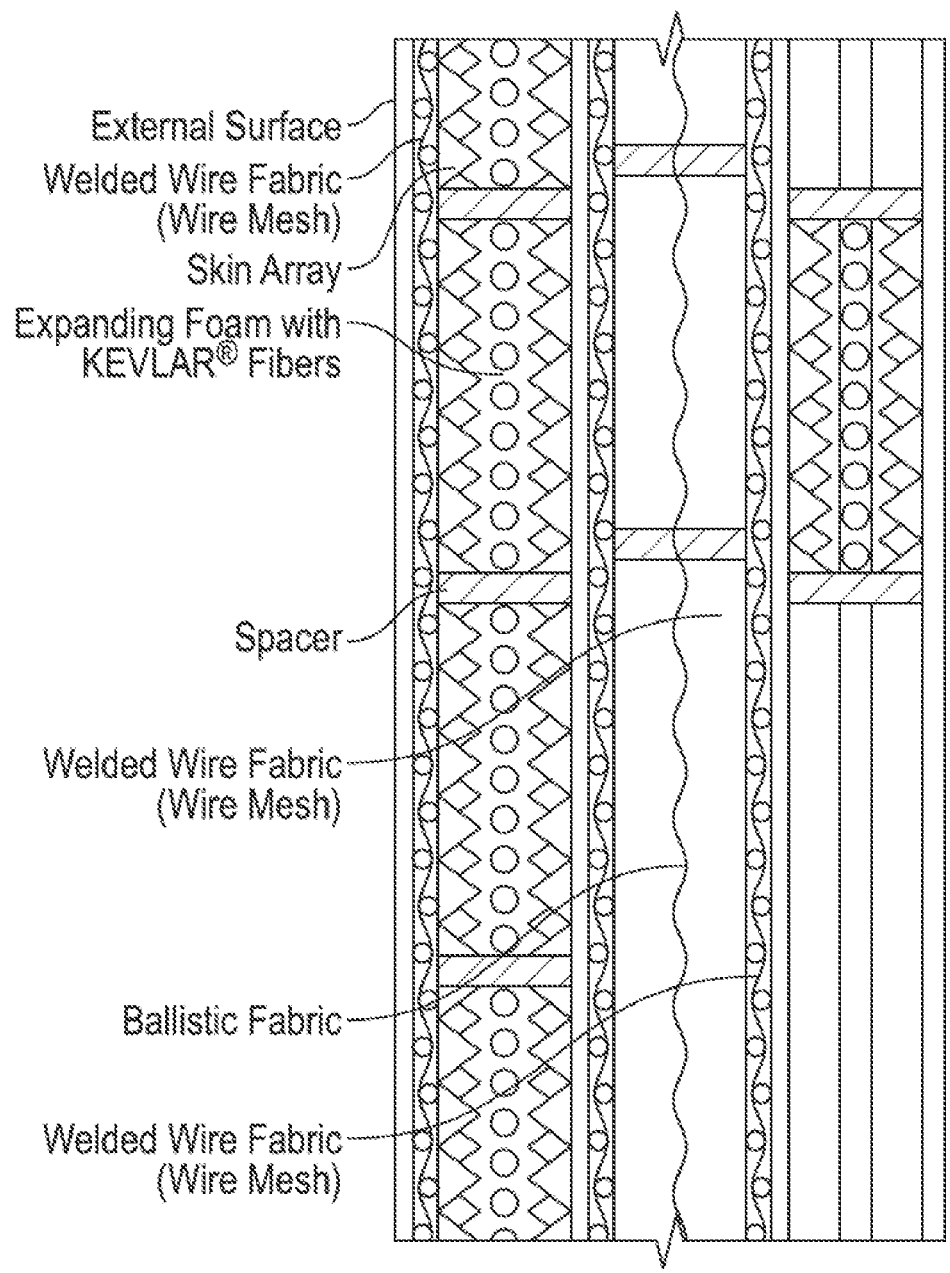
FIG. B39

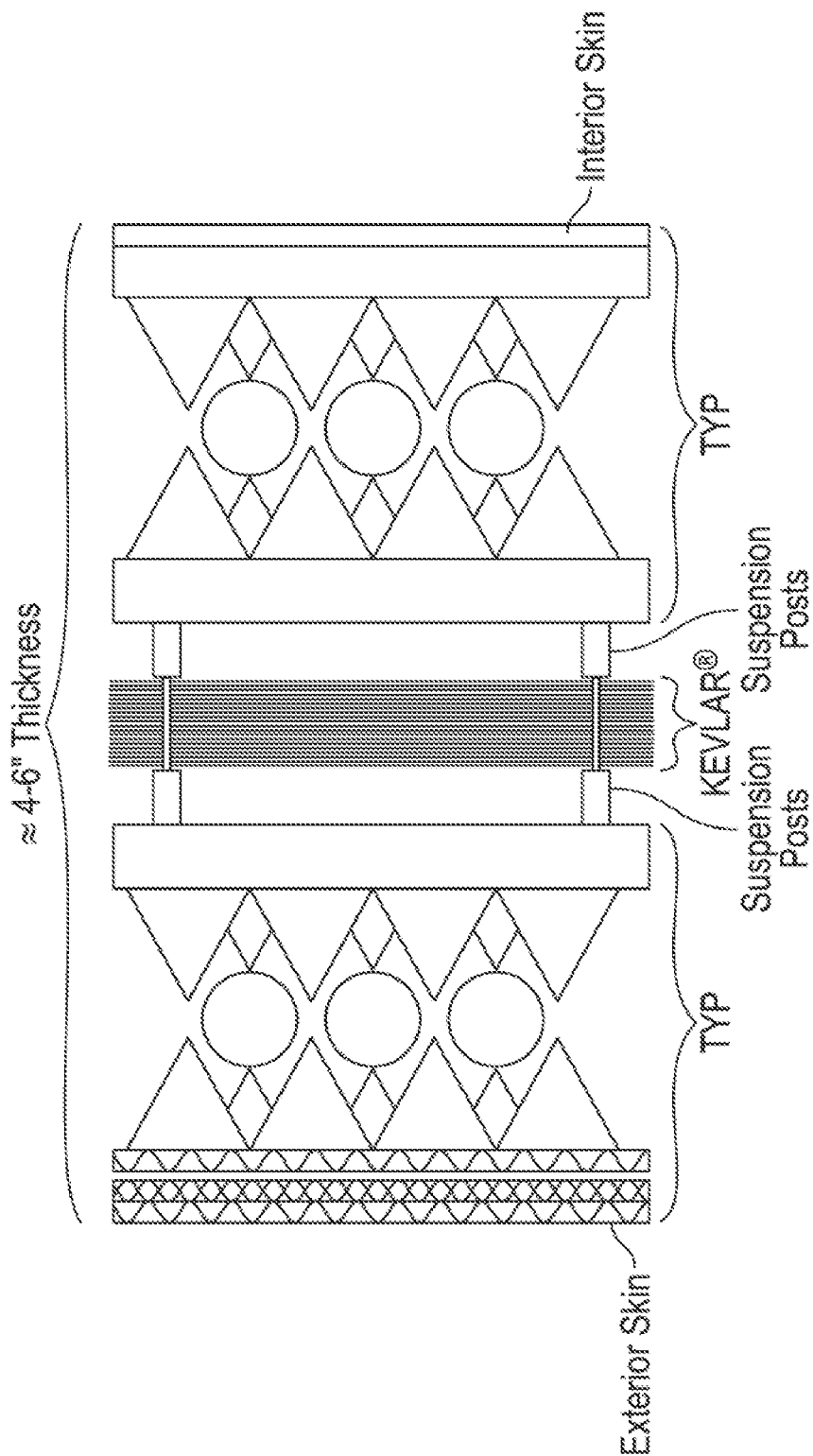
FIG. B40

STRUCTURES, SYSTEMS, AND METHODS FOR ENERGY DISTRIBUTION

CROSS-REFERENCE TO RELATED APPLICATION(S)

This application is a divisional of U.S. patent application Ser. No. 16/442,243, filed Jun. 14, 2019, titled "Structures, Systems, and Methods for Energy Distribution", which claims priority to and the benefit of U.S. Provisional Application No. 62/685,850, filed Jun. 15, 2018, titled Ogre Skin, the contents of both which are incorporated herein by reference in their entirety.

FIELD

This disclosure generally relates to energy distribution. More particularly, this disclosure related to force distribution structures used as intermediaries to shield and/or protect target objects from impact events, such as those caused by ballistic objects and blunt force objects, for example. In particular, this application includes three-dimensional, multi-component structures designed to absorb and redirect applied forces, or applied energy, away from target objects, and/or distribute such applied forces or applied energy across a significantly reduced physical contact surface area.

BACKGROUND

Historically, to overcome the resulting forces ballistic objects, shock absorption, or other forms of impact event required solutions that are heavy and bulky and have very little, if any, flexibility to conform to the surface they are protecting without significant and specific work required to design for a particular situation or application. Newer materials and ability to produce composite (multi-layer) solutions have helped to reduce the required weight and bulk of these solutions. However, nearly all of these solutions continue to rely on flat (planar) surfaces (even if angular in their overall configuration) on both the outward facing ("strike face") and inward facing ("back face") surface. As a result, the flat surface maintains at least the same, if not a greater, amount of surface area contact on a "receiving surface" of a recipient of the impact event. For example, if an impact event acts upon three square inches of the strike face, an area of three square inches or greater, is likely to be affected on the recipient. In other words, with current solutions, the surface area of the recipient that is acted upon by the impact event is the same or greater than the initial surface area acted upon by the impact event on the initial surface being acted upon the "strike face."

It is a common problem that a skin, or protective layer(s), used to mitigate an impact has several factors that reduce the practicality or usability of the skin to efficiently address an impact event, reduce injury potential, and increase the survivability of the impact event. When applied to wearable applications (as a non-limiting example), the factors include (1) heavy and/or bulky layer(s) that reduce efficiency in movement and energy required to support and/or move with the skin in place; (2) rigid and/or inflexible layer(s); (3) specific only to one or a limited range of applications/configurations; (4) reduced effectiveness to attenuate an impact event due to a 1:1 or greater ratio of strike face to back face surface area; (5) "solid" materials in which the volume is generally "full" and has no voids or spaces; and (6) lack of "breathability" or airflow. Several of these factors can result in over-heating by the wearer and subsequent reduction in the amount of skin that can be worn over a given time, in a given environment, and/or the amount of time a wearer can benefit from the maximum protection such a skin provides. When applied to non-wearable applications, the skin is generally limited to planar (flat) surfaces, which lacks the ability to conform to the object to be protected when the object includes multiple.

SUMMARY

In one embodiment, an apparatus for distributing an impact force can include a first structural component that defines an internal volume. In addition, a second structural component can be positioned in the internal volume. The second structural component can include first and second edges, and a region between the first and second edges. In response to the impact force, the first structural component can direct a first portion of the impact force away from the second structural component, and can pass a second portion of the impact force to the second structural component. The second structural component can direct the second portion away from the region.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 33A-33D illustrate an array of energy distribution structures distributing an applied force, in accordance with some described embodiments;

FIGS. B1A-B40 depict still other embodiments as shown and described herein; and

Figure 58:
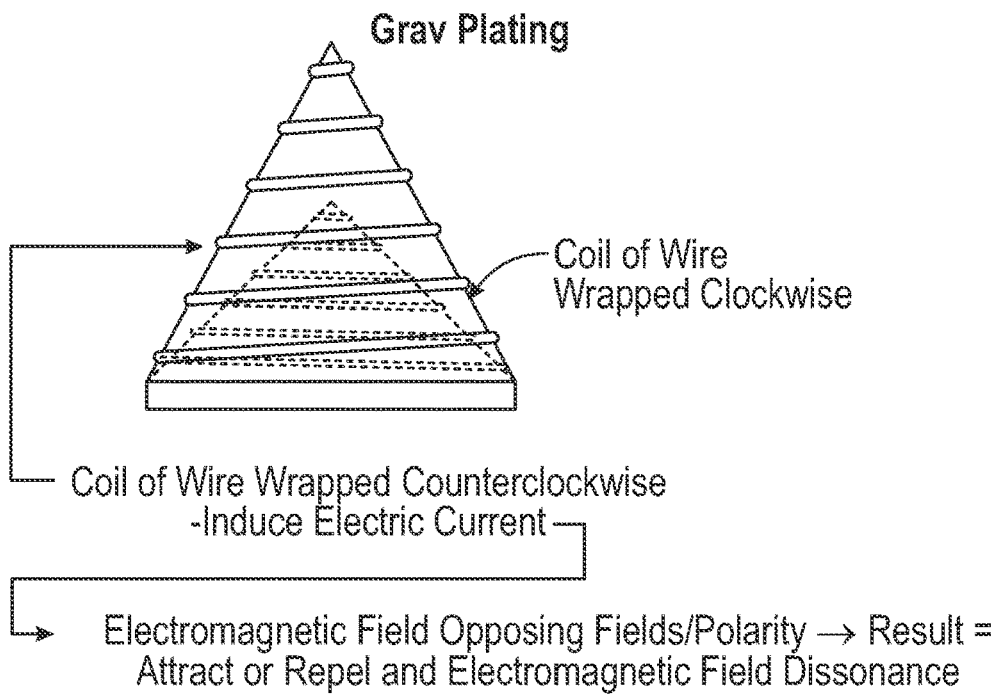
Figure 59:
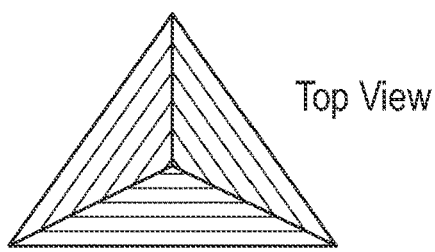
Figure 60:
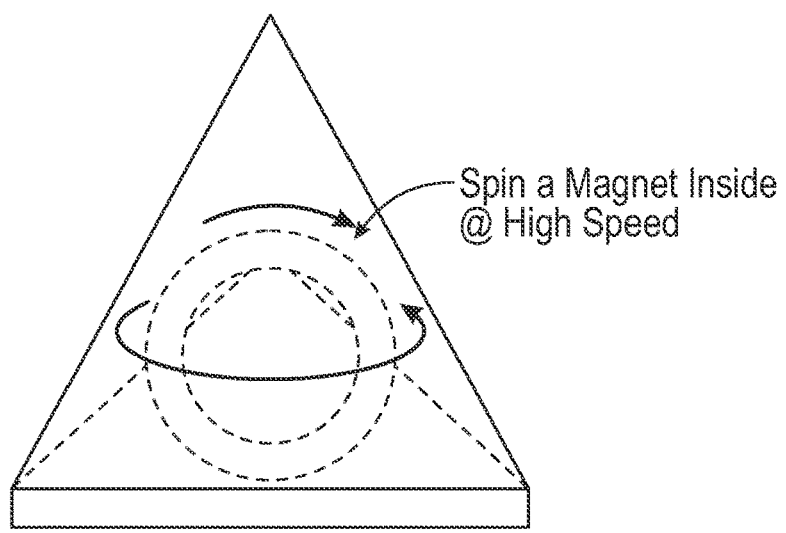
Figure 61:
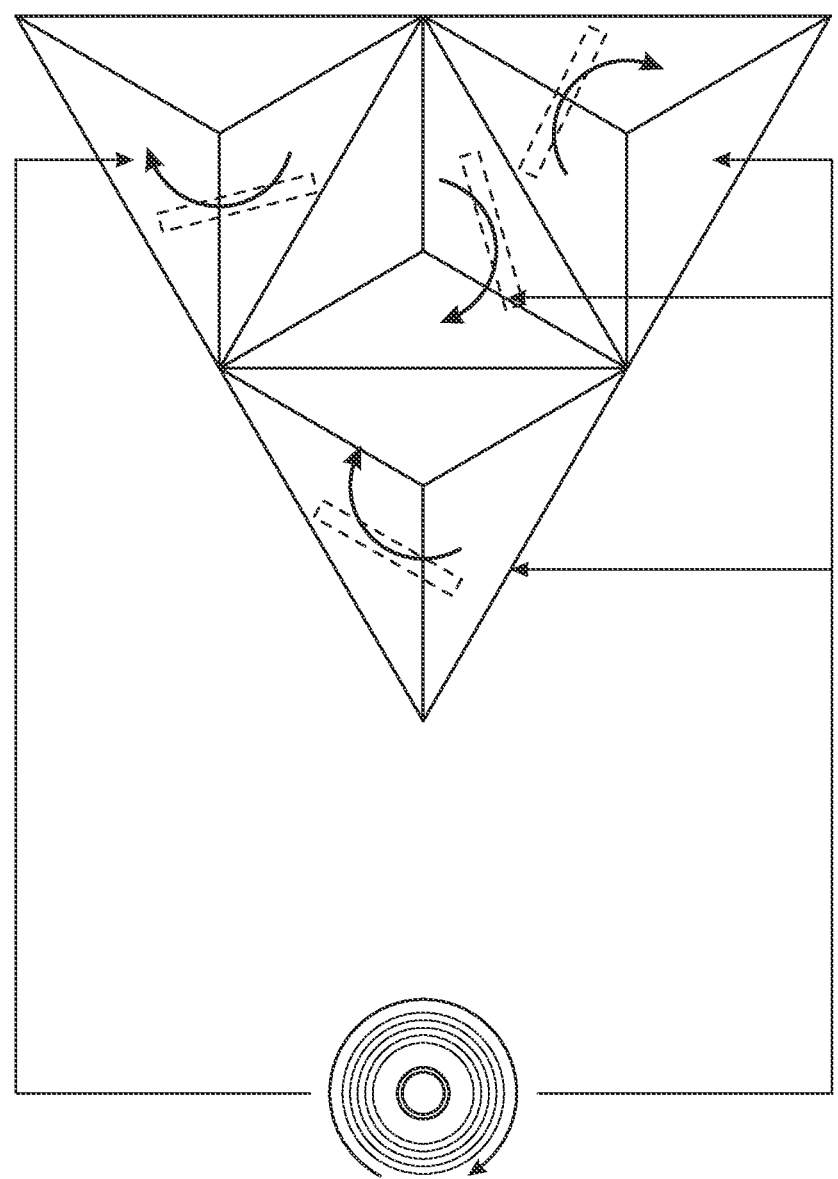
Figure 62:
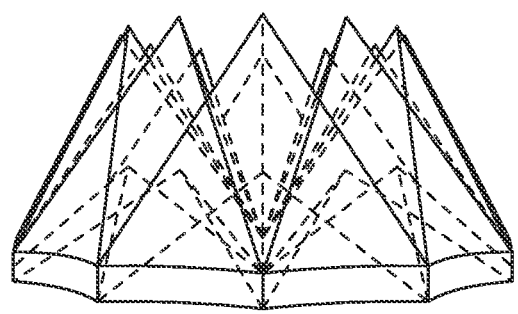
Figure 63:
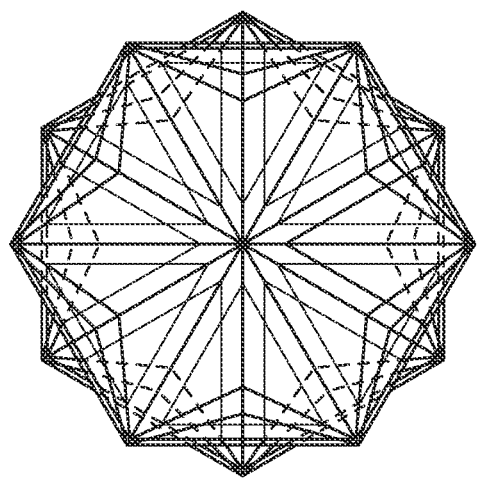
Figure 64:
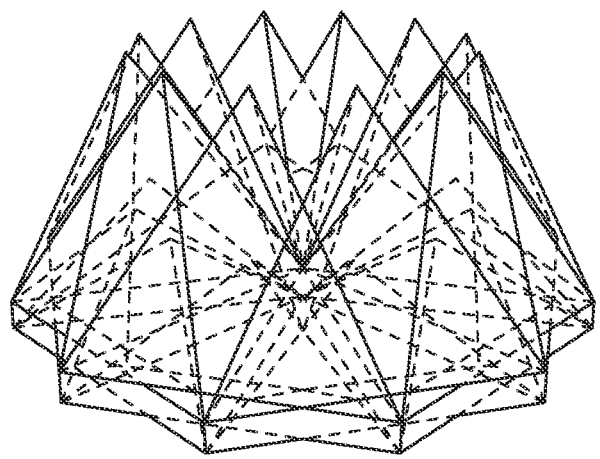
Figure 65:
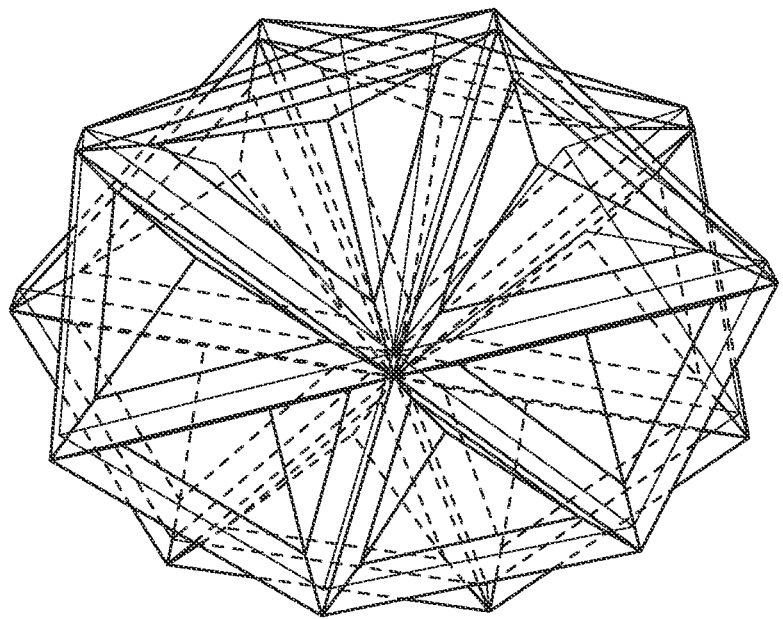
Figure 66:
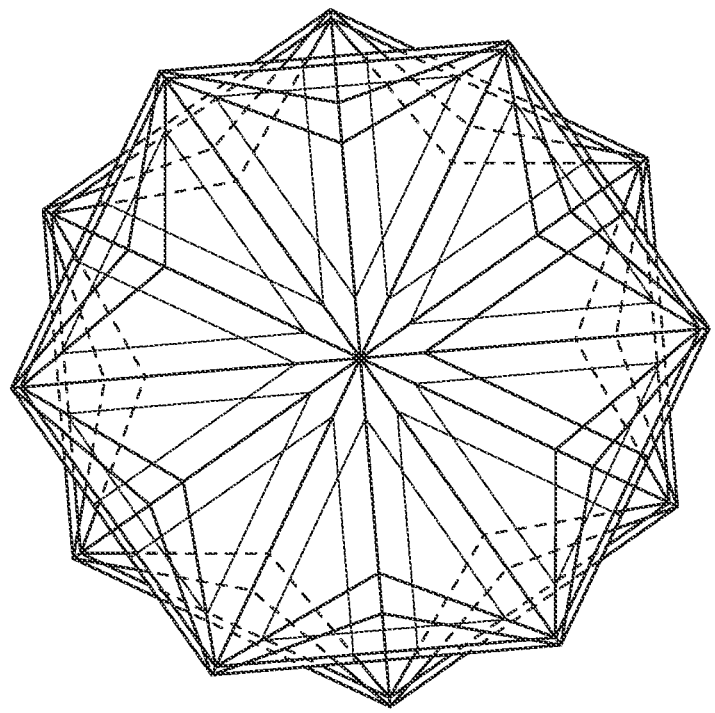
Figure 67:
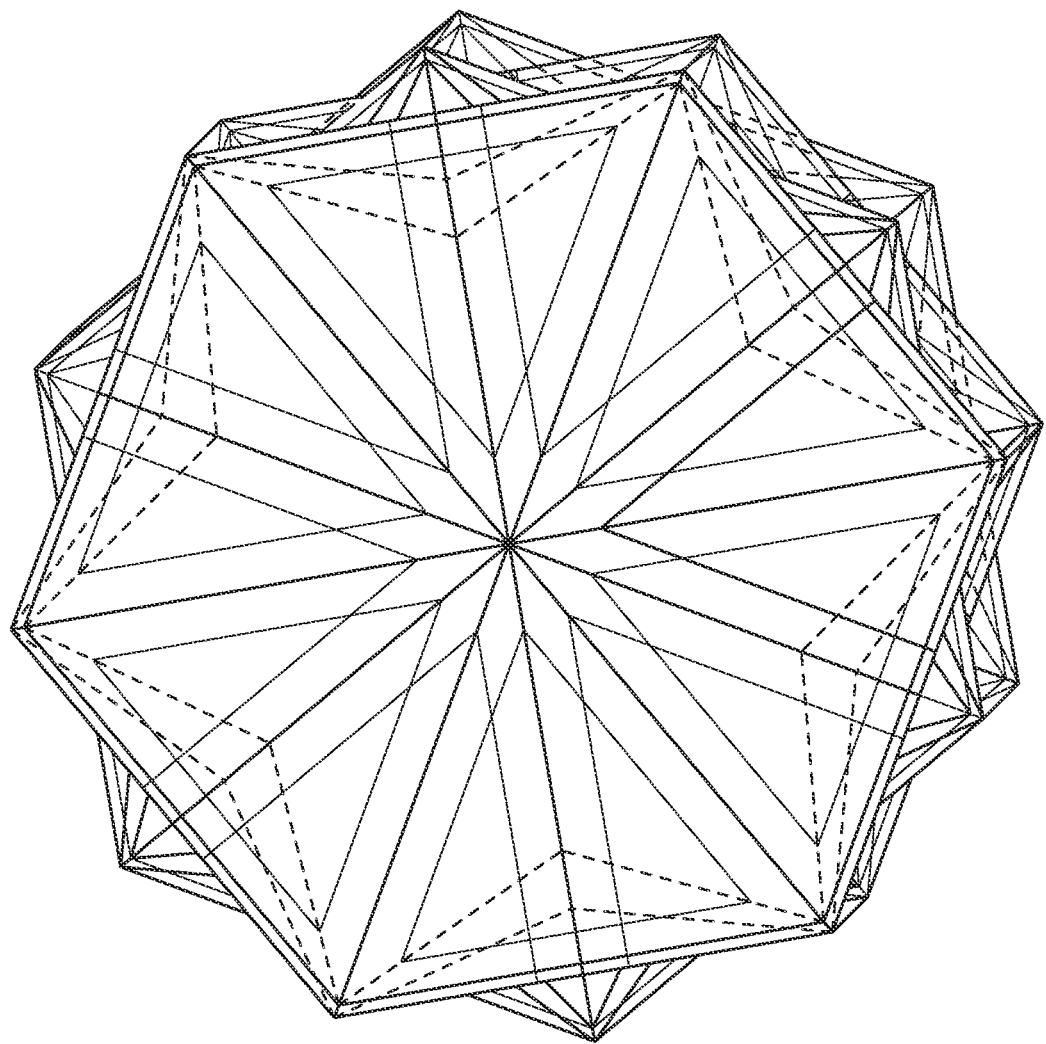
Figure 68:
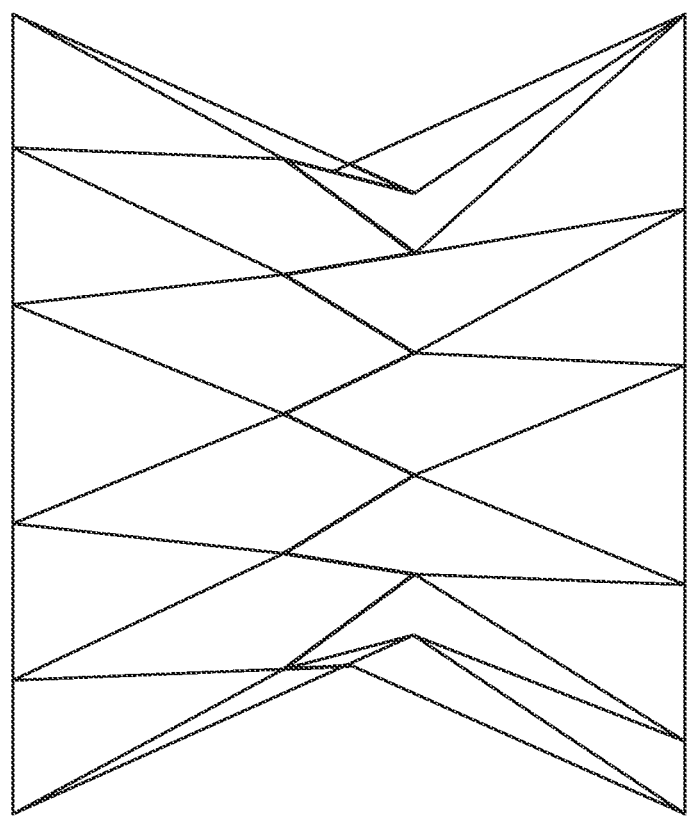
Figure 69:
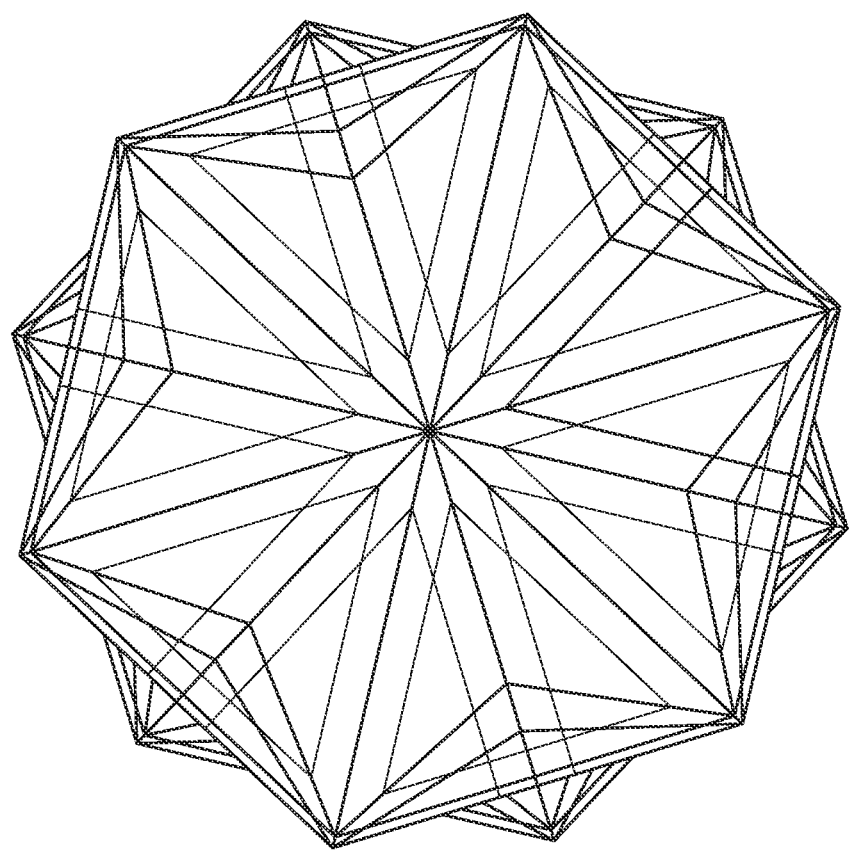
Figure 70:
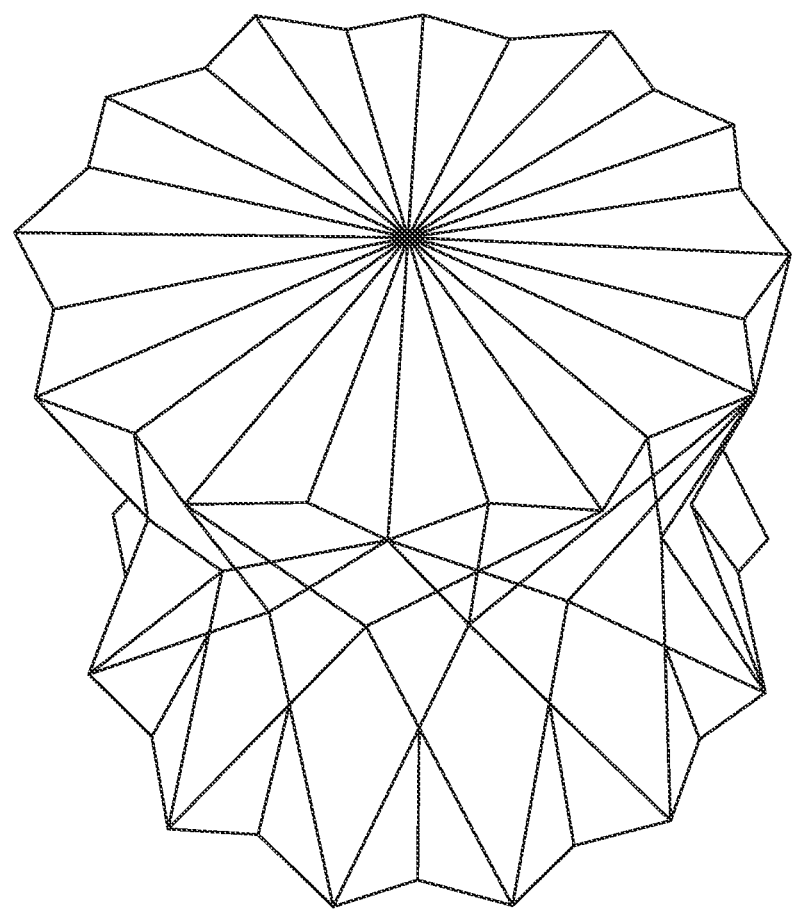
Figure 71:
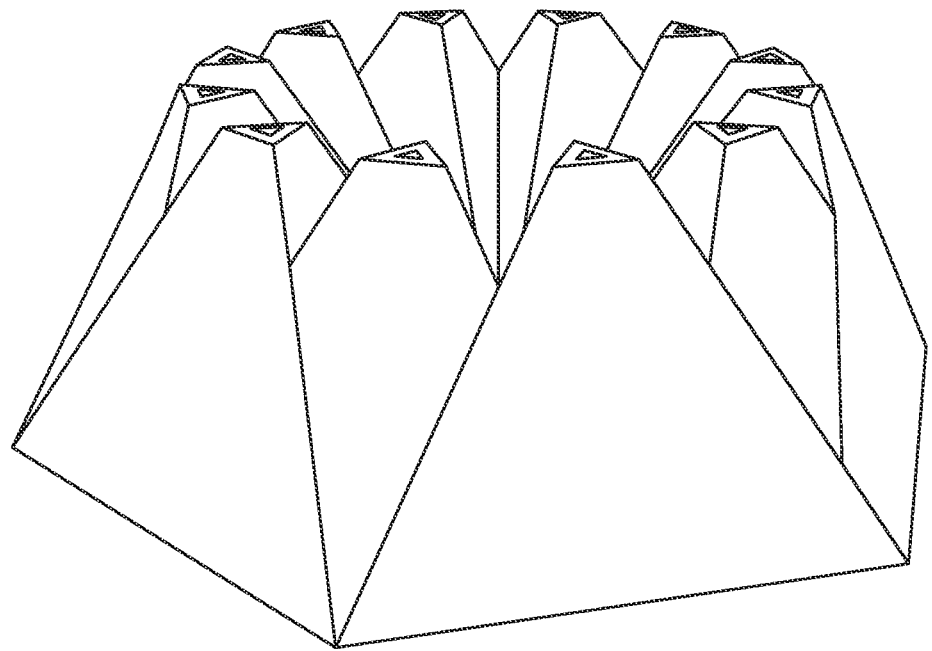
Figure 72:
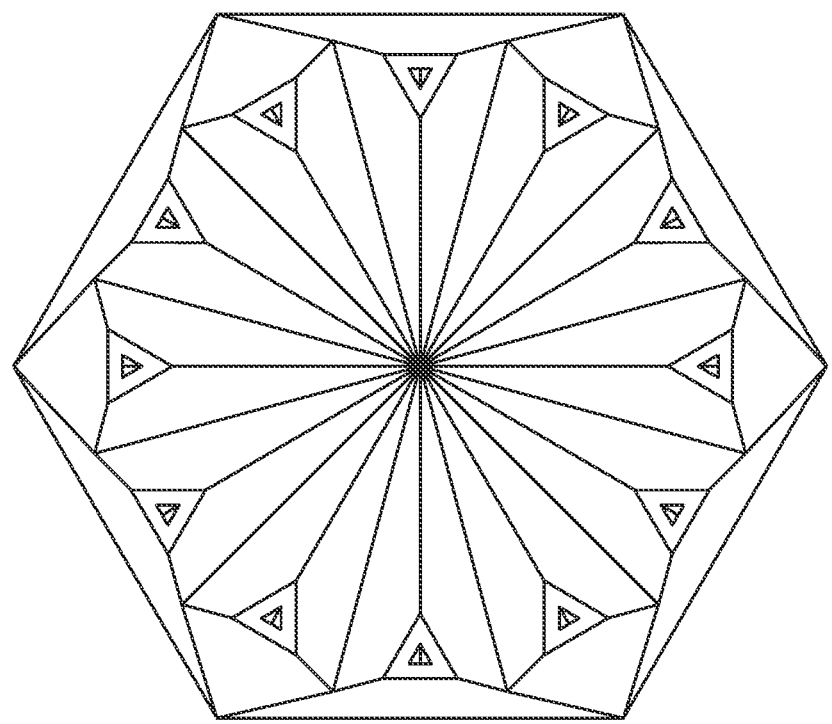
Figure 73:
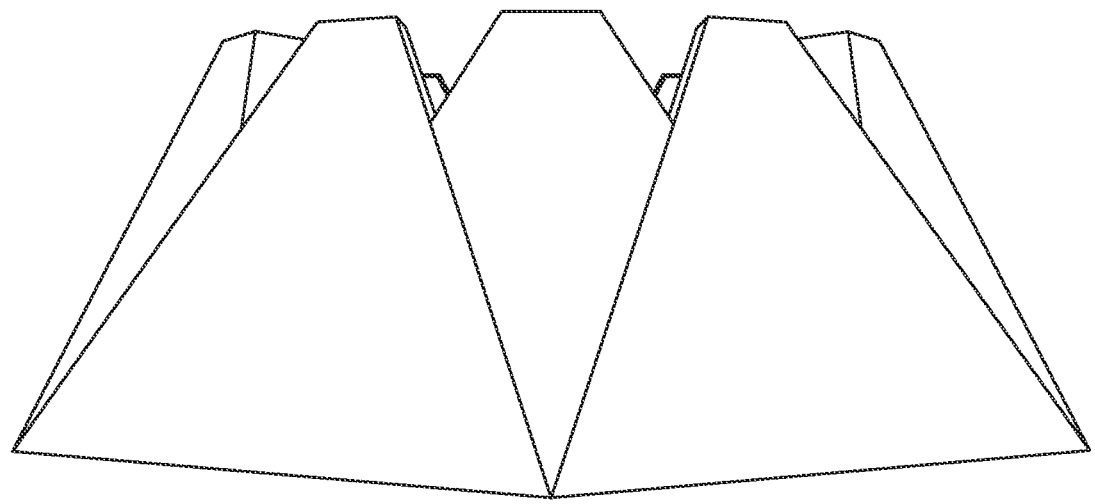
Figure 74:
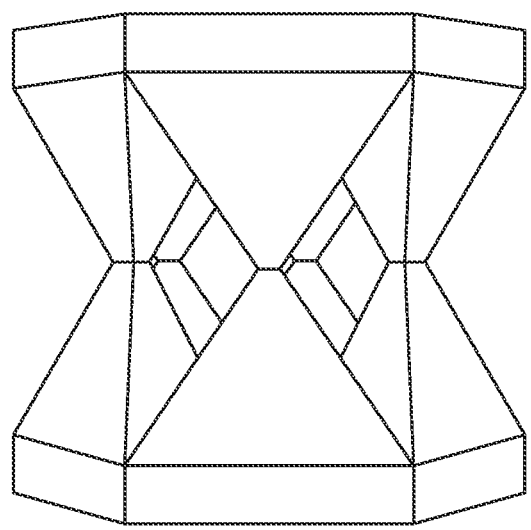
Figure 75:
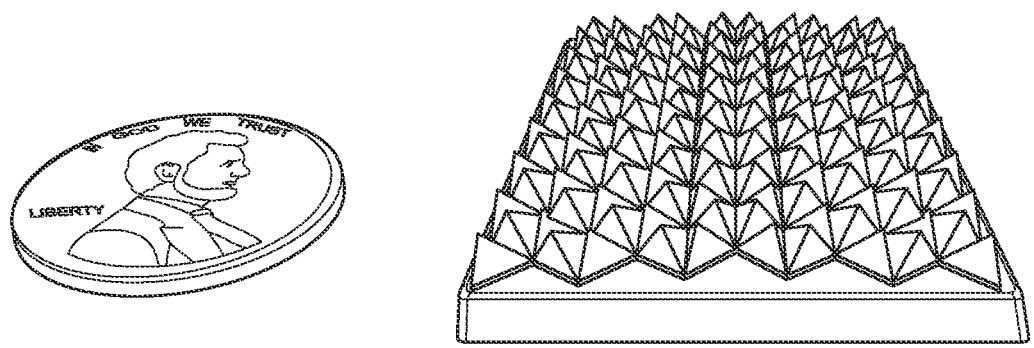
Figure 76:
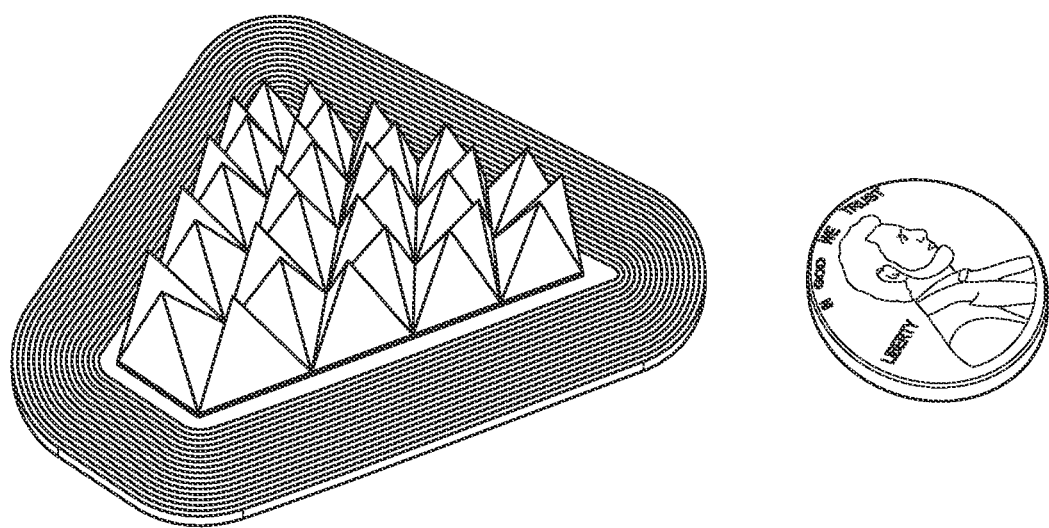
Figure 77:
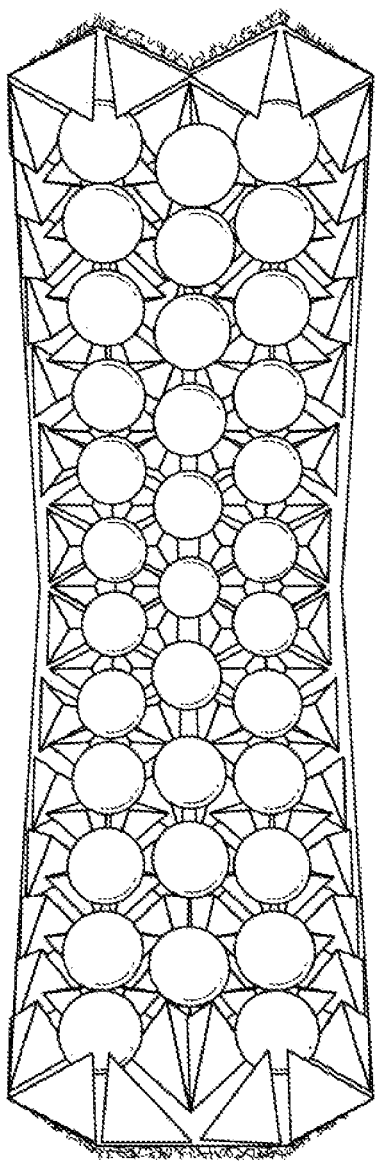
Figure 78:
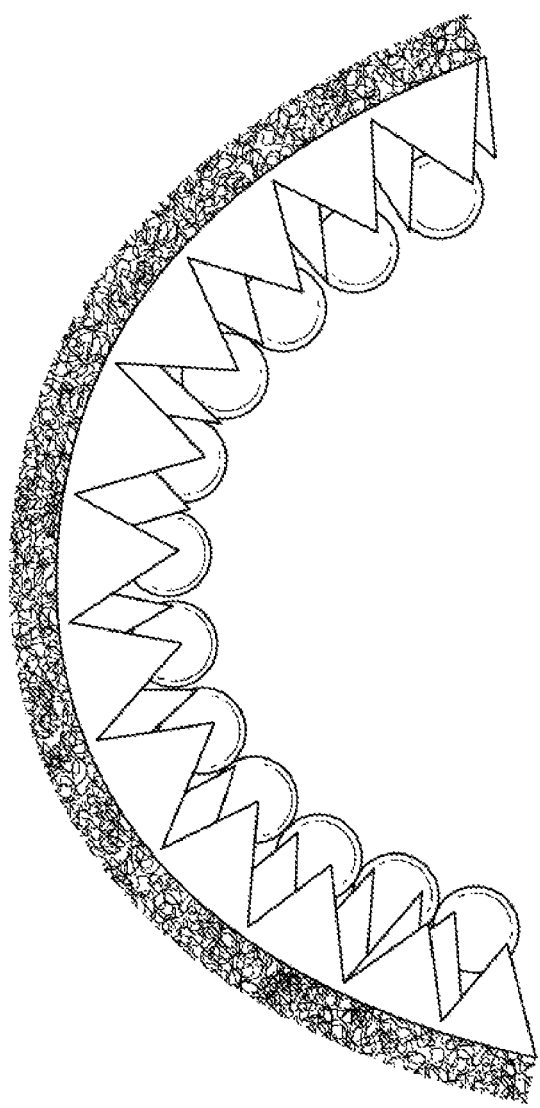
Figure 79:
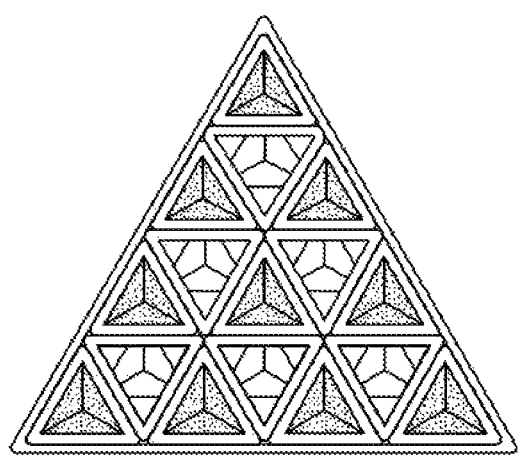
Figure 80:
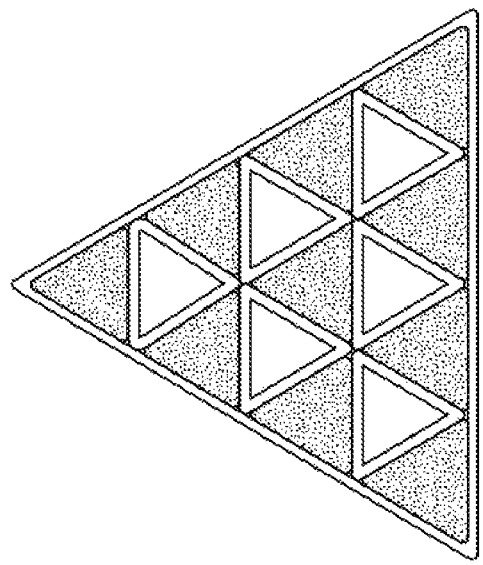
Figure 81:
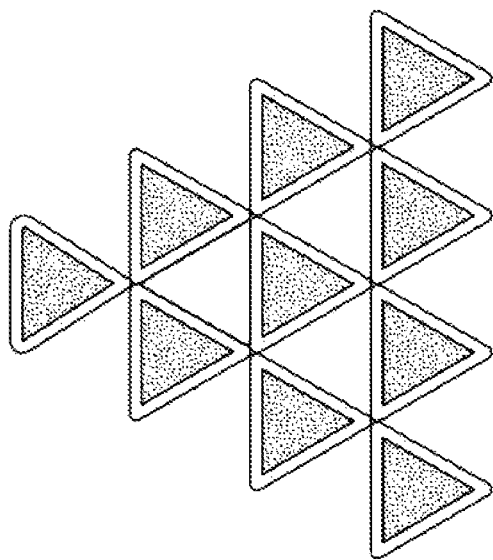
Figure 82:
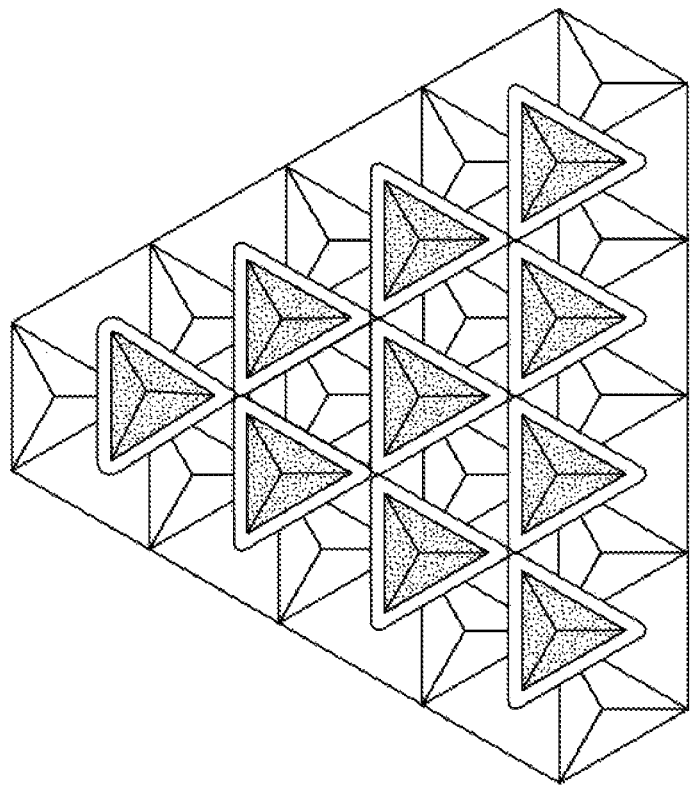
Figure 83:
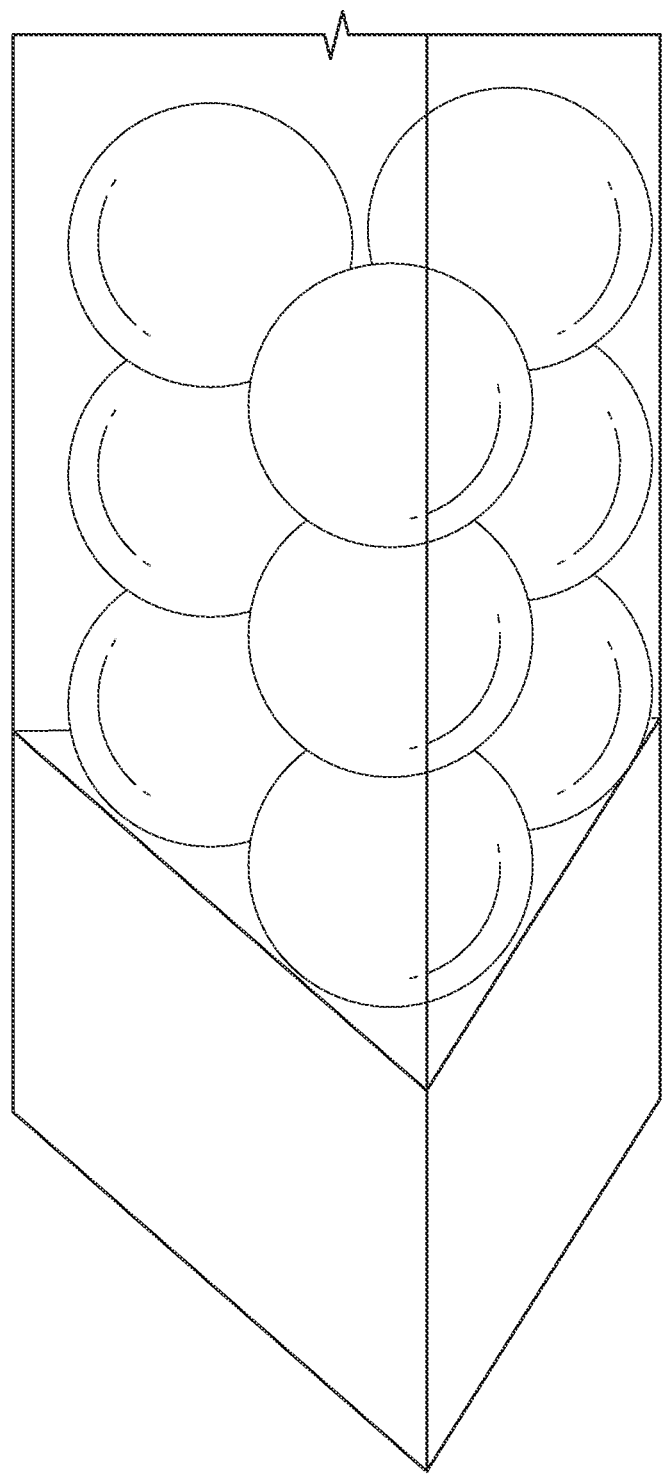
Figure 84:
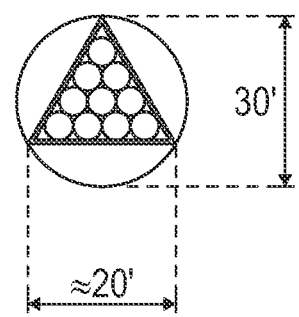
Figure 85:
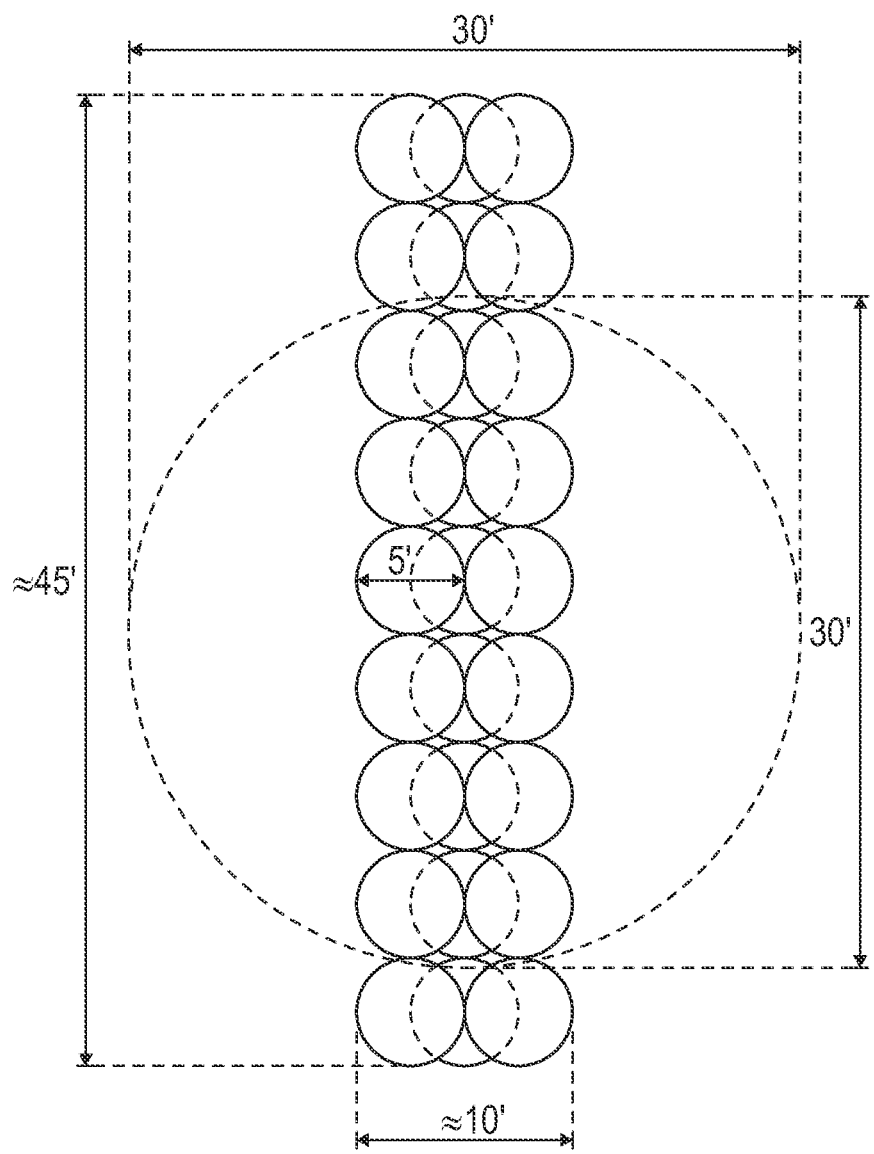
Figure 89:
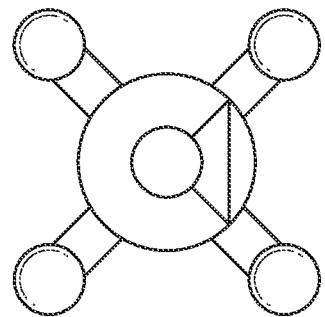
Figure 88:
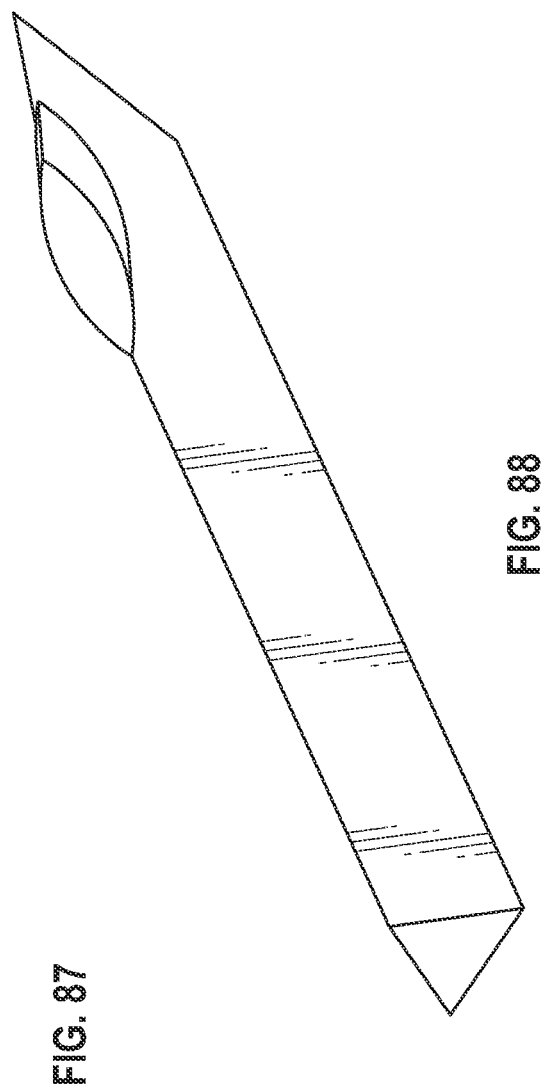
Figure 87:
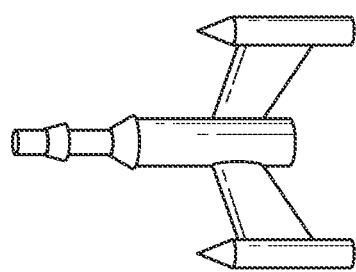
Figure 90:
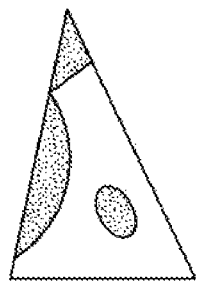
Figure 91:
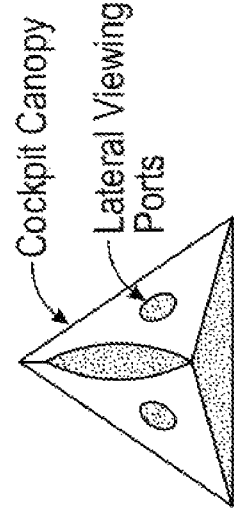
Figure 92:
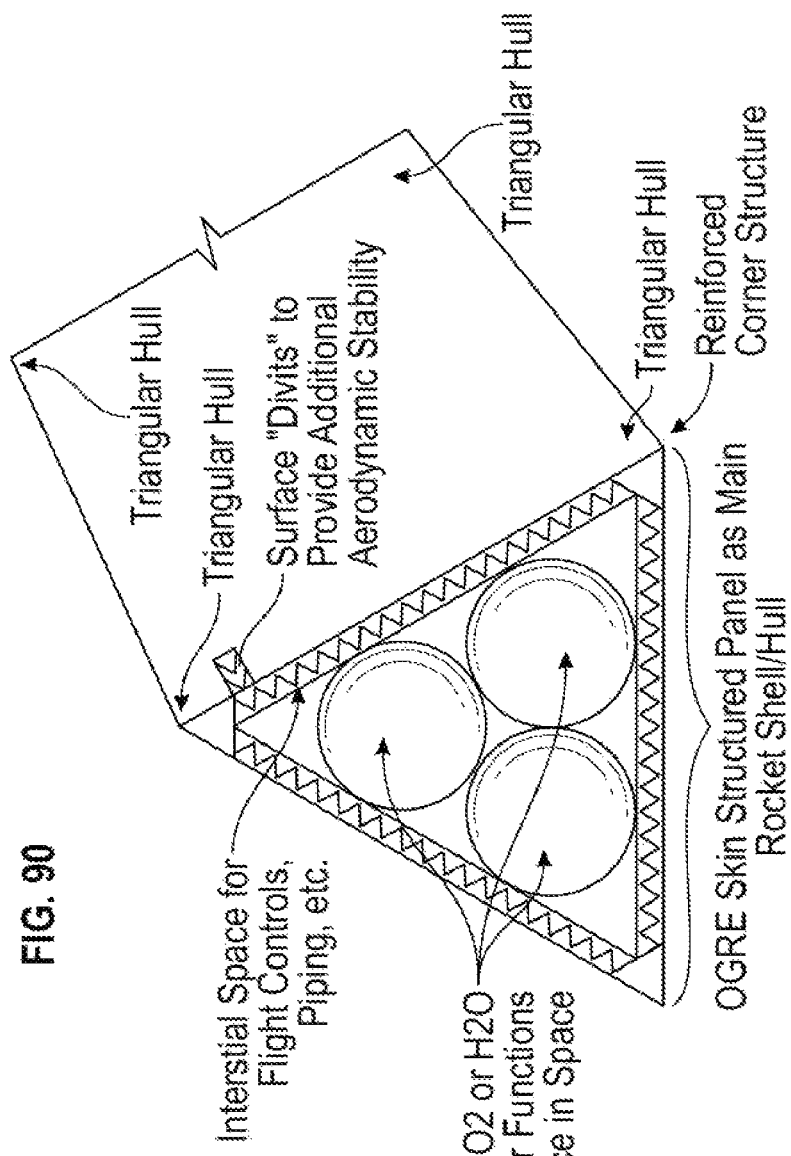
Figure 93:
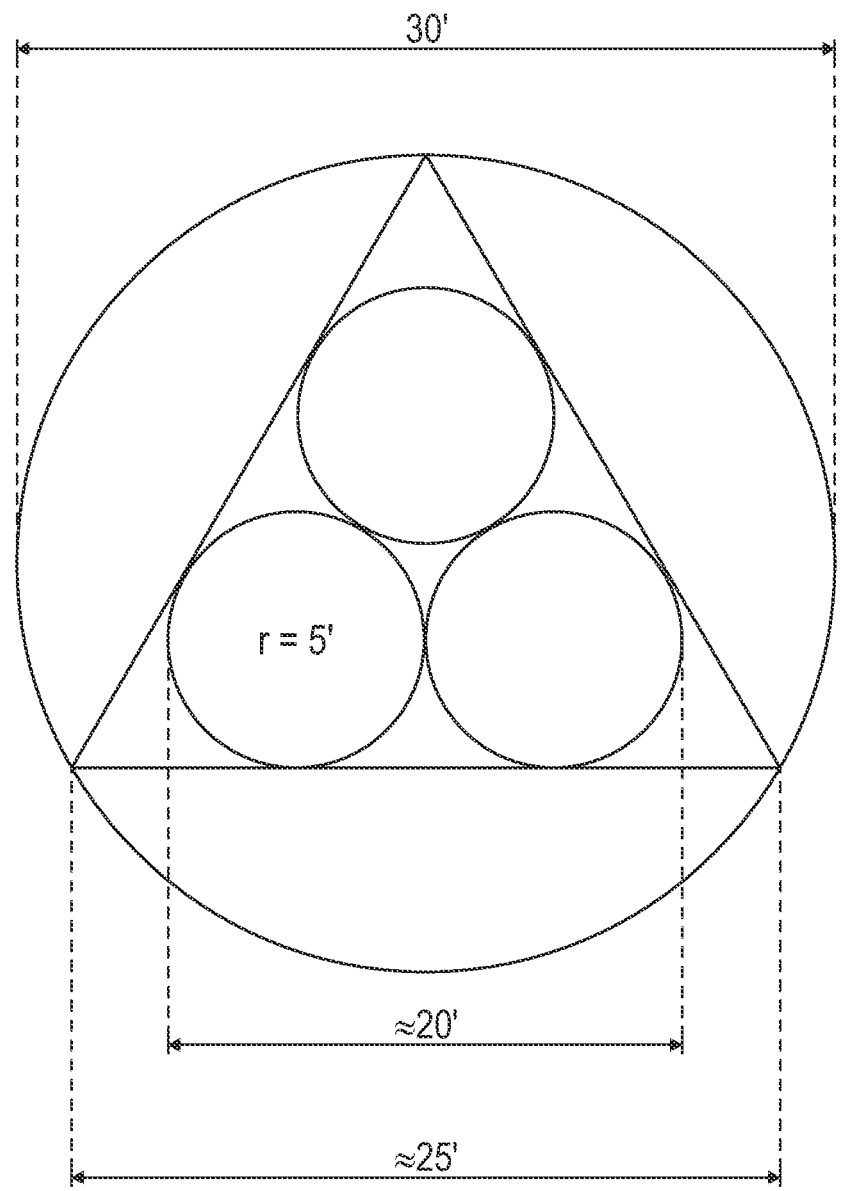
Figure 94:
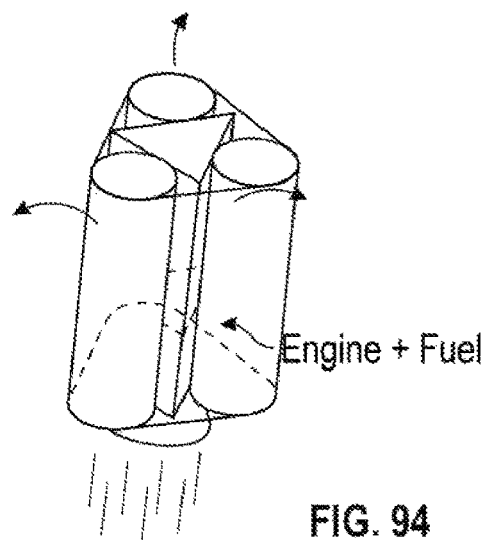
Figure 95:
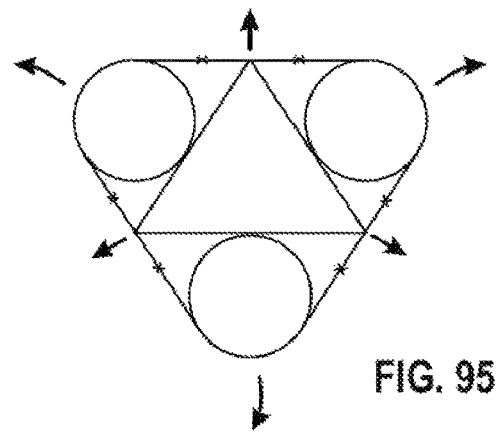
Figure 96:
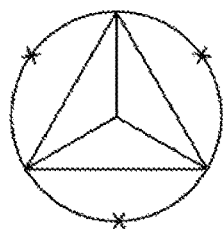
Figure 97:
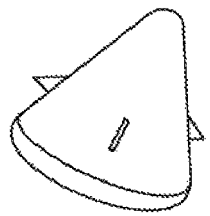
Figure 98:
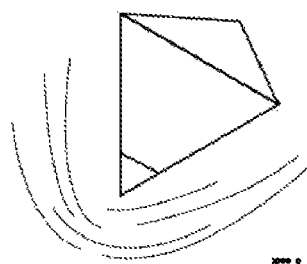
Figure 99:
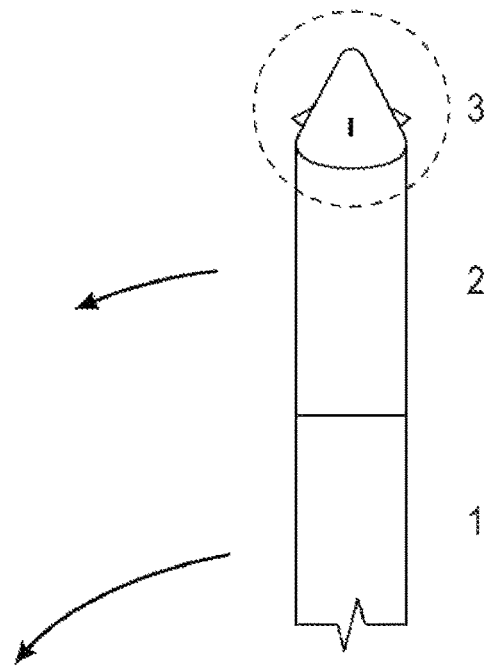
Figure 100:
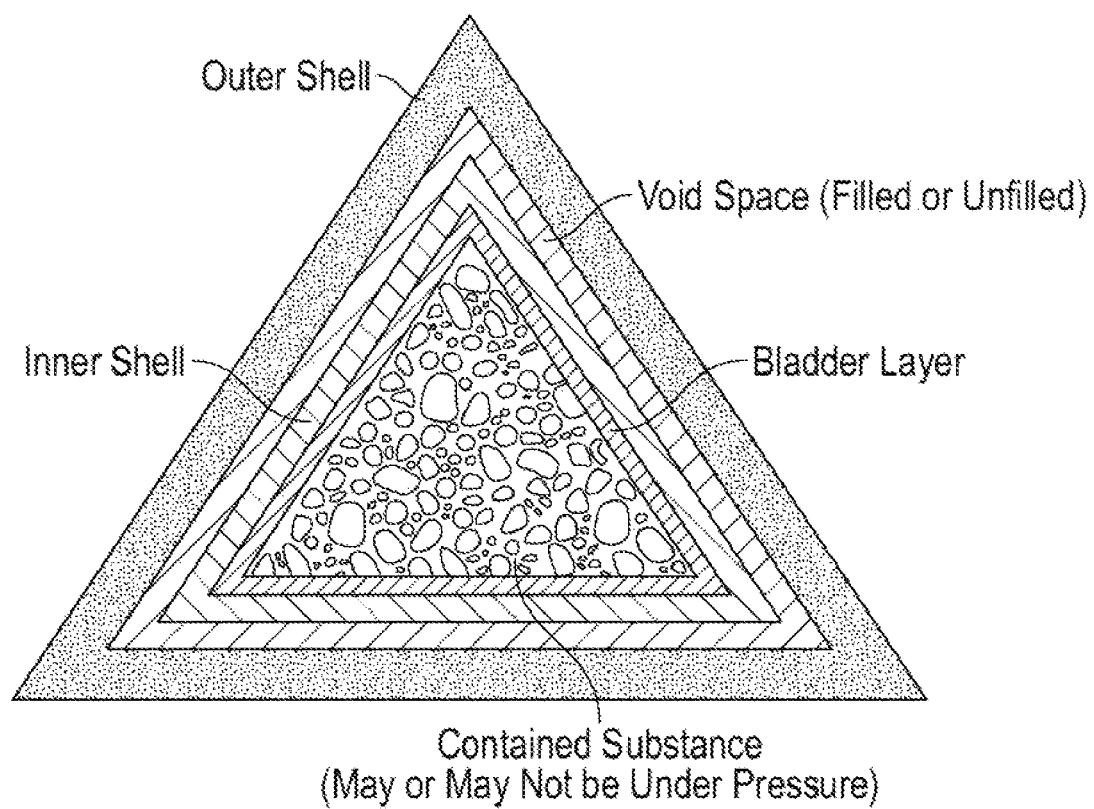
Figure 102:
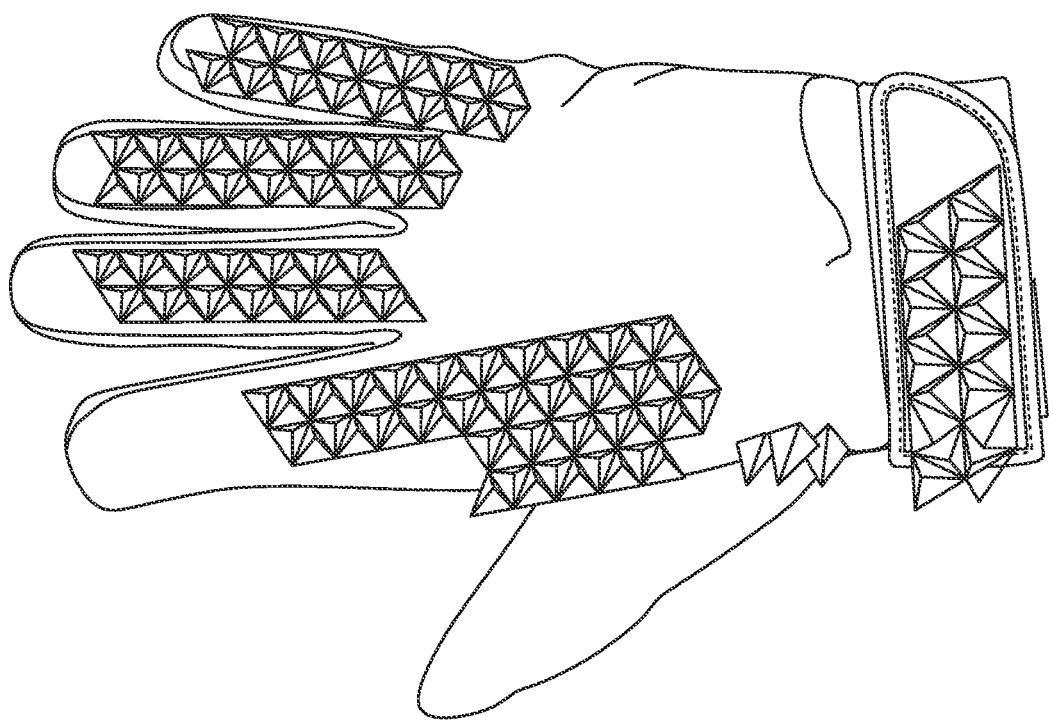
Figure 101:
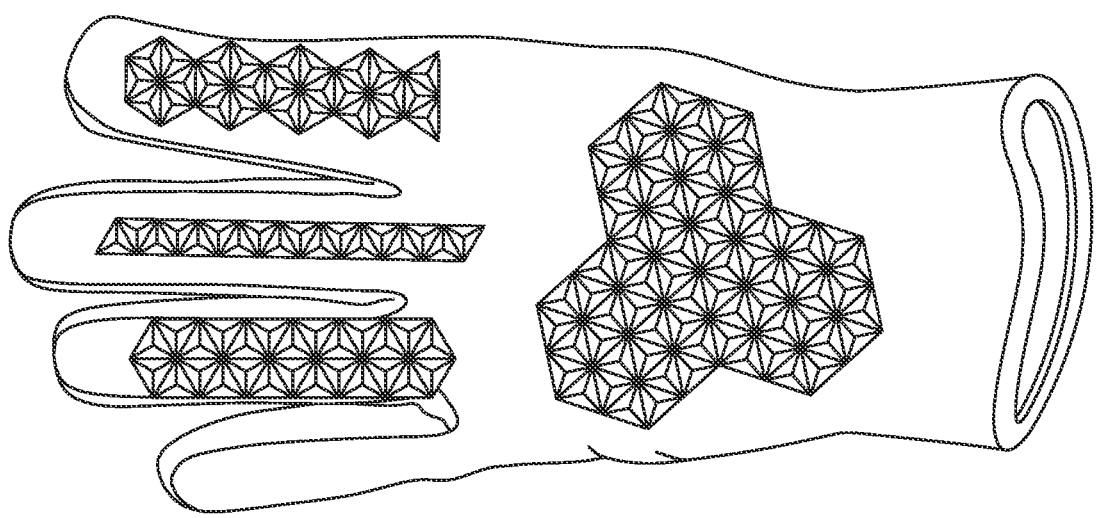
Figure 103:
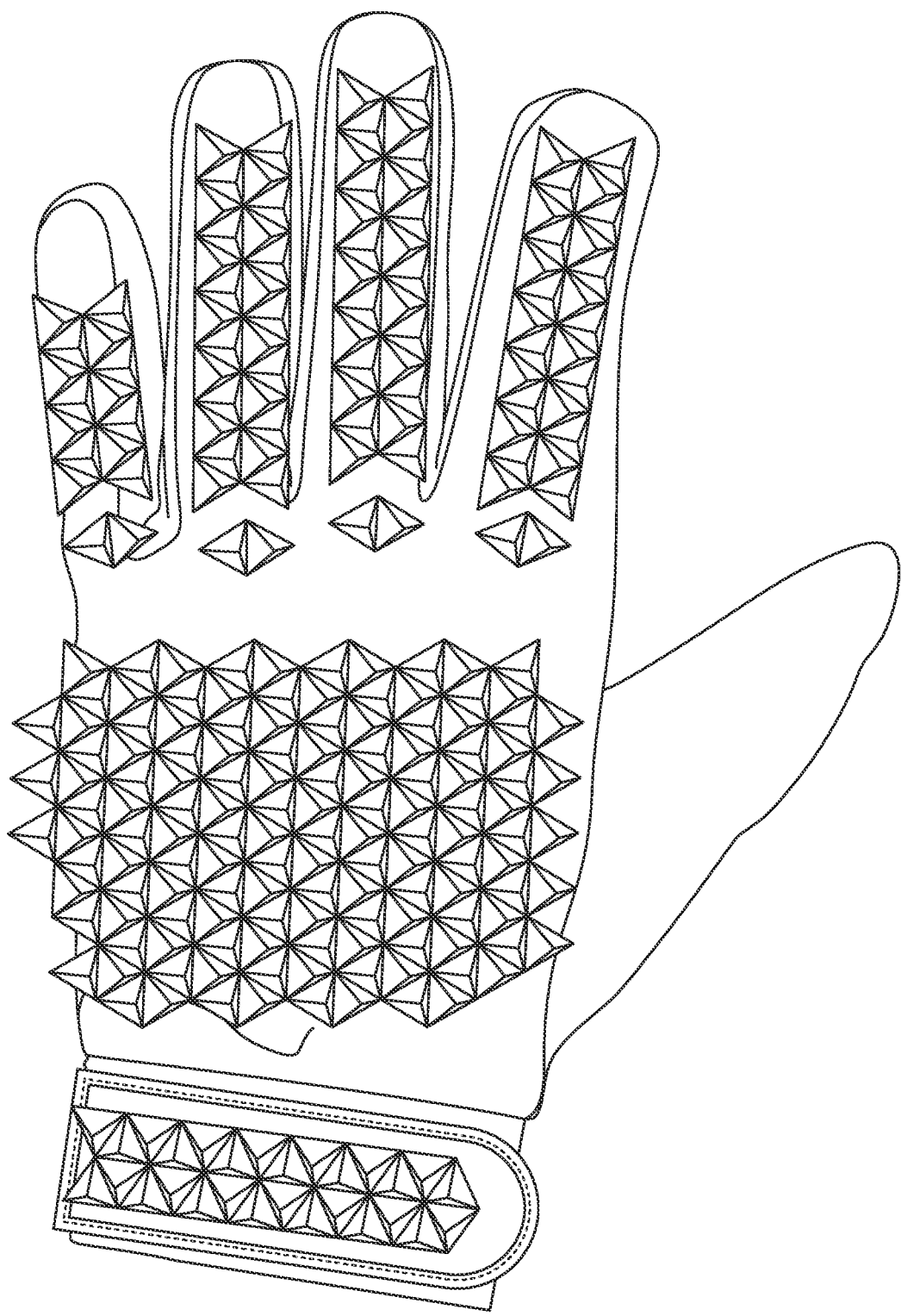
Figure 104:
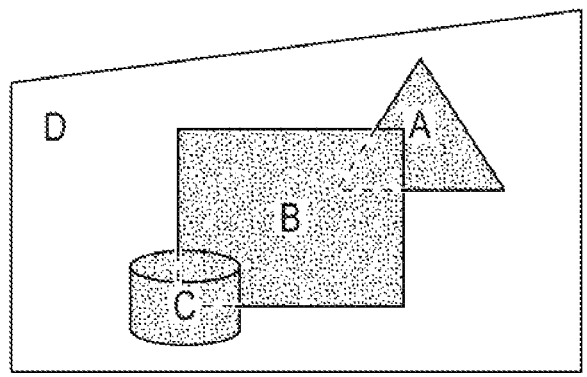
Figure 105:
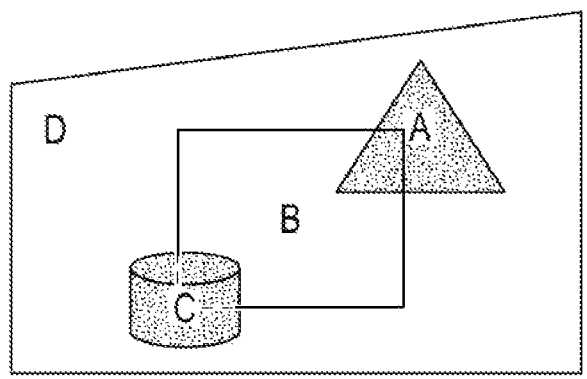
Figure 106:
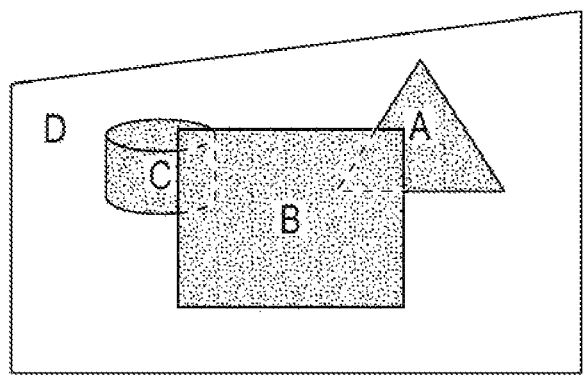
Figure 107:
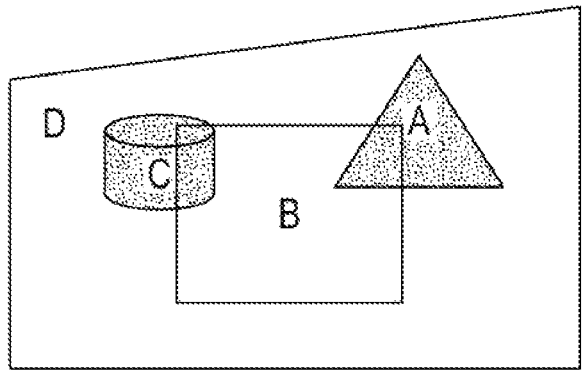
Figure 108:
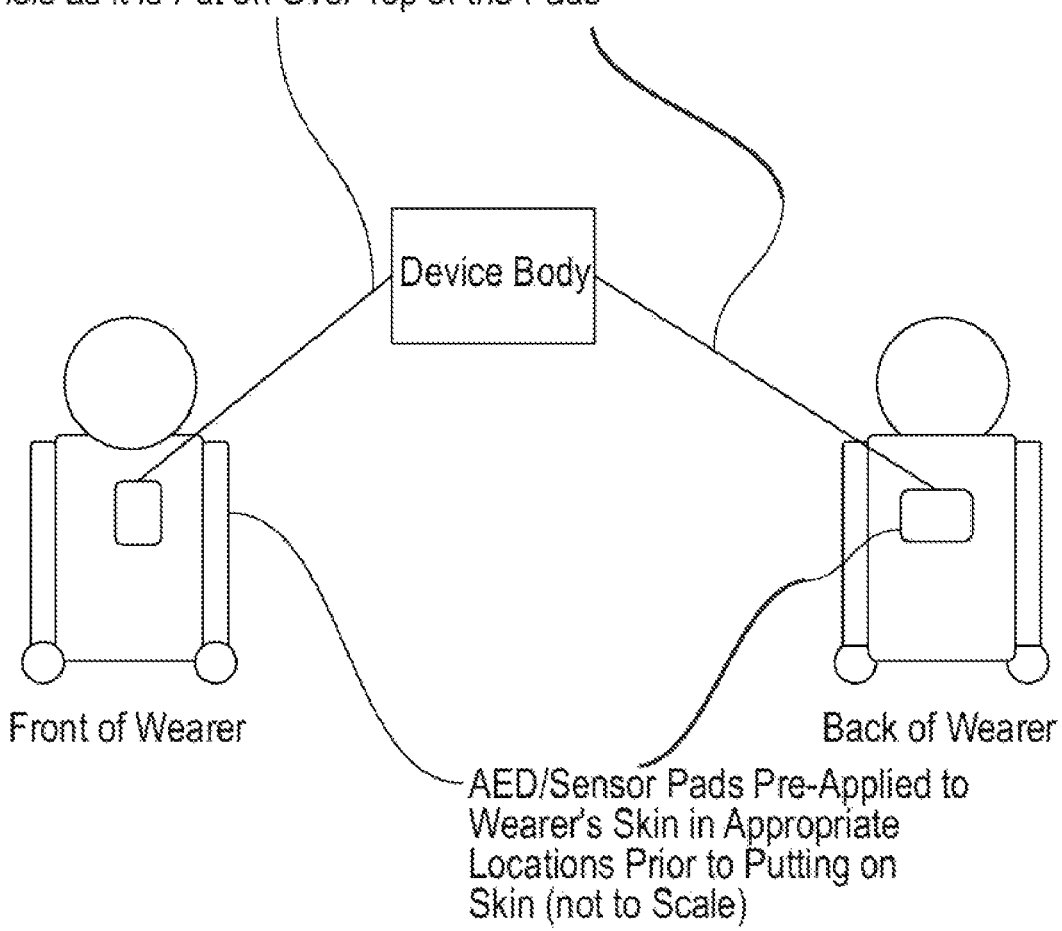
Figure 109:
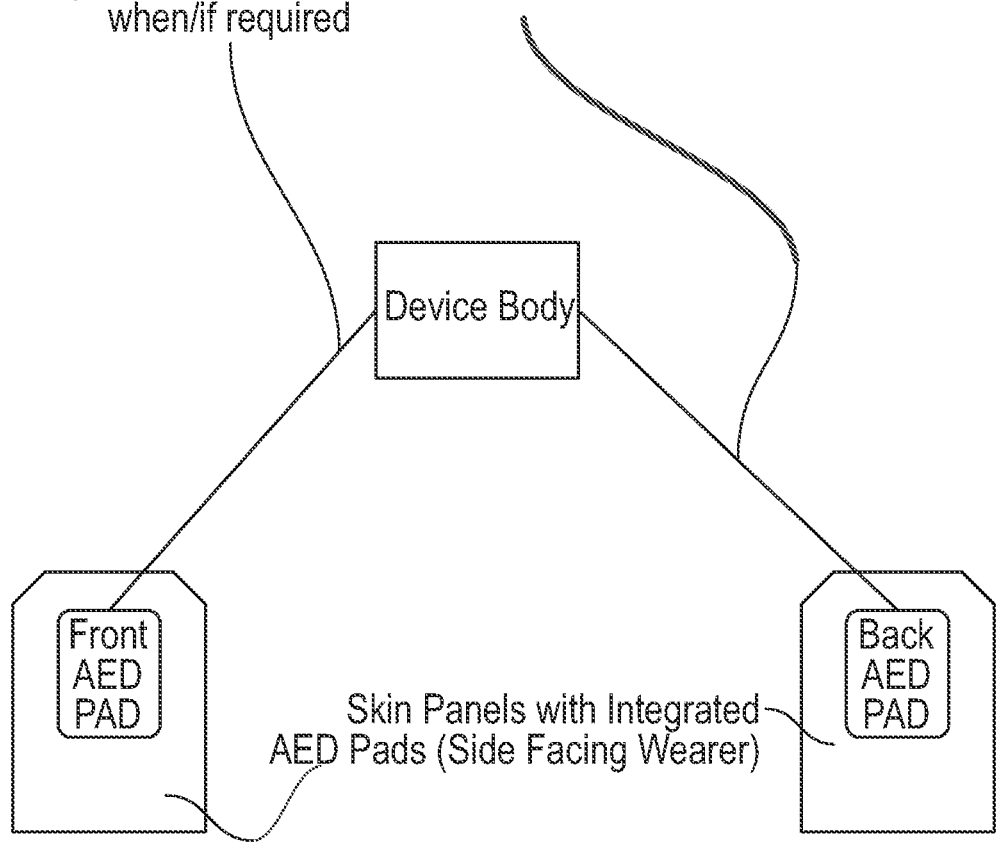
Figure 110:
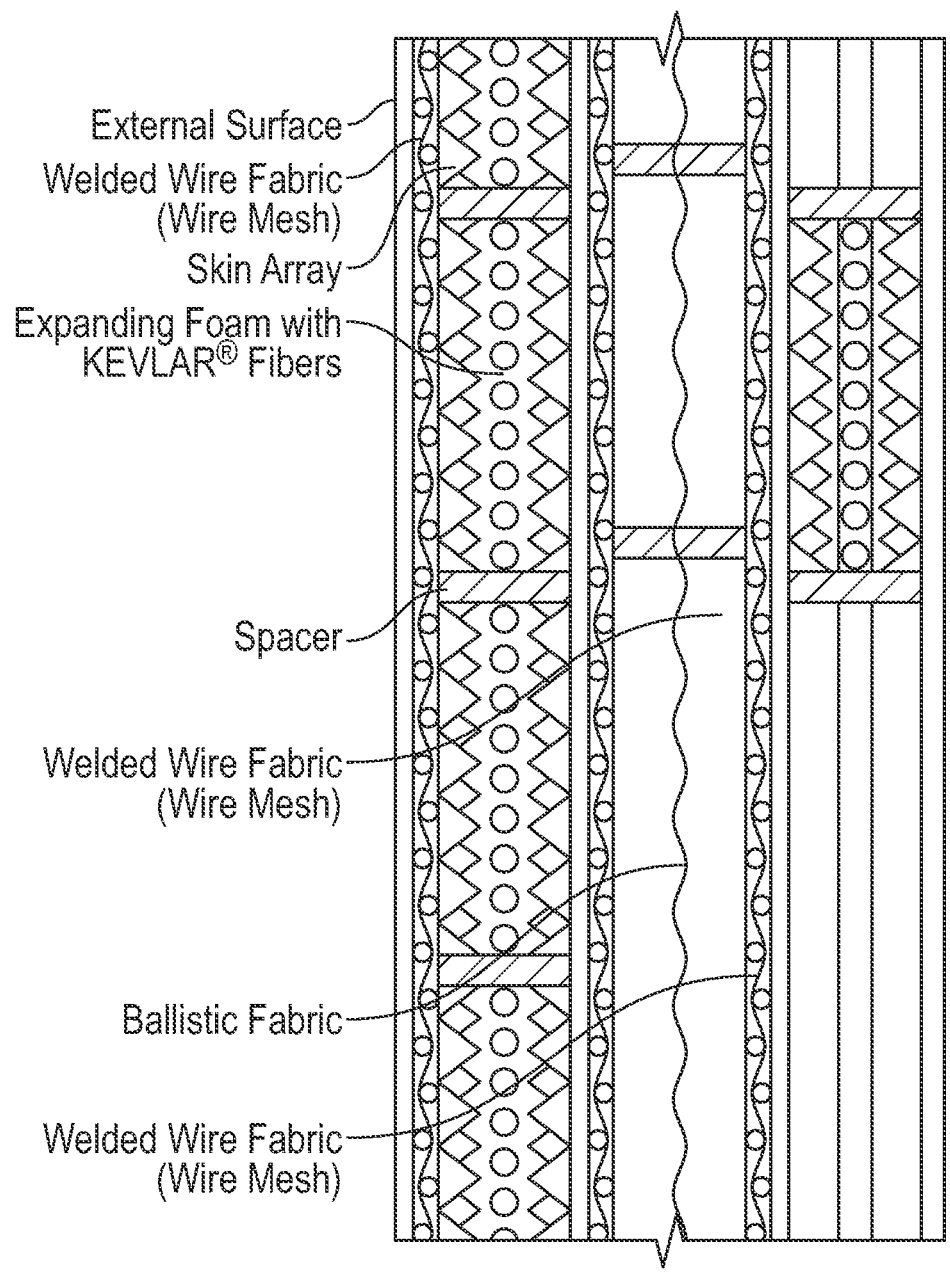
Figure 111:
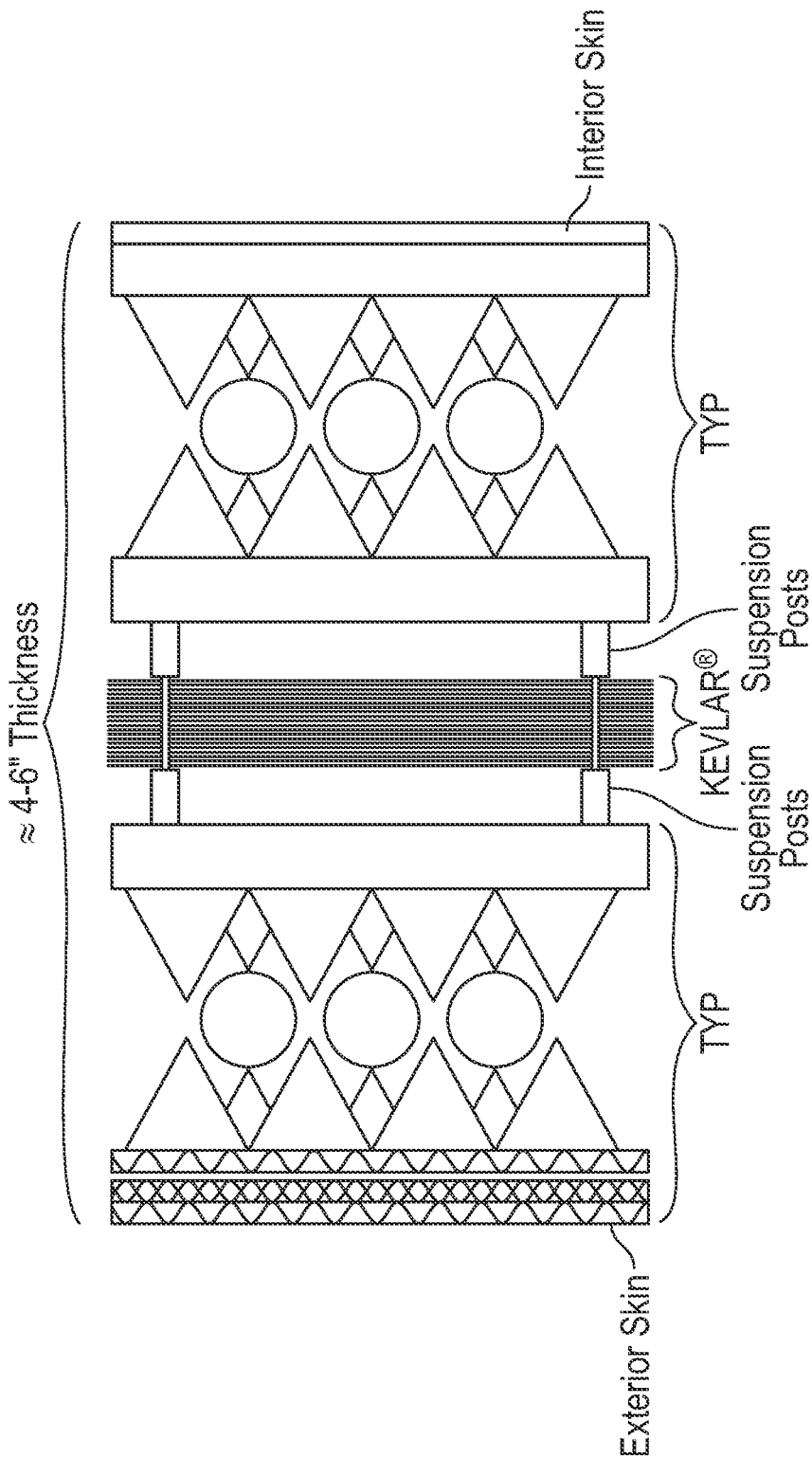
Figure 112:
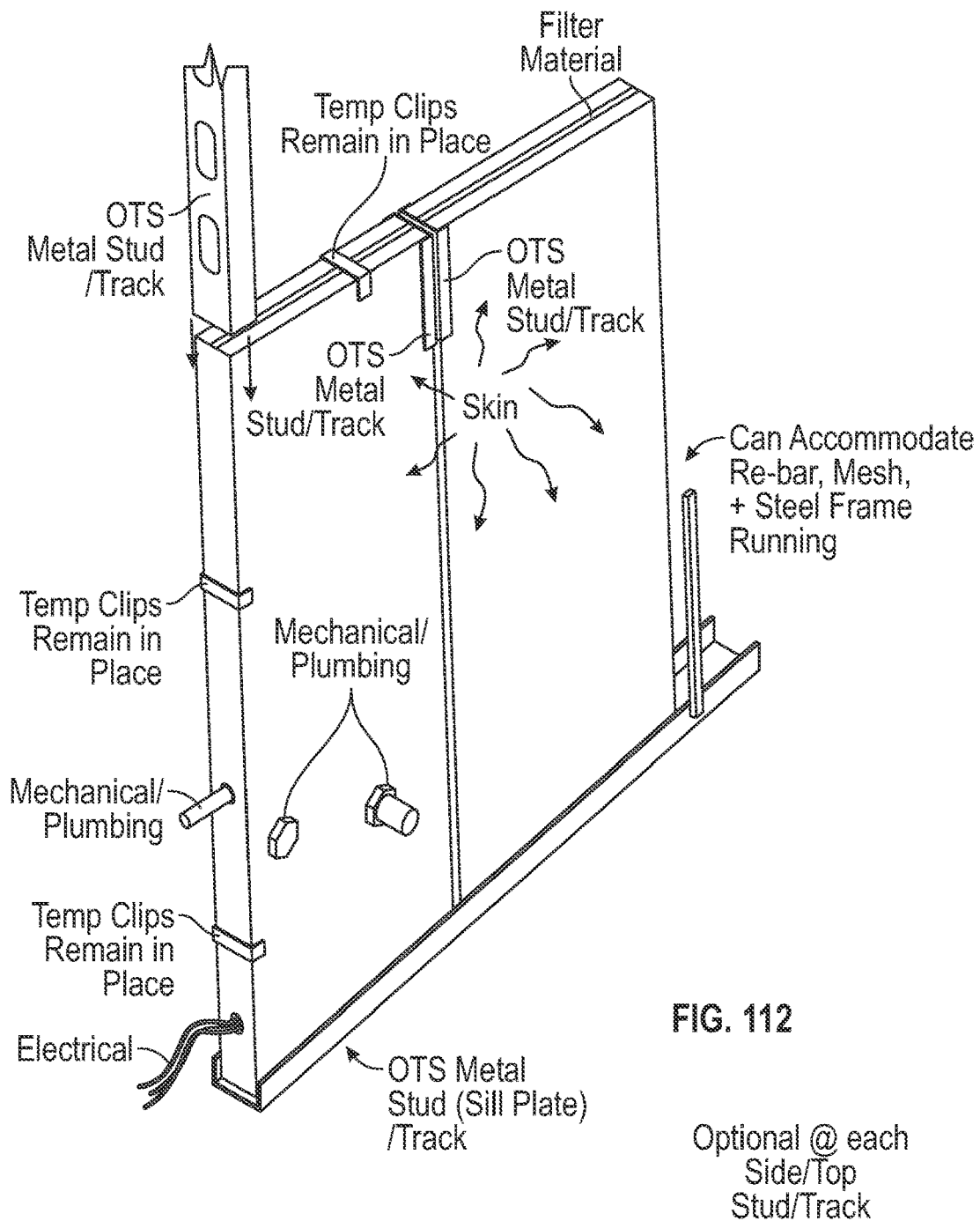
Figure 113:
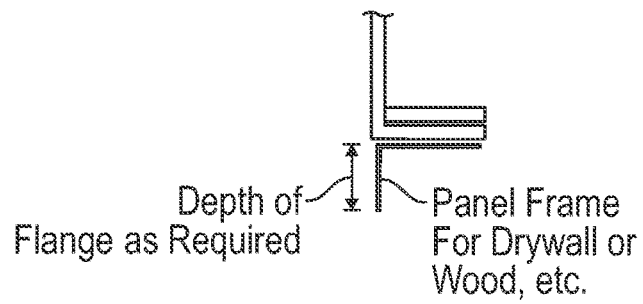
Figure 114:
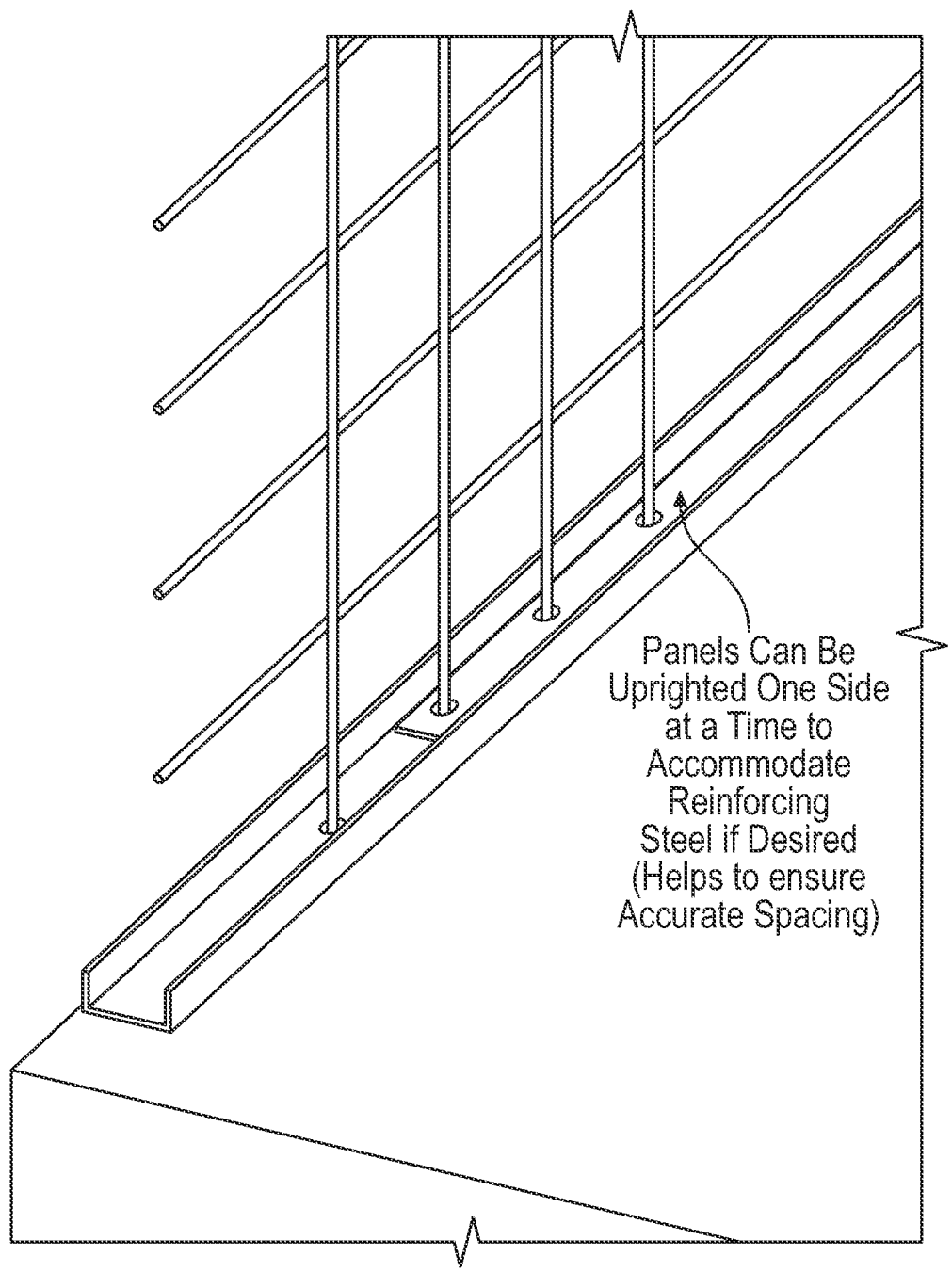
Figure 115:
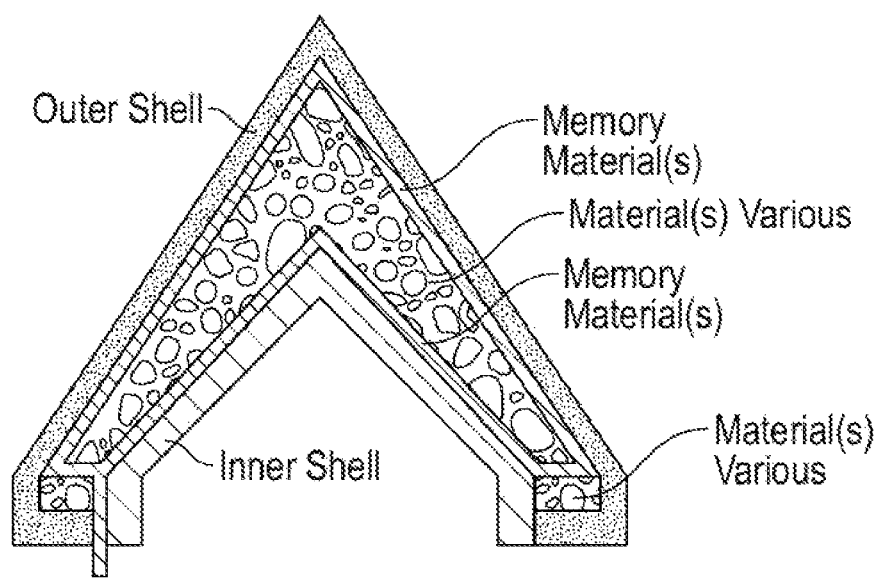
Figure 116:
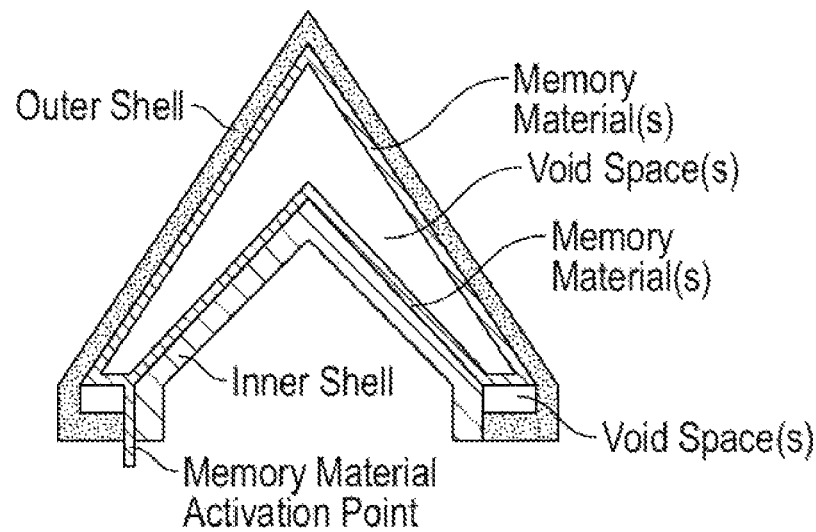
Figure 117:
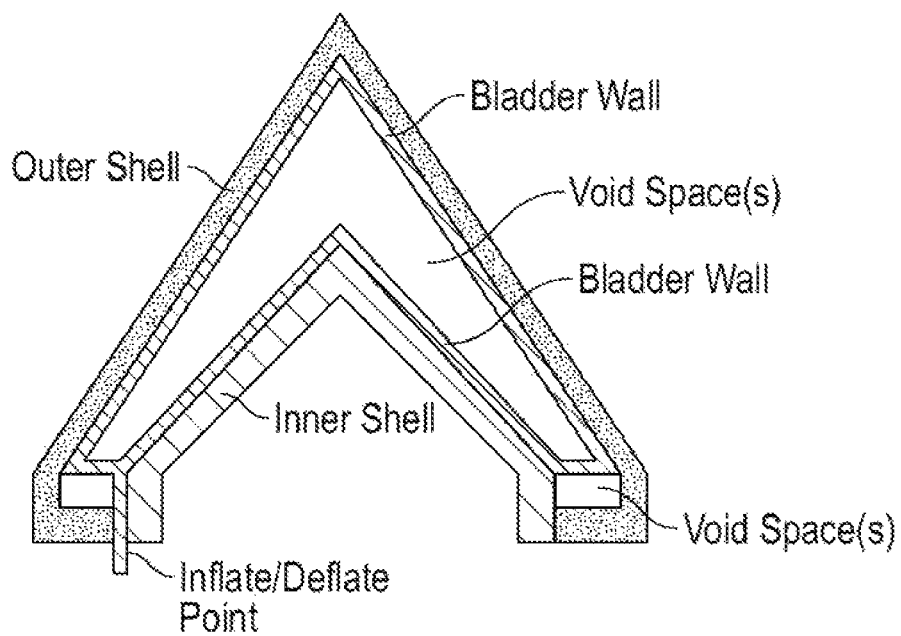

FIGS. 58-117 depict still other embodiments as shown and described herein; and

FIGS. B1A-B40 depict still other embodiments as shown and described herein.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to energy distribution structures designed to absorb and redirect, or distribute, an externally applied force. In particular, the energy distribution structures can act as a shield or protective layer for humans (or robotic equivalents) in wearable applications, such as clothing or wearable protective gear. Further, the energy distribution structures can act as a shield or protective layer for objects in non-wearable applications, such as armored vehicles, as a non-limiting example. An externally applied force may occur through a variety of means, such as an impact event through contact by an object (including ballistic and non-ballistic objects), increased pressure, or shockwaves, as non-limiting examples.

As described herein, an energy distribution structure includes multiple three-dimensional components extending in X-, Y- and Z-coordinates (of a Cartesian coordinate system). For example, an energy distribution structure may include an outer component and an inner component. The inner component is positioned in an internal space or volume defined by walls of the outer component. In some embodiments, the inner and outer components are each defined by a three-dimensional structure, such as a tetrahedron that includes multiple triangular walls and a triangular base. The inner and outer components may be directly coupled to each other and/or directly coupled to a base component. The tetrahedron configuration of the inner and outer components should be construed as a non-limiting example, as many different three-dimensional configurations can be used. Also, the number of outer and inner components need not be equal. For example, in some embodiments, an energy distribution structure includes an outer component and two or more inner components.

The outer component provides an exterior surface of the energy distribution structure, and accordingly, initially absorbs energy from the externally applied force. The location at which the externally applied force is received by the outer component defines an impact location. Unlike traditional protective structures that include a flat, two-dimensional configuration (the thickness of the protective structure excluded as a "dimension"), the outer component includes a three-dimensional configuration. As a result, the outer component not only absorbs the energy from a ballistic object, but also redirects the energy throughout the walls (of the outer component) and away from the impact location. In other words, the outer component of the energy distribution structure changes the trajectory of the energy (initially defined by the trajectory of the ballistic object), whereas the flat protective structure tends to simply absorb and directly transfer the energy from the (force due to the ballistic object) to an object directly behind the location of the force. Moreover, spalling (destructive breakdown of the metallic or other layers) may occur, and the metallic or outer layers become projectiles and also stopped (or contained) after the initial impact (this is why most hard-plate).

Although the outer component redirects the energy, at least some of the absorbed energy bends, collapses, or otherwise deforms the outer component, causing the outer component to engage the inner component at one or more locations of the inner component, thereby defining one or more impact locations, respectively, on the inner component. When this occurs, residual energy from the externally applied force is transferred from the outer component to the inner component. As a result, the inner component may act in a manner similar to that of the outer component, and redirect the residual energy throughout the walls of the inner component and away from the one or more impact locations to the inner component. Further, some of the energy (initial and/or residual) that passes through the outer and inner components may further pass through the base component. In some instances, the impact energy that passes through the outer component, and cancels or offsets the residual energy that passes through the inner component. Still, although the inner component redirects the energy, at least some of the absorbed energy bends, collapses, or otherwise deforms the inner component, causing the inner component to engage the object that is shielded by the energy distribution structure (or some layer between the object and the energy distribution structure). However, the impact energy that passes through the inner component and/or the base component and reaches the object is substantially mitigated such that damage or injury that would otherwise be caused by the impact energy to the object can be prevented.

Furthermore, energy distribution structures described herein may be connected to form an array of energy distribution structures. An array of energy distribution structures may refer to one or more rows and columns of energy distribution structures that are joined together (integrally or separable). Each energy distribution structure of the array can include an inner and outer component that functions in a manner similar to the previously described inner and outer component, respectively. Based on the connected energy distribution structures, the array of energy distribution structures provides a network of structures that can receive and re-direct the energy from the externally applied force. As a result, an energy distribution structure (or structures) that receives energy through an externally applied force can transfer the energy not only through the outer and inner components (as described above), but also to adjacent energy distribution structures. These adjacent energy distribution structures can subsequently transfer the energy through their respective outer and inner components, as well as to their adjacent energy distribution structures. This energy transfer process may continue throughout the additional energy distribution structures of the array until the energy is fully absorbed by the array or transferred out of the array. Moreover, the motion or flow of energy through the energy distribution(s) need not follow a linear path, and can travel in direction other than the initial direction of travel of the incoming object (that generates the externally applied force).

The array of energy distribution structures provides an increased area of protection from impact events. In some instances, the array of energy distribution structures can withstand and protect from multiple impact events. Also, the connection points and connection edges between adjacent energy distribution structures of the array may flex and act as a hinge. The ability for the array of energy distribution structures to flex at certain locations allows the array to conform to non-planar objects. Further, when the array of energy distribution structures is part of a wearable application such as clothing, the flexibility allows for movement by the user without compromising the functionality or strength. Also, in some instances, multiple arrays if energy distribution structures may interdigitate with (or otherwise form a stacked configuration) with each other, with one of the arrays providing a flexible array with relative motion capability, and the other array providing a relatively rigid or robust structure provides protection over/around/in proximity to the flexible array.

Energy distribution structures described herein, including arrays of energy distribution structures, may be formed in many ways. For example, in some embodiments, a 3D printer that emits a curable material to form three-dimensional objects can be used to form an energy distribution structure. However, other operations, such as molding operations including compression molding and injection molding (as non-limiting examples), are possible. Energy distribution structures may include materials such as graphene, plastic, synthetic fibers (such as KEVLAR®, KEVLAR® 29, KEVLAR® 49, compressed or otherwise modified or altered KEVLAR®), carbon fiber, carbon nanotubes, pelletized material, resin(s) or some combination thereof, as non-limiting examples. Additionally, energy distribution structures may be applied to a material, such as a fabric layer (including clothing), by curing/applying a portion of the energy distribution structures directly to the fibers of the fabric layer. Other application methods include adhesives, fasteners, or hook and loop fasteners (such as VELCRO®), as non-limiting examples. Further, energy distribution structures, including arrays of energy distribution structures, may be positioned between two (or more) layers of materials, with the layers of material being formed from one of the aforementioned material used to form an energy distribution structure or a combination materials.

There are many applications, conditions, and situations in which an energy distribution structure(s) can absorb, re-direct, and protect from, or mitigate, the negative consequences of either a ballistic or non-ballistic impact, an instantaneous or prolonged impact such as atmospheric pressure or decompression, explosive overpressure (shock-wave), or even low-velocity contact and blunt force trauma. Some non-limiting applications in which an energy distribution structure(s) may be applied include body armor and armor for military vehicles to protect from ballistic objects, blunt force protection on sporting gear or athletic apparel to protect against a ball or human interaction, tire treads and tank tracks for traction and absorption of impacts during driving on non-flat surfaces, pipe covering to protect against an exploding pipe, airplane wings for increased lift and thrust, rocket fuel engines for absorption of energy during use, packaging for protection of cargo during shipment, window protection for storm/hurricane/high-velocity winds, home insulation (for heat and sound), and vessel coverage for increased surface area to increase buoyancy at high speeds. Also, regarding maritime applications, the void or space between the structures may create a vacuum or air cushion once surface tension is broken to reduce drag.

These and other embodiments are discussed below with reference to all of the drawings, FIGS. 1-57, B1-B42 and BC1-BC3. However, those skilled in the art will readily appreciate that the detailed description given herein with respect to these Figures is for explanatory purposes only and should not be construed as limiting.

Figure 1A:
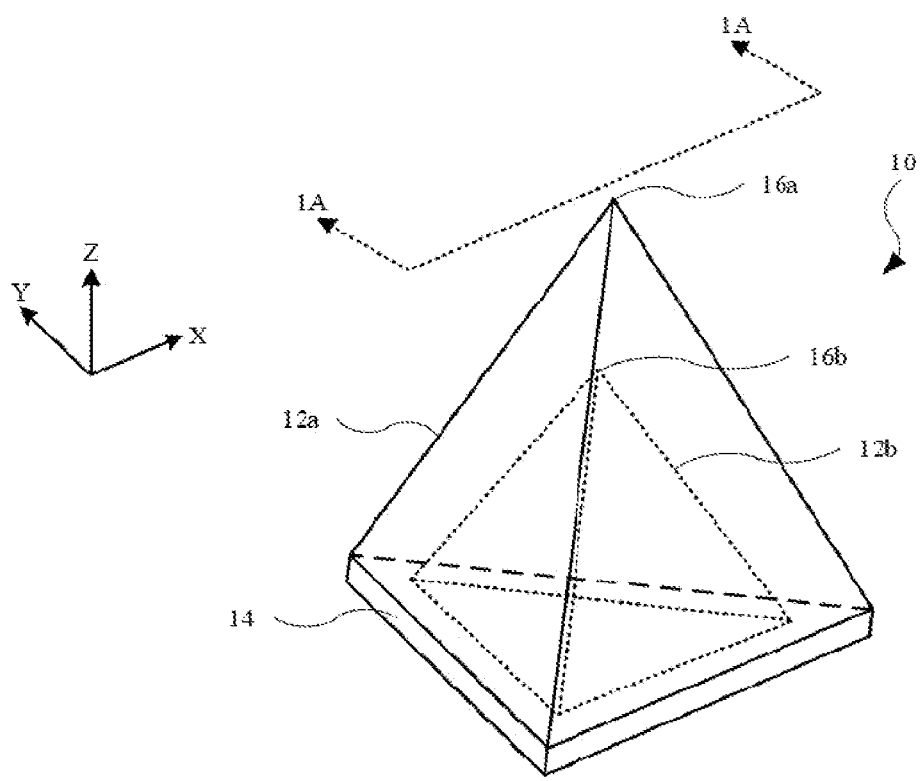
FIG. 1A illustrates an isometric view of an embodiment of an energy distribution structure, in accordance with some described embodiments.

FIG. 1A illustrates an isometric view of an embodiment of an energy distribution structure 10, in accordance with some described embodiments. The energy distribution structure 10 (and other energy distribution structures described herein) can project and shield users (i.e., humans or robotic structures), as well as other stationary or moving objects, from impact events caused by an object(s) that strikes, collides with, or otherwise provides an externally applied force to the energy distribution structure 10. Also, in the detailed description and in the claims, an energy distribution structure may be referred to as other phrases, such as an energy distribution unit, an energy distribution module, or an impact energy distribution structure, an energy distribution unit, or an energy distribution module.

The energy distribution structure 10 can be defined by a three-dimensional structure having components or features extending in X-, Y- and Z-directions (coordinates of a Cartesian coordinate system). For example, the energy distribution structure 10 can include a component 12a and a component 12b. The component 12a generally defines an exterior surface of the energy distribution structure 10, and can further define an internal volume, or space (which could be solid or hollow), in which the component 12b is positioned. Further, the component 12a includes a surface (or set of surfaces) that can initially receive the impact event. Based on the relative positions, the component 12a and the component 12b may be referred to as the outer component and the inner component, respectively. Also, in some instances, the component 12a and the component 12b may be referred to as a first component and a second component, respectively. When the energy distribution structure 10 includes a tetrahedron shape, the component 12a and the component 12b may be referred to as a first tetrahedron component and the first tetrahedron component, respectively.

The energy distribution structure 10 may further include a base component 14. The base component 14 can be integrally formed with or coupled to the component 12a and/or the component 12b by means such as adhesives, or hook and loop fasteners, as non-limiting examples. While the energy distribution structure 10 represents a single energy distribution structure in FIG. 1A, the energy distribution structure 10 may be part of an array of energy distribution structures that are connected either at their respective bases and/or a base layer, or elsewhere. These features will be shown and described below.

Also, the energy distribution structure 10 further includes a tip 16a, or peak, which can represent an uppermost part of an exterior the energy distribution structure 10 (in the upright position shown in FIG. 1A). Further, the tip 16a represents the tip of the component 12a. Also, the component 12b also includes a tip 16b.

The energy distribution structure 10 may include a tetrahedron shape as a non-limiting example. In this regard, the component 12a and the component 12b may include multiple triangular walls. Further, the component 12a and the component 12b may each include three triangular walls joined together such that each of the component 12a and the component 12b defines a tetrahedron. Also, the perimeter of the base component 14 may define a triangular shape. The triangular walls of the component 12a and the component 12b may include equilateral triangles, or isosceles or scalene triangles. Further, the triangular walls of the component 12a may include equilateral triangles and the component 12b may include isosceles triangles, or vice versa. It should be noted, however, that shapes other than a tetrahedron are possible, and examples of which will be shown and described below.

The energy distribution structure 10 can absorb and redirect, or distribute, energy from an externally applied force away from the surface being protected. For example, impact by an object to the component 12a defines an impact location to the energy distribution structure 10. In response, the component 12a can absorb at least some of the energy and redirect the energy through the walls of the component 12a to the base component 14, where the energy can be dissipated as a non-limiting example via transfer laterally to adjacent base components and other energy distribution structures. Accordingly, the component 12a can change the trajectory of the received energy. In some instances, the energy absorbed by the component 12a is sufficient enough to overcome the structural integrity of the component 12a, thereby causing the component 12a to bend, collapse, or otherwise deform onto the component 12b. As a result, at least some the residual, or remaining, energy in the component 12a can be transferred to the component 12b, and the component 12b can absorb and distribute the energy through the walls of the component 12b to the base component 14, where the residual energy can be dissipated. Accordingly, similar to the component 12a, the component 12b can change the trajectory of the received energy. The residual energy transferred to the component 12b may be sufficient enough to overcome the structural integrity of the component 12b, thereby causing the component 12b to bend, collapse, or otherwise deform. In some instances, at least some of the energy from the impact event passes through the component 12a, the component 12b, and the base component 14. However, the energy may be sufficiently dissipated such that little or no damage/injury occurs to an object covered by the energy distribution structure 10. Examples of the energy absorption/redirection will be shown below.

Figure 1B:
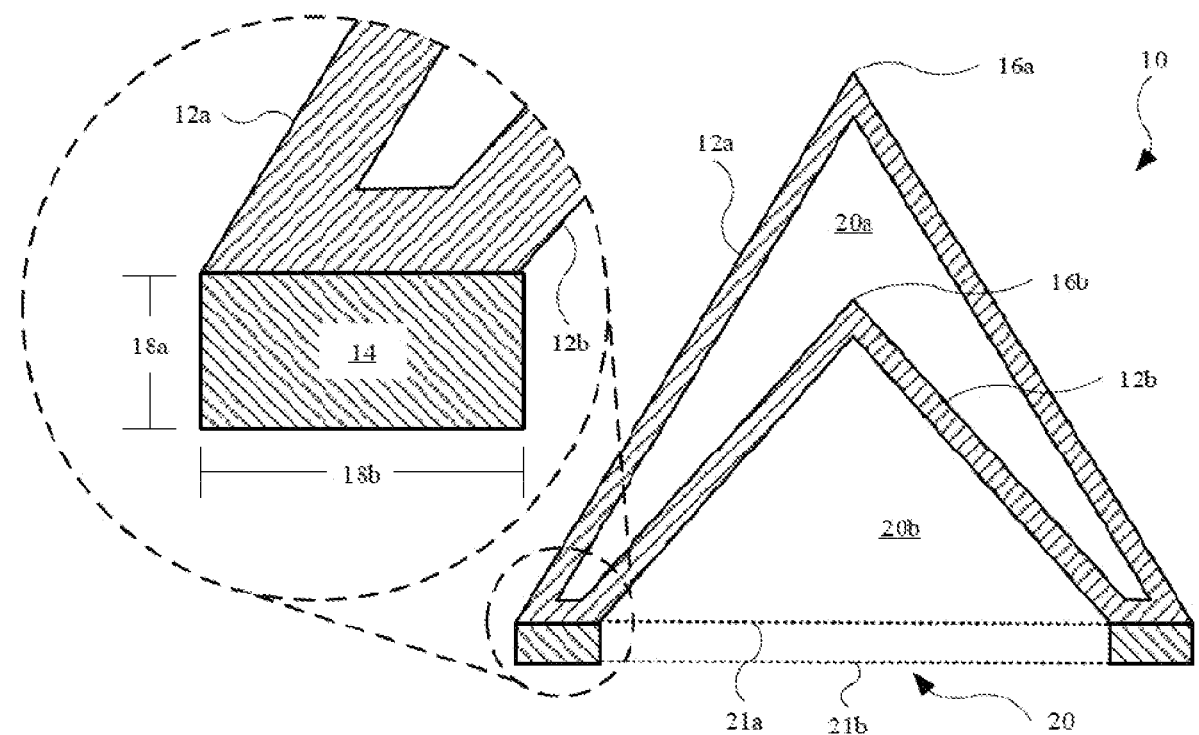
FIG. 1B illustrates a cross sectional view of the energy distribution structure shown in FIG. 1A, taken along line 1B-1B.

FIG. 1B illustrates a cross sectional view of the energy distribution structure 10 shown in FIG. 1A, taken along line 1B-1B. As shown, the component 12a and the component 12b each include a triangular cross section. However, the shape of the triangular cross sections may differ. Although not shown in the cross sectional view, the base component 14 (and other base components described herein) may define a continuous border around the base, or lower region (opposite the tip 16a and the tip 16b) of the energy distribution structure 10. The base component 14 may provide a shared surface area of contact for the component 12a and the component 12b, and allows for the energy distribution structure 10 to connect to adjoining energy distribution structures (not shown in FIG. 1B). As shown in the enlarged view, the component 12a and the component 12b can each terminate at the base component 14 at different locations of the base component 14 but along the same (horizontal, as depicted in FIG. 1B) plane defined by a horizontal surface base component 14. The cross section of the base component 14 shows the base component 14 having a dimension 18a and a dimension 18b. Each of the dimension 18a and the dimension 18b can vary.

Also, in some embodiments, the energy distribution structure 10 can include one or more spaces or voids. For example, the energy distribution structure 10 can include an internal volume 20 that is defined by the component 12a. The perimeter of the internal volume 20 can be defined by the inner perimeter of the component 12a and a dotted line 21a extending to the component 12b, or alternatively, a dotted line 21b extending to the base component 14. The internal volume 20 may include a region 20a defined by a space between the component 12a and the component 12b, as well as a region 20b defined by a space between the component 12b and the dotted line 21a, or alternatively, the dotted line 21b.

Figure 2A:
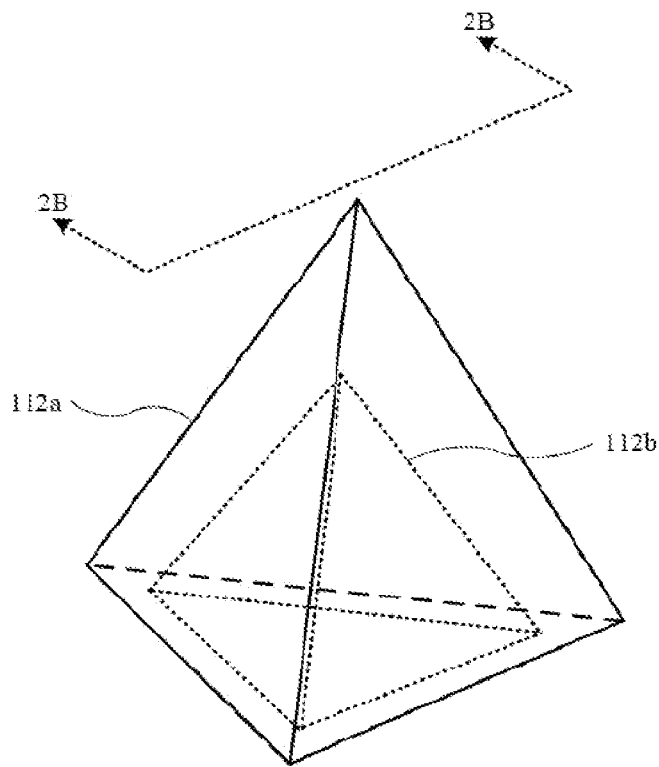
FIG. 2A illustrates an isometric view of an alternate embodiment of an energy distribution structure, showing the energy distribution structure without a base component, in accordance with some described embodiments.

FIG. 2A illustrates an isometric view of an alternate embodiment of an energy distribution structure 110, showing the energy distribution structure 110 without a base component, in accordance with some described embodiments. As shown, the energy distribution structure 110 includes a component 112a and a component 112b. The component 112a generally defines an exterior surface of the energy distribution structure 110, and further defines an internal volume, or space, in which the component 112b is positioned. With the exception of the base component 14 (shown in FIG. 1A), the energy distribution structure 110 may include any features and functions described for the energy distribution structure 10, or other embodiments herein. The energy distribution structure 110 can be directly secured to an object to be protected or some layer that is positioned between the energy distribution structure 110 and the object.

Figure 2B:
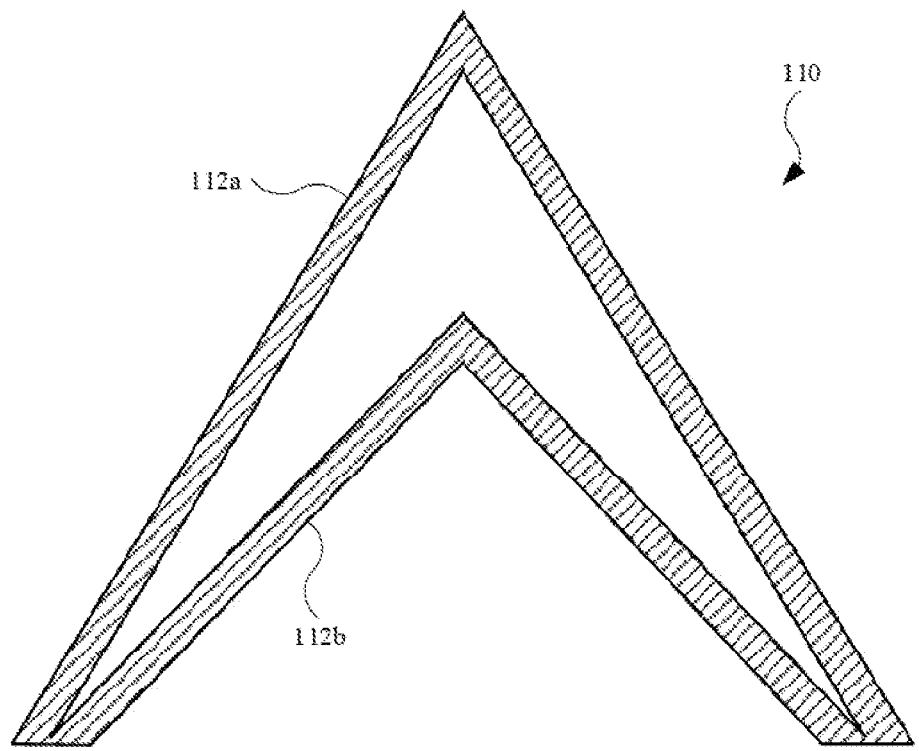
FIG. 2B illustrates a cross sectional view of the energy distribution structure shown in FIG. 2A, taken along line 2B-2B.

FIG. 2B illustrates a cross sectional view of the energy distribution structure 110 shown in FIG. 2A, taken along line 2B-2B. Similar to a prior embodiment, the component 112a and the component 112b each can include a triangular cross section. Further, the component 112a and the component 112b can combine to define the base of the energy distribution structure 110.

Figure 2C:
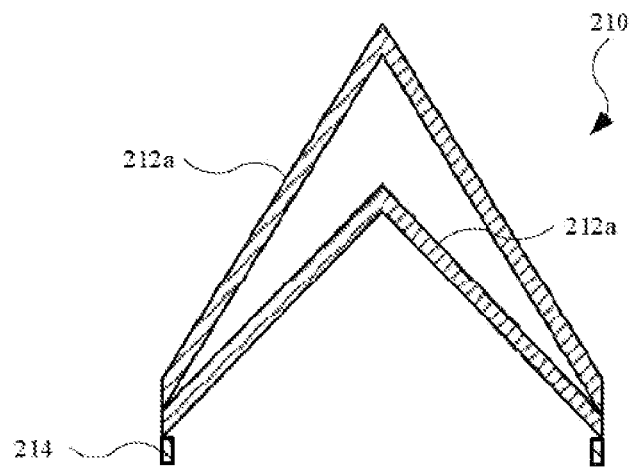
FIG. 2C illustrates a cross sectional view of an alternate embodiment of an energy distribution structure, showing the components sharing an edge, in accordance with some described embodiments.

FIG. 2C illustrates a cross sectional view of an alternate embodiment of an energy distribution structure 210, showing the components sharing an edge, in accordance with some described embodiments. As shown, the energy distribution structure 210 can include a component 212a and a component 212b, both of which can be coupled to a base component 214. Also, the component 212a and the component 212b at the base component 214, can intersect along the same (vertical) plane defined by a vertical surface of the base component 214.

Figure 2D:
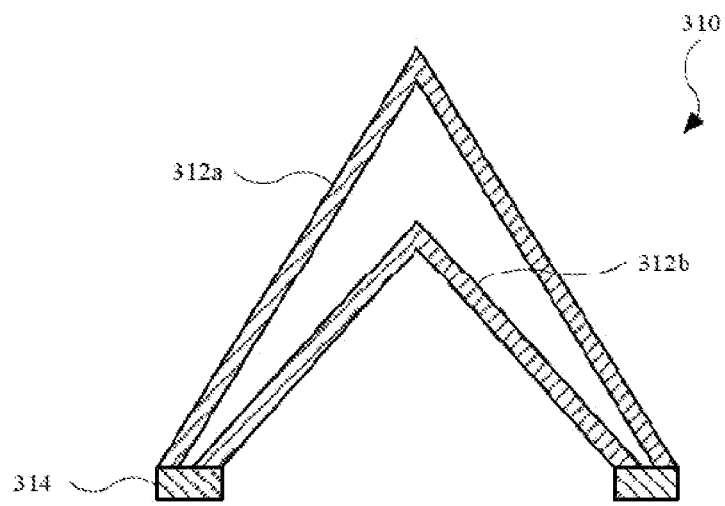
FIG. 2D illustrates a cross sectional view of an alternate embodiment of an energy distribution structure, showing the components of the energy distribution structure separated from each other and joined by a base component, in accordance with some described embodiments.

FIG. 2D illustrates a cross sectional view of an alternate embodiment of an energy distribution structure 310, showing the components of the energy distribution structure 310 separated from each other and joined by a base component 314, in accordance with some described embodiments. As shown, the energy distribution structure 310 can include a component 312a and a component 312b. However, the component 312a and the component 312b can be separated, i.e., not in contact with each other, but can be coupled to the base component 314.

Figure 2E:
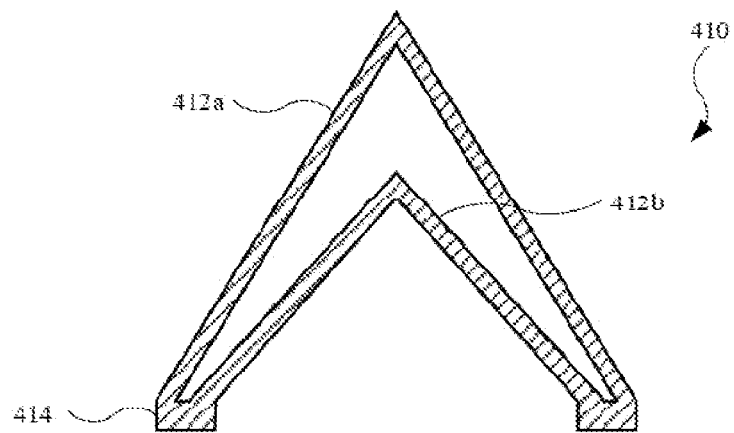
FIG. 2E illustrates a cross sectional view of an alternate embodiment of an energy distribution structure, showing components of the energy distribution structure integrally formed with the base component, in accordance with some described embodiments.

FIG. 2E illustrates a cross sectional view of an alternate embodiment of an energy distribution structure 410, showing components of the energy distribution structure 410 integrally formed with the base component 414, in accordance with some described embodiments. The base component 414 may be integrally formed the component 412a and/or the component 412b. The phrase "integrally formed" may refer to two or more components formed during a manufacturing process using the same material(s). In other words, the energy distribution structure 410 can include a single, unitary, monolithic structure defined by the component 412a, the component 412b, and the base component 414.

Figure 3:
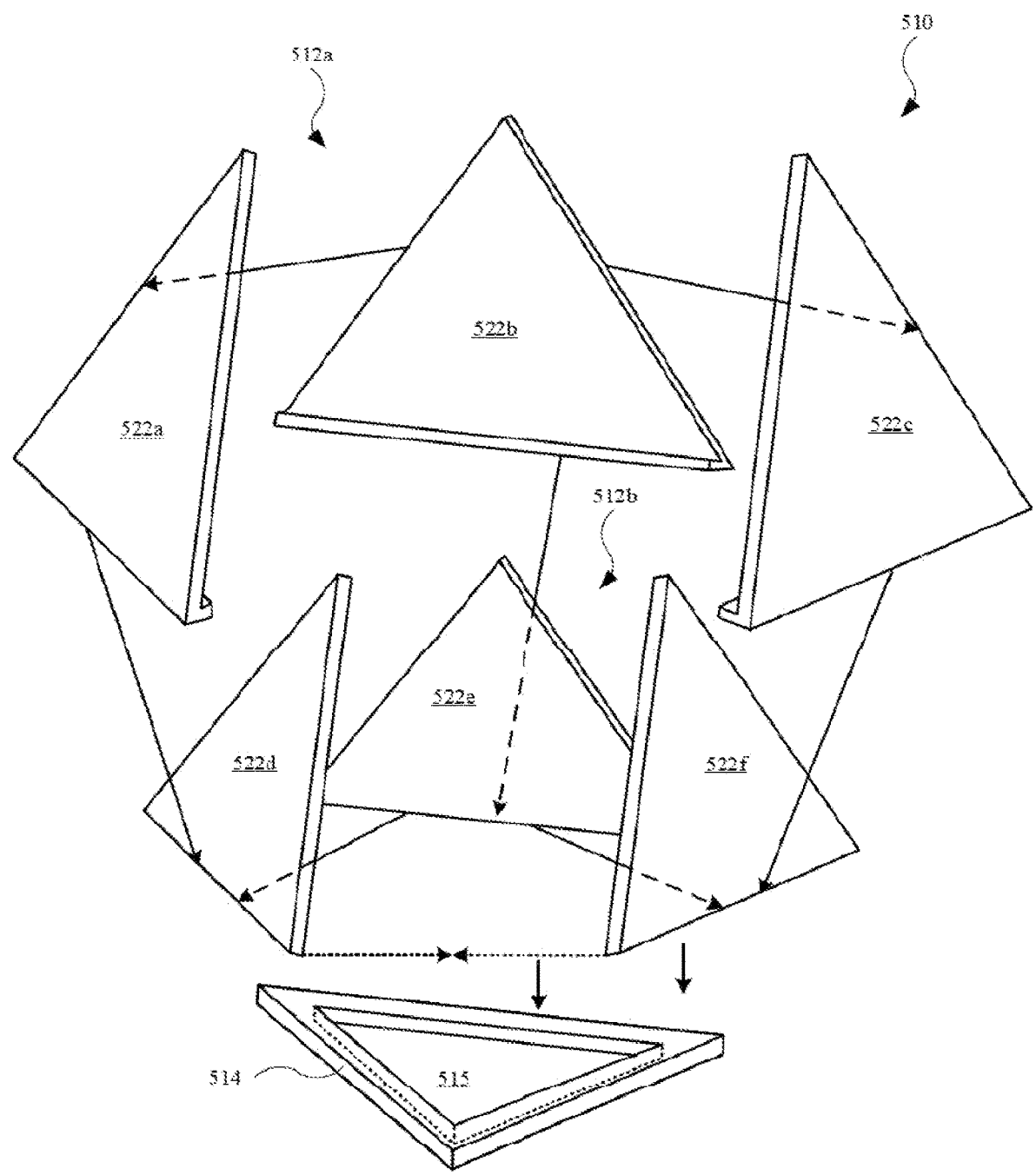
FIG. 3 illustrates an exploded view of an energy distribution structure, showing individual structures of the energy distribution structure, in accordance with some described embodiments.

FIG. 3 illustrates an exploded view of an energy distribution structure 510, showing individual structures of the energy distribution structure 510, in accordance with some described embodiments. As shown, the energy distribution structure 510 can include a component 512a (or outer component) and a component 512b (or inner component). The component 512a may include a wall 522a, a wall 522b, and a wall 522c, and the component 512b may include a wall 522d, a wall 522e, and a wall 522f. The aforementioned walls may include the same size and shape. However, the walls may include different shapes so long as the wall 522a, the wall 522b, and the wall 522c can be coupled to each other along their respective edges, and the wall 522d, the wall 522e, and the wall 522f are coupled to each other along their respective edges. Further, the walls may include equilateral, isosceles, or scalene triangles.

The energy distribution structure 510 can further include a base component 514. As shown, the base component 514 may include a triangular shape that generally corresponds to the size and shape of the lower regions of the component 512a the component 512b when the respective walls of the component 512a the component 512b are coupled together. Also, the base component 514 may include a continuous outer perimeter with an opening 515 that includes a size and shape that generally corresponds to the size and shape of the lower region of the component 512b when the wall 522d, the wall 522e, and the wall 522f are coupled together. Also, it should be noted that while the triangular walls are shown as separate, this is for illustrative purposes and the triangular walls may be integrally formed together such that the component 512a and the component 512b may each include a monolithic structure. Further, the component 512a may be integrally formed with the component 512b to define a monolithic structure.

Figure 4:
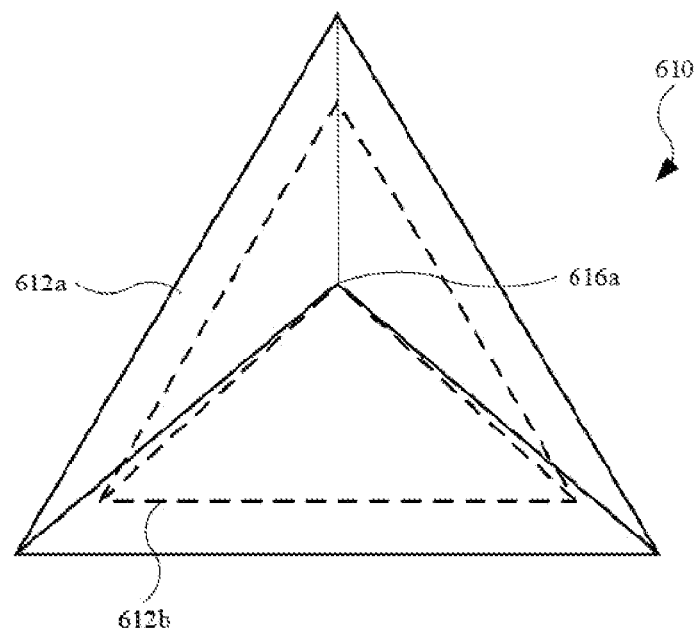
FIG. 4 illustrates an aerial view of an energy distribution structure, showing an exterior surface of the energy distribution structure, in accordance with some described embodiments.

FIG. 4 illustrates an aerial view (or top view) of an energy distribution structure 610, showing an exterior surface of the energy distribution structure 610, in accordance with some described embodiments. As shown, the energy distribution structure 610 can include a component 612a and a component 612b covered by the component 612a. The walls of the component 612a can generally define an exterior of the energy distribution structure 610 and can be joined at a tip 616a.

Figure 5:
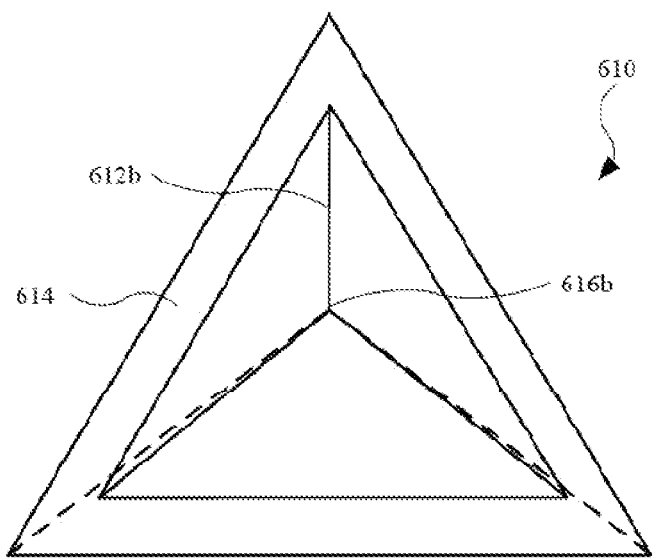
FIG. 5 illustrates a bottom view of the energy distribution structure shown in FIG. 4, showing an interior surface of the energy distribution structure.

FIG. 5 illustrates a bottom view of the energy distribution structure 610 shown in FIG. 4, showing an interior surface of the energy distribution structure 610. As shown, the walls of the component 612b can generally define an interior of the energy distribution structure 610 and can be joined at a tip 616b.

FIGS. 6A-6E illustrate an energy distribution structure 710 distributing an applied energy or force, in accordance with some described embodiments. An applied force 724 (represented by an arrow) may originate in a variety of ways. Such non-limiting examples of an applied energy or force include internal or external energy or force, such as ballistic and non-ballistic objects, pressure changes, shockwaves, or some other energy or object(s) that engage the energy distribution structure 710. Also, the applied energy 724 to the energy distribution structure 710 can cause the components of the energy distribution structure 710 to "fail," which may include a breakdown (and in some cases, rupture) of the components. As a result, the applied energy 724 causes movement of the component, and can be characterized by multiple zones, such as a zone 27a, a zone 27b, and a zone 27c, which will be described below.

Figure 6A:
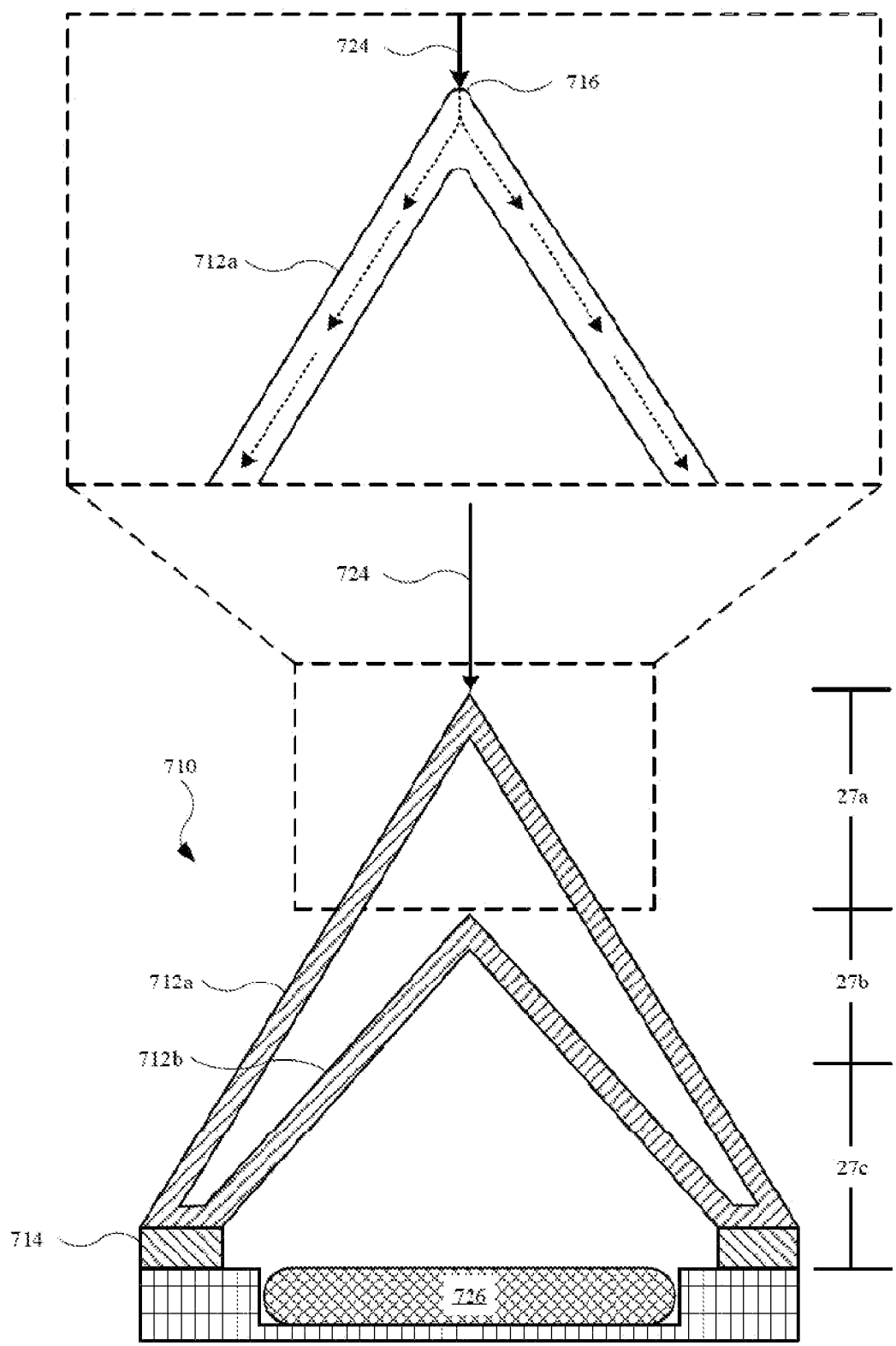
FIGS. 6A-6E illustrates an energy distribution structure distributing an applied force, in accordance with some described embodiments.

FIG. 6A illustrates a cross sectional view of the energy distribution structure 710 receiving an applied force 724. As shown, the energy distribution structure 710 includes a component 712a and a component 712b, both of which are coupled to a base component 714. The energy distribution structure 710 can be designed and positioned to protect an object 726.

As shown in the enlarged view, the applied force 724 is incident on the component 712a. Although the applied force 724 is generally directed to a tip 716a of the component 712a, the applied force 724 may occur at or along any portion or surface of the component 712a. The dotted arrows within the component 712a represent energy provided by the applied force 724 that is absorbed by the component 712a. The absorbed energy can follow a path defined by the structure of the component 712a. Further, based upon the structure of the component 712a, the absorbed energy can be redirected through the component 712a along a trajectory that is different than the trajectory of the applied force 724 initially incident on the component 712a. In this regard, when the component 712a includes a tetrahedron shape, the absorbed energy can flow through the triangular walls of the component 712a and to the base component 714. The changed/altered trajectory of the applied force 724 may nonetheless occur even when the applied force 724 is incident at a location of the component 712a other than the tip 716a. Based on the location of the object 726 to be protected by the energy distribution structure 710, the energy absorbed by the component 712a can be redirected along a trajectory that is away from the object 726, such that the absorbed energy may not be incident on the object 726.

Subsequent to the applied force 724 being exerted on the component 712a, the component 712a can remain in the zone 27a. However, the applied force 724 can overcome the structural integrity of the component 712a, causing the component to move or at least partially collapse.

Figure 6B:
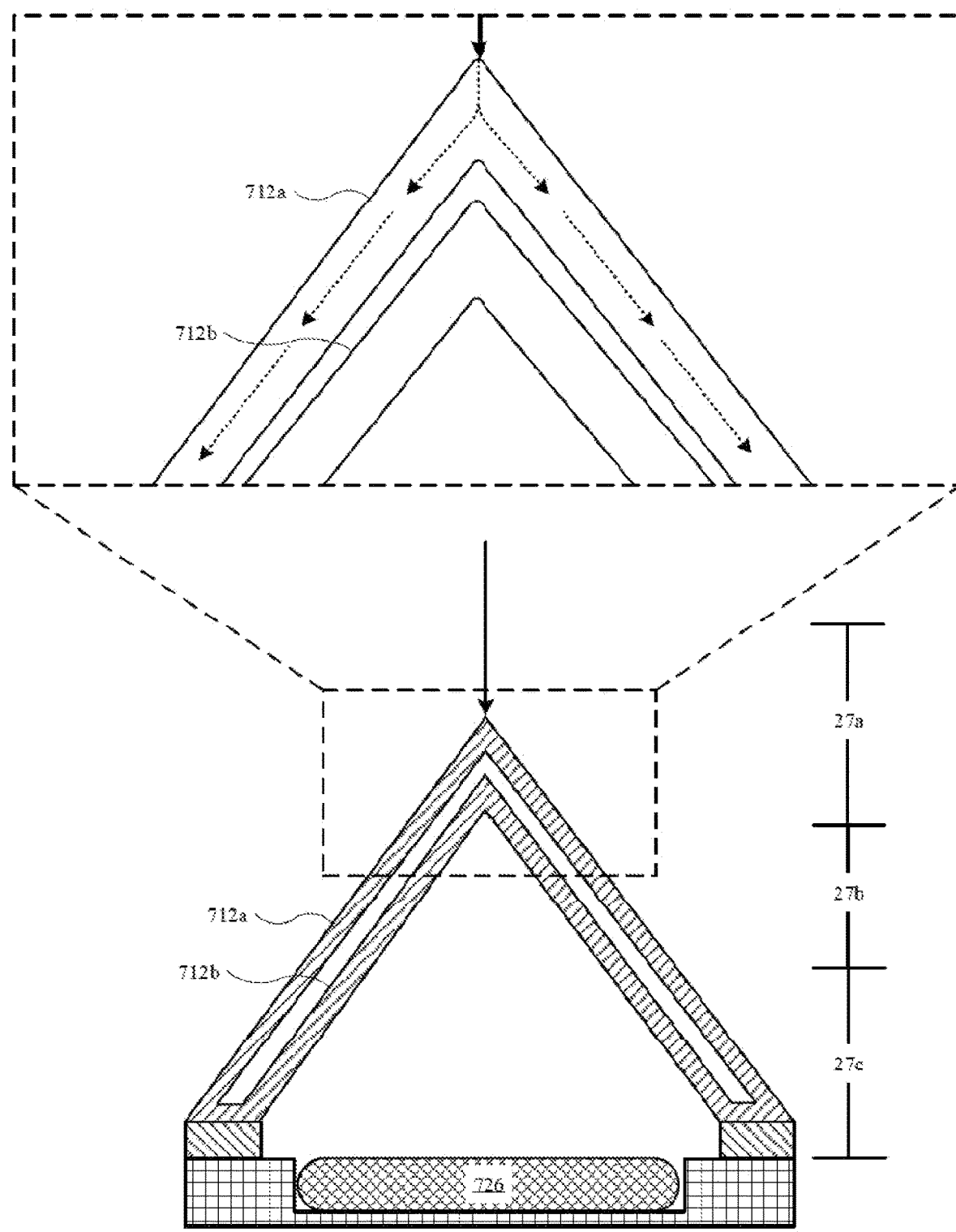

FIG. 6B illustrates a cross sectional view of the energy distribution structure 710 shown in FIG. 6A, showing the component 712a continuing to receive and redirect the absorbed energy received by the applied force 724. As shown, the component 712a can begin to collapse or break down and move toward the component 712b, but remains in the zone 27a (along with the component 712b). For reference, the uppermost region of the zone 27a represents the original height of the energy distribution structure 710, which is defined in part by the component 712a. Also, as shown in the enlarged view, the component 712a continues to redirect the absorbed energy away from the object 726.

Figure 6C:
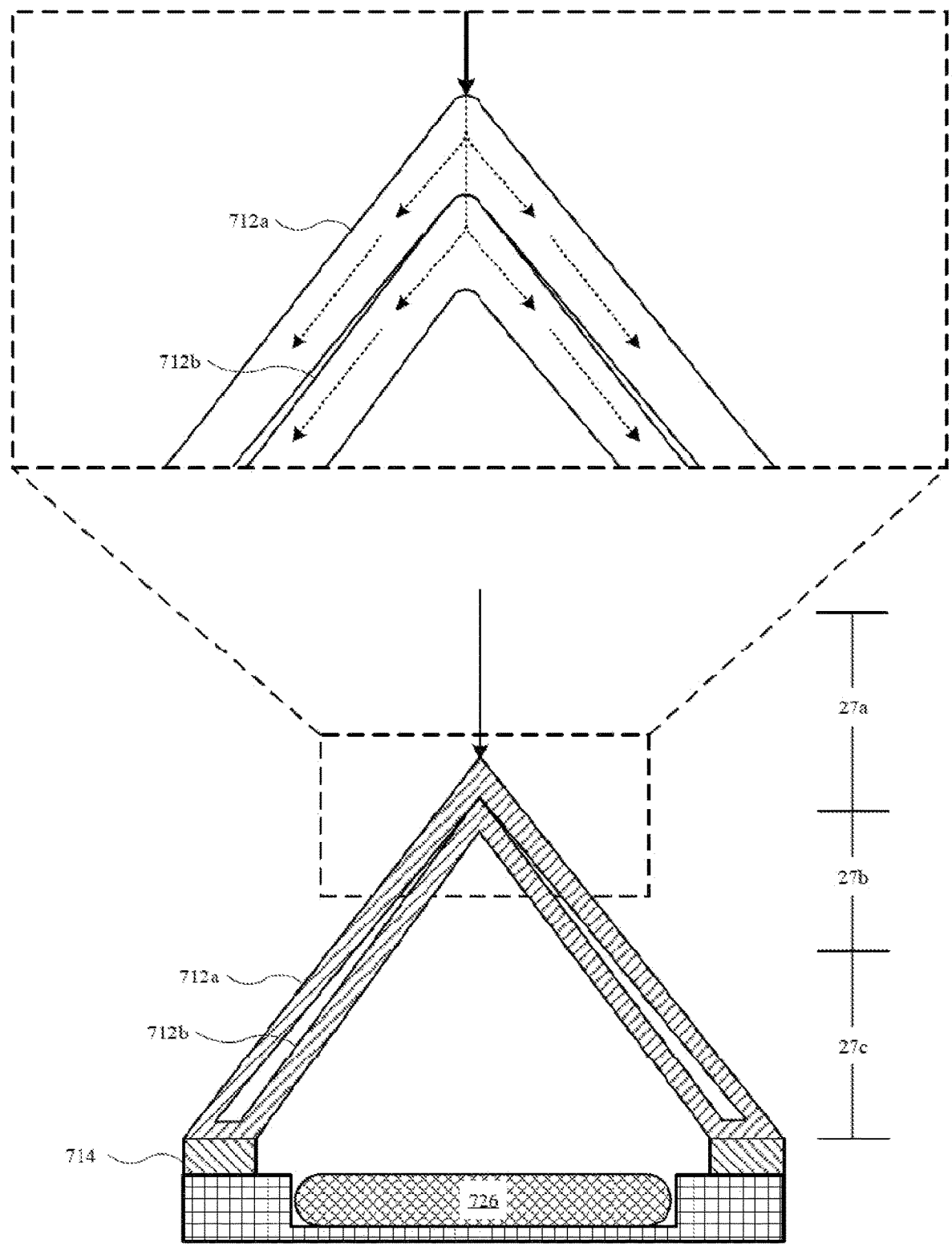

FIG. 6C illustrates a cross sectional view of the energy distribution structure 710 shown in FIG. 6B, showing the component 712a can continue to receive and redirect the absorbed energy received by the applied force 724. As shown, the component 712a can further collapse or break down and engage the component 712b, but both the component 712a and the component 712b remain in the zone 27a. The component 712b begins to absorb residual energy, or energy initially absorbed by the component 712a and transferred to the component 712b. For example, as shown in the enlarged view, the dotted arrows represent energy within the component 712b represent absorbed (residual) energy by the component 712b. The component 712b can also redirect the absorbed energy toward the base component 714. In this manner, both the component 712a and the component 712b redirect the absorbed energy away from the object 726.

Figure 6D:
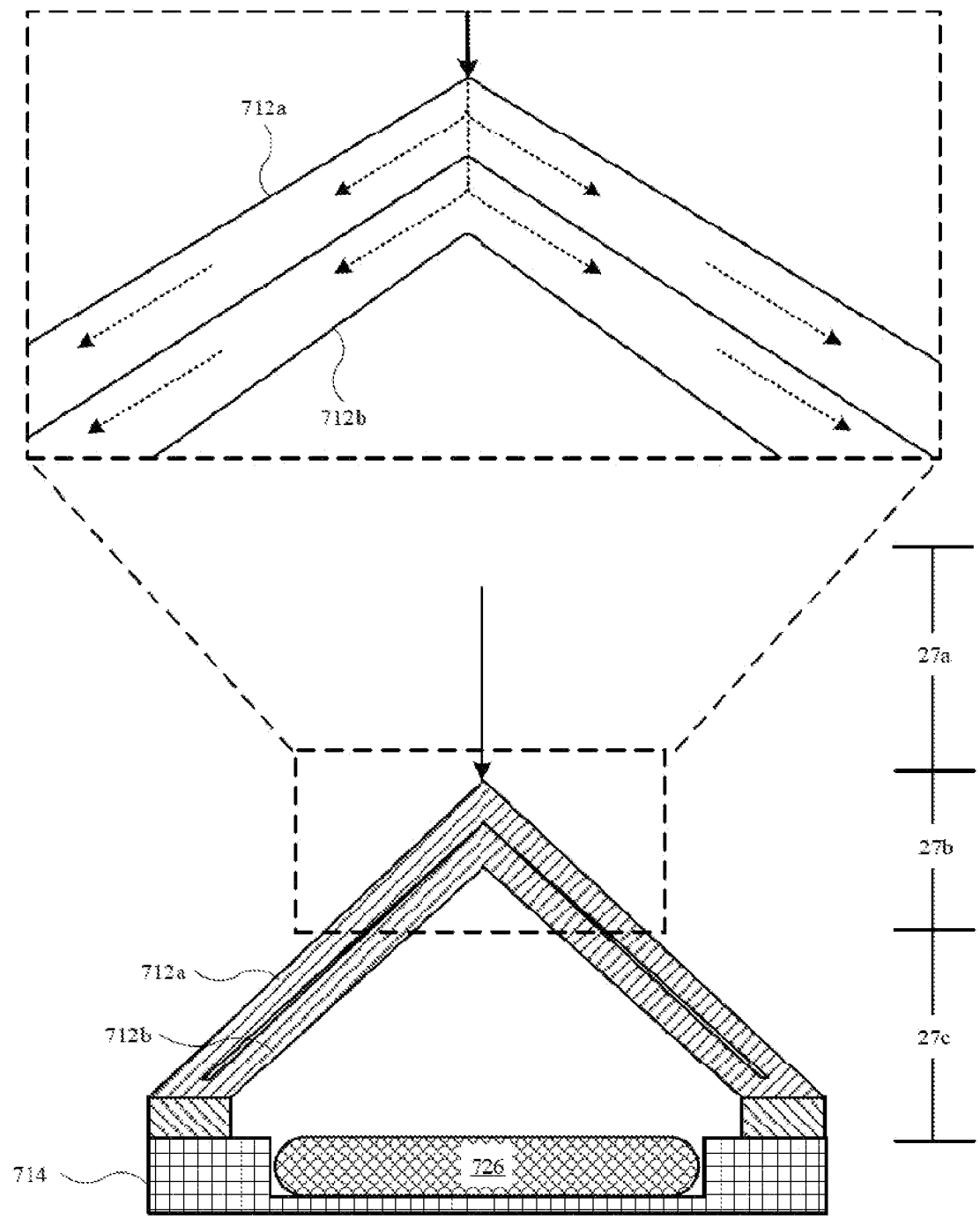

FIG. 6D illustrates a cross sectional view of the energy distribution structure 710 shown in FIG. 6C, showing the component 712a and the component 712b can continue to receive and redirect the absorbed energy received by the applied force 724. As shown, the component 712b can begin to breakdown together with the component 712a, and both the component 712a and the component 712b can transition to the zone 27b, which is beyond the zone 27a. As shown in the enlarged view, absorbed energy can continue to pass through the component 712a and the component 712b, with both components continuing to redirect the absorbed energy toward the base component 714. In this manner, both the component 712a and the component 712b continue to redirect the absorbed energy away from the object 726.

Figure 6E:
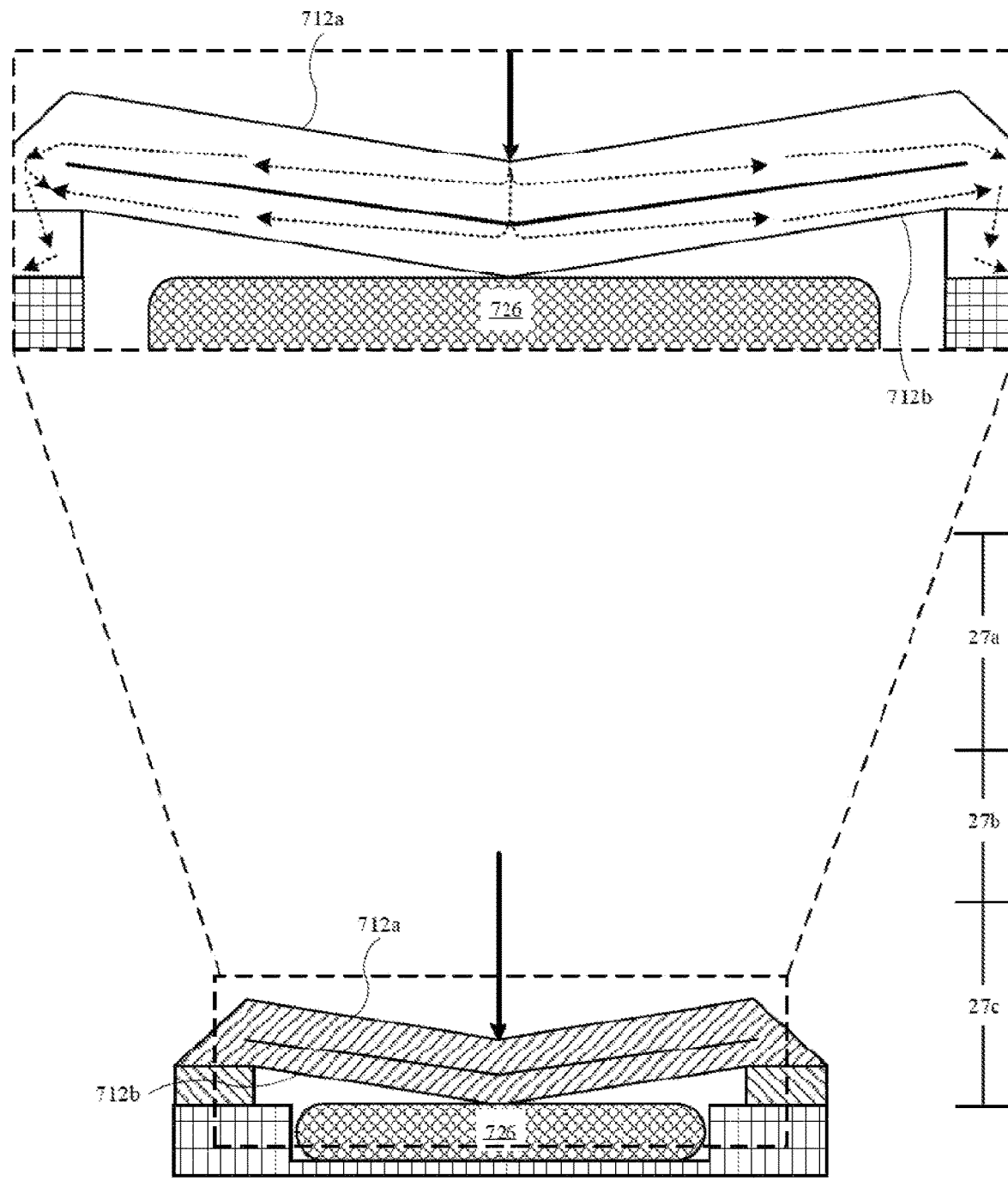

FIG. 6E illustrates a cross sectional view of the energy distribution structure 710 shown in FIG. 6D, showing the component 712a and the component 712b can further receive and redirect the absorbed energy received by the applied force 724. As shown, the component 712b can substantially collapse, and both the component 712a and the component 712b can transition to the zone 27c, which is beyond the zone 27b. As shown in the enlarged view, absorbed energy can continue to pass through the component 712a and the component 712b, with both components continuing to redirect the absorbed energy toward the base component 714. In this manner, both the component 712a and the component 712b can further redirect the absorbed energy away from the object 726. Furthermore, the absorbed energy in the component 712a may offset or cancel absorbed energy in the component 712b, as indicated by the arrows touching each other.

Based upon the design configuration, the energy distribution structure 710 can mitigate, or substantially mitigate, the effects of the applied force 724. As a result, the energy distribution structure 710 can shield the object 726 from the applied force 724 that could otherwise damage the object 726.

Figure 7A:
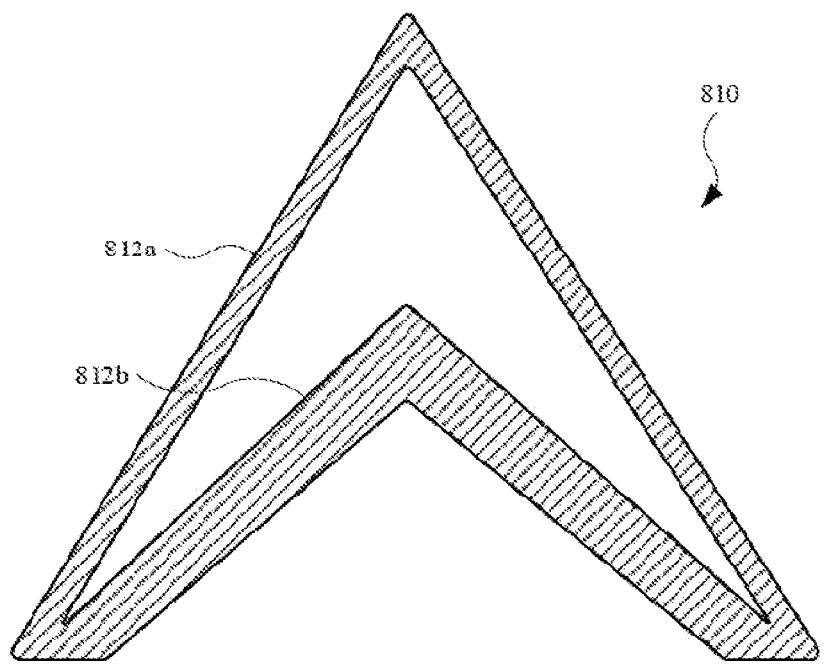
FIGS. 7A-7D illustrate cross sectional views of embodiments of energy distribution structures with non-uniform walls, in accordance with some described embodiments.
Figure 7B:
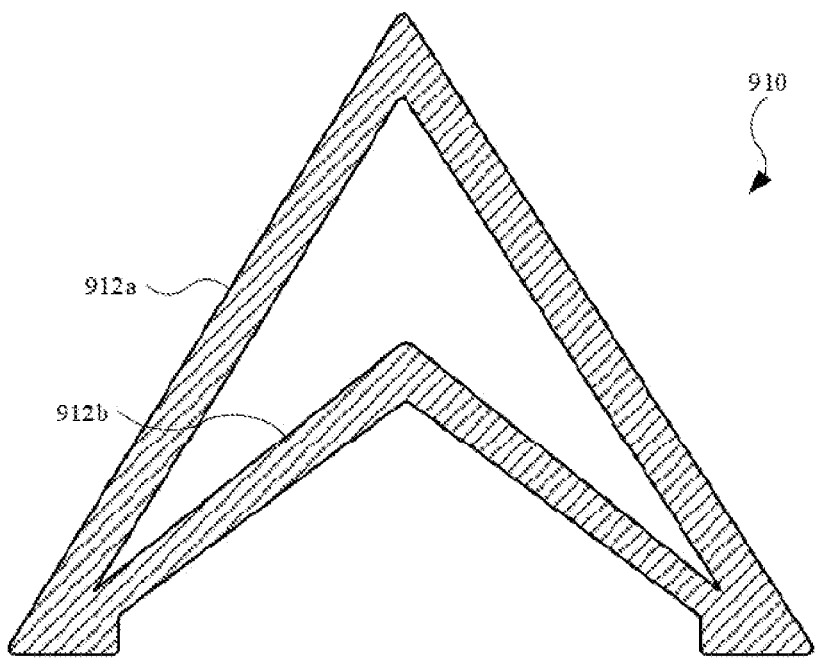
Figure 7C:
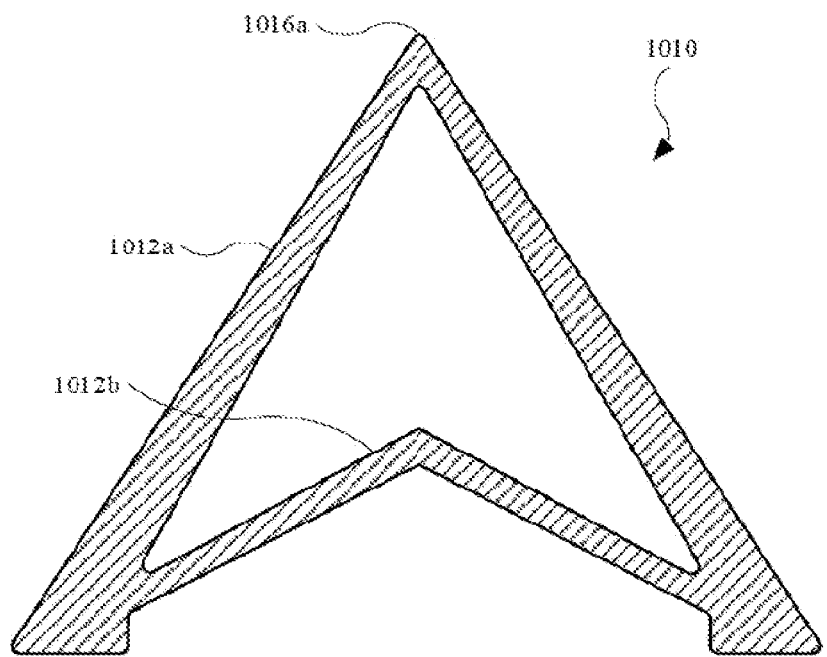
Figure 7D:
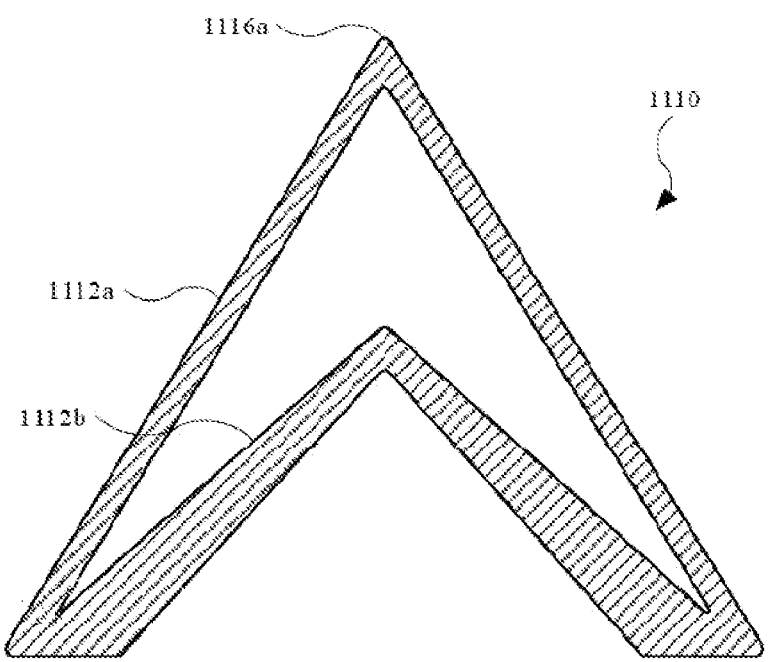

FIGS. 7A-7D illustrate cross sectional views of embodiments of energy distribution structures with non-uniform walls, in accordance with some described embodiments. The energy distribution structures shown and described in FIGS. 7A-7D may include at least some similar three-dimensional features such as those described for other energy distribution structures described herein. FIG. 7A illustrates a cross sectional view of an embodiment of an energy distribution structure 810 with a component 812a (or outer component) and a component 812b (or inner component). As shown, the component 812a can include a thickness, or width, that is less than the thickness, or width, of the component 812b. Conversely, FIG. 7D illustrates a cross sectional view of an energy distribution structure 910 with a component 912a (or outer component) and a component 912b (or inner component), further showing the component 812a having a thickness, or width, that is greater than the thickness, or width, of the component 912b.

FIG. 7C illustrates a cross sectional view of an energy distribution structure 1010 with a component 1012a (or outer component) and a component 1012b (or inner component), showing the component 1012a as having a tapered thickness, or width, whereas the thickness, or width, of the component 1012b can be generally uniform. FIG. 7D illustrates a cross sectional view of an energy distribution structure 1110 with a component 1112a (or outer component) and a component 1112b (or inner component), showing the component 1112b as having a tapered thickness, or width, whereas the thickness, or width, of the component 1112a can be generally uniform. The tapering shown in FIGS. 7C and 7D shows an increasing width from the tip 1016a and the tip 1116a, respectively, to respective base regions of the energy distribution structure 1010 and the energy distribution structure 1110. However, in some embodiments, the width increases from the respective base regions of the energy distribution structure 1010 and the energy distribution structure 1110 to the tip 1016a and the tip 1116a, respectively.

Figure 8A:
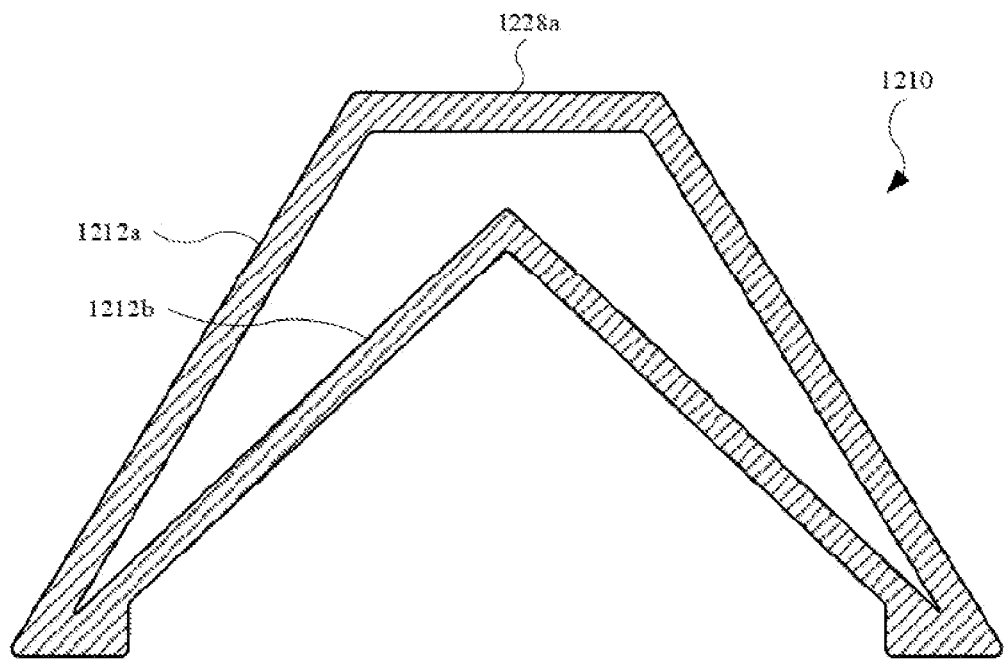
FIGS. 8A-8B illustrate cross sectional views of embodiments of energy distribution structures with truncated components, in accordance with some described embodiments.
Figure 8B:
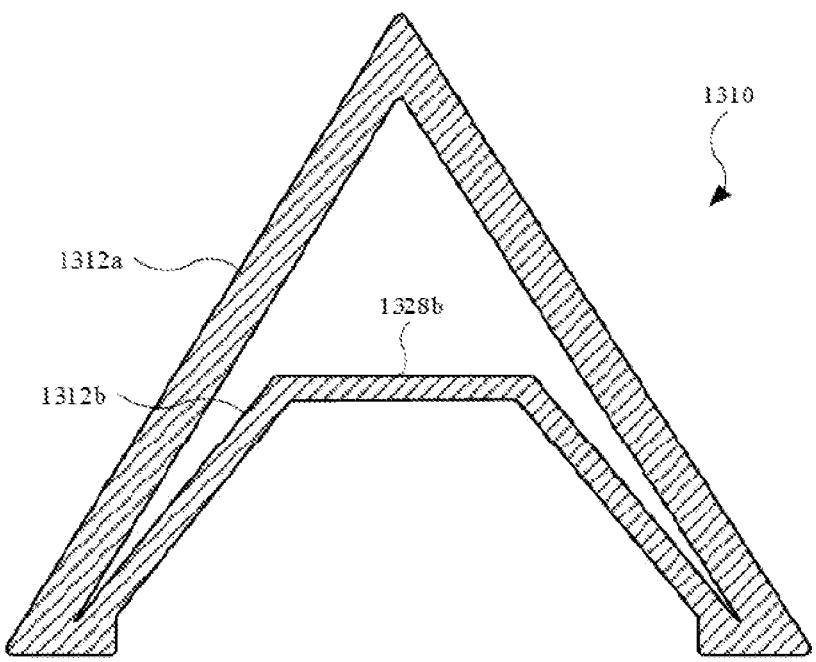

FIGS. 8A-8B illustrate cross sectional views of embodiments of energy distribution structures with truncated components, in accordance with some described embodiments. The energy distribution structures shown and described in FIGS. 8A-8B may include one or more similar three-dimensional features from the other energy distribution structures described herein. FIG. 8A illustrates a cross sectional view of an embodiment of an energy distribution structure 1210 with a component 1212a (or outer component) and a component 1212b (or inner component). As shown, the component 1212a can include a truncated region 1228a, whereas the component 1212a can maintain a tetrahedron shape. Conversely, FIG. 8B illustrates a cross sectional view of an energy distribution structure 1310 with a component 1312a (or outer component) and a component 1212b (or inner component), with the component 1312a having a truncated region 1328b, whereas the component 1312a can maintain a tetrahedron shape.

Figure 9A:
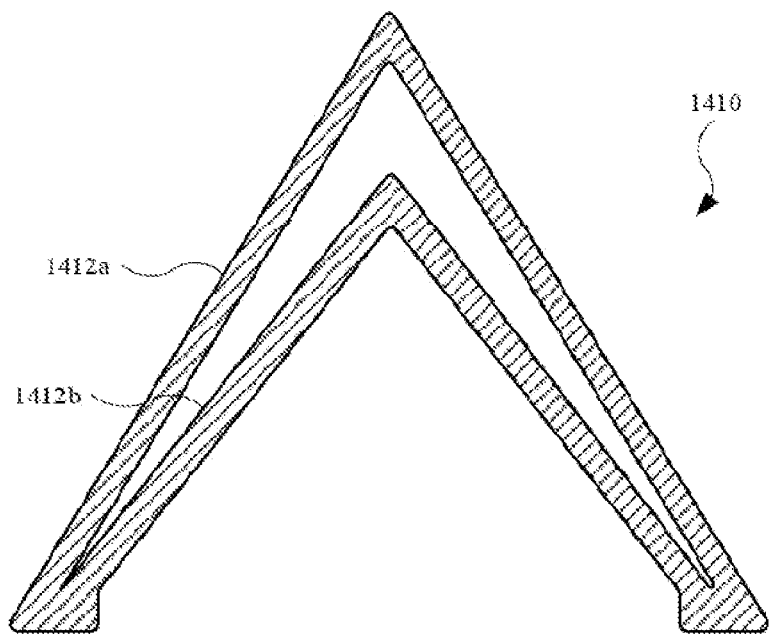
FIGS. 9A-9B illustrate cross sectional views of embodiments of energy distribution structures with components positioned at various angles, in accordance with some described embodiments.
Figure 9B:
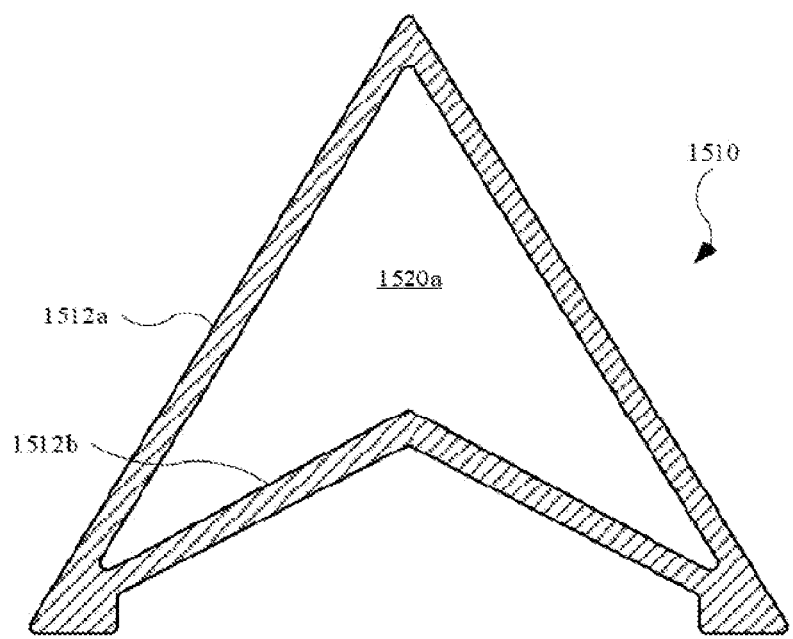

FIGS. 9A-9B illustrate cross sectional views of embodiments of energy distribution structures with components positioned at various angles, in accordance with some described embodiments. The energy distribution structures shown and described in FIGS. 9A-9B may include one or more similar three-dimensional features from the other energy distribution structures described herein. FIGS. 9A-9B show that the distance or separation between components of an energy distribution structure can be selected to, for example, provide one or more materials within the region or space between the components. For example, this can facilitate engagement by the component 1412a, in response an applied force (not depicted in FIG. 9A), more quickly during collapse or breakdown. Conversely, FIG. 9B illustrates a cross sectional view of an energy distribution structure 1510 with a component 1512a (or outer component) and a component 1512b (or inner component). As shown, there is a greater distance between the components 1512a, 1512b compared to other embodiments. This configuration can enable enlargement of a region 1520a (between the component 1512a and the component 1512b) to, for example, at least partially fill the region 1520a with objects and/or fluids.

Figure 10A:
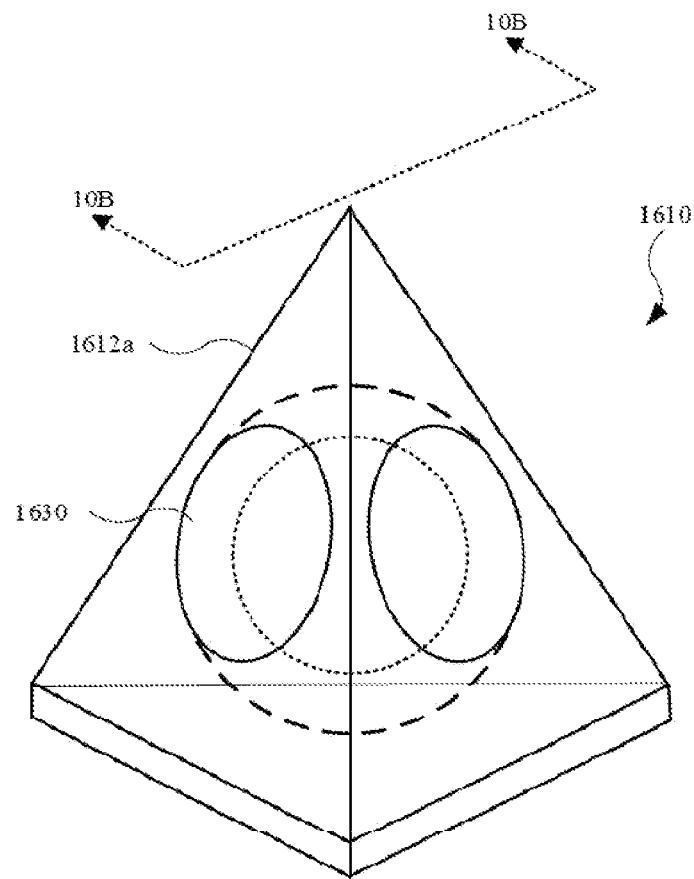
FIG. 10A illustrates an isometric view of an embodiment of an energy distribution structure, showing an object positioned in the energy distribution structure and protruding from the walls of the energy distribution structure, in accordance with some described embodiments.
Figure 10B:
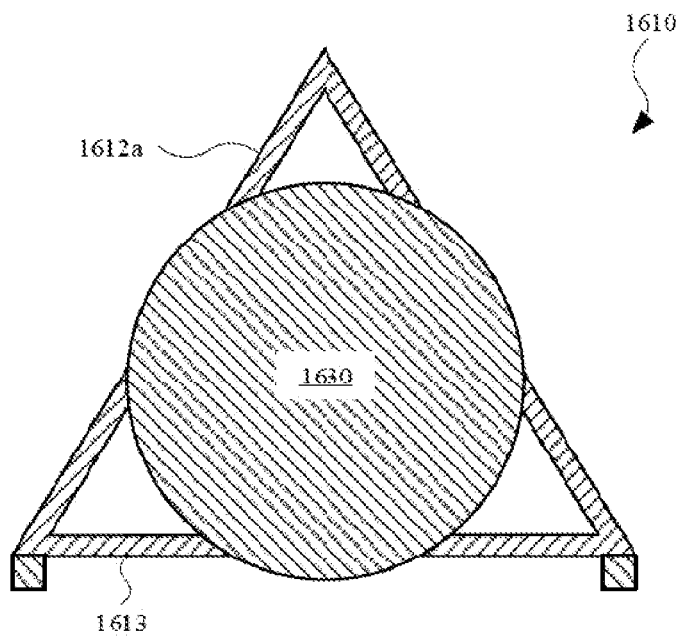
FIG. 10B illustrates a cross sectional view of the an energy distribution structure shown in FIG. 10A, further showing the object protruding out of the energy distribution structure.

FIG. 10A illustrates an isometric view of an embodiment of an energy distribution structure 1610, showing an object 1630 positioned in the energy distribution structure 1610 and protruding through the walls of the energy distribution structure 1610, in accordance with some described embodiments. As shown, the object 1630 can be a spherical element. However, other shapes, including an oblong element, another tetrahedron, a cube (as non-limiting examples) can be employed. The energy distribution structure 1610 can include a component 1612a, representing a housing or outer component. In the example, shown in FIG. 10A, the object 1630 can represent an "inner component." Further, while the object 1630 is substantially contained within the component 1612a, at least some portions of it can protrude, and extend beyond, the walls of the component 1612a. Based on the material and relative position of the object 1630, the energy distribution structure 1610 can be configured to provide a faster response time for energy absorption, as the object 1630 can be in direct contact with the component 1612a. FIG. 10B illustrates a cross sectional view of the an energy distribution structure 1610 shown in FIG. 10A, further showing the object 1630 protruding out of the energy distribution structure 1610, and in particular, the component 1612a. As shown in FIG. 10B, the component 1612a includes a bottom wall 1613.

Figure 10C:
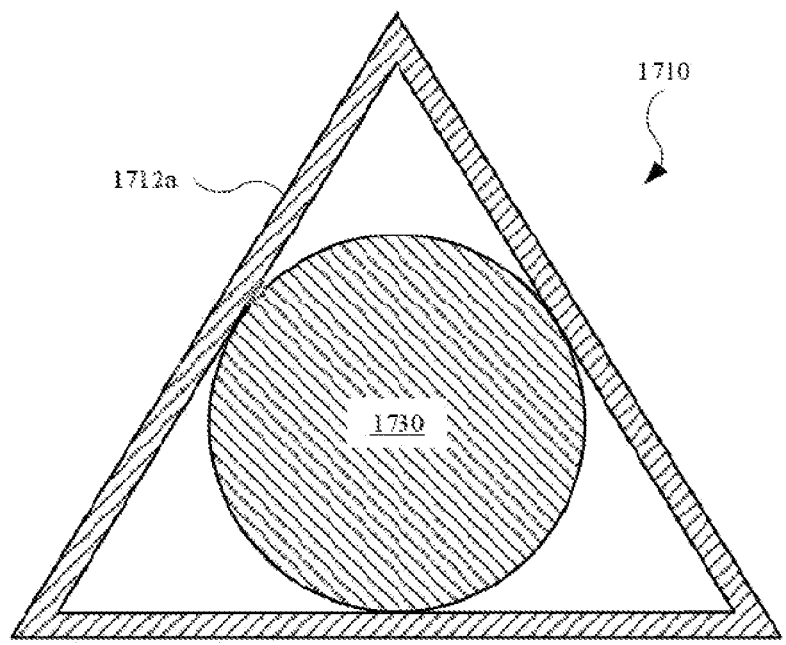
FIG. 10C illustrates a cross sectional view of an alternate embodiment of an energy distribution structure, showing an object positioned within the energy distribution structure, in accordance with some described embodiments.

FIG. 10C illustrates a cross sectional view of an alternate embodiment of an energy distribution structure 1710, showing an object 1730 positioned within the energy distribution structure 1710, in accordance with some described embodiments. As shown, the object 1730 is fully contained within a component 1712a of the energy distribution structure 1710. Although not shown, the object 1730 may be free of contact with the walls (diagonal walls) of the component 1712a.

Figure 10D:
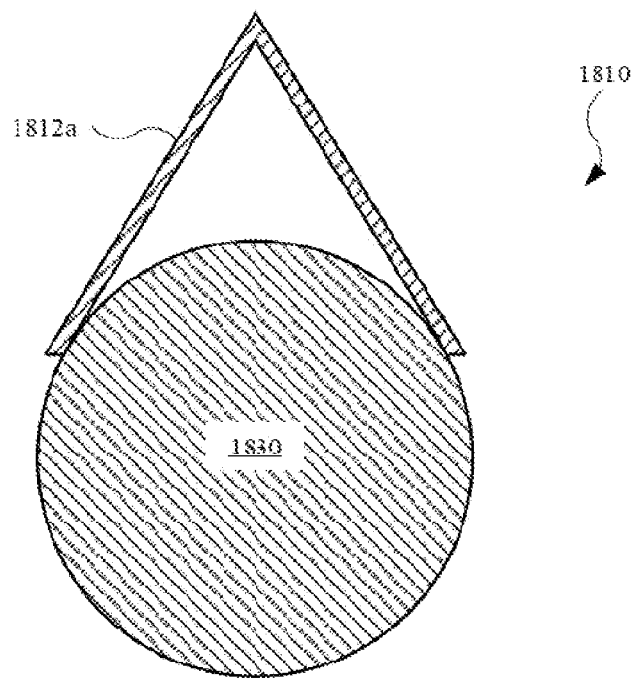
FIG. 10D illustrates a cross sectional view of an alternate embodiment of an energy distribution structure, showing an object that forms a base component of the energy distribution structure, in accordance with some described embodiments.

FIG. 10D illustrates a cross sectional view of an alternate embodiment of an energy distribution structure 1810, showing an object 1830 that forms a base component of the energy distribution structure 1830, in accordance with some described embodiments. When the object 1830 includes a spherical element, the object 1830 provides an energy distribution structure 1810 with a convex surface. In this regard, the energy distribution structure 1810 may be positioned in a structure (not shown in FIG. 10D) that includes a (corresponding) concave surface.

Figure 11A:
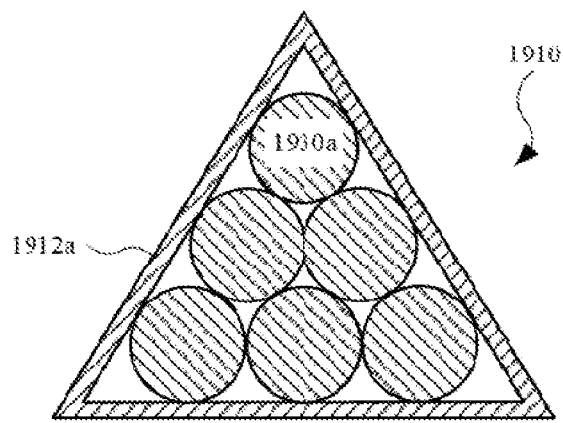
FIGS. 11A-11C illustrate cross sectional views of embodiments of energy distribution structures, showing multiple object positioned within their respective energy distribution structures, in accordance with some described embodiments.
Figure 11B:
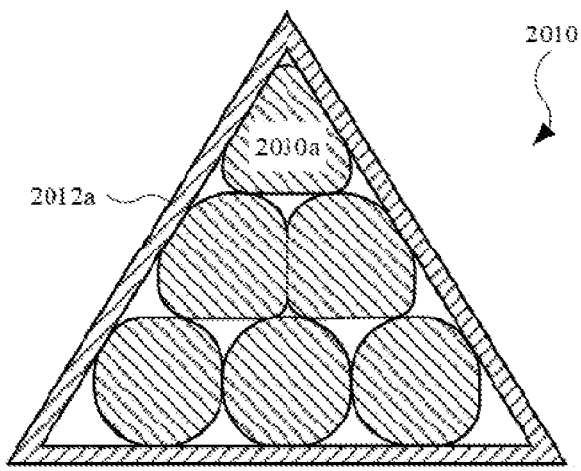
Figure 11C:
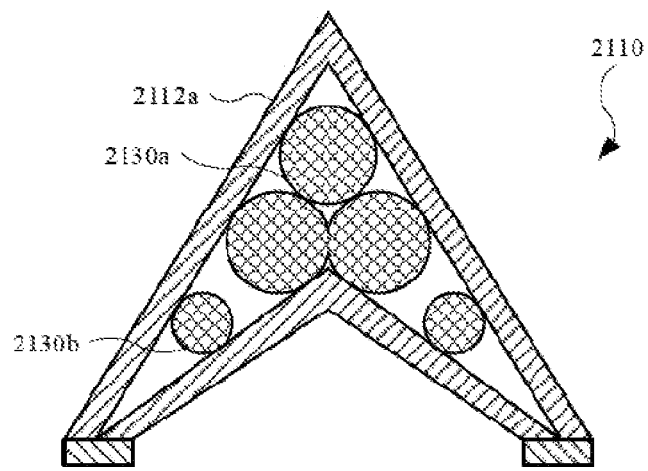

FIGS. 11A-11C illustrate cross sectional views of embodiments of energy distribution structures, showing multiple object positioned within their respective energy distribution structures, in accordance with some described embodiments. The energy distribution structures shown and described in FIGS. 11A-11C may include at least some similar three-dimension features as at least some other energy distribution structures described herein. Also, each energy distribution structure in FIGS. 11A-11C form an internal volume to hold their respective objects. FIG. 11A illustrates a cross sectional view of an embodiment of an energy distribution structure 1910, showing multiple objects positioned within a component 1912a of the energy distribution structure 1910, in accordance with some described embodiments. As shown, an object 1930a, representative of the remaining objects, may include a spherical element, as a non-limiting example. Also, adjacent objects are engage with each other and the component 1912a. This arrangement may provide a more robust counterforce to an applied force (not depicted in FIG. 11A).

FIG. 11B illustrates a cross sectional view of an embodiment of an energy distribution structure 2010, showing multiple objects positioned within a component 2012a of the energy distribution structure 2010, in accordance with some described embodiments. As shown, an object 2030a, representative of the remaining objects, may include a compliant material that conforms to the component 2012a. Also, adjacent objects are engage with each other and the component 2012a. This arrangement may provide a more energy absorption from an applied force (not depicted in FIG. 11B).

FIG. 11C illustrates a cross sectional view of an embodiment of an energy distribution structure 2110, showing multiple objects positioned within a component 2112a of the energy distribution structure 2110, in accordance with some described embodiments. As shown, the energy distribution structure 1210 includes an object 2130a and an object 2130b. While the object 2130a and the object 2130b may generally include the same shape, the size may vary. For example, the diameter of the object 2130a is greater than that of the object 2130b. This arrangement may provide for additional objects, due to the varying size of the objects.

Figure 12:
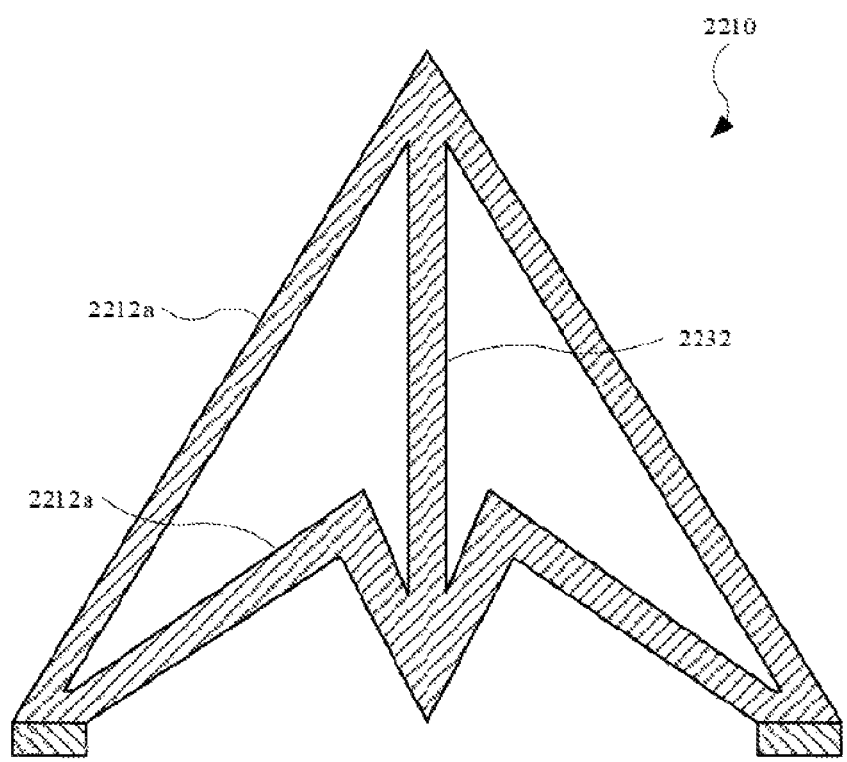
FIG. 12 illustrates a cross sectional view of an embodiment of an energy distribution structure, showing a column support connected to the components of the energy distribution structure, in accordance with some described embodiments.
Figure 13A:
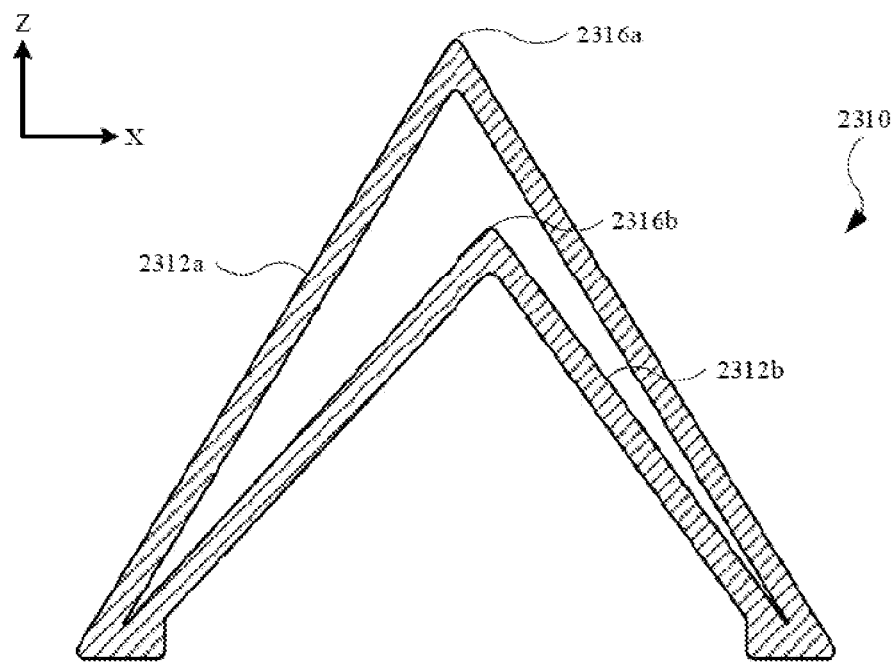
FIGS. 13A-13B illustrate cross sectional views of embodiments of energy distribution structures, showing one of the components of the energy distribution structures with an offset position, in accordance with some described embodiments.
Figure 13B:
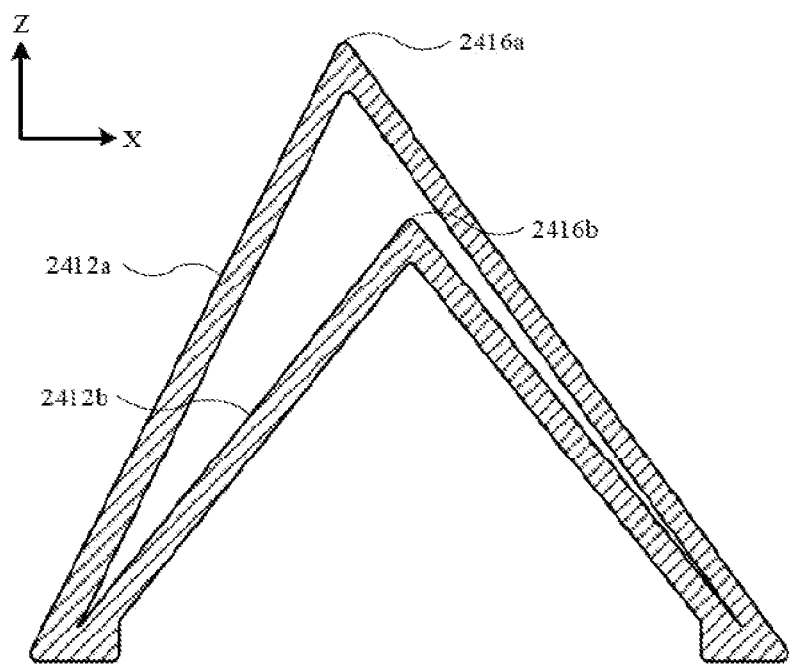

FIG. 12 illustrates a cross sectional view of an embodiment of an energy distribution structure 2210, showing a column support 2232 connected to the components of the energy distribution structure 2210, in accordance with some described embodiments. As shown, the energy distribution structure 2210 includes a component 2212a and a component 2212b, both of which are connected to the column support 2232. Based on its positioned in the energy distribution structure 2210, the column support 2232 can receive an applied force (not depicted in FIG. 12) transferred from the component 2212a and direct the applied force to the component 2212b, where the FIGS. 13A-13B illustrate cross sectional views of embodiments of energy distribution structures, showing one of the components of the energy distribution structures with an offset position, in accordance with some described embodiments. FIG. 13A illustrates a cross sectional view of an energy distribution structure 2310 having a component 2312a and a component 2312b that is offset with respect to the component 2312a. As shown, a tip 2316a of the component 2312a is not aligned with a tip 2316b of the component 2312b. Also, the component 2312a may include walls (such as triangular walls) that are generally similar in size and shape, while the component 2312b may include walls (such as triangular walls) in which at least some of the walls are not equal in shape. Conversely, FIG. 13B illustrates a cross sectional view of an energy distribution structure 2410 having a component 2412a and a component 2412b that is offset with respect to the component 2412a. As shown, a tip 2416a of the component 2412a is not aligned with a tip 2416b of the component 2312b. Also, the component 2412b may include walls (such as triangular walls) that are generally similar in size and shape, while the component 2312a may include walls (such as triangular walls) in which at least some of the walls are not equal in shape. The offset configuration of an energy distribution structure may cause the component 2312a and the component 2412a to collapse, in response to an applied force (not depicted), such that one location engages the component 2312b and the component 2412b, respectively, prior to another (opposing) location.

Figure 14:
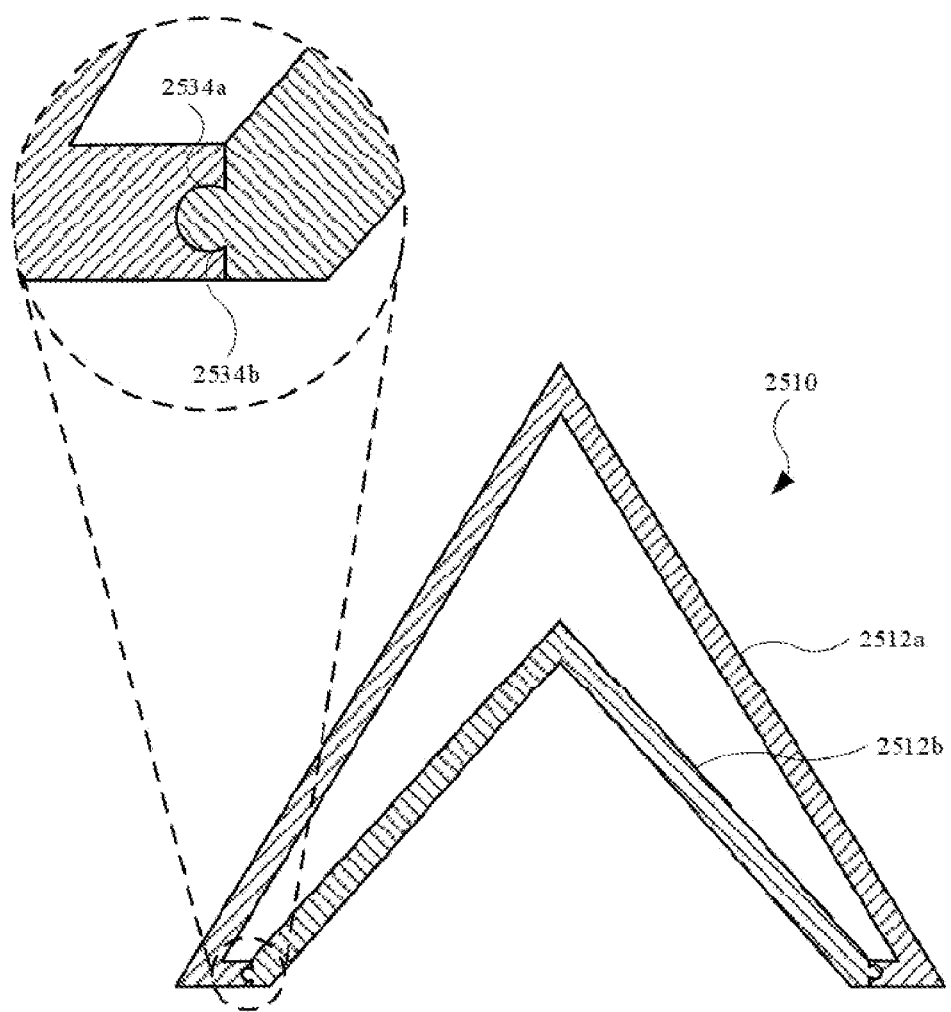
FIG. 14 illustrate a cross sectional view of an embodiment of an energy distribution structure, showing the components of the energy distribution structures coupled together by connection mechanisms, in accordance with some described embodiments.

FIG. 14 illustrate a cross sectional view of an embodiment of an energy distribution structure 2510, showing the components of the energy distribution structure 2510 coupled together by connection mechanisms, in accordance with some described embodiments. The energy distribution structure 2510 may include a component 2512a and a component 2512b. As shown in the enlarged view, the component 2512a includes a recess 2534a, or cavity, and the component 2512b includes a protruding feature 2534b, or protrusion, positioned in the recess 2534a. The protruding feature 2534b is designed to fit into the recess 3534a in a manner similar to that of puzzle pieces, as an example. As a result, the component 2512a may be decoupled from the component 2512b by removing the protruding feature 2534b from the recess 2534a. Further, the component 2512a and the component 2512b may subsequently be coupled to other coupling mechanisms. The connection mechanisms (i.e., the protruding feature 2534b and the recess 2534a) are intended to show that the components can be decoupled from each other without causing damage. It should be noted that the component 2512a and the component 2512b may include other types of coupling mechanism, such as threaded couplings, press fit couplings, frictional coupling, as non-limiting examples.

Figure 15:
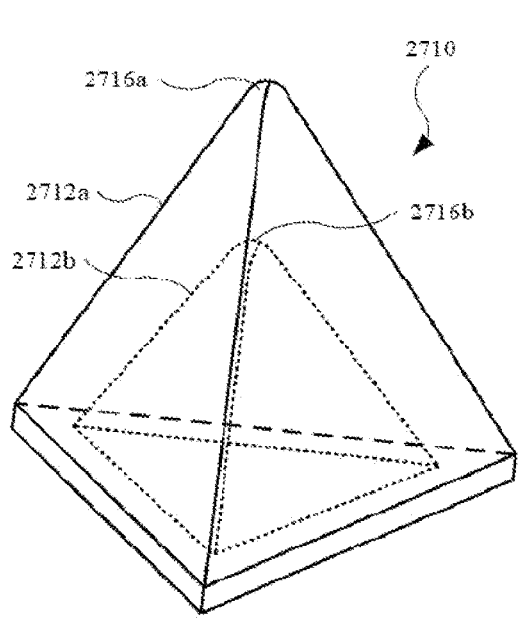
FIGS. 15-18 illustrate isometric views of alternative embodiments of energy distribution structures having shapes other than a three-sided tetrahedron shape, in accordance with some described embodiments.
Figure 16:
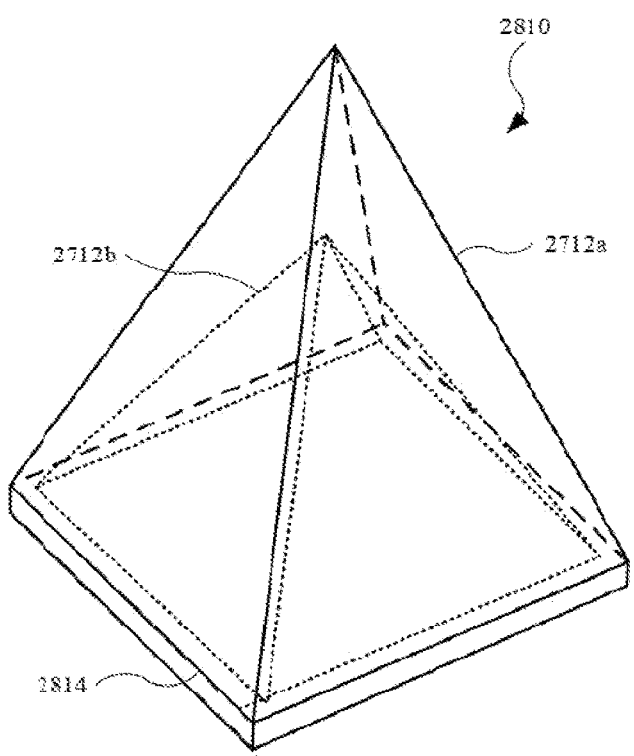
Figure 17:
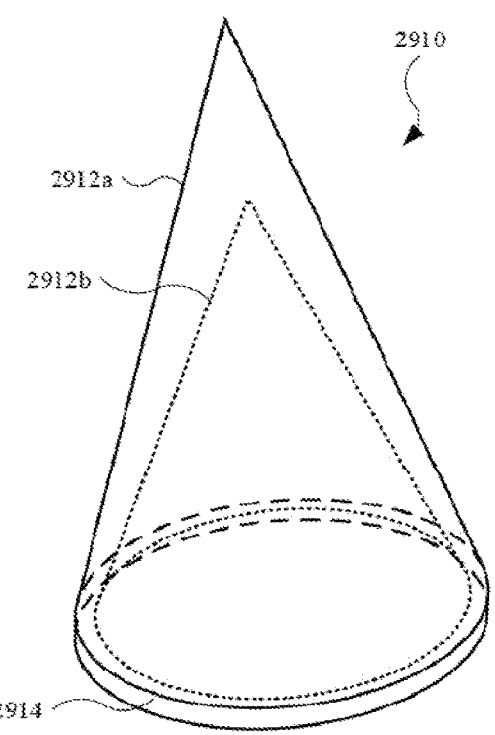
Figure 18:
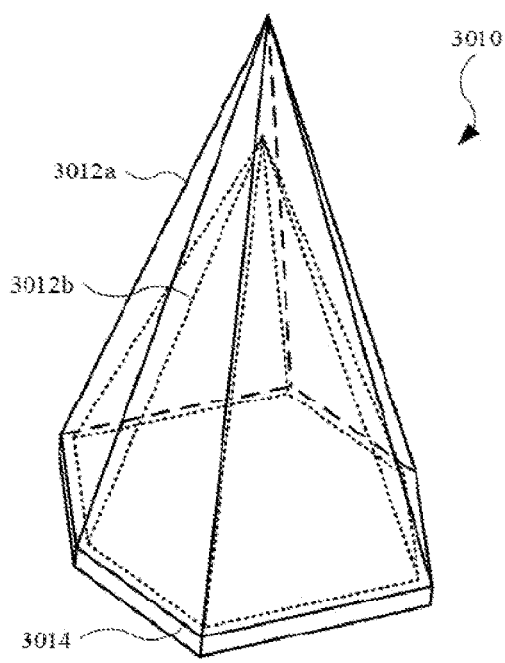

While foregoing embodiments show and describe tetrahedron shapes, several other types of energy distribution structures are possible. For example, FIGS. 15-18 illustrate isometric views of alternative embodiments of energy distribution structures having shapes other than a three-sided tetrahedron shape, in accordance with some described embodiments. FIG. 15 illustrates an energy distribution structure 2710 that includes rounded tips. For example, the energy distribution structure 2710 includes a component 2712a and a component 2712b that includes a rounded tip 2716a and a rounded tip 2716b, respectively. FIG. 16 illustrates an energy distribution structure 2810 that includes a base component 2814 having four sides. As a result, the energy distribution structure 2810 defines a pyramid shape, with a component 2812a and a component 2812b both having a pyramid shape. FIG. 17 illustrates an energy distribution structure 2910 that includes a base component 2914 having a circular shape. As a result, the energy distribution structure 2810 defines a cone shape, with a component 2912a and a component 2912b both having a cone shape. FIG. 18 illustrates an energy distribution structure 3010 that includes a base component 3014 having a hexagonal shape. As a result, the energy distribution structure 3010 defines a hexagonal shape, with a component 3012a and a component 3012b both having a hexagonal shape. The embodiments shown in FIGS. 15-18 are not intended to be limiting. Rather, the embodiments shown in FIGS. 15-18 illustrate that energy distribution structures described herein may take on several forms.

Figure 19:
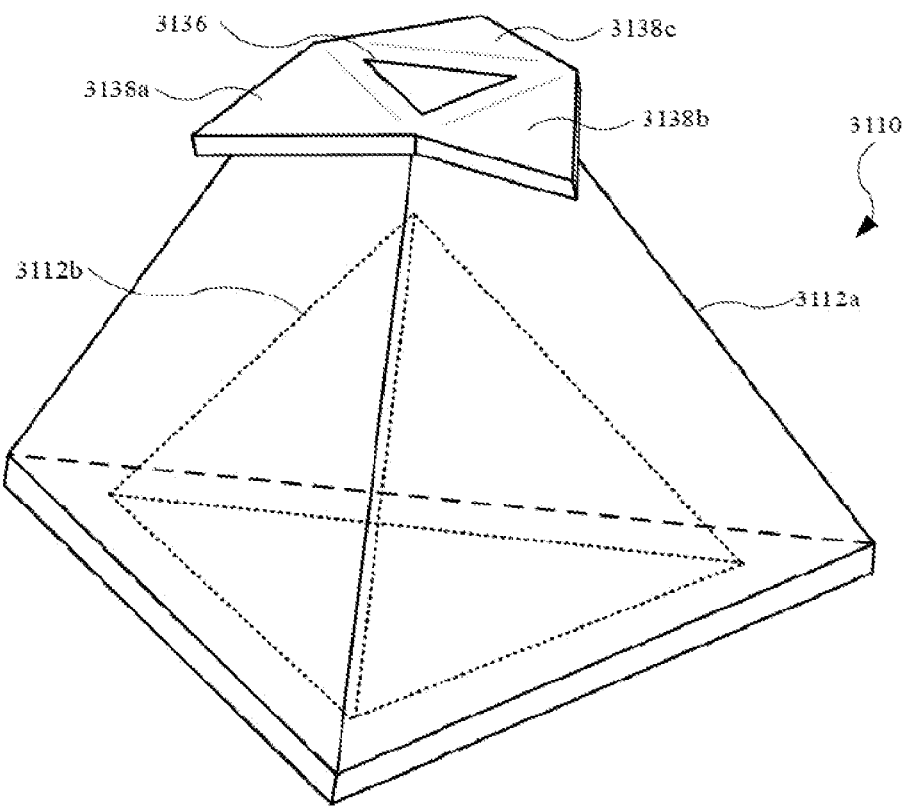
FIG. 19 illustrates an isometric view of an embodiment of an energy distribution structure, showing an opening in a component of the energy distribution structure, in accordance with some described embodiments.

FIG. 19 illustrates an isometric view of an embodiment of an energy distribution structure 3110, showing an opening 3136 in a component 3112a of the energy distribution structure 3110, in accordance with some described embodiments. Similar to prior embodiments, the energy distribution structure 3110 includes a component 3112b surround by the component 3112a. In order to form the opening 3136, the component 3112a can be preformed or cut at the tip such that an uppermost portion of the component 3112a forms multiple petals. In FIG. 19, the component 3112a includes a petal 3138a, a petal 3138b, and a petal 3138c. These petals can be used to secure the energy distribution structure 3110 to a structure or layer that covers the energy distribution structure 3110.

Figure 20:
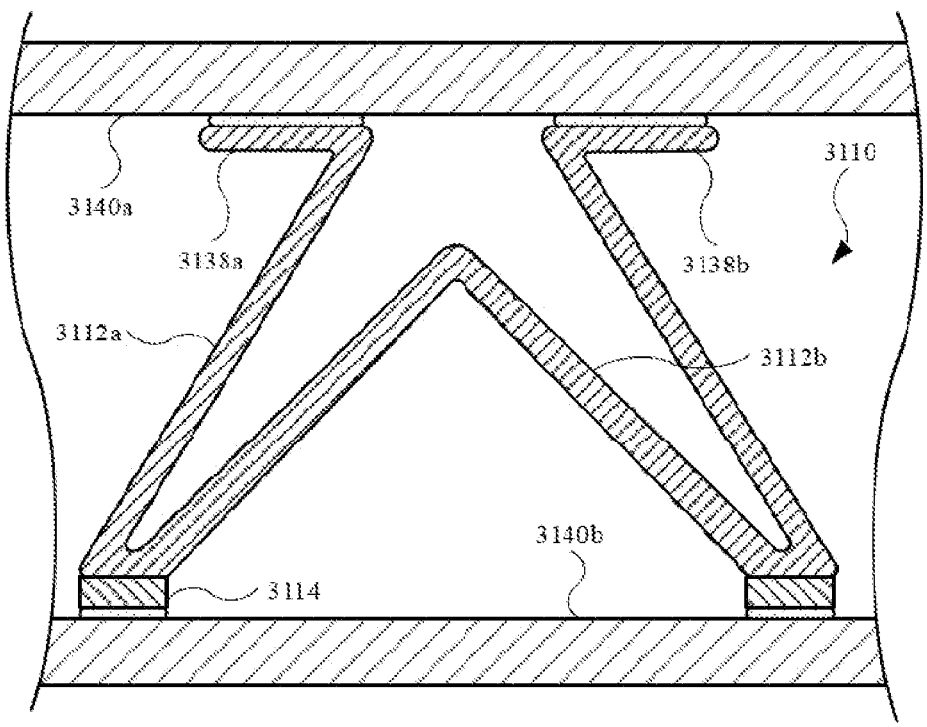
FIG. 20 illustrates a cross sectional view of the energy distribution structure shown in FIG. 19, showing the energy distribution structure positioned between, and coupled with, layers, in accordance with some described embodiments.

FIG. 20 illustrates a cross sectional view of the energy distribution structure 3110 shown in FIG. 19, showing the energy distribution structure 3110 positioned between, and coupled with, layers, in accordance with some described embodiments. The petal 3138a and the petal 3138b are coupled to a layer 3140a, and the base component 3114 is coupled to a layer 3140b. The petal 3138c (not shown in FIG. 19) may also be coupled to the layer 3140a. The layer 3140a and the layer 3140b may include fabric, metal, or KEVLAR®, as non-limiting examples. The petals and the base component 3114 may be coupled to the layer 3140a and the layer 3140b, respectively, by adhesives, fasteners/screws, hook & loop fasteners, as non-limiting examples. In the case of the layer 3140a and the layer 3140b having fibers, or some other material that includes porous regions, the petals and the base component 3114 can be cured to the layer 3140a and the layer 3140b by a 3D-printing method.

Figure 21:
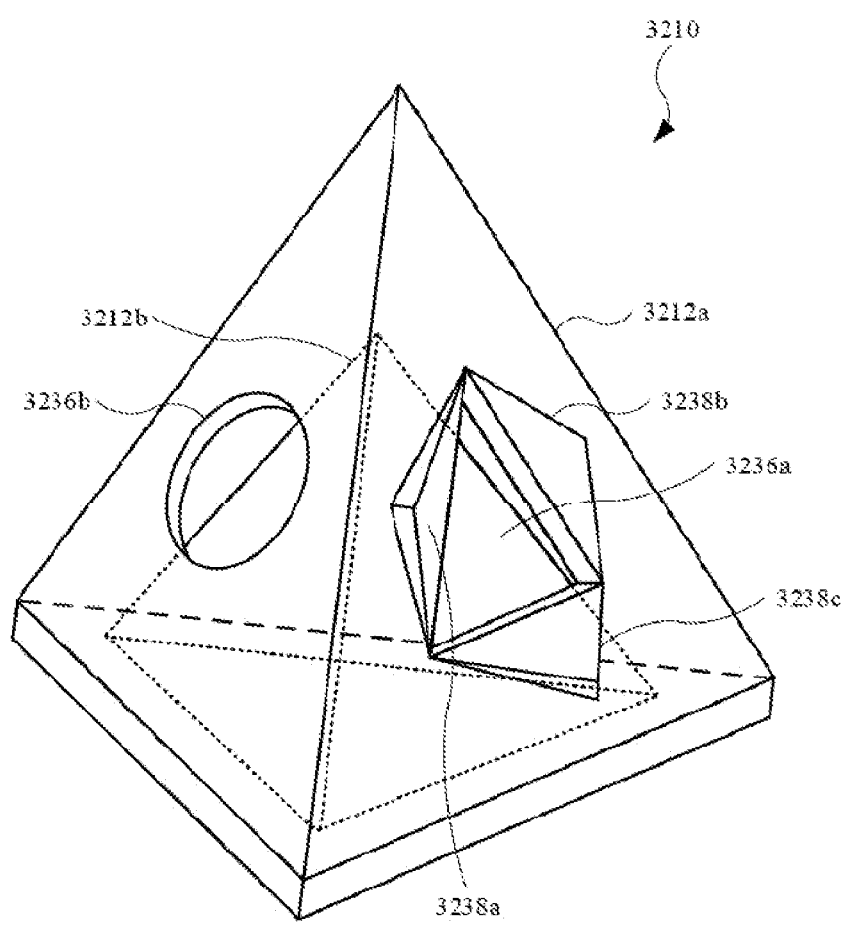
FIG. 21 illustrates an isometric view of an alternate embodiment of an energy distribution structure, showing an openings on the walls of a component of the energy distribution structure, in accordance with some described embodiments.

Energy distribution structures are not limited to openings in the uppermost region. For example, FIG. 21 illustrates an isometric view of an alternate embodiment of an energy distribution structure 3210, showing an openings on the walls of a component 3212a of the energy distribution structure, in accordance with some described embodiments. Similar to prior embodiments, the energy distribution structure 3210 includes a component 3212b surround by the component 3212a. In order to form an opening 3236a, the component 3212a can be preformed or cut at the tip such that a triangular wall portion of the component 3212a forms multiple petals. In FIG. 21, the component 3212a includes a petal 3238a, a petal 3238b, and a petal 3238c. These petals can be used to secure the an energy distribution structure 3210 to a structure or layer (not shown in FIG. 21) that covers the energy distribution structure 3210, or some other energy distribution structure (not shown in FIG. 21). Further, the energy distribution structure 3210 may include an opening 3236b that can be used to fill the energy distribution structure 3210 with a material (not shown in FIG. 21).

Figure 22:
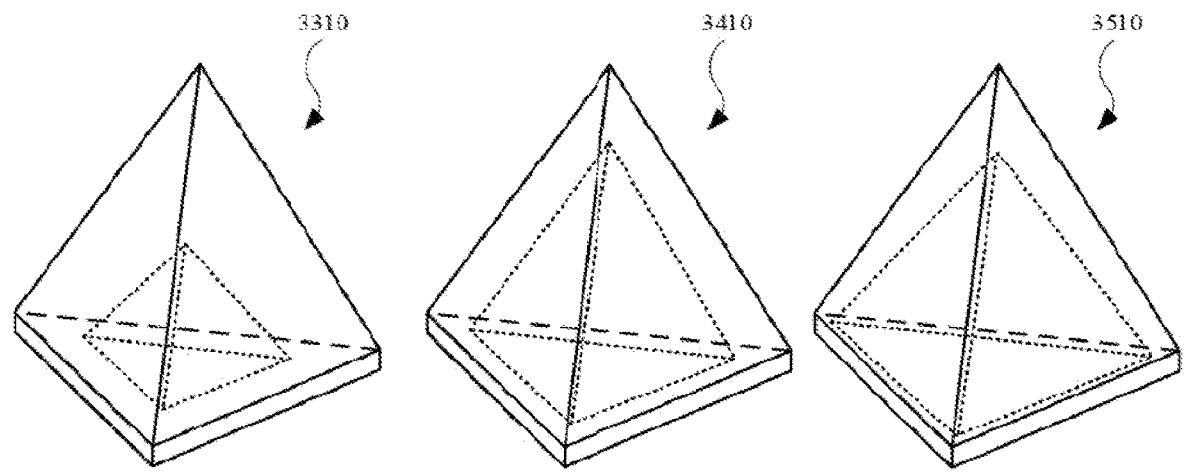
FIGS. 22-23 illustrates embodiments of energy distribution structures with inner components with different sizes, in accordance with some described embodiments.
Figure 23:
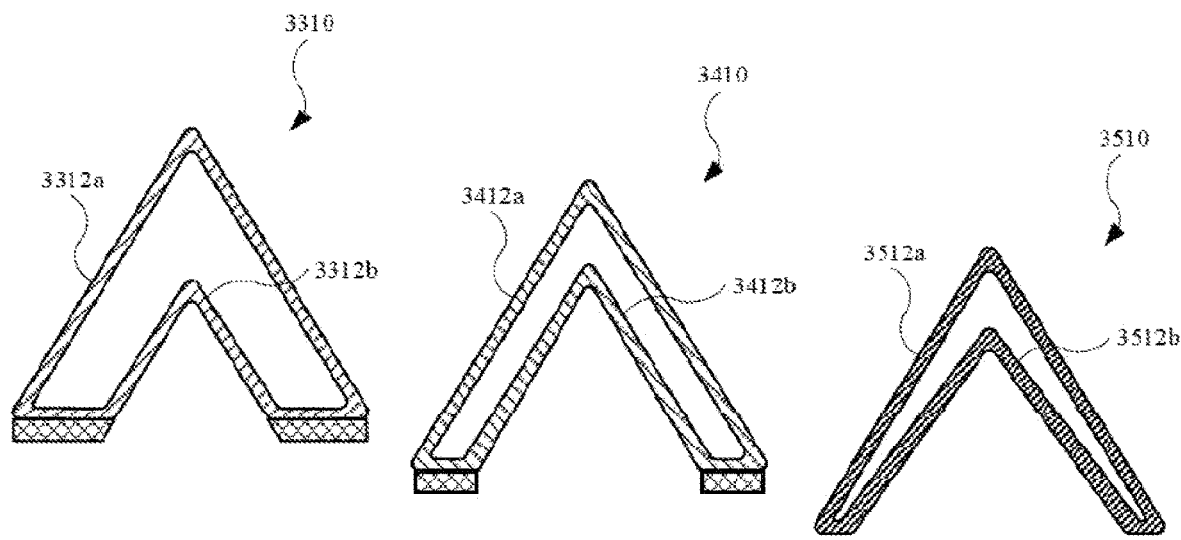

FIGS. 22-23 illustrates embodiments of energy distribution structures with inner components with different sizes, in accordance with some described embodiments. FIG. 22 shows isometric views of an energy distribution structure 3310, an energy distribution structure 3410, and an energy distribution structure 3510. FIG. 23 shows isometric cross sectional views of the energy distribution structure 3310, the energy distribution structure 3410, and the energy distribution structure 3510. The outer components (i.e., the component 3312a, the component 3412a, and the component 3512a of the energy distribution structure 3310, the energy distribution structure 3410, and the energy distribution structure 3510, respectively) are generally the same size and shape. However, the inner components (i.e., the component 3312b, the component 3412b, and the component 3512b of the energy distribution structure 3310, the energy distribution structure 3410, and the energy distribution structure 3510, respectively) are may include different sizes.

Figure 24A:
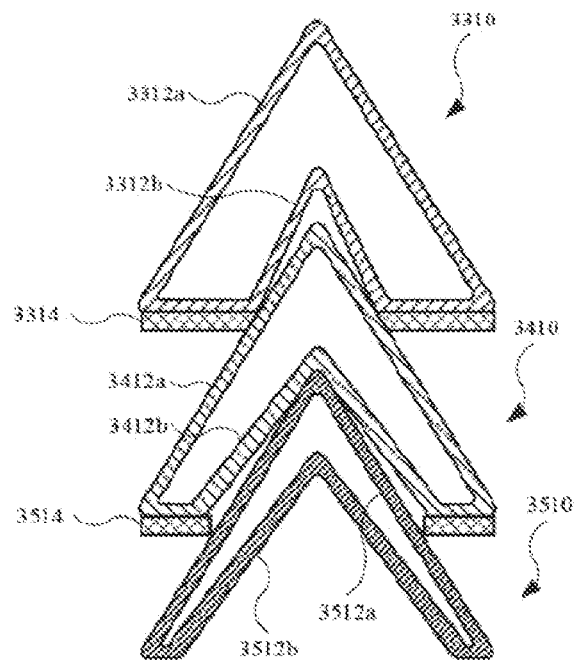
FIG. 24A illustrates a cross sectional view of the energy distribution structures shown in FIGS. 22 and 23, showing a stacked configuration of energy distribution structures, in accordance with some described embodiments.

FIG. 24A illustrates a cross sectional view of the energy distribution structures shown in FIGS. 22 and 23, showing a stacked configuration of energy distribution structures, in accordance with some described embodiments. Based on the different sizes of the aforementioned inner components, the aforementioned outer components may not fully engage the inner components. For example, the component 3412a is nested in the energy distribution structure 3310, but it not engaged with the component 3312b. This is due in part to the component 3312b being narrower than the component 3412a, as well as the base component 3314 of the energy distribution structure 3310 in contact with the component 3412a. This results in a space between the energy distribution structure 3310 and the energy distribution structure 3410. The energy distribution component 3310 (including the base component 3314) and/or the energy distribution component 3410 can be modified to provide full engagement between the energy distribution structure 3310 and the energy distribution structure 3410. Also, component 3512a is nested in the energy distribution structure 3410, but it partially engaged with the component 3412b. This is due in part to the component 3412b being wider than the component 3512a. The energy distribution component 3410 (including the base component 3414) and/or the energy distribution component 3510 can be modified to provide full engagement between the energy distribution structure 3410 and the energy distribution structure 3510.

Figure 24B:
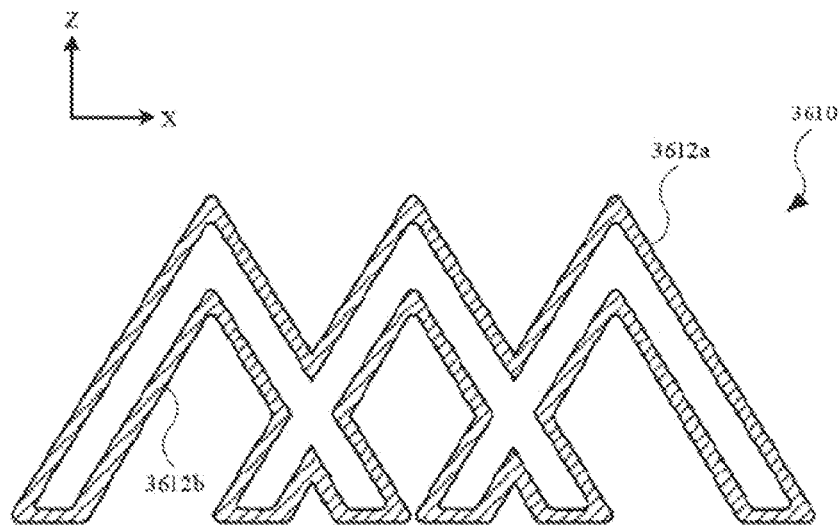
FIG. 24B illustrates a cross sectional view of an alternate embodiment of an energy distribution structures, showing multiple energy distribution structures coupled together, in accordance with some described embodiments.

FIG. 24B illustrates a cross sectional view of an alternate embodiment of an energy distribution structure 3610, showing multiple energy distribution structures coupled together, in accordance with some described embodiments. As shown, the energy distribution structure 3610 includes a series of components 3612a (representing outer component) and a series of components 3612b (representing inner components). Based the designed configuration, the energy distribution structure 3610 may provide a greater ability to withstand an applied force (not depicted) that is generally directed along the X-axis. Also, energy distribution structure 3610 may provide a smaller footprint as compared to three energy distribution structures coupled to each other at their respective bases.

Figure 24C:
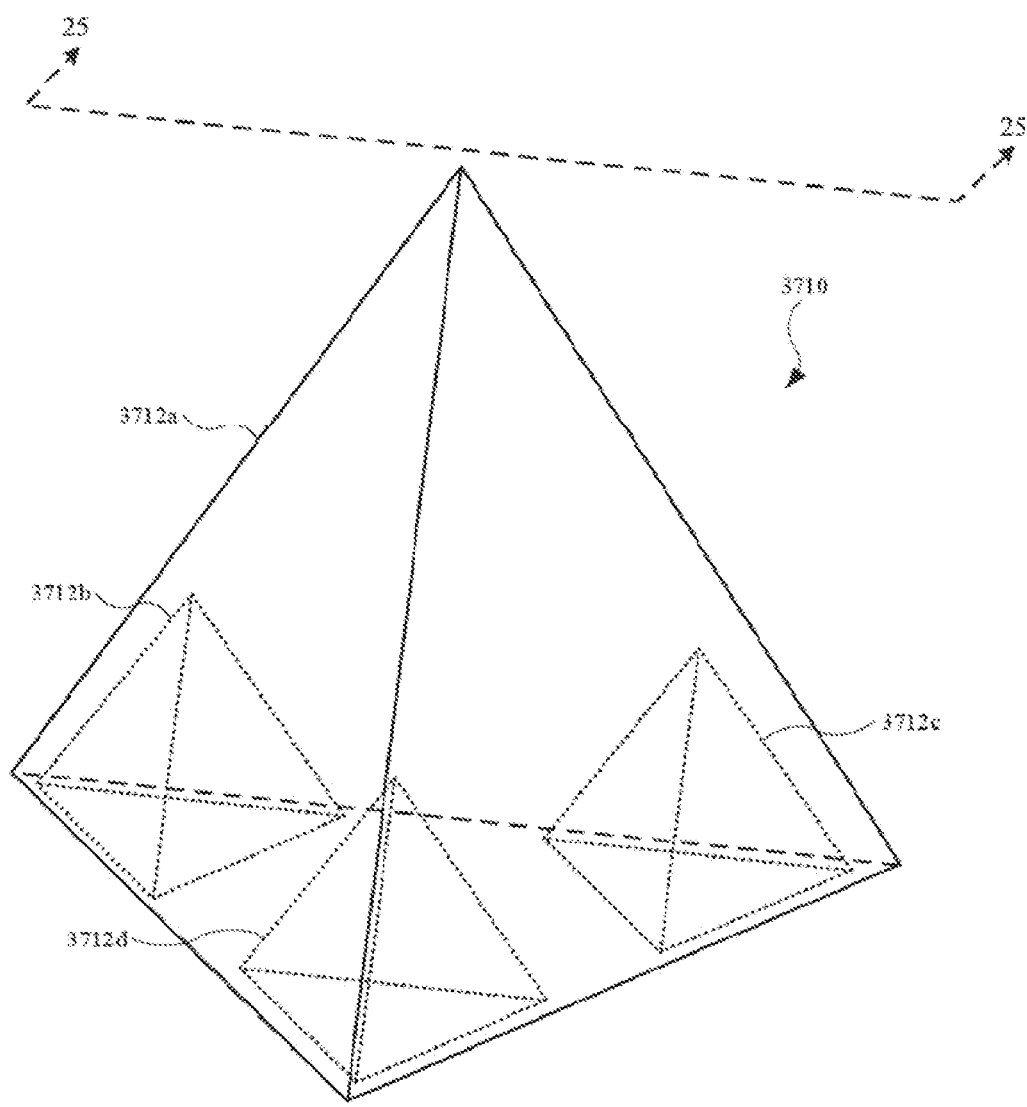
FIG. 24C illustrates an isometric view of an embodiment of an energy distribution structure, showing multiple internal components with an outer component, in accordance with some described embodiments.

FIG. 24C illustrates an isometric view of an embodiment of an energy distribution structure 3710, showing multiple internal components with an outer component, in accordance with some described embodiments. As shown, the energy distribution structure 3710 includes a component 3712a (representing an outer component) as well as a component 3712b, a component 3712c, and a component 3712d (representing inner components). The energy distribution structure 3710 illustrates that energy distribution structures described herein are not limited to a single inner component.

Figure 25:
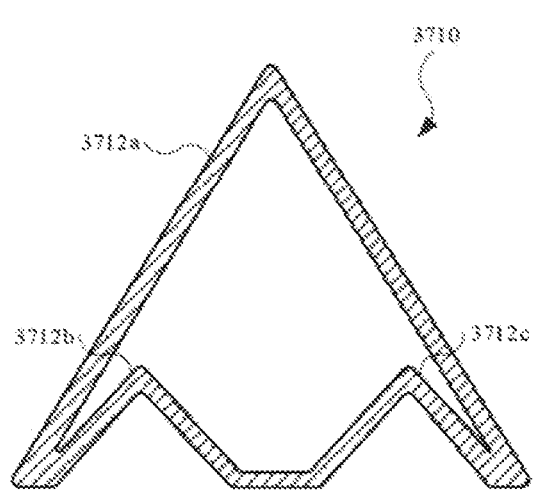
FIG. 25 illustrates a cross sectional view of the energy distribution structure shown in FIG. 24C, taken along line 25-25, showing a pair of internal components of the energy distribution structure.

FIG. 25 illustrates a cross sectional view of the energy distribution structure 3710 shown in FIG. 24C, taken along line 25-25, showing a pair of internal components of the energy distribution structure. As shown, the component 3712b and the component 3712c are positioned in the component 3712a. In some instances, an applied force (not depicted) to the component 3712a causes the component 3712a to break down and collapse onto the component 3712b and the component 3712c.

Figure 26:
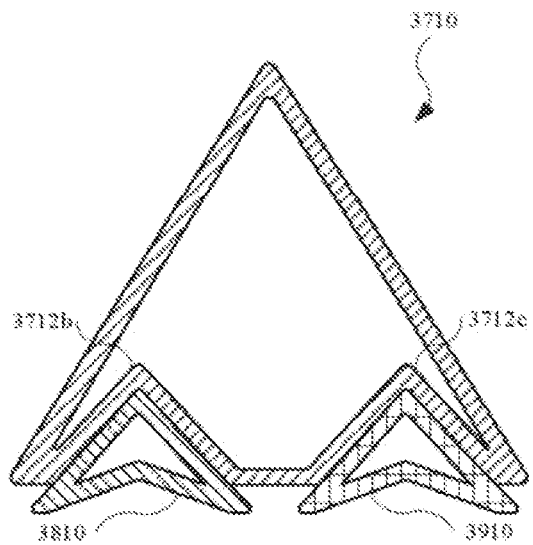
FIG. 26 illustrates a cross sectional view of the energy distribution structure shown in FIG. 25, showing additional energy distribution structures nested in the energy distribution structure, in accordance with some described embodiments.

FIG. 26 illustrates a cross sectional view of the energy distribution structure 3710 shown in FIG. 25, showing additional energy distribution structures nested in the energy distribution structure 3710, in accordance with some described embodiments. As shown, an energy distribution structure 3810 and an energy distribution structure 3910 are positioned in the component 3712b and the component 3712c, respectively.

Figure 27A:
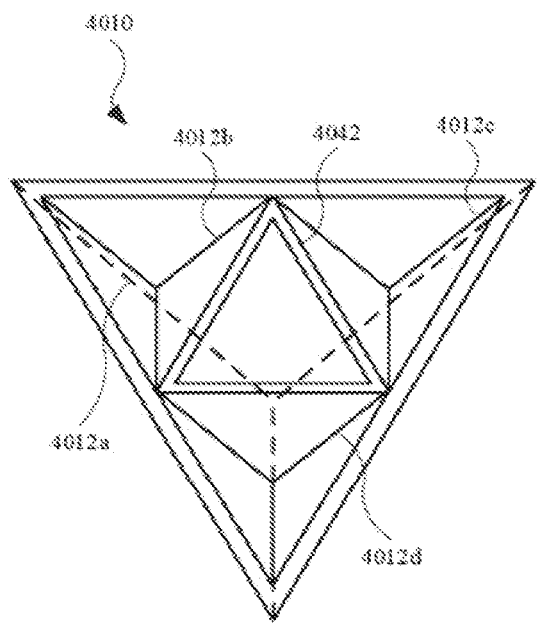
FIG. 27A illustrates a bottom view of an embodiment of an energy distribution structure, showing multiple inner components and a ledge (for an additional internal component) within an outer component, in accordance with some described embodiments.

FIG. 27A illustrates a bottom view of an embodiment of an energy distribution structure 4010, showing multiple inner components and a ledge (for an additional internal component) within an outer component, in accordance with some described embodiments. As shown, the energy distribution structure 4010 includes a component 4012a (representing an outer component) as well as a component 4012b, a component 4012c, and a component 4012d (representing inner components). The energy distribution structure 4010 further includes a ledge 4042 capable of receiving an energy distribution structure (not shown in FIG. 27A). In some embodiments, the ledge 4042 defines an opening. In some embodiments, the ledge 4042 defines a planar surface such that the energy distribution structure 4010 does not include an opening.

Figure 27B:
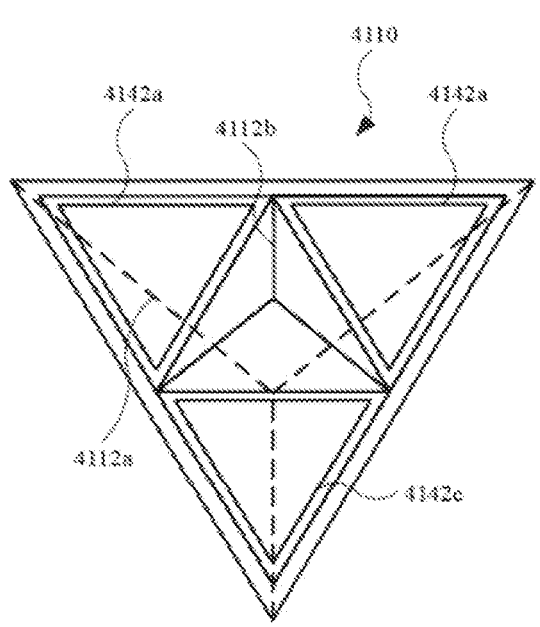
FIG. 27B illustrates a bottom view of alternate embodiment of an energy distribution structure, showing multiple ledges (for additional internal component) and inner component within an outer component, in accordance with some described embodiments.

FIG. 27B illustrates a bottom view of alternate embodiment of an energy distribution structure 4110, showing multiple ledges (for additional internal component) and inner component within an outer component, in accordance with some described embodiments. As shown, the energy distribution structure 4110 includes a component 4112a (representing an outer component) as well as a component 4112b (representing an inner component). The energy distribution structure 4110 further includes a ledge 4142a, a ledge 4142b, and a ledge 4142c, each of which is capable of receiving an energy distribution structure (not shown in FIG. 27B). In some embodiments, the ledge 4142a, the ledge 4142b, and the ledge 4142c each defines an opening. In some embodiments, the ledge 4142a, the ledge 4142b, and the ledge 4142c each defines a planar surface such that the energy distribution structure 4010 does not include an opening. Still, in some embodiments, at least one of the ledge 4142a, the ledge 4142b, and the ledge 4142c defines an opening and at least one of the ledge 4142a, the ledge 4142b, and the ledge 4142c defines a planar surface.

Figure 28:
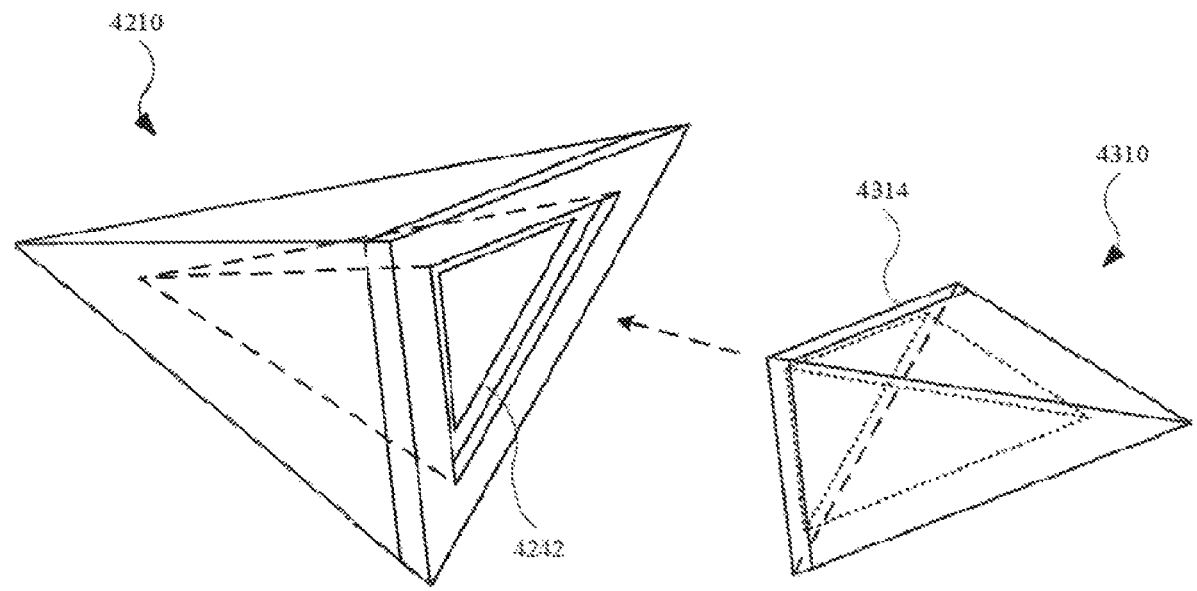
FIG. 28 illustrates an isometric view of an embodiment of an energy distribution structure, showing internal features designed to receive an energy distribution structure, in accordance with some described embodiments.

FIG. 28 illustrates an isometric view of an embodiment of an energy distribution structure 4210, showing internal features designed to receive an energy distribution structure 4310, in accordance with some described embodiments. As shown, the energy distribution structure 4210 includes a ledge 4242 can receive the energy distribution structure 4310. In particular, the ledge 4242 includes a size and shape to receive a base component 4314 of the energy distribution structure 4310.

Figure 29:
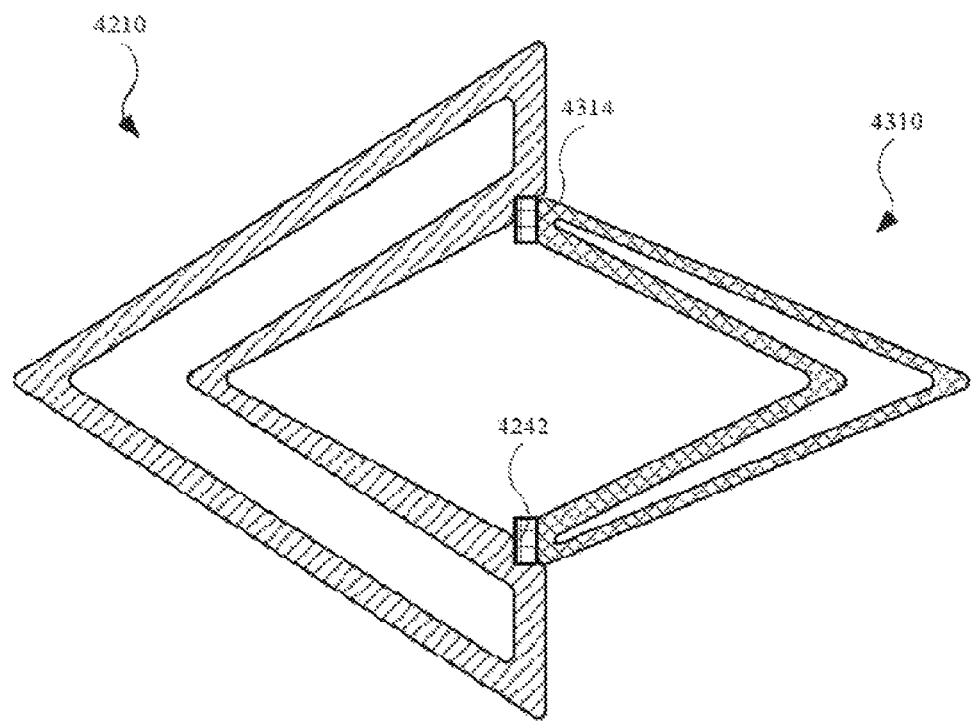
FIG. 29 illustrates a cross sectional view of the energy distribution structures shown in FIG. 28, showing the energy distribution structures coupled to each other, in accordance with some described embodiments.

FIG. 29 illustrates a cross sectional view of the energy distribution structures shown in FIG. 28, showing the energy distribution structures coupled to each other, in accordance with some described embodiments. As shown, the base component 4314 of the energy distribution structure 4310 engages the ledge 4242 of the energy distribution structure 4210. The energy distribution structures may remain together by permanent means (such as adhesives) or by non-permanent means (such as frictional engagement or hook and loop fasteners).

Figure 30:
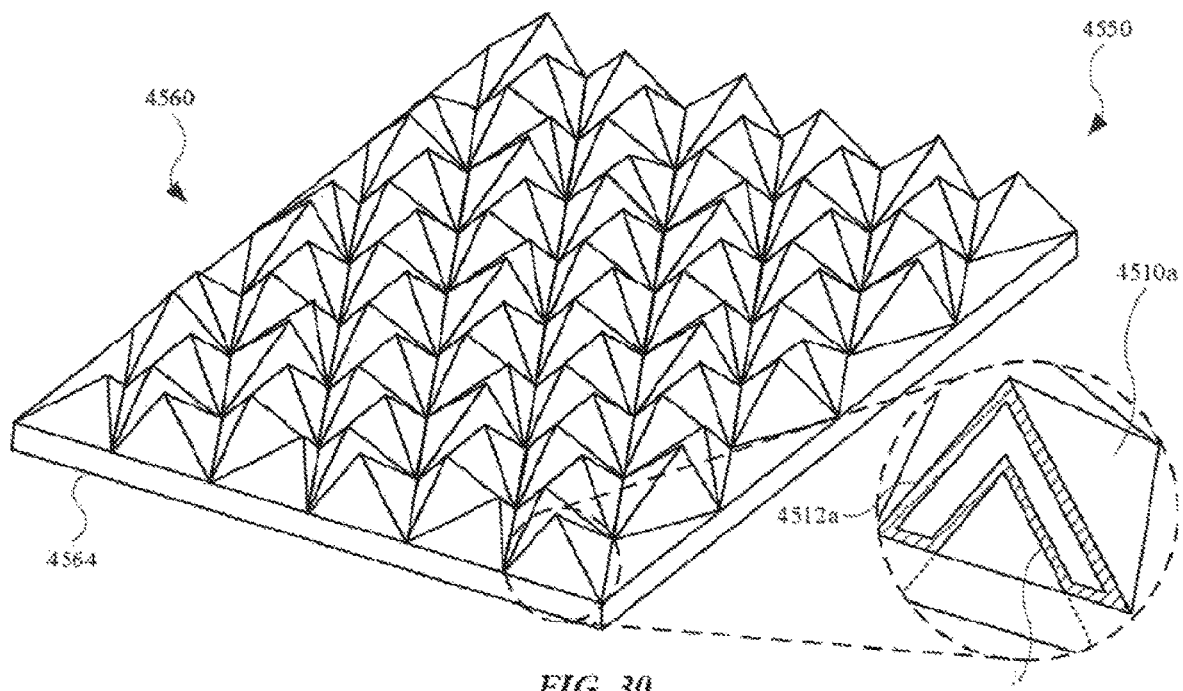
FIG. 30 illustrates an isometric view of an embodiment of an array of energy distribution structures, in accordance with some described embodiments.

The preceding embodiments show and describe energy distribution structures as singular, or unitary, energy distribution structures. However, several singular energy distribution structure may be combined to form an array of energy distribution structures. One or more arrays of energy distribution structures are shown in the following embodiments. While a particular energy distribution structure is represented in the following arrays of energy distribution structures, it should be noted any of the preceding embodiments of singular unitary energy distribution structures may be combined together to form an array of energy distribution structures. Further, the following arrays of energy distribution structures may include any feature or features described singular energy distribution structures FIG. 30 illustrates an isometric view of an embodiment of an array of energy distribution structures 4550, in accordance with some described embodiments. As shown, the array of energy distribution structures 4550 includes energy distribution structures 4560 arranged in rows and columns. As shown in the enlarged view, an energy distribution structure 4510a (representative remaining energy distribution structures shown in FIG. 30) may include a component 4512a and a component 4512b, similar to prior embodiments of an energy distribution structure. Also, the array of energy distribution structures 4500 may include a base layer 4564 coupled to the energy distribution structures 4560.

Figure 31A:
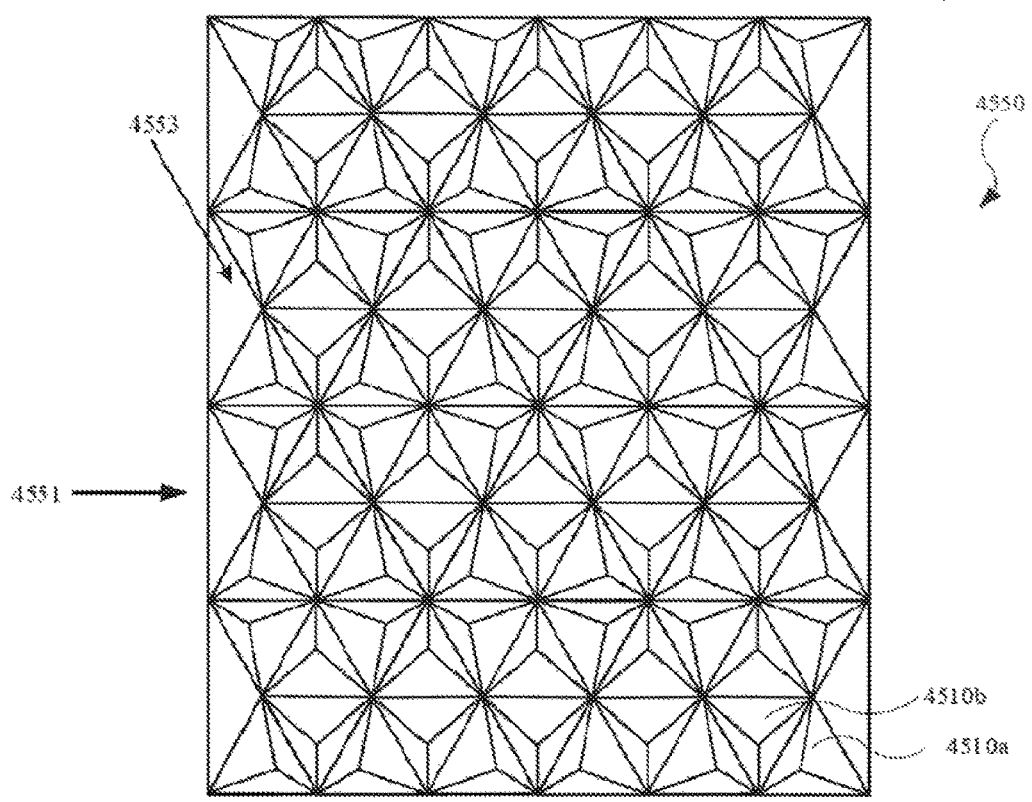
FIG. 31A illustrates an aerial view of the array of energy distribution structures shown in FIG. 30, showing relationships between adjacent energy distribution structures.

FIG. 31A illustrates an aerial view of the array of energy distribution structures 4550 shown in FIG. 30, showing relationships between adjacent energy distribution structures. As shown, adjacent energy distribution structures (such as the energy distribution structure 4510a and an energy distribution structure 4510b) may be joined at their respective edges. Also, the number of walls (defining the edges) of a particular energy distribution structure may correspond to the number of adjacent/adjoined energy distributions structures to which the particular energy distribution structure is joined. For example, a tetrahedron energy distribution stricture may be joined with three energy distributions structures of the array of energy distribution structures 4550. Also, as shown in FIG. 31A, when the energy distribution structures are tetrahedrons, the array of energy distribution structures 4550 can form several rows and diagonals of spaces or openings. For example, a row 4551 and a diagonal 4553 (representative of additional rows and diagonals, respectively) are depicted.

Figure 31B:
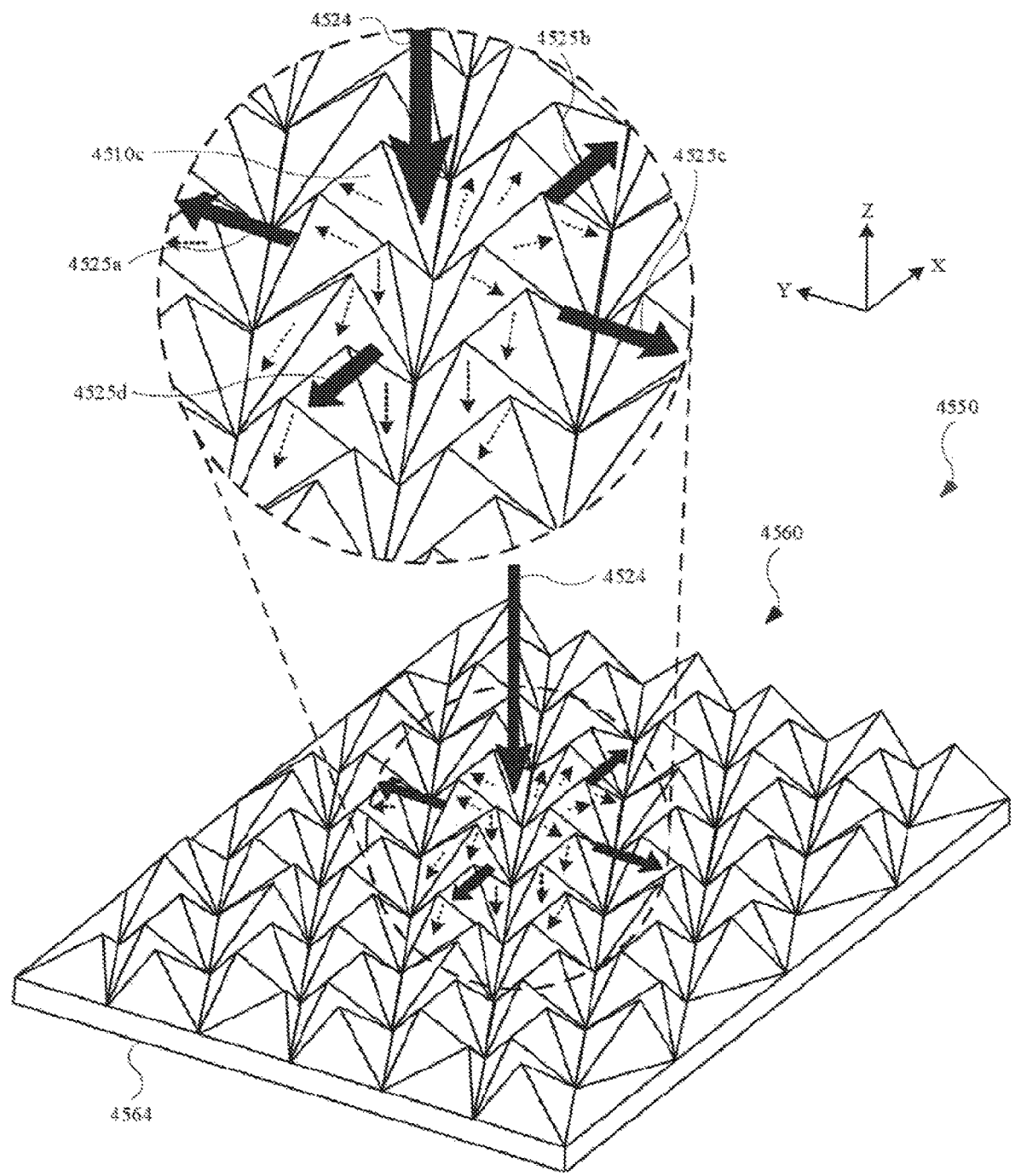
FIG. 31B illustrates an aerial view of an alternate embodiment of an array of energy distribution structures, showing a base layer that is fully covered by energy distribution structures, in accordance with some described embodiments.

FIG. 31B illustrates an isometric view of the array of energy distribution structures 4550 shown in FIG. 30, showing the array of energy distribution structures 4550 distributing an applied force 4524 through multiple energy distribution structures 4560, in accordance with some described embodiments. Similar to the singular energy distribution structures, each of the multiple energy distribution structures 4560 is designed to absorb and redirect energy received by an applied force. More importantly, any one or more of the multiple energy distribution structures 4660 that receives an applied force can absorb and redirect the applied force to other energy distribution structures.

As shown in the enlarged view, the applied force 4524 contacts an energy distribution structure 4510c. In response, the energy distribution structure 4510c absorbs and redirects the absorbed energy (represented by dotted lines with arrows) from the applied force 4524 to adjacent energy distribution structures, which in turn, redirect the absorbed energy to their respective adjacent energy distribution structures. Each of the energy distributions structures 4660 includes a three-dimensional outer component that covers one or more three-dimensional inner components. Each three-dimensional outer component can absorb and redirect energy, and each three-dimensional inner component(s) can absorb and redirect residual energy (transferred from the three-dimensional outer component).

The enlarged view further shows the applied force 4524 is incident on the array of energy distribution structures 4550 along the Z-axis. Due to the absorption and redirect abilities of the multiple energy distribution structures 4660, the applied force 4524 can be directed in multiple directs along a plane in the X-Y plane, as represented by arrow 4525a, an arrow 4525b, an arrow 4525c, and an arrow 4525d. These arrows are intended to be representative, and it should be noted that applied force 4524 can be generally redirected in any direction along the X-Y plane.

Although the example in FIG. 31B shows the applied force 4524 initially incident on a single energy distribution structure, the applied force 4524 may be initially incident on two or more of the multiple energy distribution structures 4660, and these energy distribution structures can absorb and redirect the energy from the applied force 4524.

Figure 32:
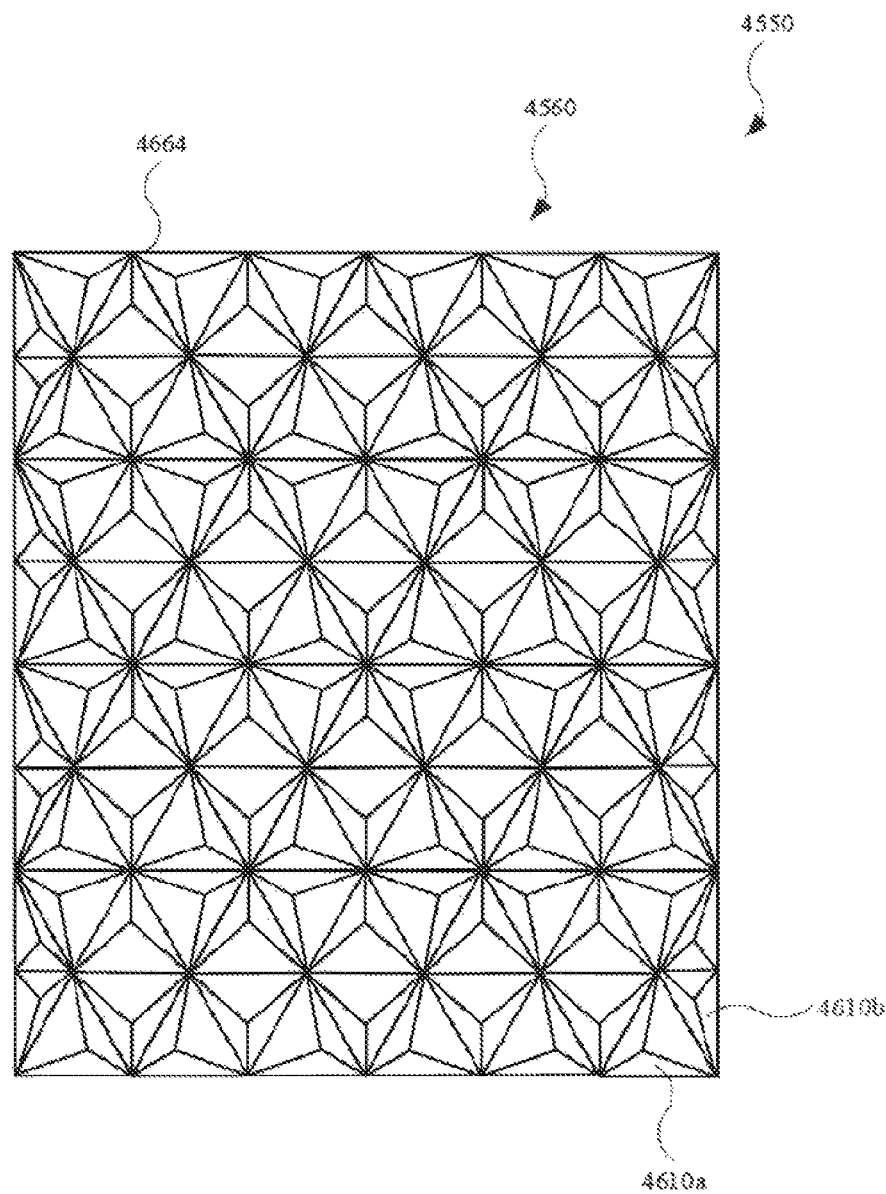
FIG. 32 illustrates an isometric view of the array of energy distribution structures shown in FIG. 30, showing the array of energy distribution structures distributing an applied force through multiple energy distribution structures, in accordance with some described embodiments.

FIG. 32 illustrates an aerial view of an alternate embodiment of an array of energy distribution structures 4650, showing a base layer 4664 that is fully covered by multiple energy distribution structures 4660, in accordance with some described embodiments. In order to fully cover the base layer 4664, the multiple energy distribution structures 4660 may different shapes. For example, the energy distribution structure 4610a is adjacent to an energy distribution structure 4610b. The energy distribution structure 4610b includes a shape that match that corresponds to a space between the energy distribution structure 4610a and an edge of the base layer 4664.

FIGS. 33A-33D illustrate an array of energy distribution structures distributing energy from an applied force, in accordance with some described embodiments.

FIGS. 33A-33D illustrate an array of energy distribution structures 4750 distributing energy from an applied force 4724, in accordance with some described embodiments. An applied force 4724 (represented by multiple arrows incident on the array of energy distribution structures 4750) includes an externally applied force that may be derived by several ways. Such non-limiting examples of an externally applied force include ballistic and non-ballistic objects, pressure changes, shockwaves, or some other object(s) that engages the array of energy distribution structures 4750. Also, the applied force 4724 to the array of energy distribution structures 4750 can cause individual energy distribution structures, including their respective components, to "fail," which may include a breakdown of the components. However, during the array of energy distribution structures 4750 can nonetheless absorb and redirect the energy provided by the applied force 4724.

FIG. 33A illustrates a cross sectional view of the array of energy distribution structures 4750 receiving the applied force 4724. As an example, the array of energy distribution structures 4750 may include a similar layout as that of the array of energy distribution structures 4450 shown in FIG. 30. As shown, the array of energy distribution structures 4750 includes multiple energy distribution structures 4760. For example, the multiple energy distribution structures 4760 may an energy distribution structure 4710a, an energy distribution structure 4710b, an energy distribution structure 4710c, and an energy distribution structure 4710d, each of which are representative of the remaining energy distribution structures. Each of the energy distribution structures may include multiple components. For example, as shown in the enlarged view, the energy distribution structure 4710a includes a component 4712a (representing an outer component) and a component 4712b (representing an inner component). The component 4712a and the component 4712b may represent an outer and inner component, respectively, of the energy distribution structure 4710b, the energy distribution structure 4710c, and the energy distribution structure 4710d. Also, multiple energy distribution structures 4760 are secured with a base layer 4764. The securing mechanism may include an adhesive or hook and loop fasteners, as non-limiting examples. Also, although not shown, the multiple energy distribution structures 4760 may be integrally formed with the base layer 4764 to form a single, monolithic structure. Also, although the base layer 4764 is shown as a single layer, the base layer 4764 may include two or more layers. Also, the base layer 4764 may be formed from a material or materials described herein for an energy distribution structure.

The array of energy distribution structures 4750 is designed and positioned to protect an object 4726. As shown in the enlarged view, the applied force 4724 is incident on the energy distribution structure 4710a, the energy distribution structure 4710b, the energy distribution structure 4710c, and the energy distribution structure 4710d. Although the applied force 4724 is generally directed to the respective tips of the energy distribution structure 4710a, the energy distribution structure 4710b, the energy distribution structure 4710c, and the energy distribution structure 4710d, the applied force 4724 may occur along any of the external surfaces of the energy distribution structure 4710a, the energy distribution structure 4710b, the energy distribution structure 4710c, and the energy distribution structure 4710d.

The dotted arrows within the components of the energy distribution structure 4710a, the energy distribution structure 4710b, the energy distribution structure 4710c, and the energy distribution structure 4710d represent energy that is absorbed by their respective outer components. For example, the dotted arrows in the component 4712a of the energy distribution structure 4710a represent energy provided by the applied force 4724 that is absorbed by the component 4712a. This absorbed energy by the component 4712a causes the component 4712a to break down and move toward the component 4712b. The absorbed energy follows a path defined by the structure of the component 4712a. Further, based upon the structure of the component 4712a, the absorbed energy is redirected through the component 4712a along a trajectory that is different than the trajectory of the applied force 4724 initially incident on the component 4712a. In this regard, when the component 4712a includes a tetrahedron shape, the absorbed energy can flow through the triangular walls of the component 4712a and to the base layer 4764 and/or other energy distribution structures of the multiple energy distribution structures 4760. The changed/altered trajectory of the applied force 4724 may nonetheless occur even when the applied force 4724 is incident at other locations of the component 4712a other than the tip 4716a. Importantly, based on the location of the object 4726 to be protected by the energy distribution structure 4710, the energy absorbed by the component 4712a is redirected along a trajectory that is away from the object 4726, and accordingly, the absorbed energy may not be incident on the object 4726. It should be noted that outer components of the energy distribution structure 4710b, the energy distribution structure 4710c, and the energy distribution structure 4710d may provide the same features as those for the component 4712a.

FIG. 33B illustrates a cross sectional view of the array of energy distribution structures 4750 shown in FIG. 33A, showing the outer components continuing to receive and redirect the absorbed energy received by the applied force 4724. As shown, the component 4712a (representative of the outer components of the energy distribution structure 4710b, the energy distribution structure 4710c, and the energy distribution structure 4710d) further breaks down and engages the component 4712b. The component 4712b begins to absorb residual energy, or energy initially absorbed by the component 4712a and transferred to the component 4712b (representative of the inner components of the energy distribution structure 4710b, the energy distribution structure 4710c, and the energy distribution structure 4710d). As shown in the enlarged view, the dotted arrows represent energy within the component 4712b represent absorbed (residual) energy by the component 4712b. The component 4712b can also redirect the absorbed energy toward the base layer 4764 and/or other energy distribution structures of the multiple energy distribution structures 4760. In this manner, both the component 4712a and the component 4712b redirect the absorbed energy away from the object 4726.

FIG. 33C illustrates a cross sectional view of the array of energy distribution structures 4750 shown in FIG. 33B, showing the outer and inner components continuing to receive and redirect the absorbed energy received by the applied force 4724. As shown, the component 4712b begins to breakdown together with the component 4712a, and both the component 4712a and the component 4712b. As shown in the enlarged view, absorbed energy continues to pass through the component 4712a and the component 4712b, with both components continuing to redirect the absorbed energy toward the base layer 4764 and/or other energy distribution structures of the multiple energy distribution structures 4760. In this manner, both the component 4712a and the component 4712b continue to redirect the absorbed energy away from the object 4726.

FIG. 33D illustrates a cross sectional view of the array of energy distribution structures 4750 shown in FIG. 33C, showing the outer and inner components continuing to receive and redirect the absorbed energy received by the applied force 4724. As shown, the component 4712a and the component 4712b (representative of the energy distribution structure 4710b, the energy distribution structure 4710c, and the energy distribution structure 4710d) substantially break down. As shown in the enlarged view, absorbed energy continues to pass through the component 4712a and the component 4712b, with both components continuing to redirect the absorbed energy toward the base layer 4764 and/or other energy distribution structures of the multiple energy distribution structures 4760. In this manner, both the component 4712a and the component 4712b continue to redirect the absorbed energy away from the object 4726. Furthermore, the absorbed energy in the component 4712a may offset or cancel with absorbed energy in the component 4712b, as indicated by the arrows touching each other. The outer and inner components of the energy distribution structure 4710b, the energy distribution structure 4710c, and the energy distribution structure 4710d provide the same features as those for the component 4712a and the component 4712b, respectively.

Based upon the design configuration, the array of energy distribution structures 4750 mitigates, or substantially mitigates, the effects of the applied force 4724. As a result, the array of energy distribution structures 4750 shields the object 4726 from the applied force 4724 that could otherwise damage the object 4726.

Figure 34:
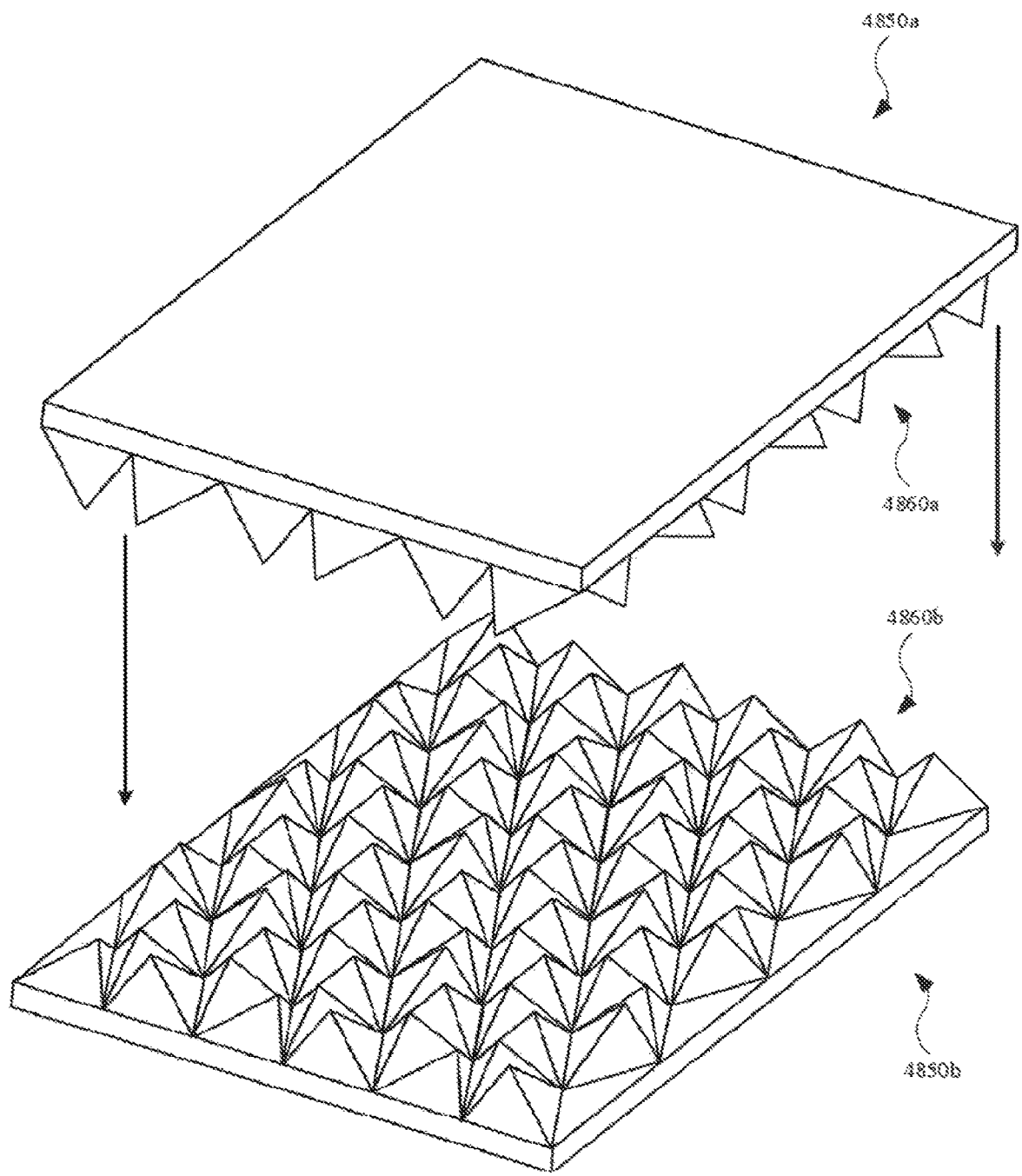
FIG. 34 illustrates an isomeric view of multiple arrays of energy distribution structures, in accordance with some described embodiments.

In some instances, two or more arrays of energy distribution structures may combine to form a system of energy distribution structures that provide additional protection against applied forces. For example, FIG. 34 illustrates an isomeric view of multiple arrays of energy distribution structures, in accordance with some described embodiments. As shown, the multiple arrays include an array of energy distribution structures 4850a with multiple energy distribution structures 4860a, and an array of energy distribution structures 4850b with multiple energy distribution structures 4860b. The array of energy distribution structures 4850a and the array of energy distribution structures 4850b may include any features described herein for arrays of energy distribution structures. Also, in some instances, the multiple energy distribution structures 4860a and the multiple energy distribution structures 4860b are identical, or at least substantially similar, to each other. However, it is possible in some embodiments that the respective energy distribution structures of the multiple energy distribution structures 4860a and the multiple energy distribution structures 4860b have differences including the number of energy distribution structures, the shape of the energy distribution structures, and/or the materials used. The arrows indicate the array of energy distribution structures 4850a can be lowered onto the array of energy distribution structures 4850b, and will be shown and discussed in further detail below.

Figure 35:
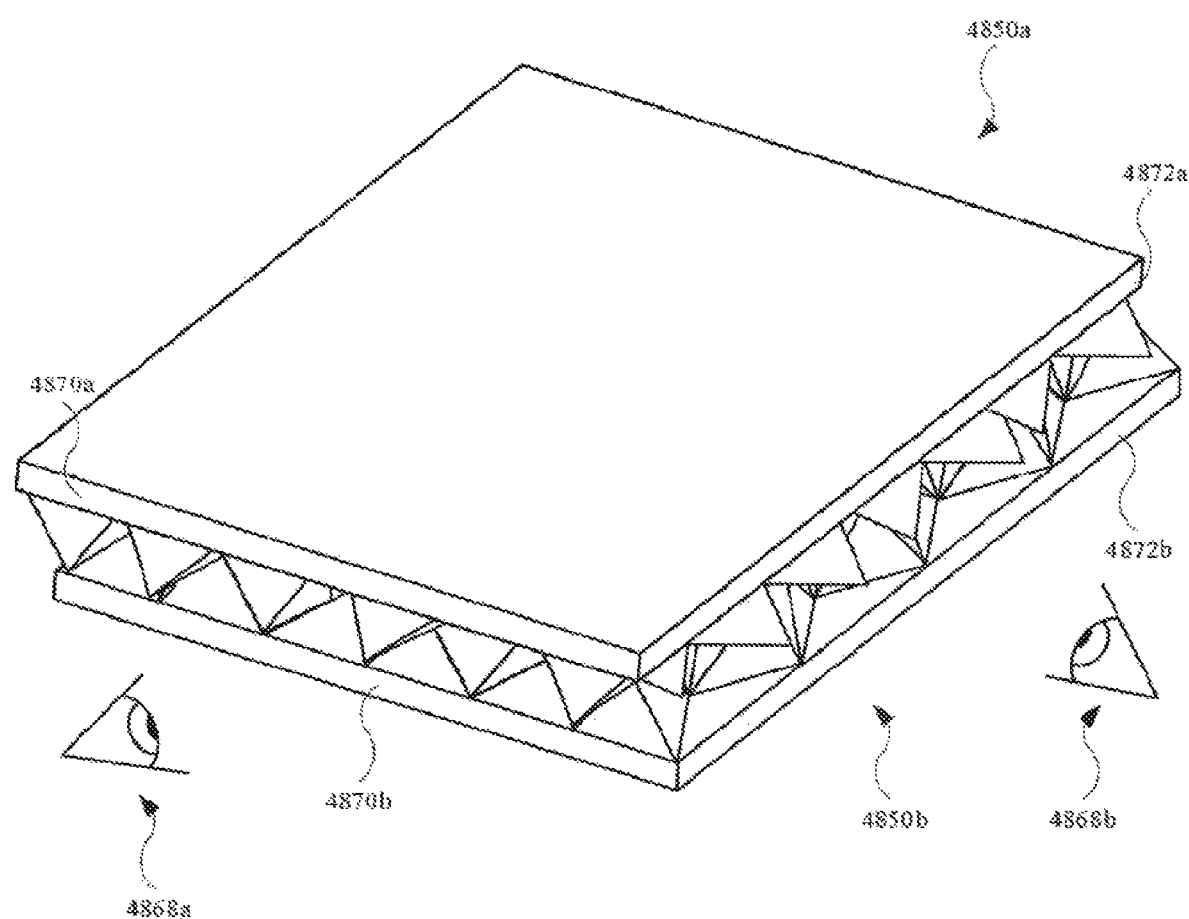
FIG. 35 illustrates an isomeric view of multiple arrays of energy distribution structures shown in FIG. 34, showing the assemblies of energy distribution structures in a stacked configuration.

FIG. 35 illustrates an isomeric view of the arrays of energy distribution structures shown in FIG. 34, showing the arrays of energy distribution structures in a stacked configuration. In the stacked configuration, the array of energy distribution structures 4850a can be interdigitated with the array of energy distribution structures 4850b. For example, an energy distribution structure of the array of energy distribution structures 4850a is positioned between two or more energy distribution structures of the array of energy distribution structures 4850b. Similarly, an energy distribution structure of the array of energy distribution structures 4850b is positioned between two or more energy distribution structures of the array of energy distribution structures 4850a. Also, by interdigitating, the array of energy distribution structures 4850a can be interlocked with the array of energy distribution structures 4850b. However, in some embodiments, the array of energy distribution structures 4850a can be subsequently removed from the array of energy distribution structures 4850b.

While array of energy distribution structures 4850a and array of energy distribution structures 4850b can be identical, or substantially similar, and interdigitated with each other, the relationship (i.e., relative position) between the respective energy distribution structures may nonetheless be different from each other from different perspectives. For example, a viewpoint 4868a (representing a side view) of an edge 4870a (of the array of energy distribution structures 4850a) and an edge 4870b (of the array of energy distribution structures 4850b) may reveal one relationship between the energy distribution structures of the respective arrays, while a viewpoint 4868b (representing a side view) of an edge 4872a (of the array of energy distribution structures 4850a) and an edge 4872b (of the array of energy distribution structures 4850b) may reveal a different relationship between the energy distribution structures of the respective arrays. This will be shown and described below.

Figure 36:
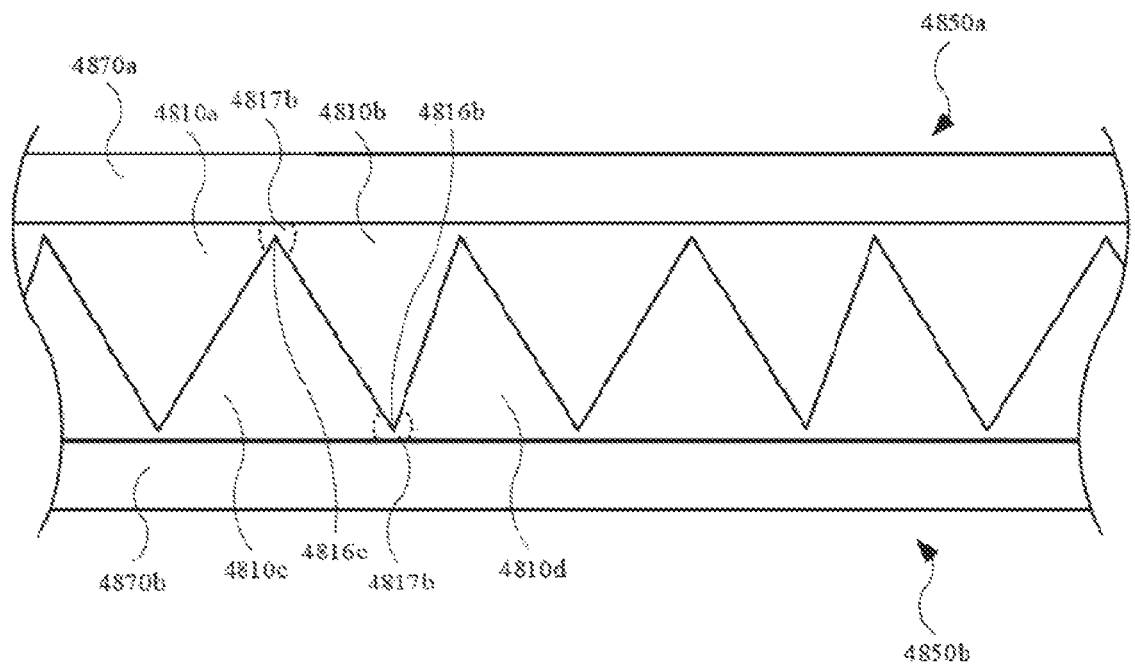
FIG. 36 illustrates a side view of the arrays of energy distribution structures shown from the viewpoint in FIG. 35, in accordance with some described embodiments.

FIG. 36 illustrates a side view of the arrays of energy distribution structures shown from the viewpoint 4868a shown in FIG. 35, in accordance with some described embodiments. As shown, the array of energy distribution structures 4850a is interdigitated with the array of energy distribution structures 4850b. In the example illustration, the array of energy distribution structures 4850a includes an energy distribution structure 4810a and an energy distribution structure 4810b, with the energy distribution structure 4810a and the energy distribution structure 4810b defining adjacent, or consecutive, energy distribution structures. Also, the array of energy distribution structures 4850b includes an energy distribution structure 4810c and an energy distribution structure 4810d, with the energy distribution structure 4810c and the energy distribution structure 4810d defining adjacent, or consecutive, energy distribution structures of the array of energy distribution structures 4850b.

It can be seen that when viewing the edge 4870a and the edge 4870b, the energy distribution structure 4810c is positioned with in space between the energy distribution structure 4810a and the energy distribution structure 4810b. Moreover, the energy distribution structure 4810c substantially fills the space between the energy distribution structure 4810a and the energy distribution structure 4810b, such that only relatively small gaps exist between the respective structures. Similarly, it can be seen that when viewing the edge 4870a and the edge 4870b, the energy distribution structure 4810b is positioned with in space between the energy distribution structure 4810c and the energy distribution structure 4810d. Moreover, the energy distribution structure 4810b substantially fills the space between the energy distribution structure 4810c and the energy distribution structure 4810d, such that only relatively small gaps exist between the respective structures. Accordingly, when viewing the edge 4870a and the edge 4870b, energy distribution structures of the array of energy distribution structures 4850a substantially fill the spaces between energy distribution structures of the array of energy distribution structure 4850b, and vice versa.

Also, it should be noted that the tips the energy distribution structures of the array of energy distribution structures 4850a are located, or at least approximately, located in "valleys," or locations of the lowest height, between adjacent energy distribution structures of the array of energy distribution structures 4850b, and vice versa. For example, the energy distribution structure 4810c includes a tip 4816c positioned in a valley 4817a (defined at a location of lowest height, or low point, between the energy distribution structure 4810a and the energy distribution structure 4810b), and the energy distribution structure 4810b includes a tip 4816b positioned in a valley 4817b (defined at a location of lowest height, or low point, between the energy distribution structure 4810c and the energy distribution structure 4810d). Based on these positioned, the valleys, which represent a region of relatively less structural material, are better support against an applied force (not depicted in FIG. 36) by way of the tips of an energy distribution structure being positioned in the valleys.

Figure 37:
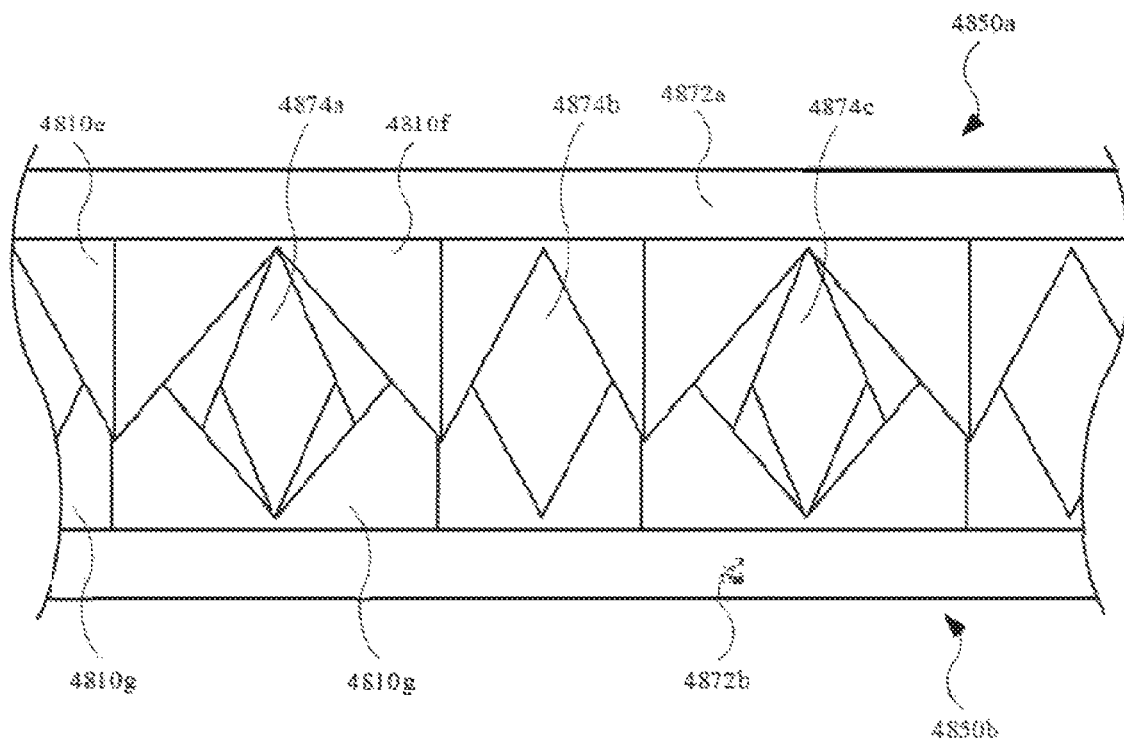
FIG. 37 illustrates a side view of the arrays of energy distribution structures shown from the viewpoint in FIG. 35, in accordance with some described embodiments.

FIG. 37 illustrates a side view of the arrays of energy distribution structures shown from the viewpoint 4868b shown in FIG. 35, in accordance with some described embodiments. In the example illustration, the array of energy distribution structures 4850a includes an energy distribution structure 4810e and an energy distribution structure 4810f, with the energy distribution structure 4810e and the energy distribution structure 4810f defining adjacent, or consecutive, energy distribution structures. Also, the array of energy distribution structures 4850b includes an energy distribution structure 4810g and an energy distribution structure 4810h, with the energy distribution structure 4810g and the energy distribution structure 4810h defining adjacent, or consecutive, energy distribution structures of the array of energy distribution structures 4850b. Further, in the interdigitated configuration shown in FIG. 37, some energy distribution structures may overlap other energy distribution structures. For example, the energy distribution structure 4810e and the energy distribution structure 4810f overlap the energy distribution structure 4810g and the energy distribution structure 4810h, respectively.

Rather than filling, or at least substantially filling spaces or voids, it can be seen that when viewing the edge 4872a and the edge 4872b, several voids (also referred to as a gaps or spaces) can be seen between the array of energy distribution structures 4850a and the array of energy distribution structures 4850b. For example, a void 4874a—defined by a space between the energy distribution structure 4810e, the energy distribution structure 4810f, the energy distribution structure 4810g, and the energy distribution structure 4810h—exists. In a similar manner, a void 4874b exists between adjacent energy distribution structures in the array of energy distribution structures 4850a and the array of energy distribution structures 4850b. Also, as shown, a void 4874c exists between adjacent energy distribution structures in the array of energy distribution structures 4850a and the array of energy distribution structures 4850b.

It can be seen that the void 4874a, the void 4874b, and the void 4874c (representative of additional voids between array of energy distribution structures 4850a and array of energy distribution structures 4850b) can extend end-to-end from each of the arrays of energy distribution structures. While the aforementioned voids represent areas of no structure, in some embodiments, these voids can be filled one or more objects to provide addition support to the arrays. This will be shown below.

Figure 38:
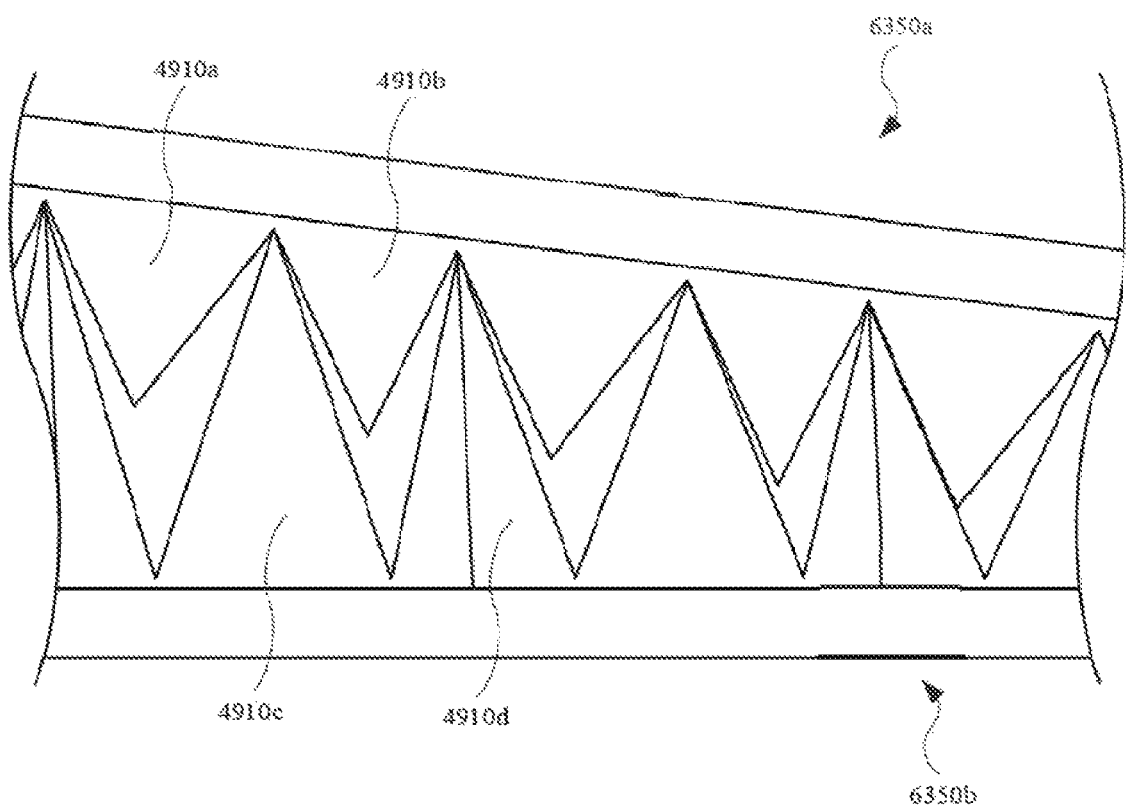
FIG. 38 illustrates isometric views of an alternative embodiment of arrays of energy distribution structures in a stacked configuration, showing an array of energy distribution structures having energy distribution structures of different sizes, in accordance with some described embodiments.

FIG. 38 illustrates isometric views of an alternative embodiment of arrays of energy distribution structures in a stacked configuration, showing an array of energy distribution structures having energy distribution structures of different sizes, in accordance with some described embodiments. As shown, an array of energy distribution structures 4950a may include an energy distribution structure 4910a and an energy distribution structure 4910b. Also, an array of energy distribution structures 4950b includes an energy distribution structure 4910c and an energy distribution structure 4910d. While the arrays of energy distribution structures previously described include energy distribution structures of the same, or substantially similar, heights, the heights of some arrays of distribution structures can vary. For example, the energy distribution structure 4910a and an energy distribution structure 4910b include the same height, while the height of the energy distribution structure 4910c is greater than that of the energy distribution structure 4910d. As a result, the array of energy distribution structures 4950a, when interdigitated with the array of energy distribution structures 4950b, may lie in a non-parallel manner as shown in FIG. 38. This may reduce the height (and cross sectional area) of interdigitated arrays of energy distribution structures, which allows for a more customized fit into certain locations (as an example advantage).

FIGS. 39-42B show and describe exemplary objects that can be used in conjunction with one or more arrays of energy distribution structures. For example, the exemplary objects shown and described in FIGS. 39-42B can be positioned on an array of energy distribution structures between two or more energy distribution structures. As another example, the exemplary objects shown and described in FIGS. 39-42B can be positioned between interdigitated arrays of energy distribution structures in locations corresponding to the voids (such as the void 4874a, the void 4874b, and the void 4874c shown in FIG. 37). These examples should be construed as non-limiting.

Figure 39:
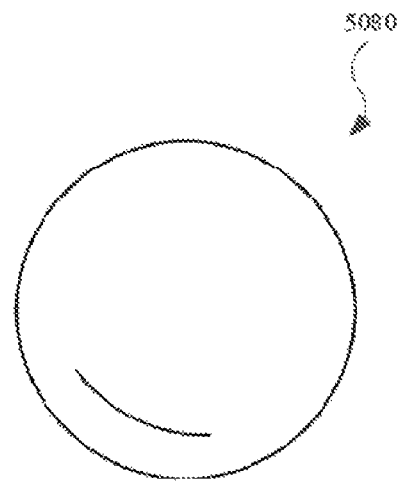
FIG. 39 illustrates an embodiment of an object, in accordance with some described embodiments.

FIG. 39 illustrates an isometric view of an embodiment of an object 5080, in accordance with some described embodiments. As shown, the object 5080 may include a spherical configuration, and may be referred to as a spherical element. In some embodiments, the object 5080 is formed from a rigid material(s) such as metals (including stainless steel, aluminum, nickel, copper, or some alloy combination thereof, as non-limiting example). In some embodiments, the object 5080 is formed from a compliant material(s) such as foam, rubber, plastic, or polymeric material(s), as non-limiting examples. Also, the object 5080 may include a solid (non-porous) object, a porous object, or a hollow object, as non-limiting examples. Configurations other than a spherical configuration are possible, such as an oblong configuration, as a non-limiting example.

Figure 40A:
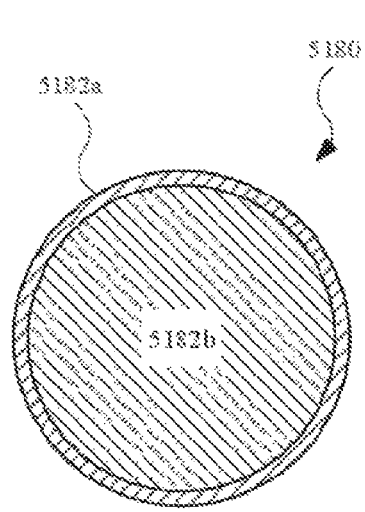
FIGS. 40A-40B illustrate cross sectional views of an object, in accordance with some described embodiments.
Figure 40B:
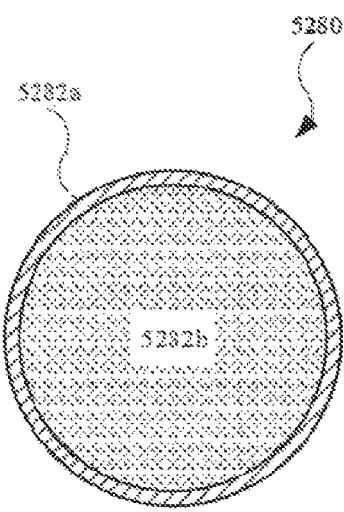

FIGS. 40A-40B illustrate cross sectional views of an object, in accordance with some described embodiments. FIG. 40A illustrates a cross sectional view of an embodiment of an object 5180, showing the object 5180 that includes an outer shell 5182a and a core 5182b surrounded by the outer shell 5182a, respectively. The outer shell 5182a and the core 5182b may include a metal, a polymer, or a compliant material, as non-limiting examples. Further, the outer shell 5182a and the core 5182b may be composed of different materials. For example, the outer shell 5182a may include a polymer and the core 5182b may include a metal.

FIG. 40B illustrates a cross sectional view of an embodiment of an object 5280, showing the object 5280 that includes an outer shell 5282a and an internal material 5282b surrounded by the outer shell 5282a, respectively. The outer shell 5282a may include a metal, a polymer, or some relatively rigid material, as non-limiting examples. However, the internal material 5282b may include a liquid (such as water), or a plasma, as non-limiting examples. In some embodiments, the internal material 5282b includes a clotting fluid. In this manner, when the object 5280 is part of wearable device (e.g., body armor), a ballistic object, such as a bullet, that strikes the wearable device can cause the object 5280 to rupture. As a result, the internal material 5282b, when composed of a clotting fluid, can cover a wound to a user of the wearable device, thereby limiting or prevent further blood loss.

Figure 41:
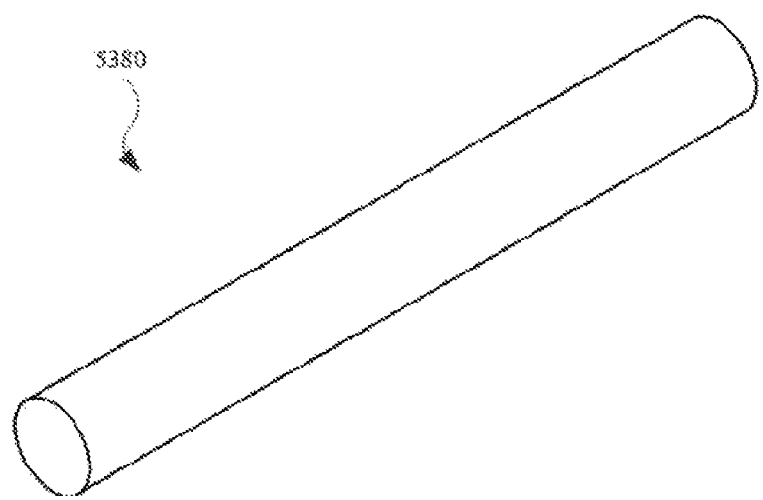
FIG. 41 illustrates an embodiment of an alternate embodiment of an object, in accordance with some described embodiments.

FIG. 41 illustrates an embodiment of an alternate embodiment of an object 5380, in accordance with some described embodiments. As shown, the object 5380 may include a cylindrical configuration with a circular cross section. In some embodiments, the object 5380 is formed from a rigid material(s) such as metals (including stainless steel, aluminum, nickel, copper, or some alloy combination thereof, as non-limiting example). In some embodiments, the object 5380 is formed from a compliant material(s) such as foam, rubber, plastic, or polymeric material(s), as non-limiting examples. Also, the object 5380 may include a solid (non-porous) object, or a porous object, as non-limiting examples. Shapes other than a circular cross section are possible, such as an oblong shape, as a non-limiting example.

Figure 42A:
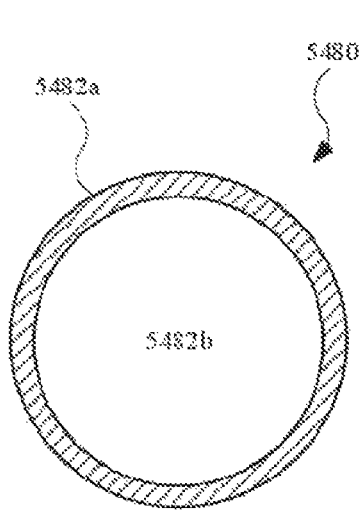
FIGS. 42A-42B illustrate cross sectional view of an object, in accordance with some described embodiments.
Figure 42B:
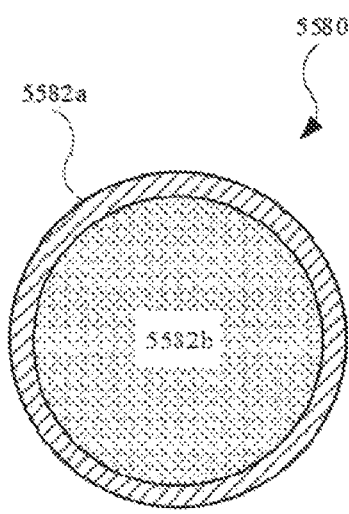

FIGS. 42A-42B illustrate cross sectional view of an object, in accordance with some described embodiments. FIG. 42A illustrates a cross sectional view of an embodiment of an object 5480, showing the object 5480 that includes an outer shell 5482a and a hollow core 5482b surrounded by the outer shell 5482a, respectively. The outer shell 5482a may include a metal, a polymer, or a compliant material, as non-limiting examples. Further, when the object 5380 is hollow, the object 5380 may be used as a conduit for fluid flow or electrical wiring, as non-limiting examples.

FIG. 42B illustrates a cross sectional view of an embodiment of an object 5580, showing the object 5580 that includes an outer shell 5582a and an internal material 5582b surrounded by the outer shell 5582a, respectively. The outer shell 5582a may include a metal, a polymer, or some relatively rigid material, as non-limiting examples. However, the internal material 5282b may include a liquid (such as water), a plasma, or a clotting fluid, as non-limiting examples.

Figure 43A:
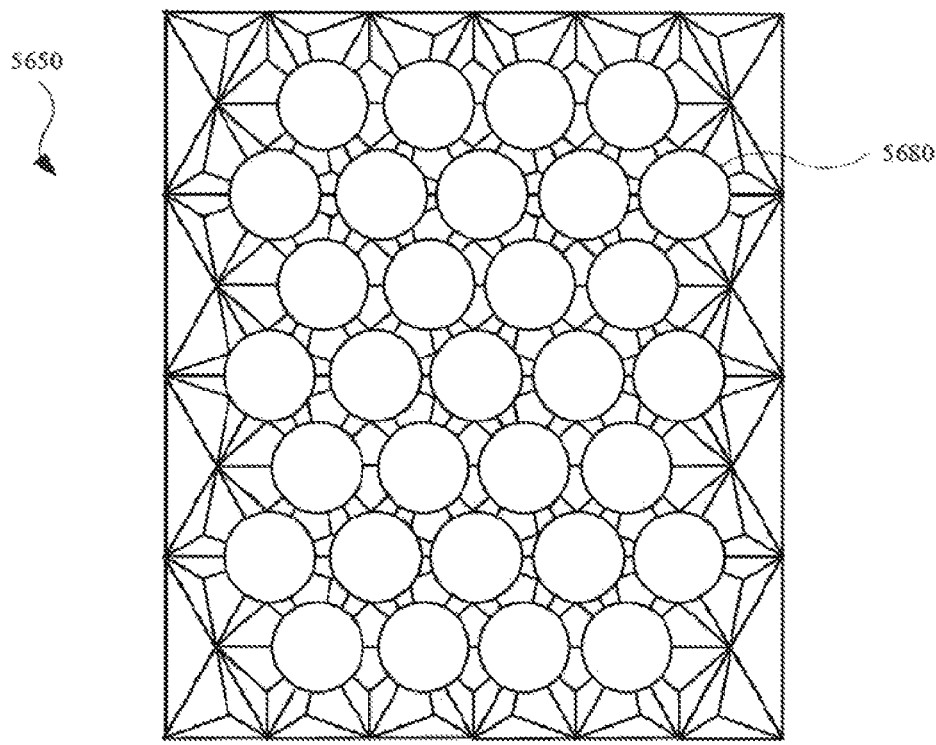
FIGS. 43A-43D illustrate aerial views of an embodiment of an array of energy distribution structures, showing multiple objects positioned on the array of energy distribution structures, in accordance with some described embodiments.
Figure 43B:
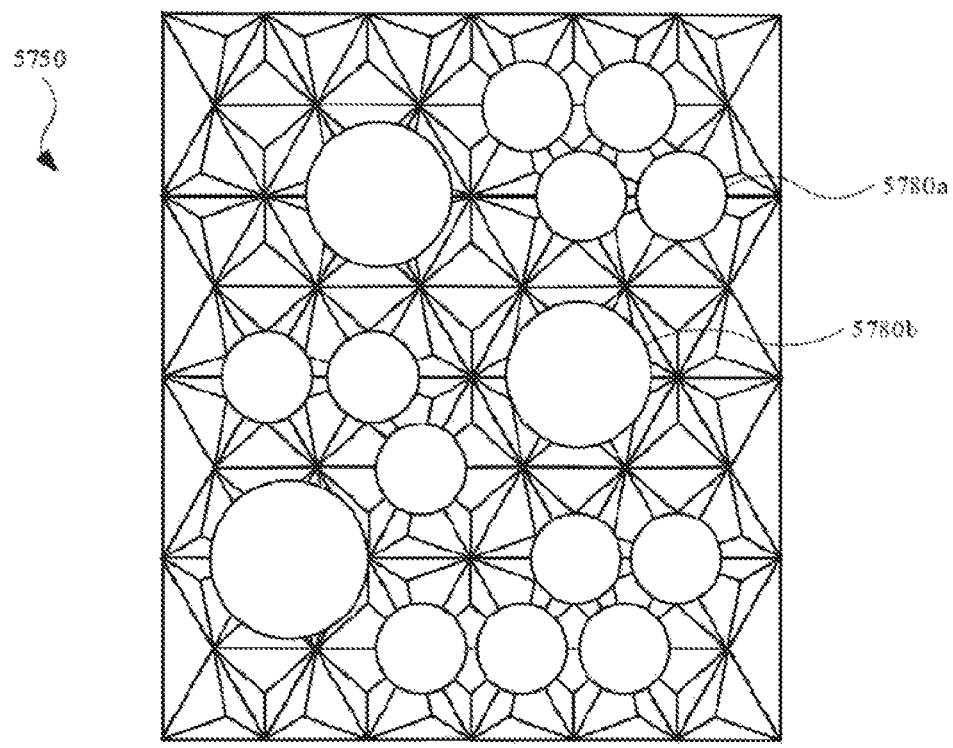

FIGS. 43A-43D illustrate aerial views of an embodiment of an array of energy distribution structures, showing multiple objects positioned on the array of energy distribution structures, in accordance with some described embodiments. The arrays shown and described in FIGS. 43A-43D may include any features described herein for arrays of energy distribution structures. Also, the objects shown and described in FIGS. 43A-43D may be positioned in valleys defined between adjacent, or consecutive, energy distribution structures. FIG. 43A illustrates an aerial view of an embodiment of an array of energy distribution structures 5650, showing several objects positioned on the array of energy distribution structures 5650. For example, an object 5680 (representative of the remaining objects) may include any features described for the objects shown and described in FIGS. 39-40B. FIG. 43B illustrates an aerial view of an embodiment of an array of energy distribution structures 5750, showing several objects positioned on the array of energy distribution structures 5650. For example, an object 5780a (representative of the remaining objects in terms of size) may include any features described for the objects shown and described in FIGS. 39-40B. However, the object 5780a may vary in size as compared to other objects. For example, the object 5780a may include a diameter of a first dimension, while an object 5780b may include a diameter of a second, different dimension. As shown, the diameter of the object 5780a is less than the diameter of the object 5780b.

Figure 43C:
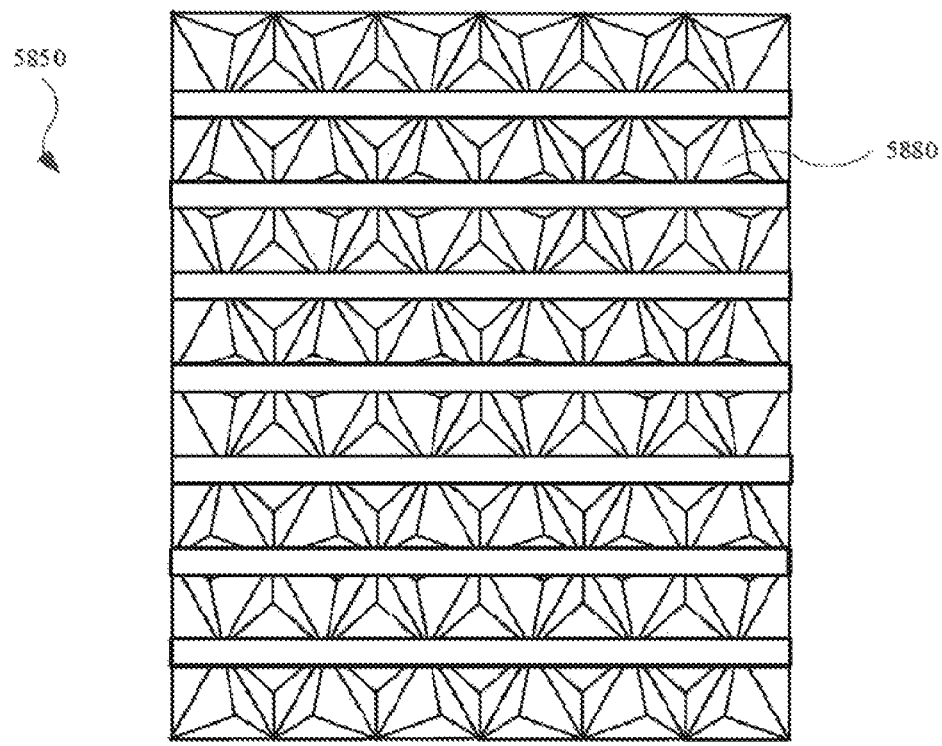
Figure 43D:
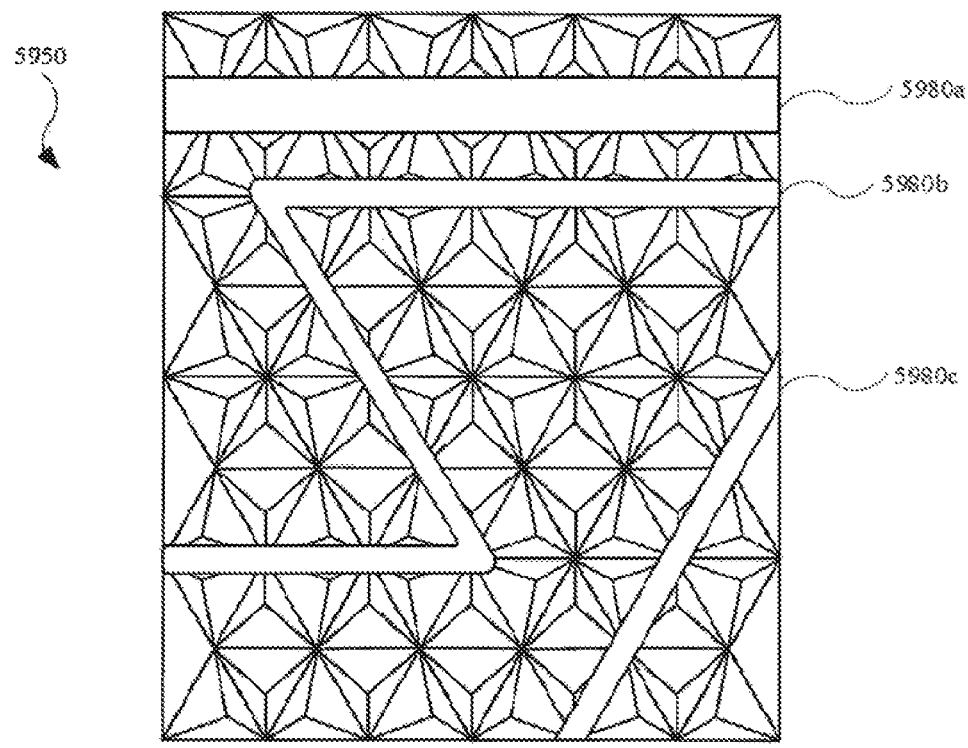

FIG. 43C illustrates an aerial view of an embodiment of an array of energy distribution structures 5850, showing several objects positioned on the array of energy distribution structures 5850. For example, an object 5880 (representative of the remaining objects) may include any features described for the objects shown and described in FIGS. 41-42B. FIG. 43D illustrates an aerial view of an embodiment of an array of energy distribution structures 5750, showing several objects positioned on the array of energy distribution structures 5650. For example, an object 5980a may include any features described for the objects shown and described in FIGS. 41-42B. However, the object 5980a may vary in size as compared to other objects. For example, the object 5980a may include a diameter of a first dimension, while an object 5980b may include a diameter of a second, different dimension. As shown, the diameter of the object 5980a is less than the diameter of the object 5780b. Furthermore, the object 5980b may include a diagonal pattern. In other words, the object 5980b can form linear and non-linear regions. Also, an object 5980c may diagonally in its entirety along the array of energy distribution structure 5950.

Figure 44:
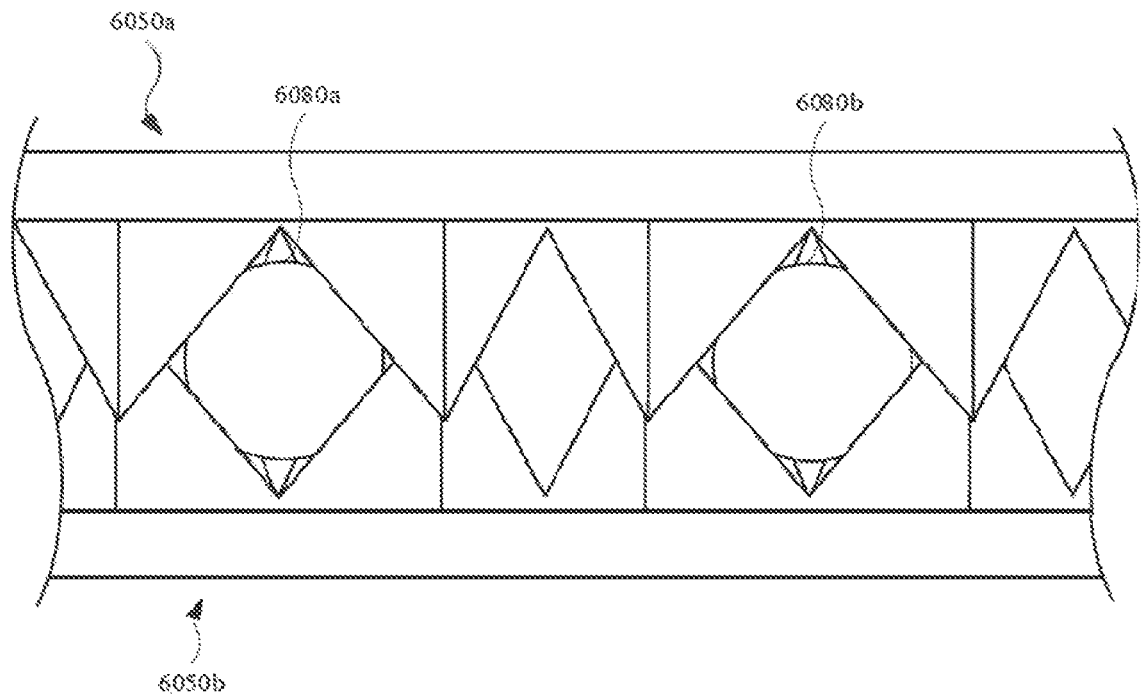
FIG. 44 illustrates a side view of embodiments arrays of energy distribution structures in a stacked configuration, showing multiple objects positioned between the arrays of energy distribution structures, in accordance with some described embodiments.

FIG. 44 illustrates a side view of embodiments arrays of energy distribution structures in a stacked configuration, showing multiple objects positioned between the arrays of energy distribution structures, in accordance with some described embodiments. As shown, an array of energy distribution structure 6050a is interdigitated with an array of energy distribution structure 6050b. Further, an object 6080a and an object 6080b are positioned in voids (not labeled in FIG. 44) defined by spaces between respective energy distribution structures of the array of energy distribution structure 6050a and the array of energy distribution structure 6050b. The object 6080a and the object 6080b may provide additional support and resistance to counter an applied force (not depicted) to the array of energy distribution structure 6050a and/or the array of energy distribution structure 6050b. The object 6068a and the object 6080b may include any configuration shown and described in FIGS. 39-42B.

Figure 45:
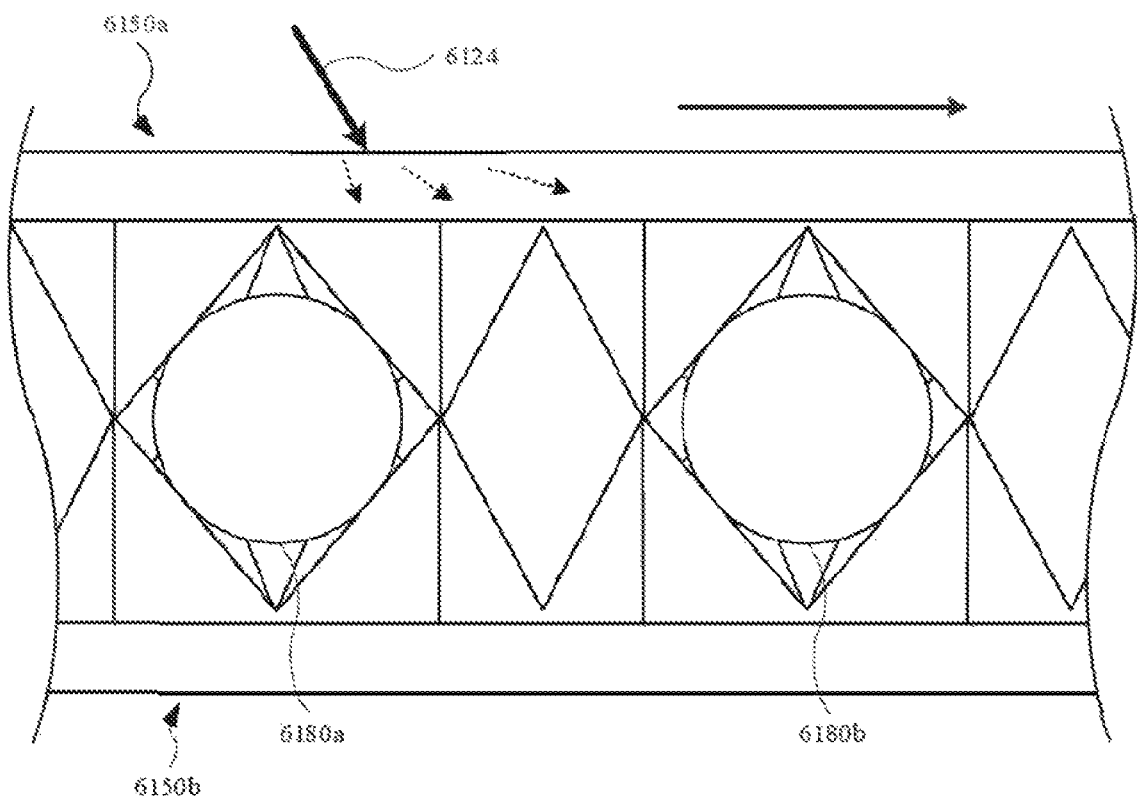
FIG. 45 illustrates a side view of alternate embodiments of arrays of energy distribution structures in a stacked configuration, showing multiple objects positioned between the arrays of energy distribution structures such that the arrays of energy distribution structures are not interdigitated, in accordance with some described embodiments.

FIG. 45 illustrates a side view of alternate embodiments of arrays of energy distribution structures in a stacked configuration, showing multiple objects positioned between the arrays of energy distribution structures such that the arrays of energy distribution structures are not interdigitated, in accordance with some described embodiments. As shown, an array of energy distribution structure 6150a is positioned over an array of energy distribution structure 6050b. Further, an object 6180a and an object 6180b are positioned in voids (not labeled in FIG. 44) defined by spaces between respective energy distribution structures of the array of energy distribution structure 6150a and the array of energy distribution structure 6150b. The object 6180a and the object 6180b may provide additional support and resistance to counter an applied force (not depicted) to the array of energy distribution structure 6150a and/or the array of energy distribution structure 6150*b*. The object 6168*a* and the object 6180*b* may include any configuration shown and described in FIGS. 39-42B.

Further, the object 6180*a* and the object 6180*b* each can include a diameter that prevents interdigitation between the array of energy distribution structure 6150*a* and the array of energy distribution structure 6150*b*. As a result, the object 6180*a* and the object 6180 can allow respective energy distribution structures of the array of energy distribution structure 6150*a* and the array of energy distribution structure 6150*b* to align with each other. Also, due to the lack of interdigitation, when an applied force 6124 is incident on the array of energy distribution structure 6150*a*, the array of energy distribution structure 6150*a* can move laterally with respect to the array of energy distribution structure 6150*b*. The lateral movement can provide additional energy redirection by the array of energy distribution structure 6150*a*.

Figure 46:
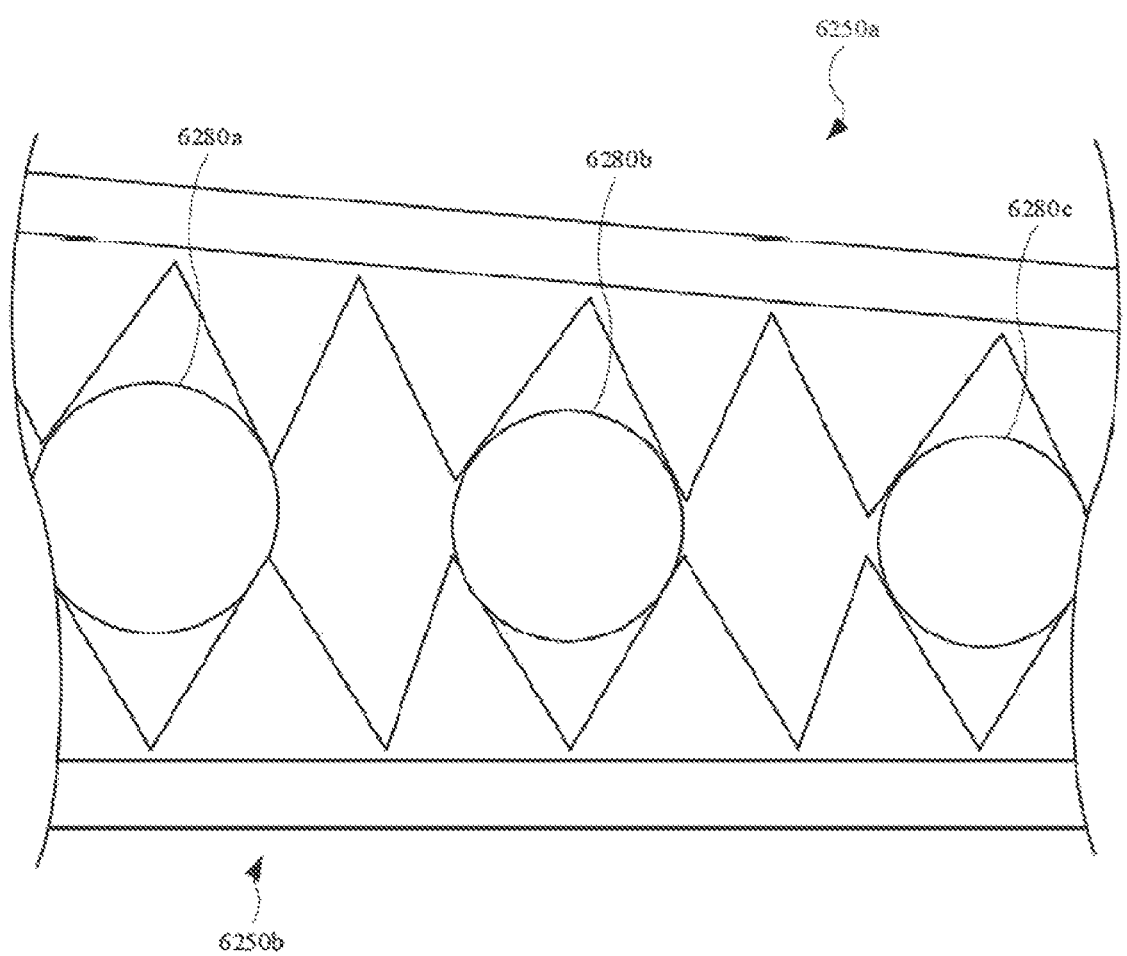
FIG. 46 illustrates a side view of alternate embodiments of arrays of energy distribution structures in a stacked configuration, showing multiple objects of different sizes positioned between the arrays of energy distribution structures, in accordance with some described embodiments.

FIG. 46 illustrates a side view of alternate embodiments of arrays of energy distribution structures in a stacked configuration, showing multiple objects of different sizes positioned between the arrays of energy distribution structures, in accordance with some described embodiments. As shown, an array of energy distribution structures 6250*a* is interdigitated with an array of energy distribution structures 6250*b*. Further, an object 6280*a*, an object 6280*b*, and an object 6280*c* are positioned in voids (not labeled in FIG. 46) defined by spaces between respective energy distribution structures of the array of energy distribution structures 6250*a* and the array of energy distribution structures 6250*b*. The object 6280*a* and the object 6280*b* may provide additional support and resistance to counter an applied force (not depicted) to the array of energy distribution structures 6250*a* and/or the array of energy distribution structures 6250*b*. The object 6268*a* and the object 6280*b* may include any configuration shown and described in FIGS. 39-42B.

While some arrays of energy distribution structures previously described include objects of the same, or substantially similar, diameter, the diameters of the objects may vary. For example, the object 6280*a* includes a diameter greater than a diameter of the object 6280*b*. Also, the object 6280*b* includes a diameter greater than a diameter of the object 6280*c*. As a result, the array of energy distribution structures 6250*a*, when interdigitated with the array of energy distribution structures 6250*b*, may lie in a non-parallel manner as shown in FIG. 46. This may reduce the height (and cross sectional area) of interdigitated arrays of energy distribution structures, which allows for a more customized fit into certain locations (as an example advantage).

Figure 47A:
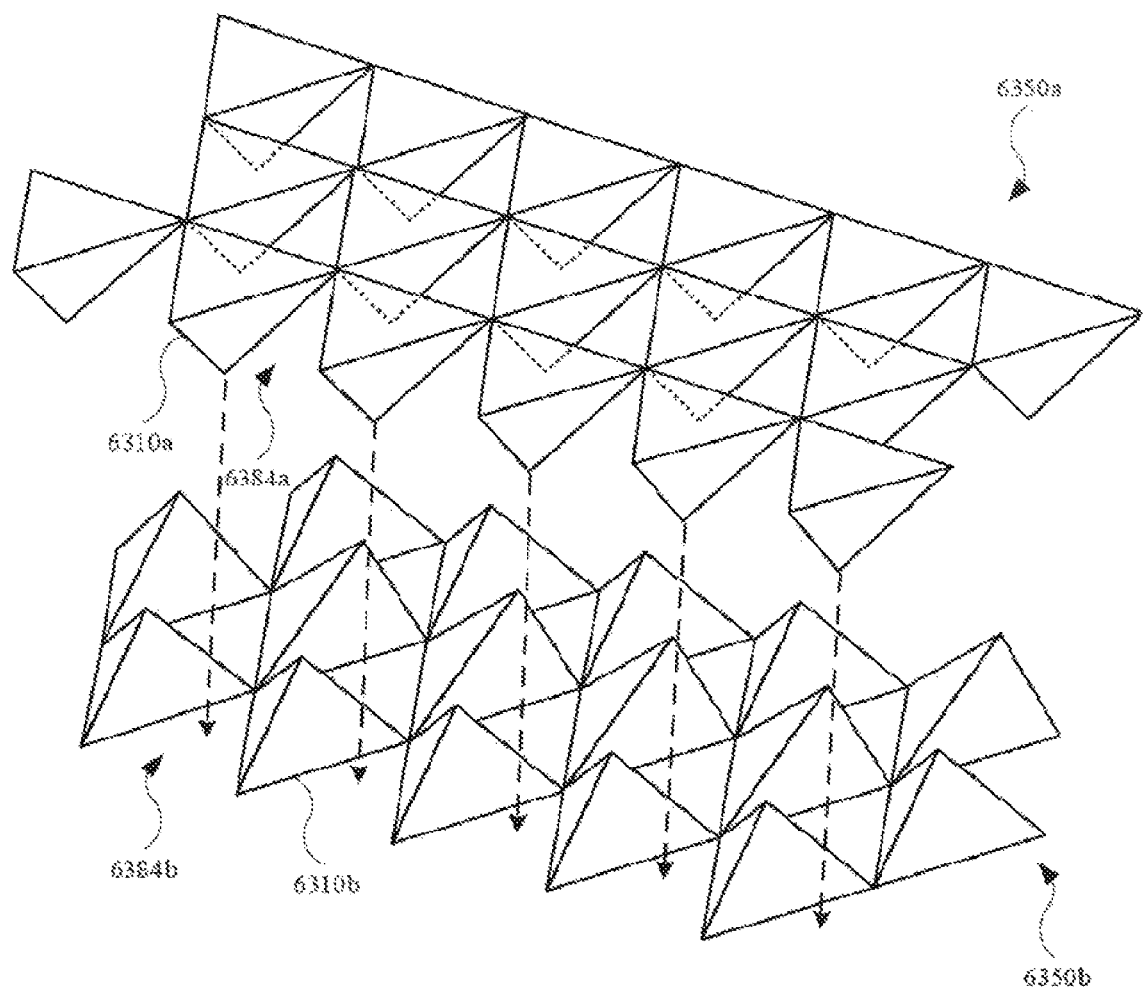
FIGS. 47A-47B illustrate isometric views of embodiments of arrays of outer components and inner components, in accordance with some described embodiments.
Figure 47B:
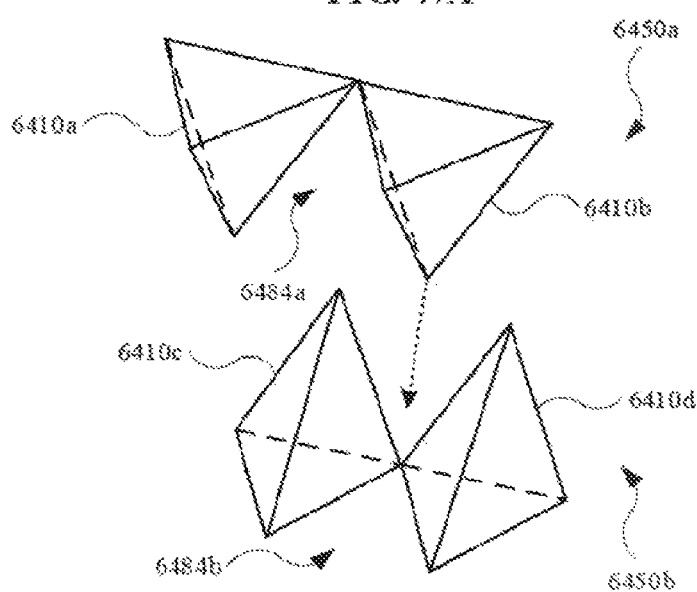

FIG. 47A-47B illustrate isometric views of an embodiment of an array of energy distribution structures having openings between adjacent energy distribution structures, in accordance with some described embodiments. The openings generally include a cross sectional area that is the same as, or substantially similar, the cross sectional area (of the base) of an energy distribution structure. FIG. 47A illustrates an array of energy distribution structures 6350*a* positioned over an array of energy distribution structures 6350*b*. As shown, the array of energy distribution structures 6350*a* includes an energy distribution structure 6310*a* and an opening 6384*a*, and the array of energy distribution structures 6350*b* includes an energy distribution structure 6310*b* and an opening 6384*b*. When interdigitated, the energy distribution structure 6310*a* is positioned in the opening 6384*a*, and the energy distribution structure 6310*b* is positioned in the opening 6384*b*. This may eliminate voids (such as the void 4874*a*, the void 4874*b*, and the void 4874*c* shown in FIG. 37) between the array of energy distribution structures 6350*a* and the array of energy distribution structures 6350*b*. FIG. 47B illustrates an alternate positioning between energy distribution structures. As shown, an array of energy distribution structures 6450*a* includes an energy distribution structure 6410*a* and an energy distribution structure 6410*b*, as well as an opening 6484*a* between the energy distribution structure 6410*a* and the energy distribution structure 6410*b*. Also, an array of energy distribution structures 6450*b* includes an energy distribution structure 6410*c* and an energy distribution structure 6410*d*, as well as an opening 6484*b* between the energy distribution structure 6410*c* and the energy distribution structure 6410*d*. When interdigitated, the energy distribution structure 6310*b* is positioned in the opening 6384*b*, and the energy distribution structure 6310*c* is positioned in the opening 6384*a*. Moreover, a tip (not labeled) of the energy distribution structure 6310*b* is positioned at a valley between the energy distribution structure 6410*c* and the energy distribution structure 6410*d*, and a tip (not labeled) of the energy distribution structure 6310*c* is positioned at a valley between the energy distribution structure 6410*a* and the energy distribution structure 6410*b*.

Figure 48:
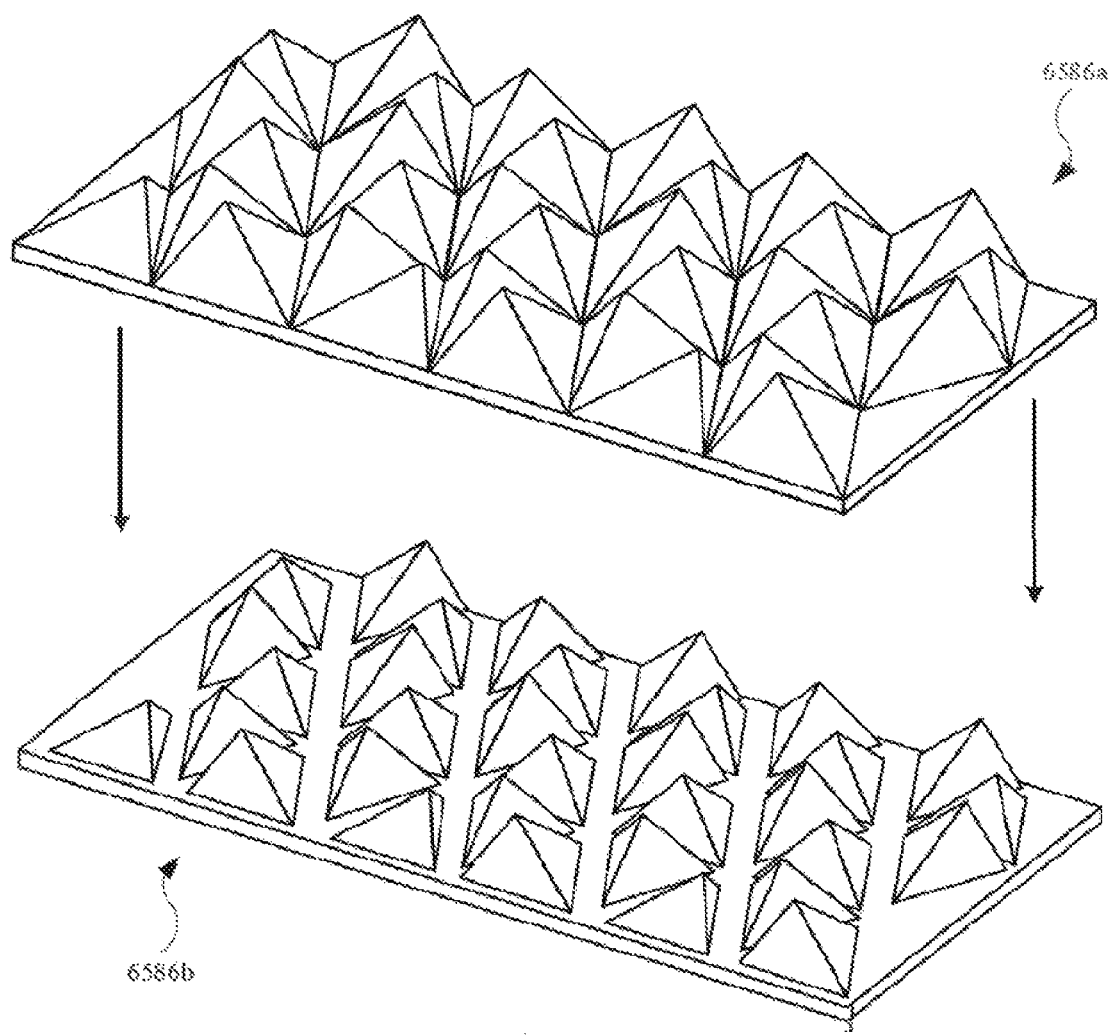
FIG. 48 illustrate an isometric view of an embodiment of an array of outer components and inner components, in accordance with some described embodiments.

FIG. 48 illustrates an isometric view of an embodiment of an array of outer components and inner components, in accordance with some described embodiments. As shown, an array of outer components 6586*a* is positioned over an array of inner component 6586*b*. When combined, the array of outer components 6586*a* combines with the array of inner component 6586*b* to form an array of energy distribution components, in accordance with several embodiments. In other words, each outer component covers a respective inner component. Accordingly, the outer and inner components of an array of energy distribution structures can be made in a modular form. This further allows the outer and inner components of different shapes and size to be combined with each other to form an array of energy distribution structures.

Figure 49:
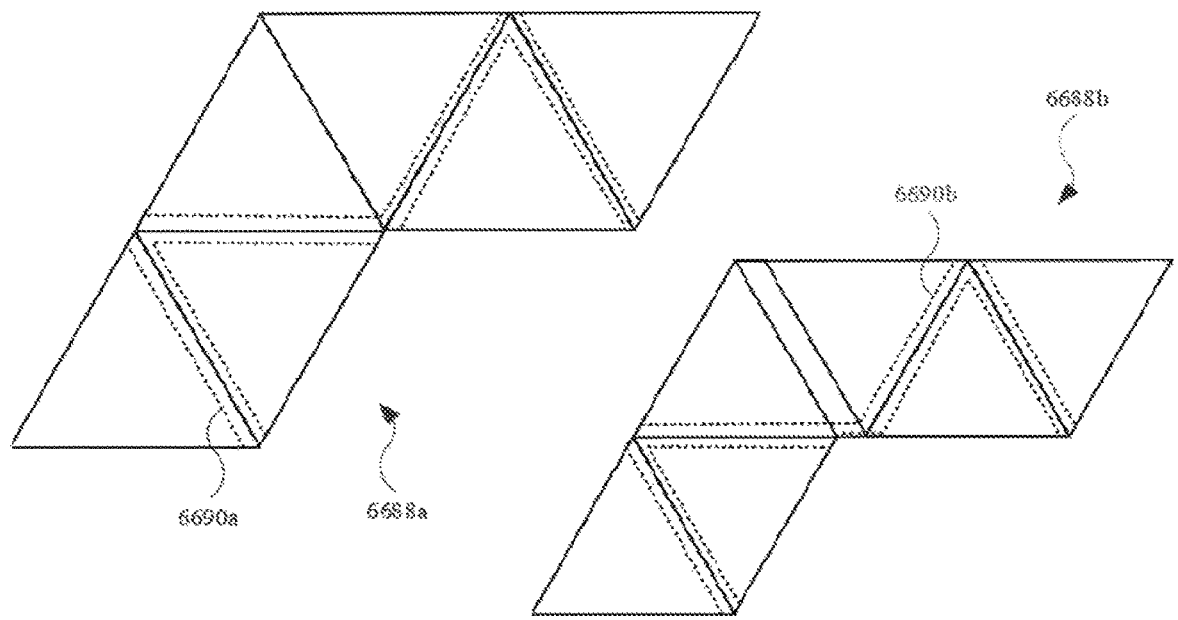
FIG. 49 illustrates an aerial view of an embodiment of a layer and a layer used to form an array of outer components and inner components, respectively, in accordance with some described embodiments.
Figure 50:
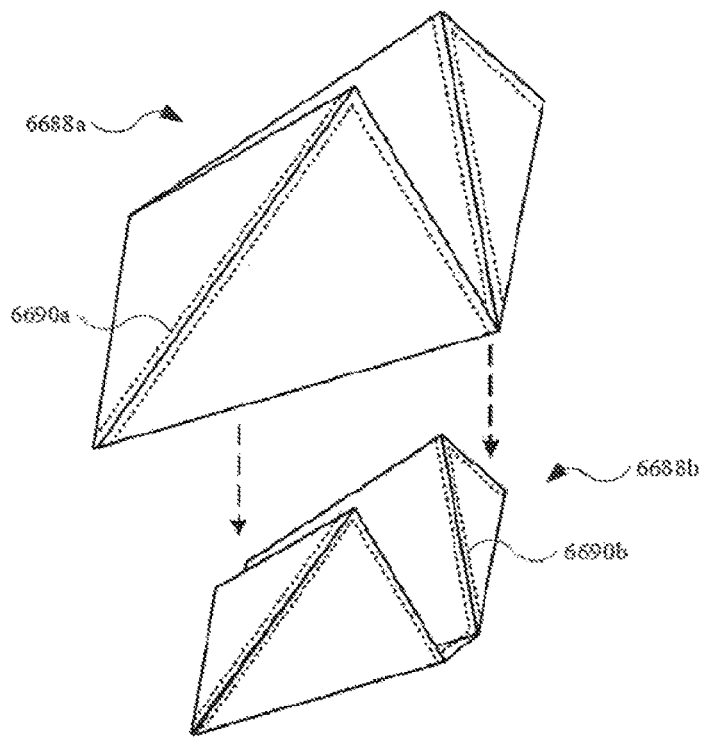
FIG. 50 illustrates an isometric view of the layer and the layer used shown in FIG. 49, showing the layer and the layer transformed to the array of outer components and inner components, respectively.

FIGS. 49 and 50 show an embodiment of outer and inner components that can be combined with each other to form an array of energy distribution structures. FIG. 49 illustrates an aerial view of an embodiment of a layer 6688*a* and a layer 6688*a* used to form an array of outer components and inner components, respectively, in accordance with some described embodiments. As shown, the layer 6688*a* and the layer 6688*b* include a conductive material 6690*a* and a conductive material 6690*b*, respectively. The conductive material 6690*a* and the conductive material 6690*b* may include a thermally conductive material or an electrically conductive material. Further, the conductive material 6690*a* and the conductive material 6690*b*.

Also, as shown in FIG. 49, the layer 6688*a* and the layer 6688*b* are generally flat. However, the layer 6688*a* and the layer 6688*b* can be converted to three-dimension forms. In this regard, the conductive material 6690*a* and the conductive material 6690*b* may "memory" capable of transitioning to a predefined shape.

FIG. 50 illustrates an isometric view of the layer 6688*a* and the layer 6688*b* used shown in FIG. 49, showing the layer 6688*a* and the layer 6688*b* transformed to the array of outer components and inner components, respectively. The conductive material 6690*a* and the conductive material 6690*b* can be used to transform the layer 6688*a* and the layer 6688*b*, respectively. For instance, when the conductive material 6690*a* and the conductive material 6690*b* include a thermally conductive material or an electrically conductive material, applying heat or electrical current, respectively, to the conductive material 6690*a* and the conductive material

6690b, thereby causing the layer 6688a and the layer 6688b to transition from flat layers to the three-dimensional structures that can subsequently form an array of energy distribution structures.

Figure 51A:
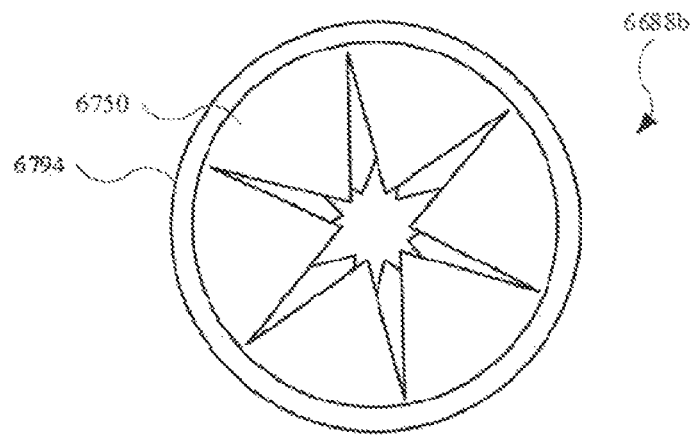
FIGS. 51A-51C illustrate a side view of embodiments of arrays of energy distribution components positioned on circular layer, in accordance with some described embodiments.
Figure 51B:
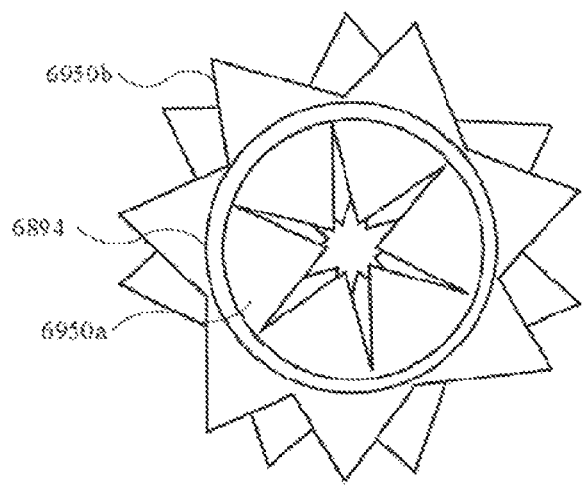
Figure 51C:
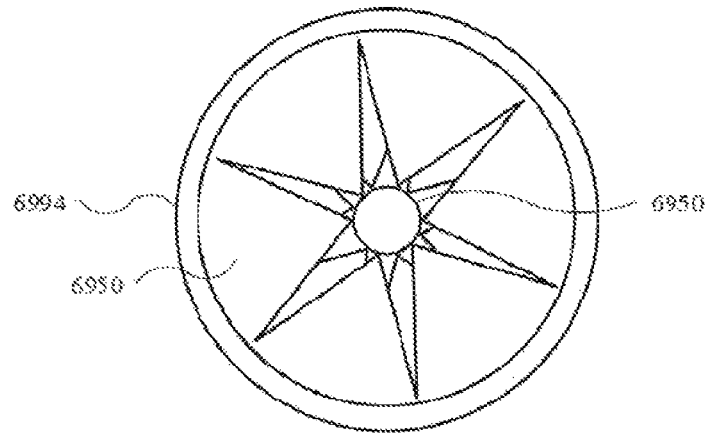

FIGS. 51A-51C illustrate a side view of embodiments of arrays of energy distribution components positioned on circular layer, in accordance with some described embodiments. The circular layers shown in FIGS. 51A-51C may represent a cylindrical element or a wheel, as non-limiting examples. FIG. 51A illustrates a circular layer 6794 having an array energy distribution structures 6750 formed within a perimeter the circular layer 6794. FIG. 51B illustrates a circular layer 6894 having an array of energy distribution structures 6850a and an array of energy distribution structures 6850b formed on opposing surfaces of the circular layer 6894. FIG. 51C illustrates a circular layer 6994 having an array of energy distribution structures 6960 formed within a perimeter the circular layer 6994, as well as an object 6980 positioned in a void (not labeled) defined by the an array of energy distribution structures 6950.

Figure 52A:
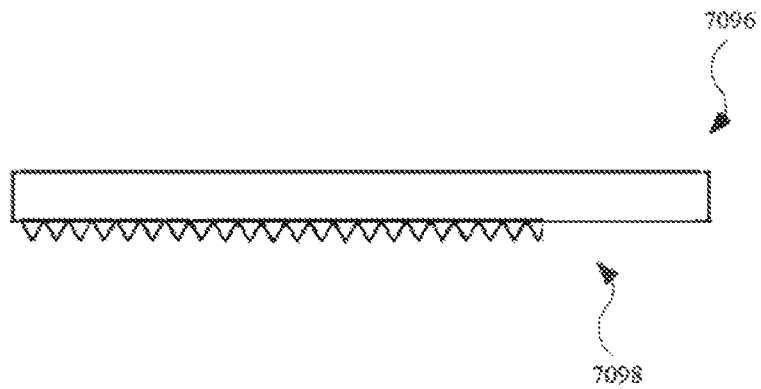
FIGS. 52A-52C illustrate base regions of energy distribution structures and arrays of energy distribution structures, in accordance with some described embodiments.
Figure 52B:
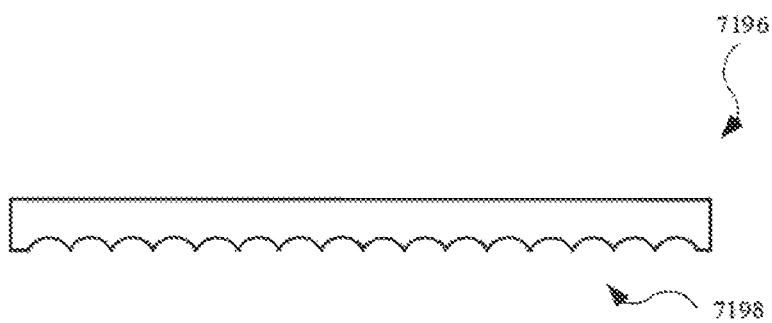
Figure 52C:
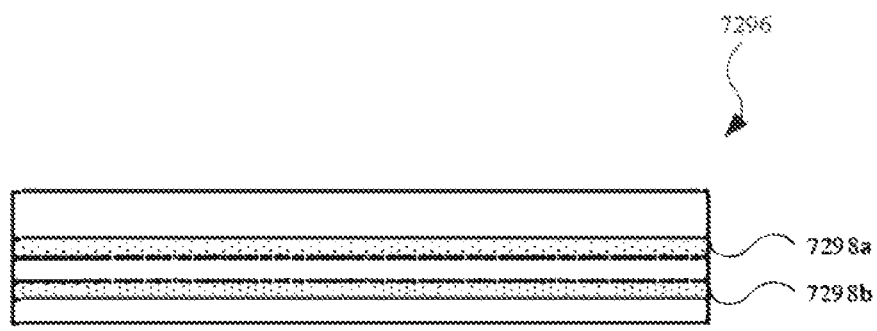

FIGS. 52A-52C illustrate base regions of energy distribution structures and arrays of energy distribution structures, in accordance with some described embodiments. In this regard, the base, bottom, or lowermost of region of an energy distribution structure and arrays of energy distribution structure is depicted in FIGS. 52A-52C. FIG. 52A illustrates a base region 7096 that includes ridges 7098. As shown, the ridges 7098 include a saw tooth configuration, or conversely, a series of grooves. FIG. 52B illustrates a base region 7196 that includes dimples 7198. As shown, the dimples 7198 include semicircular grooves. FIG. 52C illustrates a base region 7296 that includes a layer 7298a and a layer 7298b adhered or bonded together.

Figure 53A:
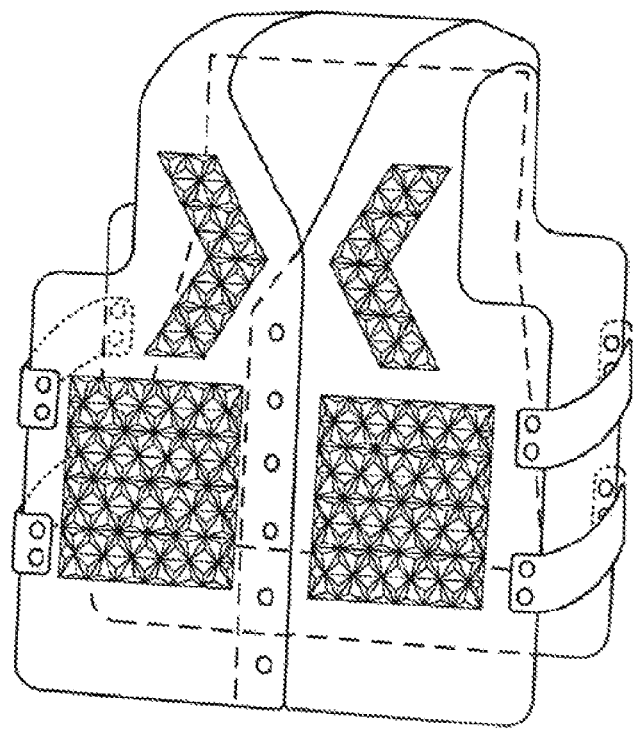
FIGS. 53A-53B illustrate isometric views of an embodiment of an armored vest, in accordance with some described embodiments.
Figure 53B:
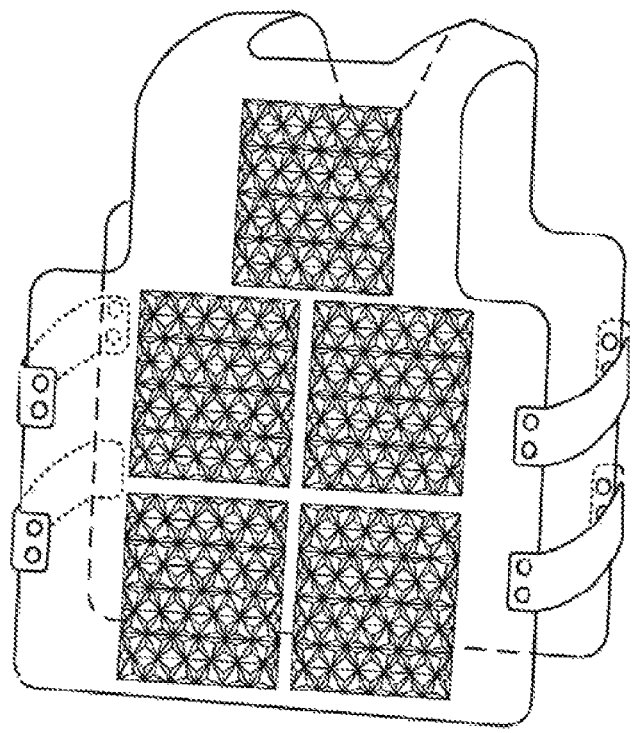

FIGS. 53A-53B illustrate isometric views of an embodiment of an armored vest, in accordance with some described embodiments.

Figure 54A:
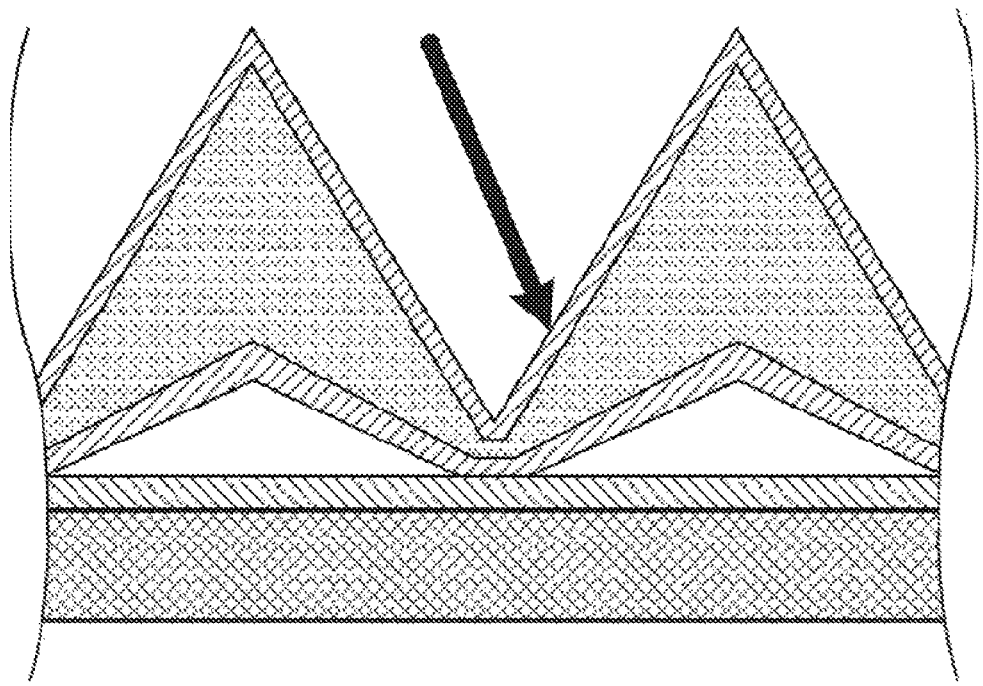
FIGS. 54A-54B illustrate a cross sectional view of an array of energy distribution structures receiving of an armored vest receiving an applied force, in accordance with some described embodiments.
Figure 54B:
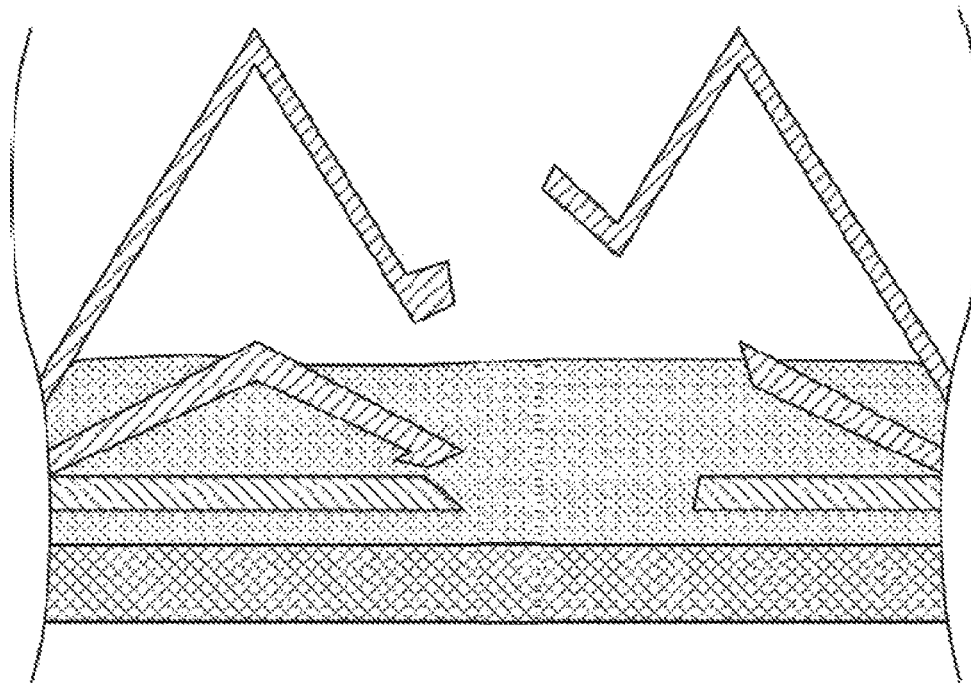

FIGS. 54A-54B illustrate a cross sectional view of an array of energy distribution structures receiving of an armored vest receiving an applied force, in accordance with some described embodiments.

Figure 55A:
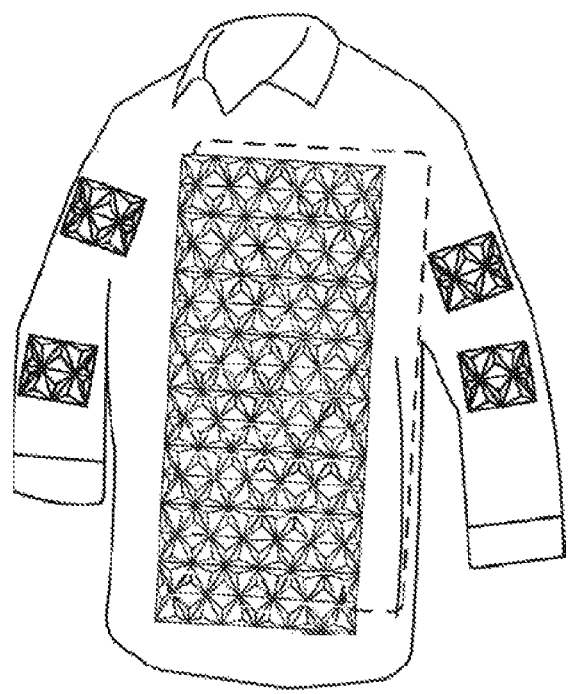
FIGS. 55A-55B illustrate alternate embodiments of additional articles of clothing that include energy distribution structures, in accordance with some described embodiments.
Figure 55B:
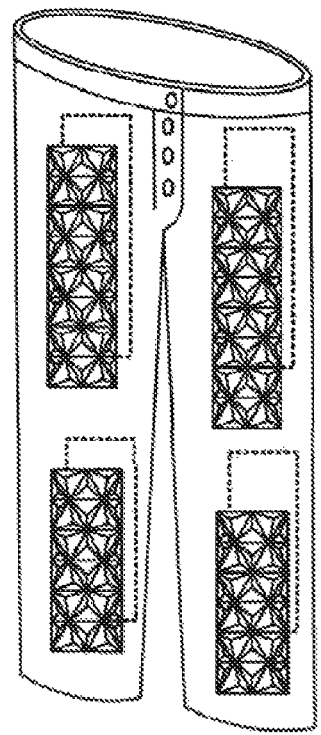

FIGS. 55A-55B illustrate alternate embodiments of additional articles of clothing that include energy distribution structures, in accordance with some described embodiments.

Figure 56:
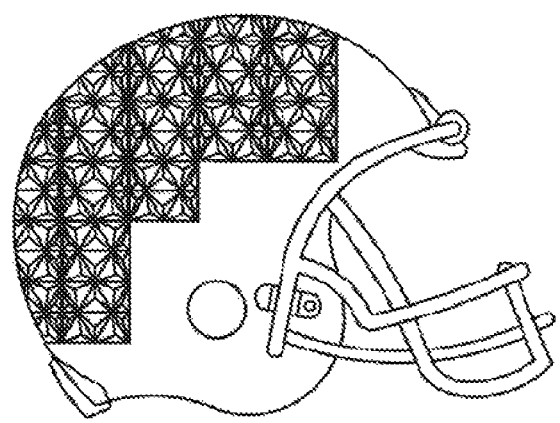
FIG. 56 illustrates a football helmet that includes energy distribution structures, in accordance with some described embodiments.

FIG. 56 illustrates a football helmet that includes energy distribution structures, in accordance with some described embodiments.

Figure 57:
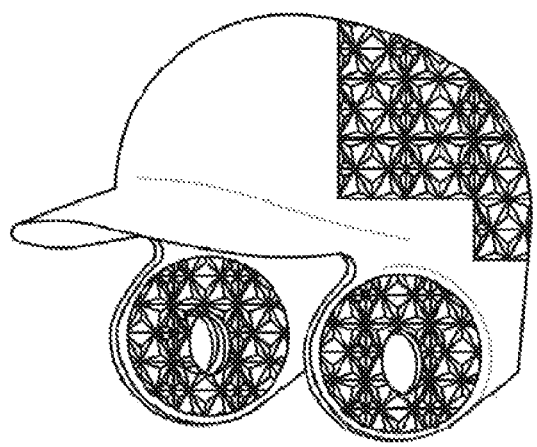
FIG. 57 illustrates a baseball helmet that includes energy distribution structures, in accordance with some described embodiments.

FIG. 57 illustrates a baseball helmet that includes energy distribution structures, in accordance with some described embodiments. Still other embodiments can be applied to vehicles, such as armored vehicles, aircraft, vessels, ships (both surface and subsurface), accessories, propellers, packaging, energy cells such as solar cells, etc.

In some embodiments, flat-stock, coil-stock, bar stock, plate, strips or similar "raw" material could be embedded with or be applied to "memory wire" or similar (non-limiting) material such that the "memory wire" is trained in the desired final shape of the structural embodiments disclosed herein. When activated such versions can be used to "fold" the material into the desired configuration of, for example, tetrahedrons.

This same concept could be used to re-flatten the tetrahedrons after being folded, if the "memory wire" is trained in a flat or coiled end-state.

In other embodiments, such technology could be used to have armor or surfaces that go from flat to being shaped like the structures described herein (or similar architectures) to enable on-demand modification of surfaces to prepare for various conditions/threats as non-limiting examples.

It is further conceivable that such technology could be used to re-structure body armor (as a non-limiting example) either on-demand and/or following a hit to add to the self-healing aspect of the embodiments discussed elsewhere in the patent application.

Gravity/Anti-Gravity Plating

Embodiments of these structures could be used as the basis for a gravity/anti-gravity plate. The base tetrahedron unit's unique design provides an architecture that facilitates "coiling" or otherwise laying out as non-limiting examples, conductor(s) and/or stationary and/or moving magnetic component(s), magnet(s), etc., which could include copper, conductive metals, composites, graphene, silicone, rare earth magnets, etc.) that could be used to create miniature electromagnetic fields with a pattern/patterns of said conductors that run in, and/or are electrified in, different "directions" (i.e. the opposing fields create a harmonic and/or dissonance whose byproduct separately, or with additional amplification creates a different "gravity" that is present elsewhere in proximity to the unit thus either overcoming terrestrial gravity (of a celestial body, satellite, comet, asteroid, etc. as non-limiting examples, and/or manmade structures, and/or general "zero-gravity" associated with activities in space (again as non-limiting examples). This assembly may or may not include (as a non-limiting example) a spinning or otherwise rotating or moving magnet or magnets within the "coil(s)" to further create an electromagnetic field, harmonic, dissonance, etc. to achieve the desired result.

The void space in between the "shells" of the unit may be filled, as a non-limiting example, with fluid, gas, plasma, magnetic fluid (known as "ferrofluid", or other material(s) which serves to amplify or increase the effect of the "coil (s)". in a desired application.

The ability to have a structural element in which and through which various pathways can be provided for wiring, cabling, optics, fluids, liquids, gases, plasma, etc. (non-limiting examples), is a key element of this technology that facilitates the ability to use it as the base architectural component for the above and below applications (as non-limiting examples).

When a unit is placed in an array (reference various formats and embodiments shown in patent), the proximity of each to one another, if calibrated and/or amplified correctly should create a "pool" of gravity different than is present elsewhere in proximity to the array.

Applications for such a technology would include, as a non-limiting example, "gravity" plating for the interior and/or exterior of space-faring vehicles, ships, stations, as non-limiting examples in "zero-G" and/or reduced gravity conditions.

As another non-limiting example, such units and/or arrays, in appropriate assemblies and embodiments could also be used for containment of various chemical reactions, electro-chemical reactions, nuclear reactions, atomic fusion/fission reactants and resulting energy, heat, etc.

As another non-limiting example, such units and/or arrays, in appropriate assemblies and embodiments could also be used for focusing electromagnetic energy such as high-intensity light sources, lasers, to include electromagnetic pulses. This could lead to greater ability to maximize the effectiveness (range, intensity, focus, etc.) of lasers and other electromagnetic energy devices as well as those using and/or projecting or otherwise moving plasma, ions, or similar non-physical elements or items such as fluids, liquids, gases, etc.

As another non-limiting example, such units and/or arrays, in appropriate assemblies and embodiments could also be used to focus or direct and/or shield from radiation, ions, ionization, plasma, As another non-limiting example, such units and/or arrays, in appropriate assemblies and embodiments could also be used for creating shielding to counteract or protect from potential damage caused by any number of threats such as electromagnetic, radiation, plasma, laser, or other known, or as-yet-unknown non-projectile-based threats. It is conceivable also, that under the right conditions and with a sufficient amount of energy provided, such "shielding" could also be used to stop, slow, redirect, or repulse projectile-based threats as well.

As another non-limiting example, such units and/or arrays, in appropriate assemblies and embodiments could also be used in conjunction with other technologies to focus electromagnetic energy in support of rapid-velocity or hyper-velocity or other levels of acceleration beyond as it relates to the movement of objects, vessels, ships, equipment, projectiles, rockets, payloads, etc. (physical items). Such hypervelocity technology is developing currently for payload launches, mining, drilling, and weaponry As another non-limiting example, such units and/or arrays, in appropriate assemblies and embodiments could also be used in an inverse application for any/all of the above to provide a repulsive "gravity" pool which could be focused/used to provide "thrust" without requiring moving parts for propulsion in water, on land, in orbit, in space, or on other celestial bodies, or objects in space.

It is also conceivable that when used in conjunction with current thrust-producing technologies, the aforementioned technology could be used to provide significant improvements in thrust to weight ratios, when used to focus incoming or outgoing forces generating such thrust. Non-limiting examples include vectoring/directing thrust from jet engines, scram-jet or similar experimental technologies, rocket thrust from solid or liquid fueled rockets, ion or plasma thrust systems, compressed gas or similar thrust, and even fan-based thrust.

As another non-limiting example, such units and/or arrays, in appropriate assemblies and embodiments could also be used to create magnetic levitation type Example Images of "gravity/anti-gravity" plating (FIGS. B1 and B2)

Alternate Embodiment—Tessellation or overlapping rotated structure can be formed from overlapping and rotating, for example, 2 small (6 tet, short for tetrahedron) arrays by a specific angle (as a non-limiting example).

This embodiment can represent a non-limiting example of how through 3D printing technology, it would be possible to make extremely strong structural elements of this or other forms based on the individual unit architecture of essentially any version listed in the patent.

This specific shape and versions of it, tend to lock together when put together with "tips" facing each other. See FIGS. B3-B11, which includes 3D printed pieces, an example of two pieces opposing, slight rotation, and "locked" together into a structural assembly, an example of 3 individual pieces sitting next to each other to show how the perimeters interact, and an example of 3 interlocked pieces placed in close proximity showing how the pieces would interact when placed closely together.

FIG. B12 depicts an example of an alternate configuration with "truncated" tips and modified interfaces to allow for a hexagon-shaped end base (Isometric view).

FIGS. B13-B15 show alternate configurations, and FIG. B16 depicts an example of tip-to-tip configuration (side view).

Other examples (FIG. B16) can include flexible assemblies mounted to a flexible backing, for instance. Still other embodiments can be curved and/or reinforced, such as with structures having spheres or other shapes in the "valleys" between tets. Such versions can be applicable to, for example, pressure vessels and submarines, ship hulls, etc. See, e.g., FIGS. B17-B22. These include examples of the "every other tet" configurations. More than one tet could be "skipped" in a given location as other non-limiting representative examples.

Additional embodiments can include configurations for rockets or missiles. For example, FIGS. B23-B29 disclose embodiments as structural elements that are applied in rockets and space craft to make the hull and provide more efficient use of materials and volume. In these images, there are representative examples of how such a configuration can look and some of the benefits.

Further, it is worth noting that in lieu of the spherical or cylindrical fuel pods or fuel tanks currently used, such pressure vessels could themselves be made of embodiments such as outer or skin panels. Further still, these pressure vessels can be in the shape of embodiments shown throughout this disclosure. As a non-limiting example, the tetrahedron shaped fuel pods could facilitate enhanced volume use of the proposed triangle-shaped hull.

There are benefits in addition to the tetrahedron shape, to provide a "bladder" (e.g., analogous to an inner tube on a bike tire) to contain the physical contents and or separate the contents from the pressure vessel to avoid physical contact between the contents and the walls of the pressure vessel. This or similar configurations can provide a better pressure vessel assembly than current spherical or cylindrical pressure vessels. However, if these embodiments forming the vessel are supported by layers, or other structures made from embodiments disclosed herein, they can maintain required pressure without the need of a "bladder."

Examples include stacking of round or cylinder-shaped "fuel pods" inside of a triangular rocket hull (tube). Other examples are space-saving by using more, smaller diameter fuel pods in lieu of larger ones inside a triangular hull configuration. Based on the math, 5 foot diameter spheres can replace the same volume of a single sphere with a 15 foot diameter, with an embodiment of a rocket hull configuration using a triangular "tube." Examples of cockpit and "section" view of hull and spherical representative fuel pods are included. Other examples depict how a triangular rocket hull can provide potentially similar volume with potentially less material. Additional non-limiting examples of configurations related to a triangular hull rocket design are included.

FIG. B30 depicts a horizontal section through a tetrahedron unit as an example of how a tet-shaped pressure vessel can be constructed using a bladder or liner to contain a substance which may or may not be under pressure.

Glove examples are provided in FIGS. B31-B32.

Active Camouflage

Embodiments or application described herein can be used as a base architecture. A unit or array of units can incorporate color-changing lights such as light emitting diodes or LED's (as a non-limiting example), color changing materials such as photo-reactive plastics or other materials as non-limiting examples, and with coordination of the colors which are projected, a false image could be provided which would optically (visually) camouflage or otherwise obscure visibility of an object covered with such a unit or array of units such that it would appear to blend in with surrounding visual references. If, as a non-limiting example, a tetrahedron embodiment used as the outer shell could me made of any number of materials and in any number of opacities to support the desired external condition of the array and additionally to provide protection to the other components that make up the assembly. Inside of each unit making up the array there could be, as an example, a single or multiple LED's on at least one face or edge or any number of LED's on any number of faces or edges of the inner shell whose orientation is such that the light emitted would show outwardly from the inner shell through the outer shell. Consequently, by combining the colors into images (not unlike an LED or OLED TV screen) an image could be portrayed, projected, or otherwise made which would serve to mask or camouflage the underlying object(s), person/people, or structure(s), etc. (for purposes of this section, we will call this the 'object' This can further be altered by having a camera, not unlike the very small cameras in mobile/cellular telephones today (or smaller) as a non-limiting example, this camera could be used to pick up the approximate image that a person viewing the 'object' would otherwise see if the 'object' was not in their field of view. This camera could, as a non-limiting example, be in the "tip" of the tet unit, or in the valley between a grouping of more than one tet units, or on the face or faces of units as required to provide the appropriate image input to render the image output via the LED's. Embodiments with a shape other than a tetrahedron and with more outwardly oriented faces (FIGS. 15, 16, 17, 18, and 19 as non-limiting examples) may also be configured in such a way and can have additional benefits, such as complexity of terrain or "background" against which the 'object' is to be camouflaged. Configurations using any number of or combination of other embodiments, figures, etc. within this patent or logically following from this patent may also be conceived.

This technology could be applied to wearable applications for non-camouflage applications as well, for purposes such as advertising, marketing, displaying vitals and/or displaying other information which a wearer may wish to display, even applications for fashion, art, etc. Additionally, the same could also be used for new types of signage, and other applications for use on stationary or moveable objects, structures, vehicles, etc. as non-limiting examples.

FIGS. B33-B36 depict shapes A, B, C and D where A, B, and C represent items, and shape D represents the general background. In the examples that follow, the assumption is that B is the 'object' that needs to be camouflaged. Shape B is an object that has active camouflage panels as representatively described above which are attached to its exterior surface and which can be used to make it visually blend in with background as well as objects that are behind it such that is visually appears to not be present. The outline of shape B is left in the images to provide reference only. The camera(s) on the front and rear faces of shape B identify and capture the correct image of the other shape(s) in front or behind (as well as the color) and a software and program then project/display those shapes and colors onto the face visible to the viewer. Because the image being displayed on the side of shape B that is facing the observer is a "live feed" image, should a change occur in the color of one of the other shapes, shape B would be able to adjust accordingly. This allows the shape B to move with respect to background D and shapes A and C and have the displayed image (or camouflage pattern) adjust to reflect (display) what is behind the shape B at any given point in time.

Shape C can be in front B and shape A can be behind B. One drawing depicts how these shapes would look if no active camouflage was in use on shape B. In another drawing, the arrangement of shapes is the same as before, but Shape B has Active Camouflage in use thus making shape C appear to essentially just be in front of shape D and Shape A to appear to have nothing in front of it. In another version, shapes C and A are behind shape B, which shows how these shapes would look if no active camouflage was in use on shape B. Further, the arrangement of shapes can be the same as before, but Shape B can has Active Camouflage in use thus making shape C appear to essentially just be in front of shape D and Shape A to appear to have nothing in front of it.

Embodiments can include an integrated, automated external defibrillator (AED) built into body armor, a space suit, a diving suit, or other protective gear. Such gear can provide defibrillation to the wearer when an injury or other causal factor occurs which causes the heart to stop or beat in an otherwise abnormal rhythm.

It is understood that the reader will have basic knowledge of what an AED is, and at a basic level that they re-start or re-set the heart in case of an emergency through the issuance of an electric "shock" to the heart muscle by creating an arch of electricity which passes from one transmitting pad through the heart muscle to a receiving pad. As such, we will consider the basic configuration of an AED to be in line with the device presented here-in. It can include three components, including a main device body from which a shock is administered, and one each of a front pad and a back pad with their respective connections to the main device body. These devices can be such that all that is required of a user is that they place the pads in the correct location and follow the verbal instructions provided.

It is further understood that in a battlefield situation or situation under fire, or in orbit or in outer space, obtaining medical help can be difficult, and in some cases unavailable. If help is available, in some situations removing exterior layers is not simple, and/or may not be an option. In the vacuum of space, or at depth under water, removing a protective garment may, in fact, may cause more harm. In space moreover, removing a space suit while still in the vacuum of space would not be an option if a situation occurred where a person needed defibrillation and could not be taken into a pressurized location prior to removing their space suit.

Some embodiments can provide a unique architecture to facilitate routing the necessary components through embodiments disclosed herein such that an AED could be incorporated into the layer closest to the wearer's skin to facilitate and allow for the AED to operate and provide necessary assistance to the wearer without having to remove their outer garments, armor, or space suit as non-limiting examples. Further, because of the automatic nature, if the wearer has the pads installed in the correct locations prior to donning any of these embodiments, such that a connection is made with the pads once the device is worn, the device could have pathway built in (either wires or nano-circuitry made with graphene, graphite (as non-limiting examples) which provide the necessary pathway from the Device Body to the pads. When the Device Body detects an issue, or when an externally provided Device Body is coupled to the embodiments to provide necessary monitoring and shock by another person like a field medic (as in a battlefield scenario) the pads are already in place and no time is lost stripping down the wearer, preparing their skin to receive the pads, and then placing the pads, etc.

FIGS. B37-B38 show a wearer appropriately locates and places the AED pads on their body prior to putting on one of the embodiments. Not shown in this picture—when the wearer puts on the embodiment, the leads that connect the AED Pads to the AED Device Body are routed through the pathway (voids) provided as a result of embodiment's architecture and unique design (reference FIGS. 35, 37, 43C, 43D, and 44) and then connected to the Device Body which is mounted, worn, or otherwise carried by the wearer.

In an alternate configuration, the pads may be applied as above and leads routed through the Embodiment as above, but the connection points from the leads to the Device Body are simply made readily accessible for use by a medic, doctor, nurse, etc. and/or the wearer if needed.

In another embodiment, the wearer may first put on an undergarment that has electrically conductive "panels" or "pathway" built into, or sewn into, or applied to the undergarment that will conduct the shock from AED panels through the undergarment to the wearer when a shock from the AED is required/applied. Such panels could be made from any number of materials such as graphene, hemp fiber, metallic or semi-metallic materials and other conductors as non-limiting examples which will allow the transfer of electricity for shock and vital sign monitoring through the undergarment. In this embodiment, the AED pads are integrate into the Embodiment panel which has the leads routed through it as well (as described above), and which are either subsequently connected to the Device Body or able to be easily accessed to connect the Device Body as/when needed.

Similar to the previous embodiment, the Embodiment panel may also simply have connection points which connect to the pads through a wearer's undergarment to the leads, and back to the Device Body.

In another embodiment, the Embodiment panels may be designed to be in direct contact with the wearer's skin and subsequently have pads, contacts, or simply electrically conductive materials integrated into the relevant points on the panel that align with the appropriate AED pad locations such that the Embodiment itself provides the contact in lieu of an independent or pre-applied pad or undergarment as described above.

The Device Body may also be integrated into the Embodiment panel(s) and/or other wearable Embodiment products such as vests, sleeves, pants, helmets, backpacks, etc. (as non-limiting examples).

Combinations of embodiments or elements of embodiments above, as well as others implied, or which are logical progressions or variations on the above or evident from the above might also be used.

With the small scale of AED's and related components, it is conceivable that an entire AED unit could be designed to be housed within the Embodiment architecture In some embodiments such as FIGS. B39-B42, versions could be used as part of or as the prime component of a structural, building, ballistic, or other panel(s) as non-limiting examples to serve any number of purposes. These images are non-limiting examples of such embodiments and assemblies. Representative Ballistic panel Assembly, alternative Ballistic Panel Assembly, Construction Building Panel Representative Assembly (shows utility routing potential).

Self-healing. In another embodiment, the architecture facilitates the ability for the unit to receive an impact and then recover in part or in whole, 'to self-heal', in a matter of speaking. Using known materials with known properties such as non-Newtonian fluids (as a non-limiting example), an embodiment of the structure can be made of materials that are flexible when not being acted upon by an external force, but react when acted upon to create strength and resistance to said force.

The layers of the embodiment (as described elsewhere) and the inclusion of different material(s) or lack of materials within the void spaces provide the ideal combination of structure and containment while not compromising mobility in non-limiting applications such as body armor or sports safety equipment. The same is true for embodiments in non-wearable applications.

Further still, by also incorporating memory wire or materials into the architecture, if an impact deforms or otherwise "damages" the structure and it is unable to re-bound in part or in full, the memory materials can then be activated (if not activated automatically by the force acting upon them) re-shape the structure into the desired configuration. (FIG. BC1).

Using memory material or other materials, filling the void space with ferro-fluid(s) or similar materials (as non-limiting examples), would also provide a way to re-shape the structure into the desired configuration by activating such a material. (FIG. BC2) This could also be accomplished by the void space being filled with any number of materials that are encapsulated (e.g., in spheres) such that they provide pressure (expanding foam as a non-limiting example) which can re-shape the structure in part or in whole and/or be used to apply pressure or create a cushion between the wearer or other surface being protected and the structure. In some cases this pressure could be used to stop bleeding as a non-limiting example.

In addition, micro-encapsulation technology where the surface of a material (a paper cup for example) can be set up such that when water is added, medicine or electrolyte drinks, etc. can be "instantly" produced, and may activated once damage occurs.

Embodiments of the structural "shape" can be desirably deployed only when a "threat" is sufficient to warrant it being "in place". It could be "deployed" using these embodiments with this deployment being a one-time or on/off, or adjustable level of deployment based on the assembly and needs of the user. See Figs. BC2 and BC3.

Embodiments can be provided as "inflatable" and able to be "deployed" using compressed gas, fluids, (as a non-limiting example). Inversely, embodiments can "deflate" the structure using a vacuum, relief valve, cap, plug, or other non-limiting methods. Applications for this include tires, protected surfaces, wearable items, re-entry shields, ship hulls, submarines, armor, as representative, non-limiting examples (FIG. BC3). Other examples can include armor that can re-constitute itself after an impact, such as by using electricity, heat, or magnetism as non-limiting examples.

Still other embodiments can include one or more of the following elements.

1. An apparatus for receiving and/or distributing an impact force, the apparatus comprising:
   a first structural component that defines an internal volume; and
   a second structural component positioned in the internal volume, the second structural component comprising a first edge and a second edge, and a region centered between the first edge and the second edge, wherein in response to the impact force:
   the first structural component directs a first portion of the impact force away from the second structural component and passes a second portion of the impact force to the second structural component, and
the second structural component directs the second portion away from the region.

2. The apparatus of claim 1, wherein the first structural component comprises a first tetrahedron, and wherein the second structural component comprises a second tetrahedron.

3. The apparatus of claim 2, wherein:
the first tetrahedron comprises a first tip,
the second tetrahedron comprises a second tip that is aligned with the first such that a longitudinal axis passes through i) the first tetrahedron at the first tip and ii) the second tetrahedron at the second tip.

4. The apparatus of claim 3, wherein:
the first tetrahedron comprises a first diagonal wall,
the second tetrahedron comprises a second diagonal wall,
the first tip is separated from the second tip by a first distance, and
the first diagonal wall is separated from the second diagonal wall by a second distance that is less than the first distance.

5. The apparatus of claim 2, wherein:
the first tetrahedron comprises a first edge; and
the second tetrahedron comprises a second edge connected to the first edge.

6. The apparatus of claim 2, further comprising a base layer connected to the first tetrahedron and the second tetrahedron.

7. The apparatus of claim 2, wherein prior to the impact force, the first structural component is not in contact with the second structural component.

8. The apparatus of claim 2, wherein:
the first tetrahedron comprises a first tip,
the second tetrahedron comprises a second tip that is not aligned with the first.

1. A structural assembly, comprising:
a first tetrahedron component;
a second tetrahedron component located within the first tetrahedron component, the second tetrahedron component defining an opening; and
a base layer that connects the first tetrahedron component with the second tetrahedron component, wherein an impact force received by the first tetrahedron component and the second tetrahedron component is directed, by the first tetrahedron component and the second tetrahedron component, away from the opening.

2. The structural assembly of claim 1, wherein the opening comprises a triangular opening.

3. The structural assembly of claim 1, wherein the opening comprises a rectangular opening.

4. The structural assembly of claim 1, wherein the first tetrahedron component comprises a first connector, and wherein the second tetrahedron component comprises a second connector that is connected to the first connector.

5. The structural assembly of claim 4, wherein the first tetrahedron component is removable from the second tetrahedron component by a decoupling between the first connector and the second connector.

6. The structural assembly of claim 1, wherein the second tetrahedron component directs the impact force through the base layer.

7. The structural assembly of claim 1, further comprising:
a third tetrahedron component connected to the base layer; and
a fourth tetrahedron component located within the first tetrahedron component, wherein the impact force received by the first tetrahedron component is directed to the third tetrahedron component.

8. The structural assembly of claim 7, wherein the impact force received by the first tetrahedron component is distributed to the third tetrahedron component.

1. An apparatus for receiving an impact force, the apparatus comprising:
a first structural component comprising a first set of walls;
a second structural component covered by the first structural component, the second structural component comprising a second set of walls; and
a base component connected to the first structural component and the second structural component, wherein an impact force to the first structural component is directed along the first set of walls, and when the first structural component deforms and contacts the second structural component, the impact force is directed to the second set of walls and the base component.

2. The apparatus of claim 1, wherein the first set of walls comprises a first set of triangular walls, and wherein the second set of walls comprises a second set of triangular walls.

3. The apparatus of claim 2, wherein the first set of triangular walls comprises equilateral triangles.

4. The apparatus of claim 2, wherein the first set of triangular walls comprises isosceles triangles.

5. The apparatus of claim 1, wherein the second set of walls defines a central region that is planar with respect to the base component, and wherein the first set of walls and the second set of walls direct the impact force away from the central region.

1. A structural assembly, comprising:
a first tetrahedron component; and
a second tetrahedron component located within the first tetrahedron component, the second tetrahedron component defining an opening, wherein an impact force passing through the first tetrahedron component and received by the second tetrahedron component is directed, by the second tetrahedron component, away from the opening.

2. The structural assembly of claim 1, wherein the second tetrahedron component receives the impact force the first tetrahedron component collapses and contacts the second tetrahedron component.

3. The structural assembly of claim 1, further comprising a base component that connects the first tetrahedron component to the second tetrahedron component, the base component surrounding the opening, wherein the impact force is directed from the second tetrahedron component to the base component.

4. The structural assembly of claim 1, wherein the impact force is reduced from a first impact to a second impact force at the opening.

1. A structural assembly, comprising:
a first component comprising a first set of walls joined together to define a first point and a first perimeter opposite the first point; and
a second component located within the first component, the second component comprising a second set of walls joined together to define a second point and a second perimeter opposite the second point, wherein an impact force to the first component is directed to the first perimeter, and when the impact force is received by the second component, the impact force is directed to the second perimeter.

2. The structural assembly of claim 1, further comprising a base component connected to the first structural component at the first perimeter and the second structural component at the second perimeter.

3. The structural assembly of claim 1, wherein the first set of walls comprises a wall connected to the base component, wherein the wall and the base component define an obtuse angle.

4. The apparatus of claim 1, wherein the first set of walls comprises a first set of triangular walls, and wherein the second set of walls comprises a second set of triangular walls.

5. The apparatus of claim 1, wherein the first set of triangular walls defines a first tetrahedron, and wherein the second set of triangular walls defines a second tetrahedron.

1. An impact resistant apparatus, comprising:
a first collapsible structure comprising:
a first wall,
a second wall connected to the first wall, and
a third wall connected to the first wall and the second wall; and
a second structure covered by the first collapsible structure, wherein the first collapsible structure is configured to absorb and deform in response to an impact force, thereby directing the impact force through at least one of the first wall, the second wall, or the third wall such that the impact force is diverted away from the second structure.

2. The impact resistant apparatus of claim 1, wherein the second structure comprises a second collapsible structure comprising:
a fourth wall,
a fifth wall connected to the fourth wall, and
a sixth wall connected to the fourth wall and the fifth wall, wherein when the first collapsible structure contacts the second collapsible structure, the second collapsible structure absorbs and absorbs the impact force, thereby directing the impact force through at least one of the fourth wall, the fifth wall, or the sixth wall.

3. The impact resistant apparatus of claim 2, wherein the first wall, the second wall, and the third wall define a first tetrahedron, and wherein the fourth wall, the fifth wall, and the sixth wall define a second tetrahedron that is positioned within a volume that is defined by the first tetrahedron.

4. The impact resistant apparatus of claim 3, wherein the first tetrahedron is larger than the second tetrahedron.

5. The impact resistant apparatus of claim 4, wherein the second tetrahedron is proportionate to the first tetrahedron.

6. The impact resistant apparatus of claim 4, wherein the second tetrahedron is disproportionate to the first tetrahedron.

7. The impact resistant apparatus of claim 1, wherein the second structure comprises a second collapsible structure that defines an opening, and wherein the second collapsible structure is configured to absorb and deform in response to the impact force, thereby directing the impact force away from the opening.

II. Stackable/Nested Tetrahedron Structures

1. An assembly, comprising:
a first structure that includes a first height, the first structure comprising:
a first tetrahedron component, and
a second tetrahedron component positioned in the first tetrahedron, the second tetrahedron component defining a first volume;
a second structure that includes a second height equal to the first height, the second structure comprising:
a third tetrahedron component,
a fourth tetrahedron component positioned in the third tetrahedron component, the fourth tetrahedron component defining a second volume different from the first volume, and
a third structure that includes a third height equal to the first height, the third structure defining a fifth tetrahedron component, wherein a nested configuration comprises i) the second structure extending into the first volume to a first distance, and ii) the third structure extending into the second volume to a second distance that is different from the first distance.

2. The assembly of claim 1, wherein the first distance is less than the second distance.

3. The assembly of claim 1, wherein the first distance is greater than the second distance.

4. The assembly of claim 1, wherein the first tetrahedron component is separated from the second tetrahedron component by a first dimension, and wherein the third tetrahedron component is separated from the fourth tetrahedron component by a second dimension that is different from the first dimension.

5. The assembly of claim 1, wherein the fourth tetrahedron component is offset with respect to the third tetrahedron component.

III. Array of Tetrahedron Structures

1. A structural assembly, comprising:
a first nested tetrahedron assembly that defines an outer perimeter comprising a first edge, a second edge, and a third edge, the first nested tetrahedron assembly comprising:
a first tetrahedron that defines an internal volume, and
a second tetrahedron that is positioned in the internal volume;
a second nested tetrahedron assembly connected to the first nested tetrahedron assembly at the first edge;
a third nested tetrahedron assembly connected to the first nested tetrahedron assembly at the second edge; and
a fourth nested tetrahedron assembly connected to the first nested tetrahedron assembly at the third edge, wherein an impact force to the first tetrahedron is directed away from the first tetrahedron and to the second nested tetrahedron assembly, the third nested tetrahedron assembly, and the fourth third tetrahedron assembly.

2. The structural assembly of claim 1, further comprising a base component connected to the first tetrahedron and the second tetrahedron, wherein when the second tetrahedron receives the impact force, the second tetrahedron directs the impact force through the base component to at least one of the first edge, the second edge, or the third edge.

3. The structural assembly of claim 2, wherein the second tetrahedron defines an opening, and wherein the second tetrahedron directs the impact force away from the opening.

4. The structural assembly of claim 1, wherein prior to the impact force, the first tetrahedron is not in contact with the second tetrahedron.

IV. Multiple Arrays of Tetrahedron Structures

1. A system, comprising:
a first base layer;
a first nested tetrahedron assembly carried by the first base layer, the first nested tetrahedron assembly comprising a first tip;
a second nested tetrahedron assembly carried by the first base layer, the second nested tetrahedron assembly comprising a second tip, wherein the first nested tetrahedron assembly and the first nested tetrahedron assembly defined a valley between the first tip and the second tip;
a second base layer;

a third nested tetrahedron assembly carried by the second base layer, the third nested tetrahedron assembly comprising a third tip, wherein a stacked configuration comprises the third tip positioned in the valley.

2. The system of claim 1, further comprising a spherical element positioned in the valley, the spherical element engaging at least one of the first nested tetrahedron, the second nested tetrahedron, or the third nested tetrahedron.

3. The system of claim 2, wherein the third tip is embedded in the spherical element.

4. The system of claim 2, wherein an impact to the second base layer is directed through the third nested tetrahedron assembly, the spherical element, and at least one of the first nested tetrahedron assembly or the second nested tetrahedron assembly.

5. The system of claim 1, wherein when the second base layer is positioned on the first base layer, the first nested tetrahedron assembly, the second nested tetrahedron assembly, and the third nested tetrahedron assembly define a void that is unobstructed from a first end of the first base layer and the second base layer to a second end of the first base layer and the second base layer.

6. The system of claim 1, further comprising a cylindrical element positioned in valley.

1. A system, comprising:
a first base layer, comprising:
a first nested tetrahedron assembly comprising a first tip,
a second nested tetrahedron assembly comprising a second tip, wherein the first nested tetrahedron assembly and the first nested tetrahedron assembly defined a valley between the first tip and the second tip; and
a second base layer that overlays the first base layer, the second base layer comprising:
a third nested tetrahedron assembly comprising a third tip, and
a fourth nested tetrahedron assembly comprising a fourth tip; and
an object positioned between the first base layer and the second base layer, wherein the object aligns the first tip and the second tip with the third tip and the fourth tip, respectively.

2. The system of claim 1, wherein the object comprises a spherical element.

3. the system of claim 2, wherein the spherical element comprises:
an outer shell; and
a fluid surrounded by the outer shell.

V. Tetrahedron Structures on Clothing

1. An article of clothing for minimizing an impact force, the article of clothing comprising:
a fabric layer;
a base layer covering the fabric layer; and
a first nested tetrahedron assembly located on the base layer, the first nested tetrahedron assembly comprising:
a first tetrahedron that defines an internal volume, and
a second tetrahedron that is positioned in the internal volume;
a second nested tetrahedron assembly located on the base layer, the second nested tetrahedron connected to the first nested tetrahedron, wherein a first portion of the impact force to the first nested tetrahedron assembly is directed through the first tetrahedron to the second nested tetrahedron assembly, and wherein a second portion of the impact force is directed through the first tetrahedron to the second tetrahedron, the second portion being less than the first portion.

2. The article of clothing of claim 1, wherein the second portion passes from the second tetrahedron to the base layer.

3. The article of clothing of claim 1, wherein the first portion is directed away from the second tetrahedron by the first tetrahedron.

1. An article of handwear, comprising:
a hand covering layer;
a digit covering layer connected to the hand covering layer; and
a cluster of tetrahedron assemblies that covers at least a portion of the hand covering layer and the digit covering layer, wherein each of the cluster of tetrahedron assemblies comprises:
a first tetrahedron that defines an internal volume, and
a second tetrahedron that is positioned in the internal volume.

2. The article of handwear of claim 1, wherein the cluster of tetrahedron assemblies comprises:
a first tetrahedron assembly; and
a second tetrahedron assembly connected to the first tetrahedron assembly, wherein the first tetrahedron shields the second tetrahedron from an impact force such that the impact force is directed from the first tetrahedron to the second tetrahedron assembly.

3. The article of handwear of claim 2, wherein in response to the first tetrahedron collapsing onto the second tetrahedron, the impact force is directed from the second tetrahedron to the second tetrahedron assembly.

VI. Tetrahedron Structures as a Wheel

1. A rolling element, comprising:
a circular base layer comprising a first surface that defines an outer surface and a second surface that is opposite the first surface;
a first nested tetrahedron assembly located on the second surface;
a second nested tetrahedron assembly located on the second surface; and
a third nested tetrahedron assembly located on the second surface.

2. The rolling element of claim 1, further comprising a spherical element in contact with the first nested tetrahedron assembly, the second nested tetrahedron assembly, and the third nested tetrahedron assembly.

3. The rolling element of claim 1, wherein the circular base layer defines a center point, and wherein the first nested tetrahedron assembly, the second nested tetrahedron assembly, and the third nested tetrahedron assembly face the center point.

4. The rolling element of claim 1, wherein the first nested tetrahedron assembly comprises:
a first tetrahedron that defines an internal volume; and
a second tetrahedron that is positioned in the internal volume.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices and solid-state devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A structural assembly, comprising:
  a first base layer;
  a first nested tetrahedron assembly carried by the first base layer, the first nested tetrahedron assembly defines an outer perimeter comprising a first edge, a second edge, and a third edge, the first nested tetrahedron assembly comprising:
    a first tetrahedron that defines an internal volume, and
    a second tetrahedron that is positioned in the internal volume; and
  a second nested tetrahedron assembly carried by the first base layer, the second nested tetrahedron assembly is connected to the first nested tetrahedron assembly at the first edge.

2. The structural assembly of claim 1, further comprising:
  a third nested tetrahedron assembly connected to the first nested tetrahedron assembly at the second edge.

3. The structural assembly of claim 1, further comprising:
  a fourth nested tetrahedron assembly connected to the first nested tetrahedron assembly at the third edge, wherein an impact force to the first tetrahedron is directed away from the first tetrahedron and to the second nested tetrahedron assembly, the third nested tetrahedron assembly, and the fourth tetrahedron assembly.

4. The structural assembly of claim 1, further comprising a base component connected to the first tetrahedron and the second tetrahedron, wherein when the second tetrahedron receives the impact force, the second tetrahedron directs the impact force through the base component to at least one of the first edge or the second edge.

5. The structural assembly of claim 4, wherein the second tetrahedron defines an opening, and wherein the second tetrahedron directs the impact force away from the opening.

6. The structural assembly of claim 1, wherein prior to an impact force, the first tetrahedron is not in contact with the second tetrahedron.

7. The structural assembly of claim 1, wherein the structural assembly is at least one of interdigitated, interwoven or stacked.

8. The structural assembly of claim 1, wherein the structural assembly comprises one of:
  tips face inward toward each other;
  tips face in opposite directions;
  a curved shape:
  a flat shape; or
  an angular shape.

9. The structural assembly of claim 1, wherein the structural assembly further comprises filler material.

10. The structural assembly of claim 1, wherein the structural assembly further comprises at least one of a fluid, gas, plasma or magnetic fluid.

11. The structural assembly of claim 1, wherein the structural assembly further comprises pathways for at least one of wiring, piping, tubing, cables or optics.

12. The structural assembly of claim 1, wherein the structural assembly is encapsulated and evacuated.

13. The structural assembly of claim 1, wherein the structural assembly further comprises a flexible assembly mounted to a flexible backing that can be curved or reinforced.

14. The structural assembly of claim 1, wherein the structural assembly is inflatable and deflatable.

15. A system, comprising:
  a first base layer;
  a first nested tetrahedron assembly carried by the first base layer, the first nested tetrahedron assembly comprising a first tip, a first tetrahedron that defines an internal volume, and a second tetrahedron that is positioned in the internal volume;
  a second nested tetrahedron assembly carried by the first base layer, the second nested tetrahedron assembly comprising a second tip, wherein the first nested tetrahedron assembly and the second nested tetrahedron assembly defined a valley between the first tip and the second tip;
  a second base layer;
  a third nested tetrahedron assembly carried by the second base layer, the third nested tetrahedron assembly comprising a third tip, wherein a stacked configuration comprises the third tip positioned in the valley.

16. The system of claim 15, further comprising a spherical element positioned in the valley, the spherical element engaging at least one of the first nested tetrahedron, the second nested tetrahedron, or the third nested tetrahedron.

17. The system of claim 16, wherein the third tip is embedded in the spherical element.

18. The system of claim 16, wherein an impact to the second base layer is directed through the third nested tetrahedron assembly, the spherical element, and at least one of the first nested tetrahedron assembly or the second nested tetrahedron assembly.

19. The system of claim 15, wherein when the second base layer is positioned on the first base layer, the first nested tetrahedron assembly, the second nested tetrahedron assembly, and the third nested tetrahedron assembly define a void that is unobstructed from a first end of the first base layer and the second base layer to a second end of the first base layer and the second base layer.

20. The system of claim 16, wherein the spherical element comprises:
  an outer shell; and
  a fluid surrounded by the outer shell.

* * * * *